(12) United States Patent
Fukushima et al.

(10) Patent No.: US 8,175,976 B2
(45) Date of Patent: May 8, 2012

(54) METHOD FOR PROVIDING AND OBTAINING CONTENT

(75) Inventors: Osamu Fukushima, Kanagawa (JP); Hajime Fujii, Saitama (JP); Hiroshi Ozaki, Saitama (JP)

(73) Assignee: Sony Corporation, Tokyo (JP)

( * ) Notice: Subject to any disclaimer, the term of this patent is extended or adjusted under 35 U.S.C. 154(b) by 2270 days.

(21) Appl. No.: 10/353,819

(22) Filed: Jan. 29, 2003

(65) Prior Publication Data
US 2003/0217007 A1 Nov. 20, 2003

(30) Foreign Application Priority Data

Jan. 29, 2002 (JP) .................... 2002-020767

(51) Int. Cl.
*G06F 21/00* (2006.01)
(52) U.S. Cl. ............. 705/50; 705/51; 705/54; 705/57; 705/901; 705/902; 705/903; 705/904; 705/911; 380/227; 380/228; 380/229; 380/230
(58) Field of Classification Search .............. 705/50
See application file for complete search history.

(56) References Cited

U.S. PATENT DOCUMENTS

| | | | | |
|---|---|---|---|---|
| 5,892,900 | A * | 4/1999 | Ginter et al. ............. | 726/26 |
| 7,020,285 | B1 * | 3/2006 | Kirovski et al. ........... | 380/238 |
| 7,543,148 | B1 * | 6/2009 | Kirovski et al. ........... | 713/176 |
| 2002/0154779 | A1 * | 10/2002 | Asano et al. ............. | 380/277 |

FOREIGN PATENT DOCUMENTS

| | | |
|---|---|---|
| JP | 00-358230 | 12/2000 |
| JP | 2000-358230 | * 12/2000 |

OTHER PUBLICATIONS

White, Ron. "How Computers Work," Millennium Edition, Que Corporation, Indianaoplis, IN, Sep. 2009.*
Wikipedia—Data compression (last modified Dec. 17, 2011). Retrieved online Dec. 19, 2011.*

* cited by examiner

*Primary Examiner* — James A Reagan
(74) *Attorney, Agent, or Firm* — Wolf, Greenfield & Sacks, P.C.

(57) ABSTRACT

In a data providing server 1101, whether or not specified compressed content data D51 generated by means of a specified compression coding method corresponding to terminal identification information has been stored in a content database 1113 is detected, according to content specifying data D53 transmitted from a portable dedicated terminal 1104. If the specified compressed content data D51 has been stored, the data providing server 1101 reads and transmits this to the portable dedicated terminal 1104. And if the specified compressed content data D51 has not been stored, the data providing server 1101 generates the specified compressed content data D51 by means of the specified compression coding method, and transmits this to the portable dedicated terminal 1104. Thereby, the specified compressed content data D51 generated by means of a specified decoding method can be properly provided to the portable dedicated terminal 1104, and the user can easily view a content based on the content data.

30 Claims, 61 Drawing Sheets

FIG. 12A

| COMPANY'S NAME | XXX PLANNING CORPORATION |
|---|---|
| TELEPHONE NUMBER | XX-XXXX-XXXX |
| E-MAIL ADDRESS | XXX@XX・・・ |
| GENRE (SELECT) | AA |
| MESSAGE | IF YOU BUY A CAR, PLEASE ENTRUST IT TO OUR COMPANY! |
| TERMS OF CONTRACT (SELECT) | 6 |

FIG. 12B

| ADVERTISER/COMPANY ID | 888888 |
|---|---|
| NAME OF COMPANY | XXX PLANNING CORPORATION |
| TELEPHONE NUMBER | XX-XXXX-XXXX |
| E-MAIL ADDRESS | XXX@XX・・・ |
| GENRE (SELECT) | AA |
| MESSAGE | IF YOU BUY A CAR, PLEASE ENTRUST IT TO OUR COMPANY! |
| TERMS OF CONTRACT (SELECT) | 6 |

FIG. 13A

| NAME | TARO YAMADA |
|---|---|
| SEX (SELECT) | 1 |
| AGE | 45 |
| GENRE HAVING INTEREST (SELECT) | AA |
| COMMENT | I WANT TO BUY A RED VAN. |
| TERMS OF CONTRACT (SELECT) | 1 |
| E-MAIL ADDRESS | XXX@XXX... |

FIG. 13B

| CUSTOMER ID | 999999 |
|---|---|
| NAME | TARO YAMADA |
| SEX (SELECT) | 1 |
| AGE | 45 |
| GENRE HAVING INTEREST (SELECT) | AA |
| COMMENT | I WANT TO BUY A RED VAN. |
| TERMS OF CONTRACT (SELECT) | 1 |
| E-MAIL ADDRESS | XXX@XXX... |

| CONDITION NUMBER | CONTENTS OF CONTRACT CONDITION |
|---|---|
| 1. | THE ADVERTISER/COMPANY PAYS A PART OF CUSTOMER'S COMMUNICATION CHARGES. |
| 2. | THE ADVERTISER/COMPANY MAKES A DISCOUNTS ON PURCHASE BY THE CUSTOMER |
| 3. | THE CUSTOMER CAN USE THE POINT OF INTERNET MILEAGE FOR PAYMENT BY CONVERTING IT INTO MONEY IN PURCHASE. |
| 4. | THE CUSTOMER CAN GET A GIFT FROM THE ADVERTISER/COMPANY ACCORDING TO THE POINT OF THE INTERNET MILEAGE. |
| 5. | THE CUSTOMER PROMISES THE ADVERTISER/COMPANY TO ACCESS TO ITS SITE FOR A PREDETERMINED TIME OR OVER EVERY MONTH. |
| 6. | THE CUSTOMER PROMISES THE ADVERTISER/COMPANY TO PURCHASE FOR A PREDETERMINED AMOUNT OR OVER EVERY MONTH. |

FIG. 14

| CUSTOMER ID | 999999 | | |
|---|---|---|---|
| NAME | TARO YAMADA | | |
| ACCESSED GENRE | AA | BB | |
| ACCESS COUNTER | 101 | 5 | |
| STATE OF PURCHASE | ¥5000 | | |
| INTERNET MILEAGE | 5101 | 5 | |
| SEX (SELECT) | 1 | | |
| AGE | 45 | | |
| GENRE HAVING INTEREST (SELECT) | AA | | |
| COMMENT | I WANT TO BUY A RED VAN. | | |
| CONTRACT CONDITION (SELECT) | 1 | | |
| E-MAIL ADDRESS | XXX@XXX・・・ | | |

| COMPANY'S NAME | XXX PLANNING CORPORATION | | |
|---|---|---|---|
| TELEPHONE NUMBER | XX-XXXX-XXXX | | |
| E-MAIL ADDRESS | XXX@XX··· | | |
| GENRE (SELECT) | AA | | |
| MESSAGE | IF YOU BUY A CAR, PLEASE ENTRUST IT TO OUR COMPANY! | | |
| TERMS OF CONTRACT (SELECT) | 6 | | |

FIG. 17

| NAME | TARO YAMADA | | |
|---|---|---|---|
| ACCESSED GENRE | AA | | |
| ACCESS COUNTER | 101 | | |
| STATE OF PURCHASE | ¥5000 | | |
| INTERNET MILEAGE | 5101 | | |
| SEX (SELECT) | 1 | | |
| AGE | 45 | | |
| GENRE HAVING INTEREST (SELECT) | AA | | |
| COMMENT | I WANT TO BUY A RED VAN. | | |
| TERMS OF CONTRACT (SELECT) | 1 | | |
| E-MAIL ADDRESS | XXX@XXX··· | | |

FIG. 18

| ADVERTISER/COMPANY ID | 888888 |
| --- | --- |
| COMPANY'S NAME | XXX PLANNING CORPORATION |
| TELEPHONE NUMBER | XX-XXXX-XXXX |
| E-MAIL ADDRESS | XXX@XX··· |
| GENRE (SELECT) | AA |
| MESSAGE | IF YOU BUY A CAR, PLEASE ENTRUST IT TO OUR COMPANY! |
| TERMS OF CONTRACT (SELECT) | 6 |
| CUSTOMER ID CONCLUDED CONTRACT | 999999 |

FIG. 19

| CUSTOMER ID | 999999 | | |
| --- | --- | --- | --- |
| NAME | TARO YAMADA | | |
| ACCESSED GENRE | AA | BB | |
| ACCESS COUNTER | 101 | 5 | |
| STATE OF PURCHASE | ¥5000 | | |
| INTERNET MILEAGE | 5101 | 5 | |
| SEX (SELECT) | 1 | | |
| AGE | 45 | | |
| GENRE HAVING INTEREST (SELECT) | AA | | |
| COMMENT | I WANT TO BUY A RED VAN. | | |
| TERMS OF CONTRACT (SELECT) | 1 | | |
| E-MAIL ADDRESS | XXX@XXX··· | | |
| ADVERTISER/COMPANY ID CONCLUDED CONTRACT | 888888 | 777777 | |

FIG. 20

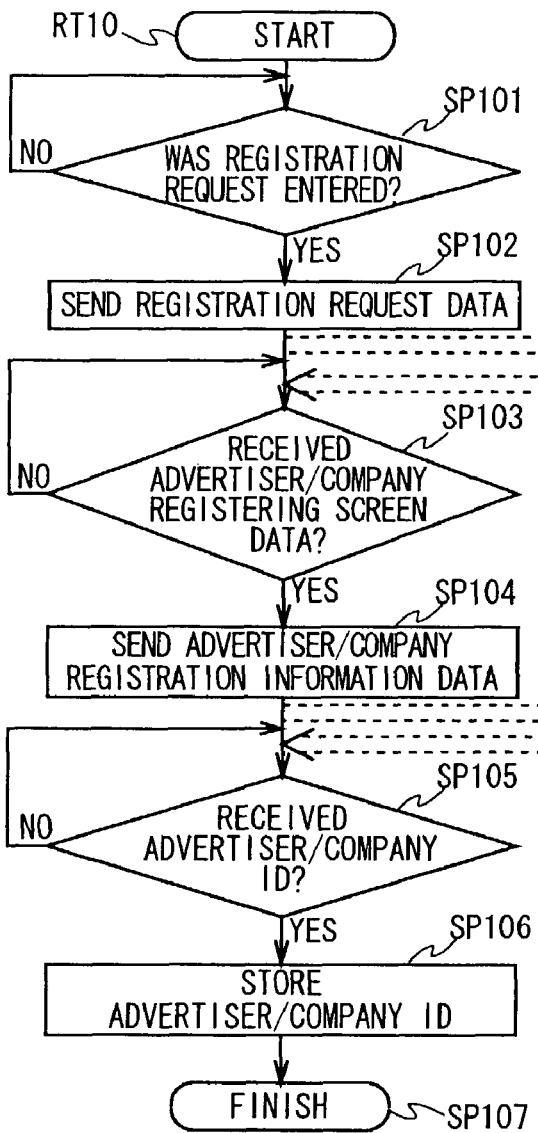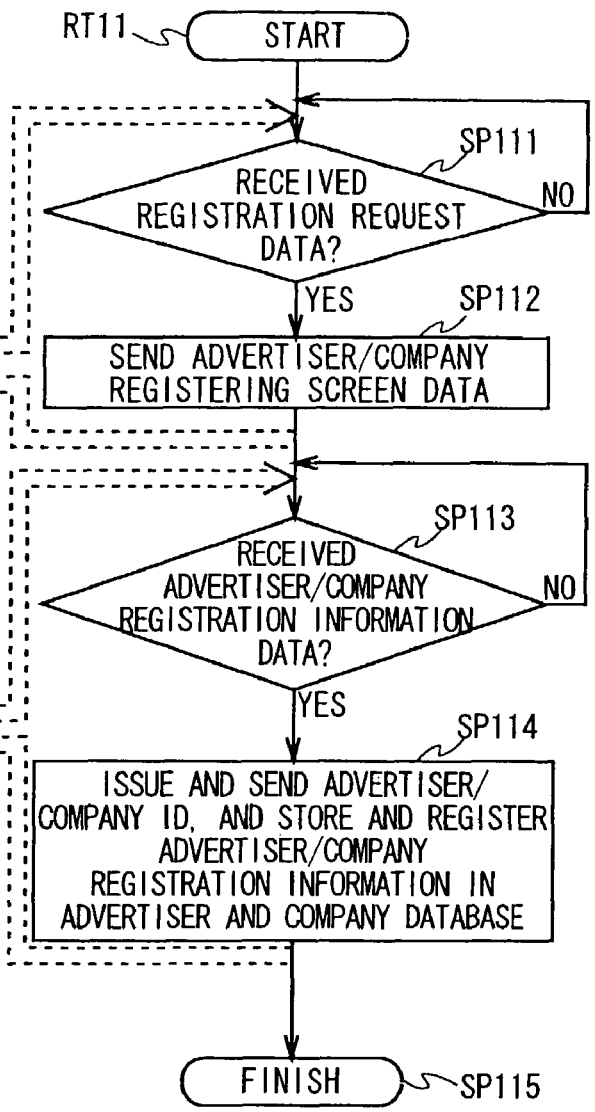
FIG. 21A
FIG. 21B

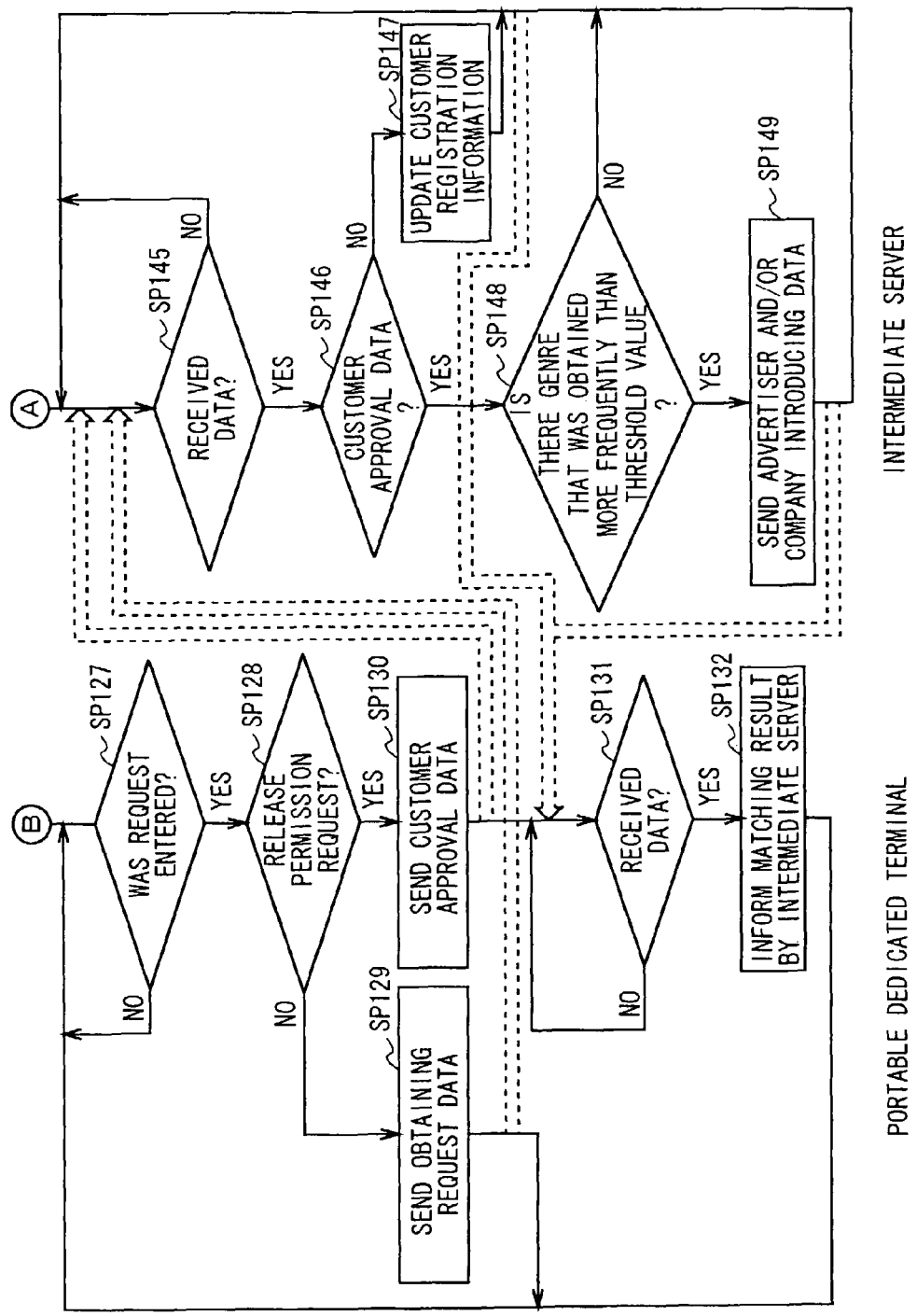

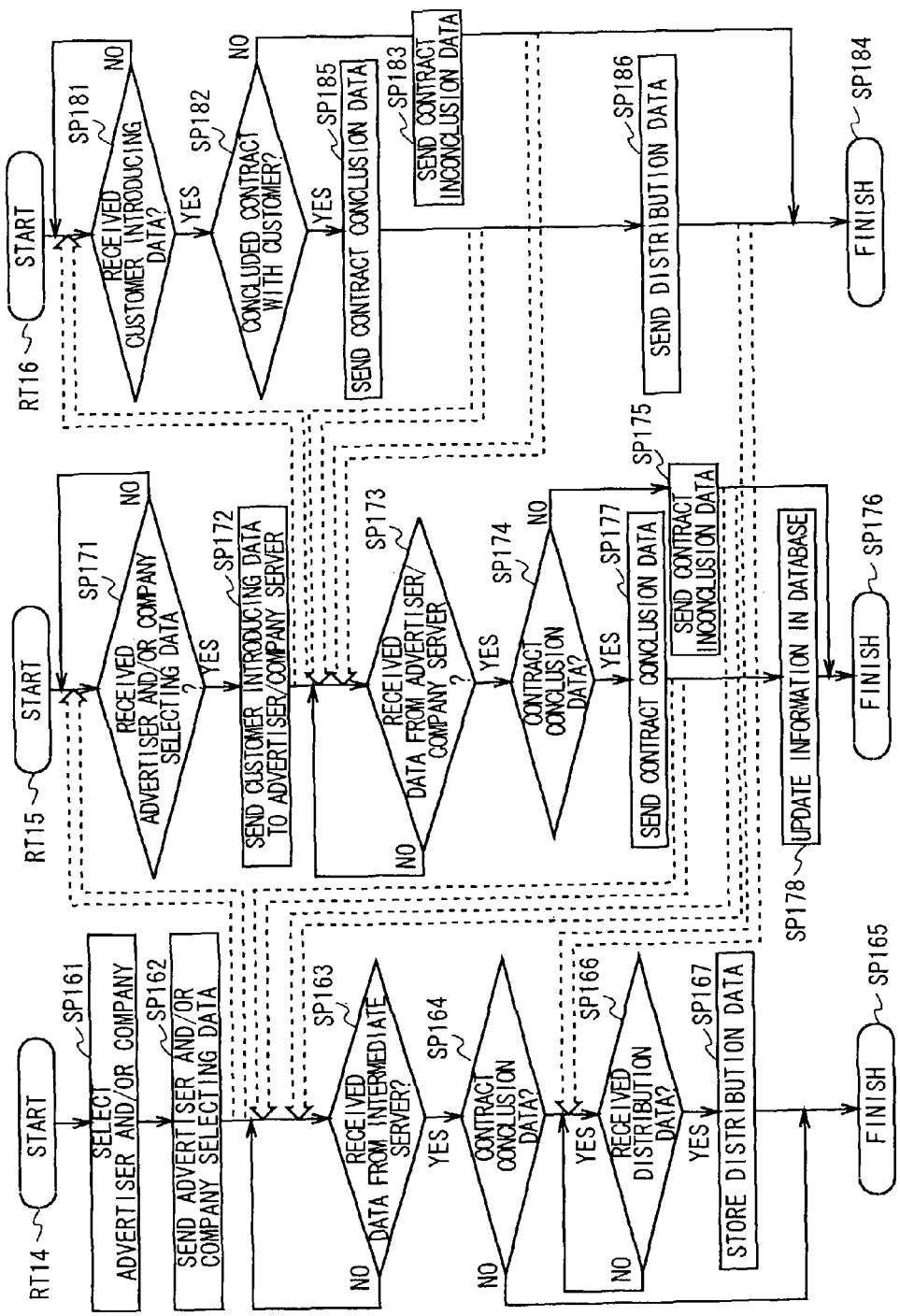

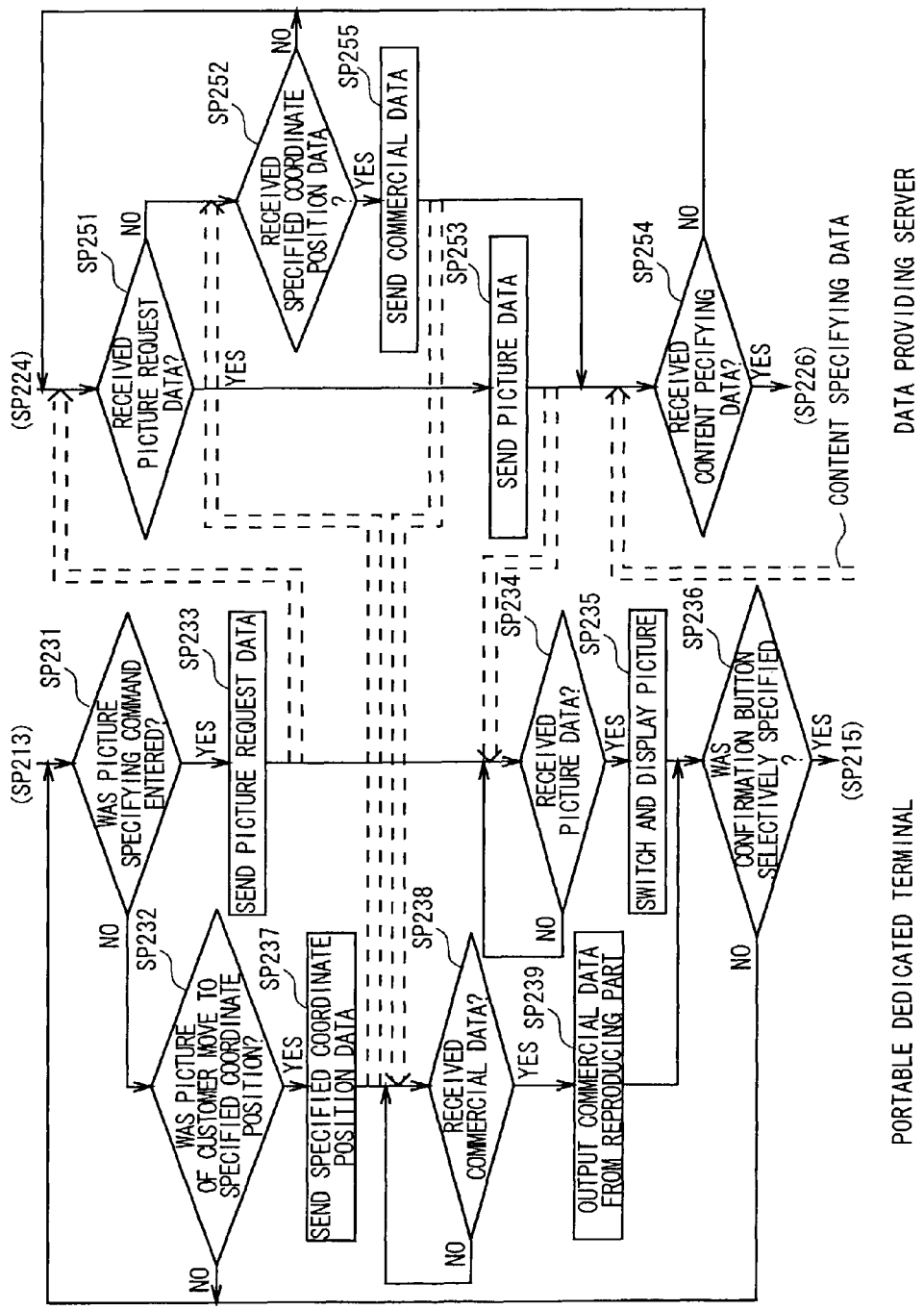

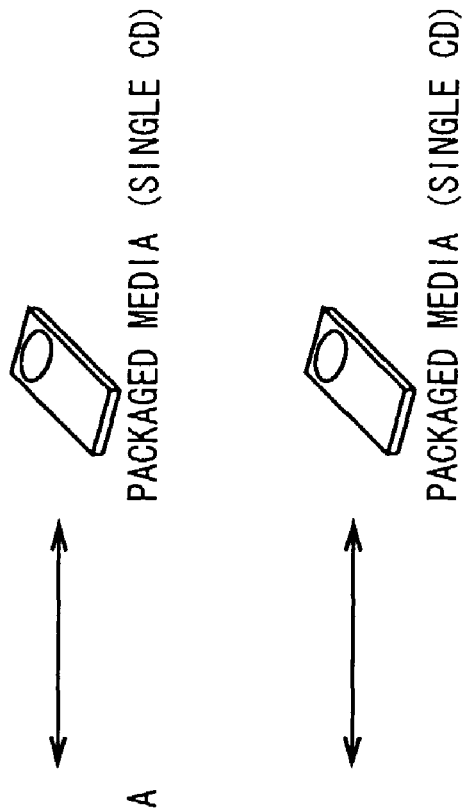
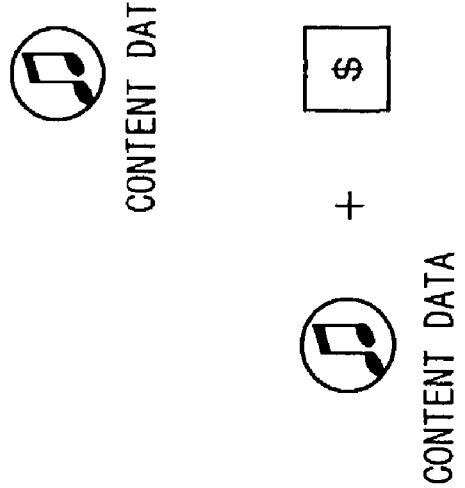
FIG. 41A
FIG. 41B

| TITLE | CONTENT ID | RANKING POINT | DATE POINT | TOTAL POINT |
|---|---|---|---|---|
| Klmnopqr | 8888888 | 2 | 1 | 3 |
| Abxjz | 3333333 | 1 | 1 | 2 |
| Dwhist | 5555555 | 3 | 3 | 6 |
| Nsbdca | 1111111 | 10 | 9 | 19 |
| ⋮ | ⋮ | ⋮ | ⋮ | ⋮ |
| Micsft | 9999999 | 5 | 8 | 13 |

FIG. 47A

| TITLE (SINGLE) | PACKAGE ID (SINGLE) | RANKING POINT | DATE POINT | TOTAL POINT | SELLING PRICE |
|---|---|---|---|---|---|
| Kabcd | 33335555 | 5 | 1 | 6 | 1000 |
| Snjpy | 1111999 | 1 | 3 | 4 | 1000 |
| Axbmc | 7778888 | 9 | 3 | 12 | 1000 |
| Micts | 4444666 | 10 | 10 | 20 | 1000 |
| ⋮ | ⋮ | ⋮ | ⋮ | ⋮ | ⋮ |
| Xbojn | 2222444 | 5 | 1 | 6 | 800 |

FIG. 47B

| TITLE (ALBUM) | PACKAGE ID (ALBUM) | RANKING POINT | DATE POINT | TOTAL POINT | SELLING PRICE |
|---|---|---|---|---|---|
| Acxbmdy | 4444444 | 10 | 9 | 19 | 3600 |
| Nomstfc | 7777777 | 5 | 9 | 14 | 3000 |
| Abedar | 6666666 | 7 | 3 | 10 | 2800 |
| Epdmc | 2222222 | 10 | 10 | 20 | 3500 |
| ⋮ | ⋮ | ⋮ | ⋮ | ⋮ | ⋮ |
| Xjyahs | 5555333 | 6 | 1 | 7 | 3200 |

FIG. 47C

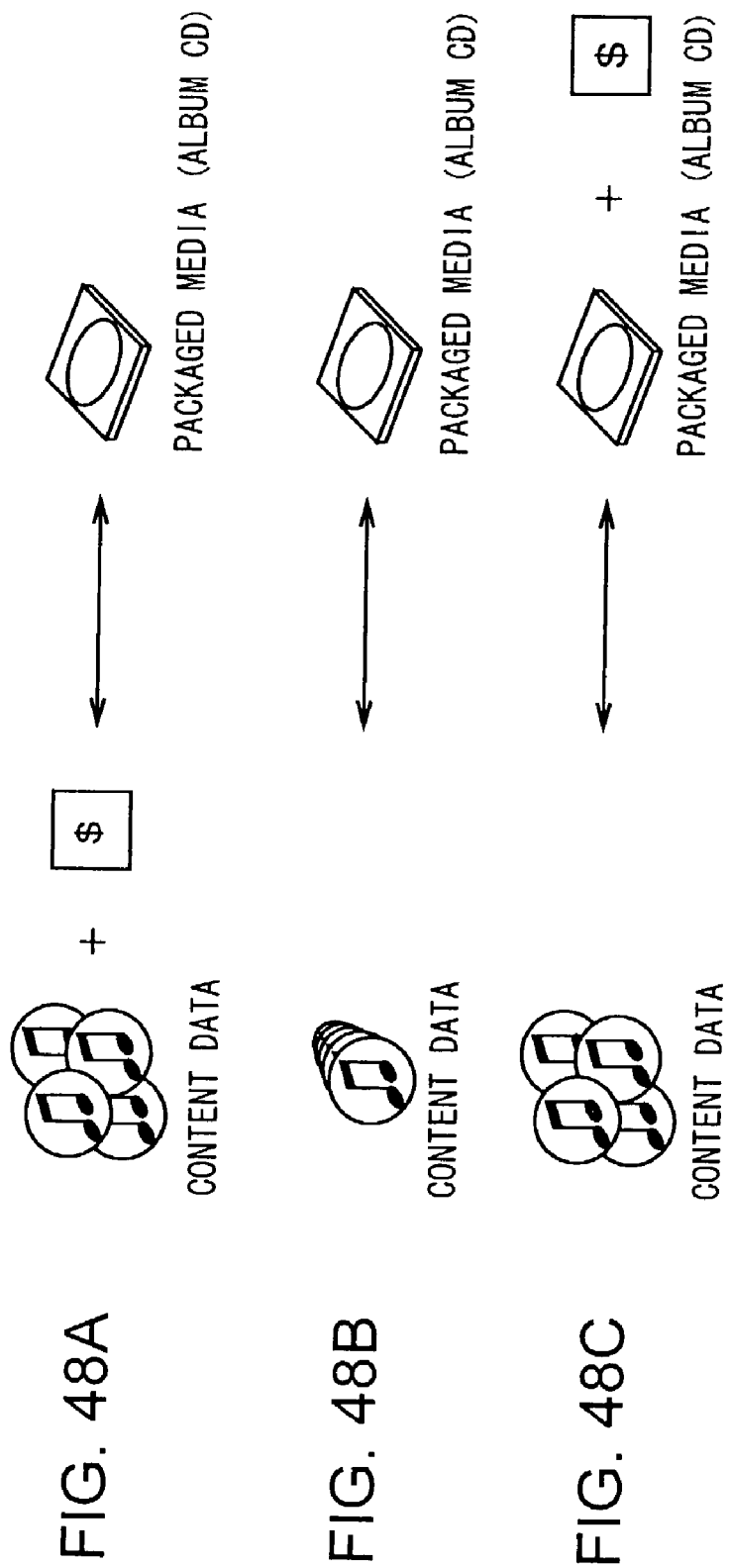

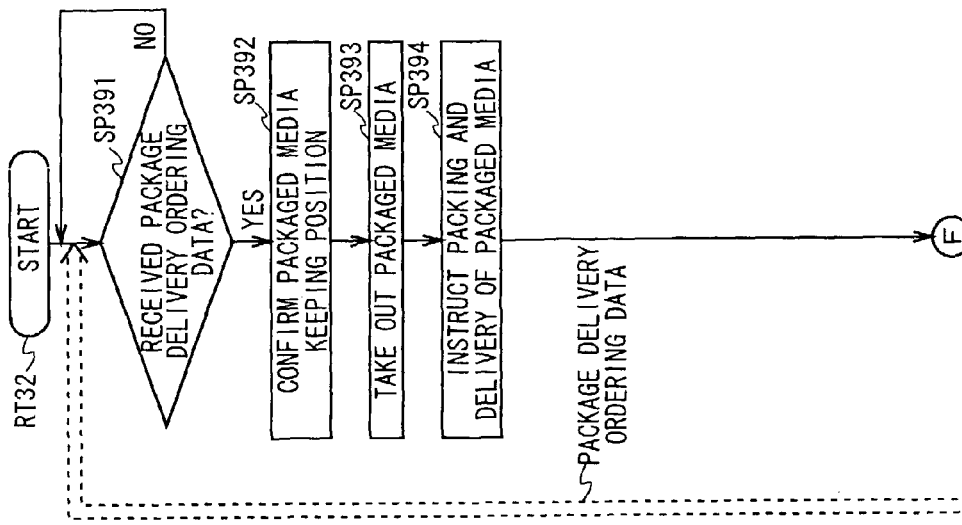
FIG. 49C
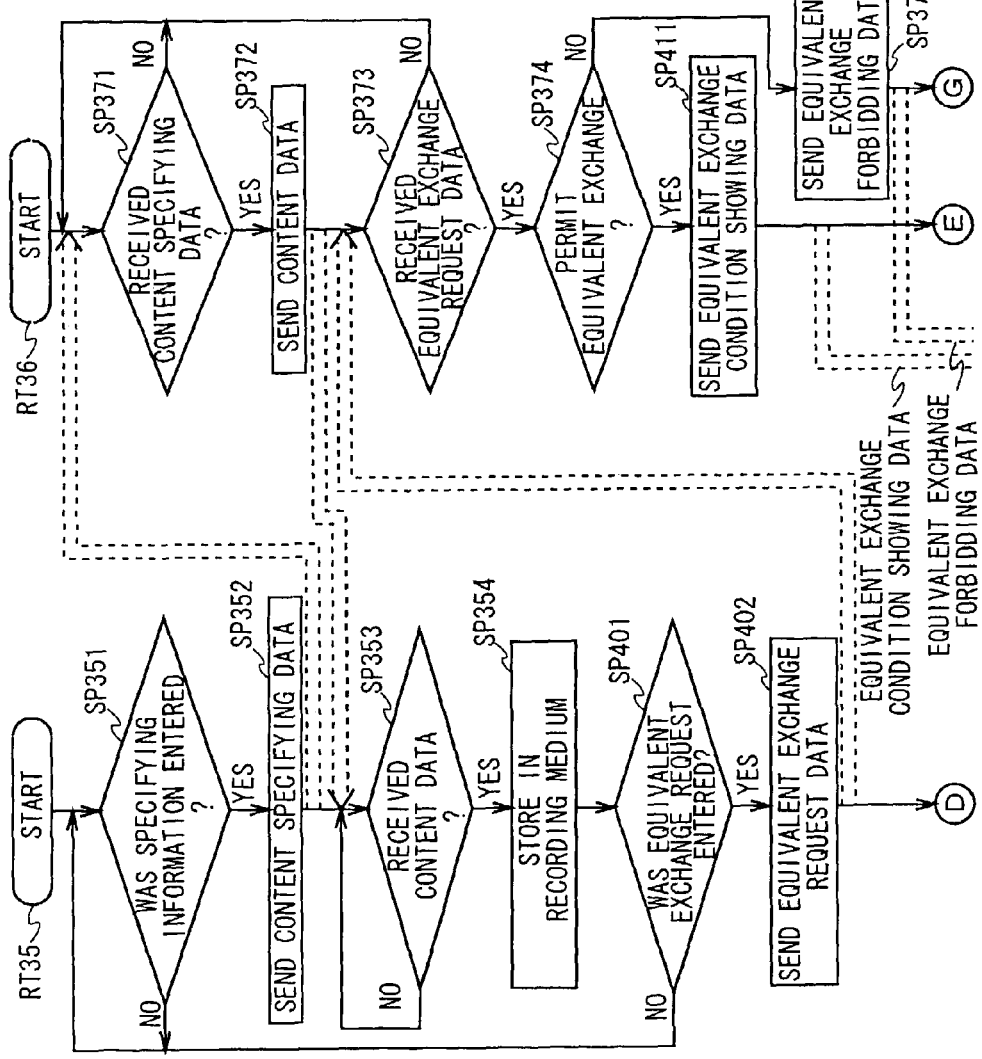
FIG. 49B
FIG. 49A

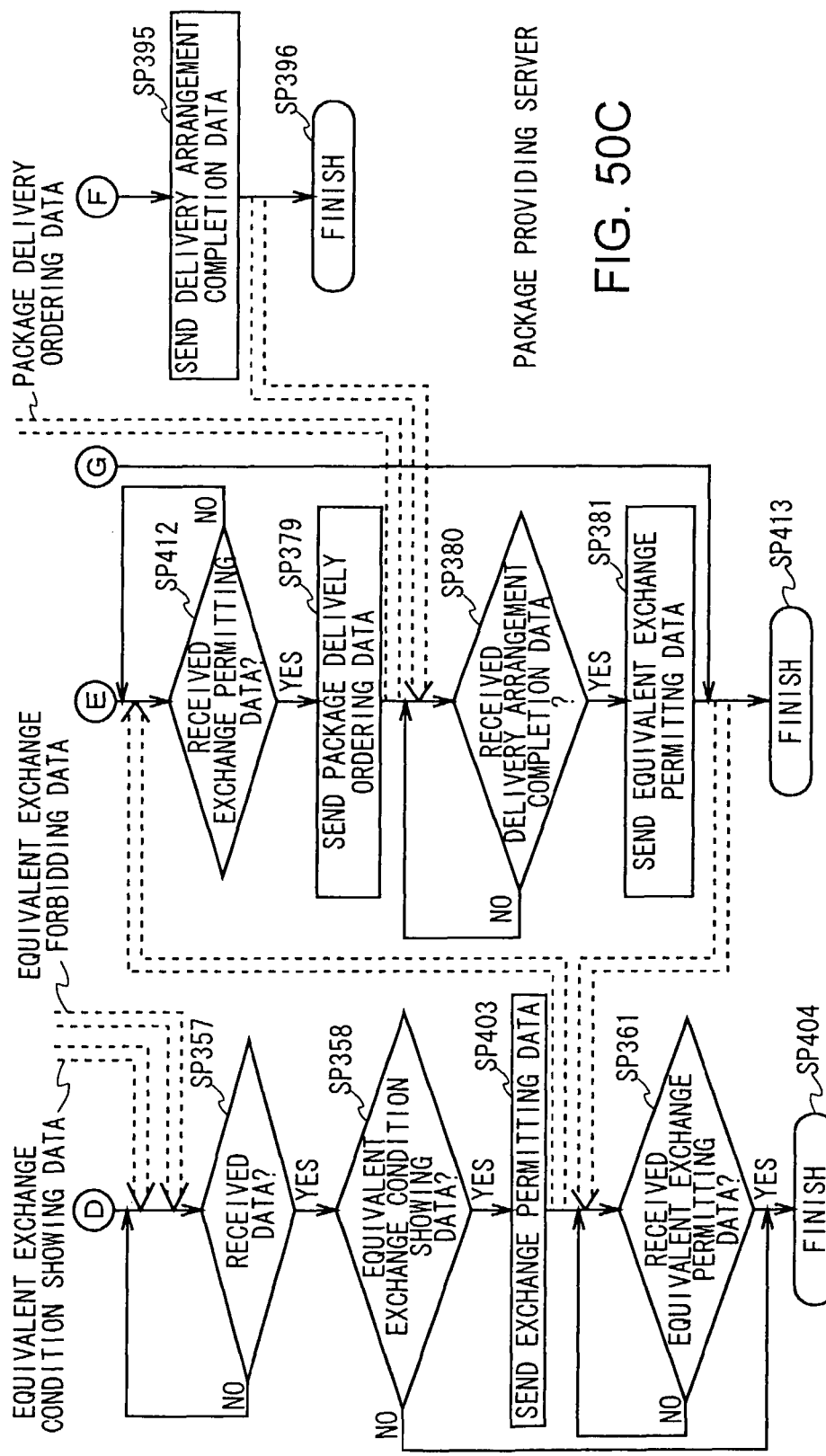

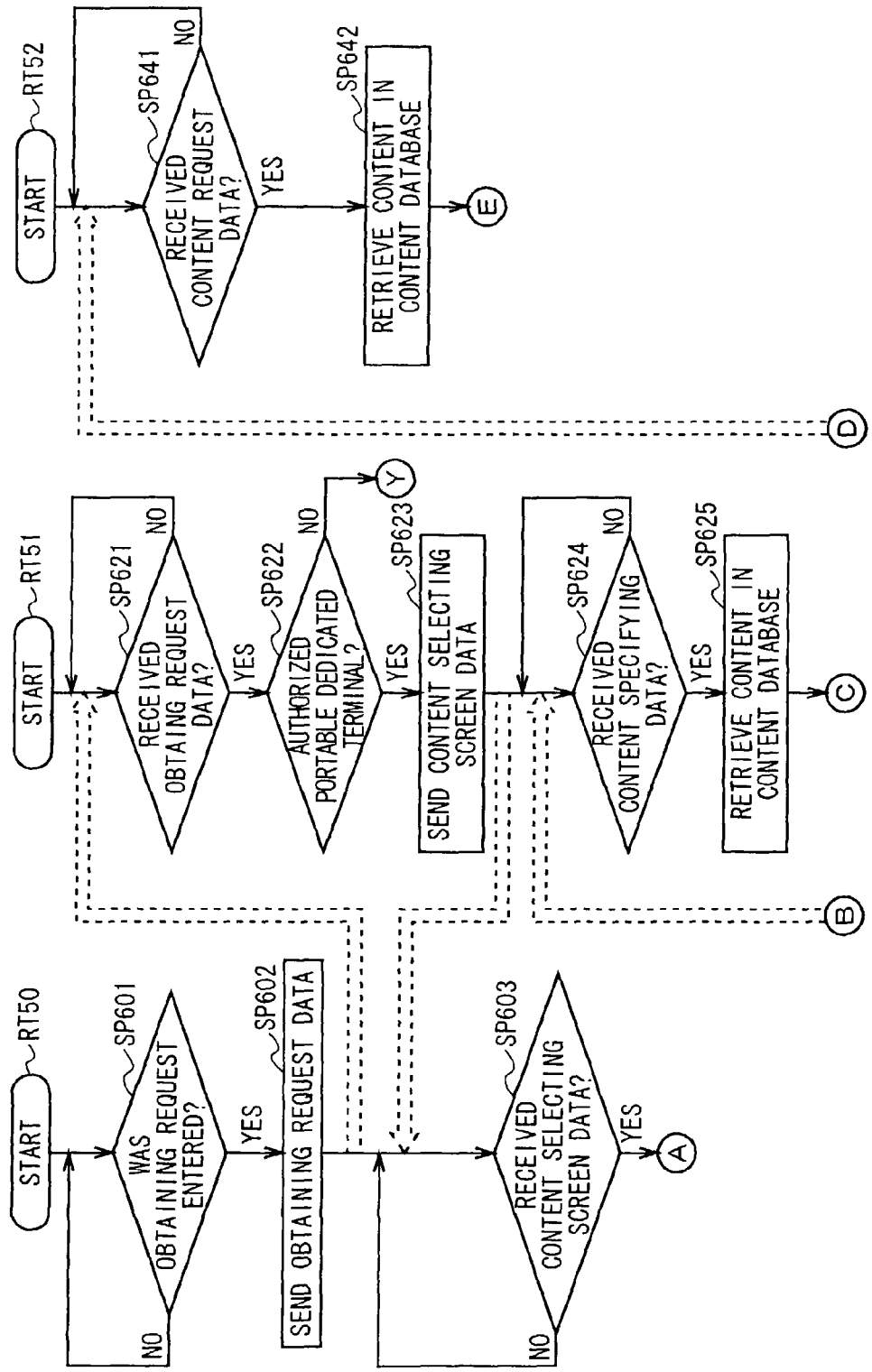

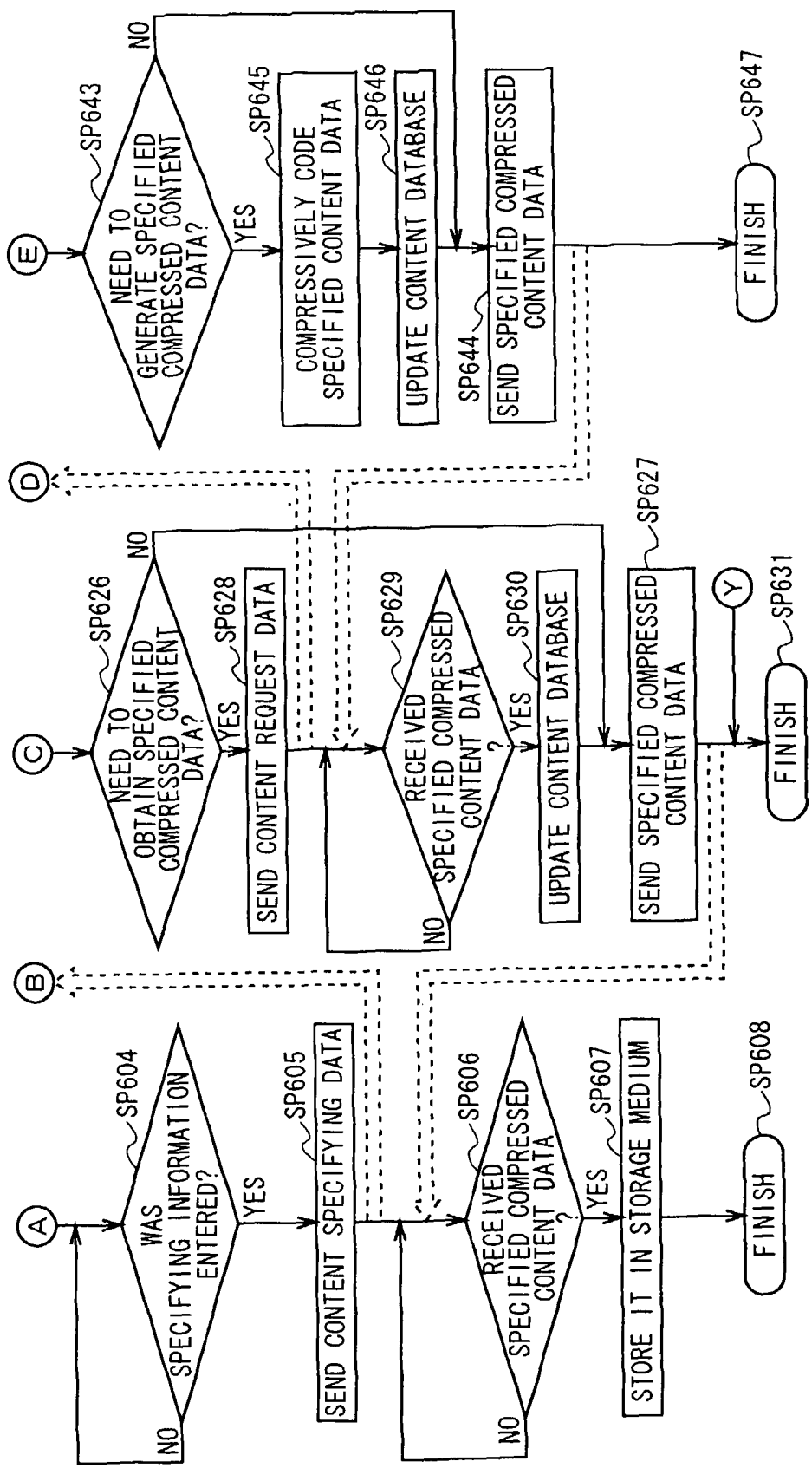

METHOD FOR PROVIDING AND OBTAINING CONTENT

BACKGROUND OF THE INVENTION

1. Field of the Invention

This invention relates to a content providing and obtaining system, and is applicable, for example, to a data providing system for providing data on various distribution information such as various content data and the advertisement, of music, motion pictures, etc. (hereinafter, this is referred to as distribution data) to a customer by means of the Internet.

2. Description of the Related Art

In recent years, the Internet being a computer communication network that it had been used in many institutes or the like for research and study in the world scale, has been quickly popularized also among companies and customers as a computer communication tool, by a use in business such as sale for merchandise, distribution of content data, and advertisement of a company and merchandise.

By using the Internet in business, the customer can buy desired merchandise and can obtain desired content data by a personal computer for instance, while staying at home. At the same time, the customer can obtain various distribution data such as the advertisement of a company and merchandise by the personal computer.

In the distribution of content data on the Internet, the transmission efficiency of the content data can be improved by transmitting compressively-coded content data to a customer's personal computer.

In the customer's personal computer, thus obtained compressively-coded content data is decoded, and the customer can view a content based on the content data.

However, in recent years, plural kinds of methods have been introduced into the market as methods of compressively coding content data. A compression coding method to be used is different depending on the manufacturing company of the content data or the like.

On the other hand, in the customer's personal computer, normally, a decoding software corresponding to a specified compression coding method is installed, or a decoding circuit only corresponding to the above specified compression coding method is provided to restrain increasing the circuit scale or the like.

Therefore, in the customer's personal computer, if the decoding software and the decoding circuit do not cope with the compression coding method that was used in the compression coding of the obtained content data, the content data cannot be decoded until the customer newly obtain a decoding software and a decoding circuit cope with that. There has been a problem that the customer cannot easily view the content.

SUMMARY OF THE INVENTION

In view of the foregoing, an object of this invention is to provide a content providing and obtaining system that the customer can easily view a content based on content data.

The foregoing object and other objects of this invention have been achieved by the provision of a content providing apparatus for providing compressed content data generated by compressively coding content data by a specified compression coding method, by receiving identification information peculiar to a content obtaining apparatus and specifying information representing specified content data that the customer wants to obtain from the content obtaining apparatus applying a specified decoding method corresponding to the specified compression coding method, by detecting whether or not specified compressed content data generated by compressively coding the specified content data by the specified compression coding method corresponding to the identification information has been stored in the data storing means for storing plural kinds of compressed content data, according to the above received identification information and the specifying information, and according to the detection result, if the specified compressed content data has been stored in the data storing means, by reading the specified compressed content data from the data storing means, or if the specified compressed content data has not been stored in the above data storing means, by compressively coding the specified content data being the original data of that specified compressed content data by the specified compression coding method, and generating the specified compressed content data, and by transmitting the specified compressed content data read from the data storing means or the generated specified compressed content data to the content obtaining apparatus. Accordingly, every time when the customer requests to obtain specified content data from the above content obtaining apparatus, the content providing apparatus can accurately provide specified compressed content data generated by compressively coding that specified content data by a specified compression coding method corresponding to a specified decoding method, without newly applying another decoding method different from a specified decoding method previously applied to the content obtaining apparatus. Thus, the customer can easily view a content based on the content data.

The nature, principle and utility of this invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 12A and 12B are schematic diagrams showing the configuration of advertiser/company registration information;

FIGS. 13A and 13B are schematic diagrams showing the configuration of customer registration information;

FIG. 14 is a schematic diagram showing the contract terms between the customer and an advertiser/company;

FIG. 17 is a schematic diagram showing the configuration of advertiser/company introducing information;

FIG. 18 is a schematic diagram showing the configuration of customer introducing information;

FIG. 19 is a schematic diagram showing the configuration of advertiser/company information updated by the conclusion of a contract;

FIG. 20 is a schematic diagram showing the configuration of customer registration information updated by the conclusion of a contract;

FIGS. 21A and 21B are flowcharts showing an advertiser/company registration processing procedure in a data providing system;

FIGS. 23A and 23B are flowcharts showing the advertiser/company introducing processing procedure in the data providing system;

FIGS. 24A to 24C are flowcharts showing a contract processing procedure in the data providing system;

FIGS. 33A and 33B are flowcharts showing the subroutine of the content providing processing procedure in the data providing system;

FIGS. 41A and 41B are conceptual views for explaining equivalent exchanges of the content data of a single tune for packaged media of a single CD;

FIGS. 47A to 47C are schematic diagrams showing the configuration of data tables in a packaged media database;

FIGS. 48A to 48C are conceptual views for explaining equivalent exchanges of plural content data for the packaged media of an album CD;

FIGS. 49A to 49C are flowcharts showing an equivalent exchange processing procedure in the data providing system;

FIGS. 50A to 50C are flowcharts showing the equivalent exchange processing procedure in the data providing system;

FIGS. 66A to 66C are flowcharts showing a content providing and obtaining processing procedure in the data providing system; and FIGS. 67A to 67C are flowcharts showing the content providing and obtaining processing procedure in the data providing system.

DETAILED DESCRIPTION OF THE EMBODIMENT

Preferred embodiments of this invention will be described with reference to the accompanying drawings:

(1) Usage Pattern of Internet by Data Providing System

Figure 1:
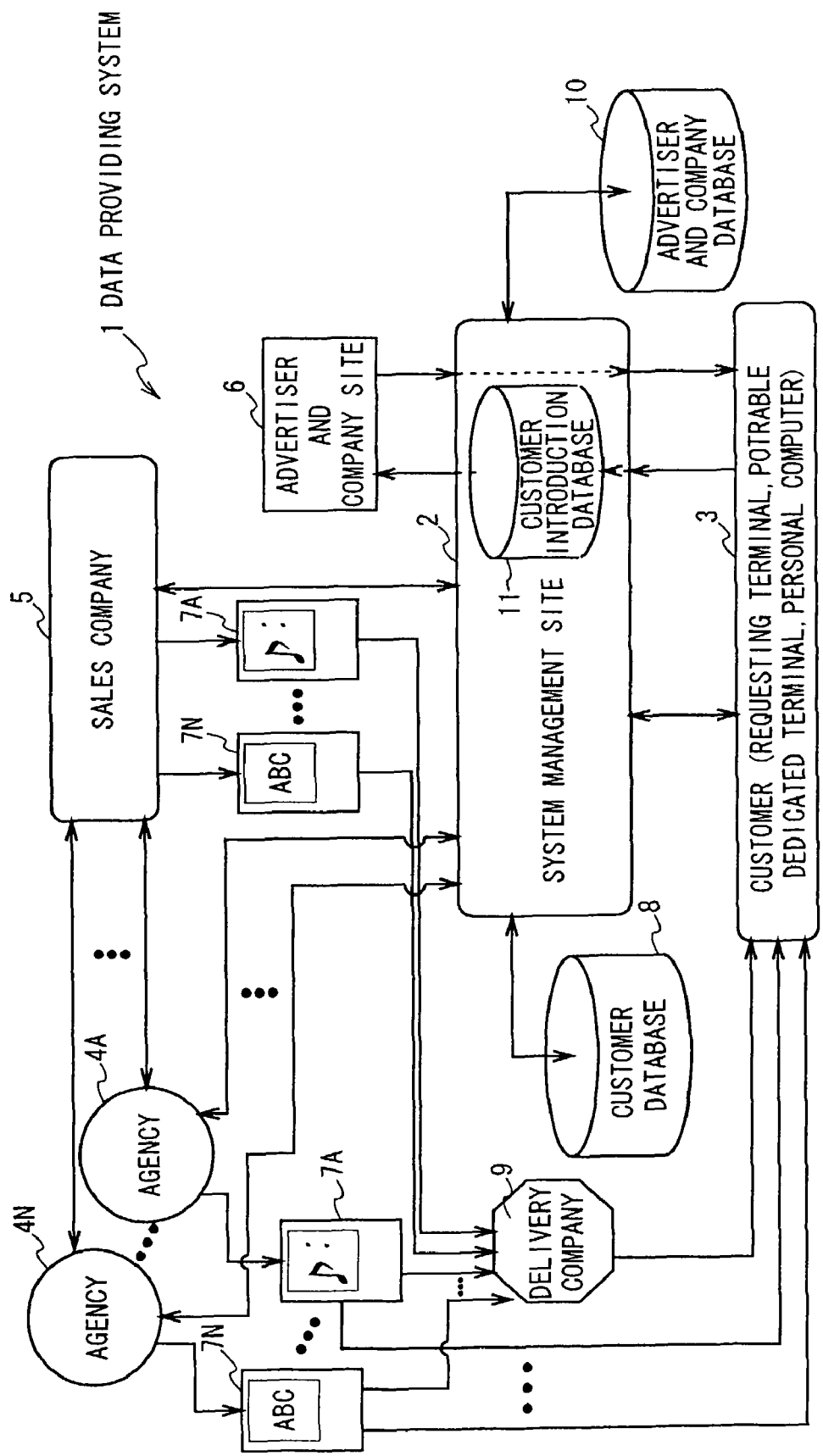
FIG. 1 is a conceptual view showing the usage pattern of the Internet by a data providing system.

As shown in FIG. 1, in a data providing system 1, communication can be performed on the Internet (not shown) between a system management site 2 that integrally manages the above data providing system and the customer 3, between the system management site 2, plural kinds of shops 4A to 4N such as retail stores and rental shops, to that the customer 3 comes (hereinafter, these are referred to as agencies), and a sales company 5 that sells merchandise described later to these agencies 4A to 4N, and between the system management site 2 and a site for providing distribution data 6 established by an advertiser/company (hereinafter, this is referred to as advertiser/company site), respectively.

Figure 2:
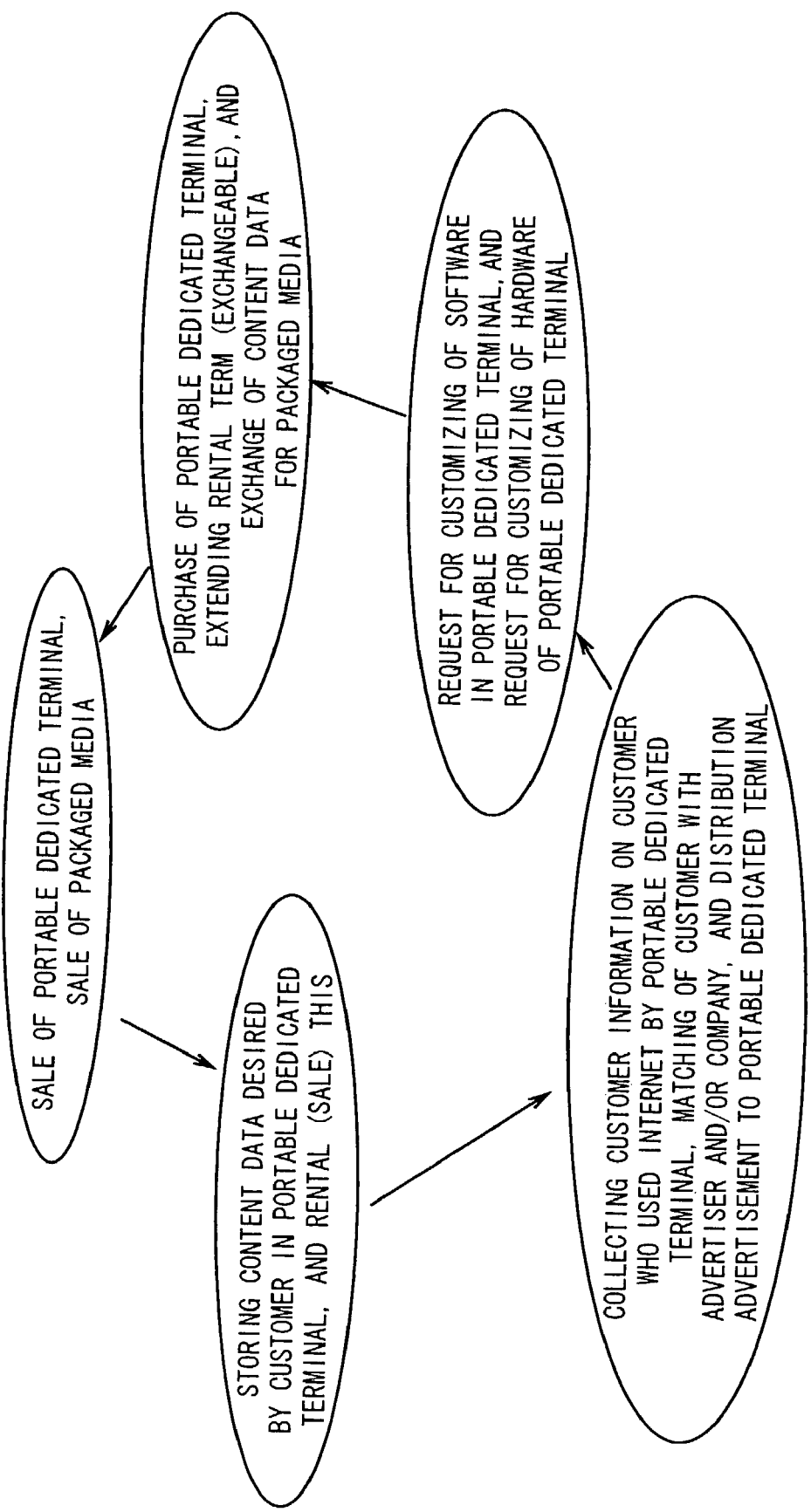
FIG. 2 is a schematic diagram showing the usage pattern of a portable dedicated terminal that was rented to the customer.

In this case, as shown in FIGS. 1 and 2, the agencies 4A to 4N are rental shops that sell and rent the content (composed of audio data, video data, text data, etc.) of music, a motion picture, game software, a novel, a photograph, a comic, etc., as commercial packaged media such as a compact disc (CD), a digital video disc (DVD), a compact disc read-only memory (CD-ROM), and a book (hardcovered novel, photo book, picture book, comic book). The agencies 4A to 4N are shops that deal in contents such as preparatory schools for selling and renting the contents (composed of text data, etc.) of reference books, question books, literatures for entrance examination, etc., as commercial packaged media of books.

If the agencies 4A to 4N desire to use the Internet in the state where they will start new business or already started business and are in business, they notify the system management site 2 of that by the use of a personal computer or the like.

If the use of the Internet is requested from the agency 4A-4N, the system management site 2 obtains agency information such as a name, a kind of contents that the agency will deal in, and an account number at a dealing bank from the above agency 4A-4N, and executes agency registrations.

Then, the system management site 2 provides plenty of content data to each agency 4A to 4N respectively from among various content data of music, motion pictures, game software, novels, photographs, comics, reference books, question books, literatures, etc. that have been previously stored in a content database (not shown), according to the kind of contents specified by the agencies 4A to 4N. The above agencies 4A to 4N form a content database for these content data peculiar to each agency.

At this time, the sales company 5 sells portable dedicated terminals 7A to 7N only for recording and reproducing content data, and commercial packaged media such as CDs, DVDs, CD-ROMs, and books, that the above agencies 4A to 4N will deal in, to the agencies 4A to 4N according to instructions from the system management site 2. On the other hand, the customer 3 who wants to use the Internet accesses the above system management site 2 and notifies it of that he/she wants to use the Internet, for instance, by operating a request terminal dedicated to the system management site installed in a stand such as KIOSK, a convenience store or the like.

If to use the Internet is wanted by the customer 3, the system management site 2 obtains personal information (hereinafter, this is referred to as customer information) such as a name, sex, age, and an account number at a dealing bank from the above customer 3, and executes a customer registration. The system management site 2 stores the above customer information as customer registration data, and generates a customer database 8.

The agencies 4A to 4N will provide plural kinds of content data to the registered customer 3 by two types of systems: a purchase system and a rental system. If the customer 3 notifies an agency 4A-4N of content specifying information for specifying desired content data and system specifying data representing the way of obtaining for the above content data, purchase or rental, by using the request terminal via the system management site 2, the agency 4A-4N accepts the reservation of the purchase or the rental of the content data responding to that.

If the agency 4A-4N accepts the reservation from the customer 3 in that manner, the agency 4A-4N executes electronic accounting for the purchase (selling price) and the rental (rental term) of the content data, by using the customer registration information on the customer 3 (the account number of the customer 3) read from the customer database 8 in the system management site 2. Then, the agency 4A-4N reads the desired content data according to the request from the content database, and records this in a predetermined recording medium provided in a portable dedicated terminal 7A-7N.

Here, the agency 4A-4N can make the customer 3 also use the portable dedicated terminal 7A-7N by either system of purchase and rental. If content data is requested, the agencies 4A to 4N simultaneously executes electronical accounting for the purchase (selling price) and the rental (rental term) of the above portable dedicated terminal 7A-7N by using the customer registration information.

Therefore, for instance, if the customer 3 requested to use the portable dedicated terminal 7A-7N by rental, the agency 4A-4N rents the portable dedicated terminal 7A-7N storing the content data according to the request of the customer 3, according to the way of delivery requested by the customer 3: by directly handing it to the customer 3 at the shop or by delivering it by a delivery company 9.

Thereby, the customer 3 who previously reserved to purchase/rent the content data and the portable dedicated terminal 7A-7N by the request terminal can enjoy the content data by reproducing it with the above portable dedicated terminal 7A-7N as soon as he/she gets the portable dedicated terminal 7A-7N.

Such portable dedicated terminal 7A-7N can access only the agency 4A-4N that recorded the content data via the system management site 2 by a communication function provided inside, and can execute processing for purchasing/renting content data (including accounting).

Therefore, when the customer 3 newly requests to purchase/rent content data by the portable dedicated terminal 7A-7N in rental, the agency 4A-4N can transmit the requested content data to the portable dedicated terminal 7A-7N in rental via the system management site 2, and the content data can be recorded therein. Thus, content data can be easily distributed on the Internet also to a customer 3 who does not own a device connectable to the Internet (hereinafter, this is referred to as device for connecting to the Internet) such as a personal computer, similarly to a customer 3 who owns a device for connecting to the Internet.

By the way, the system management site 2 relays the request for purchasing/renting the content data sent from the portable dedicated terminal 7A-7N and the request terminal, to the agency 4A-4N. Thus, the contents of that request are added to the customer registration information in the customer database 8 as additional customer information, and the above customer registration information is updated. Thereby, customer's taste (for example, the genre of content data that the customer obtained), the state of the using of the Internet or the like can be grasped from the customer registration information.

Furthermore, the system management site 2 obtains advertiser/company information composed of advertiser name information and company name information, business contents information that represents the genre of the above providing distribution data or the like, from advertisers and companies that will provide various distribution data at an advertiser/company site 6, stores this as advertiser/company registration information and generates an advertiser/company database 10.

If the customer 3 sends release permission information representing that he/she permits to release his/her customer information to the advertisers and companies from the portable dedicated terminal 7A-7N in rental as customer permission data, the system management site 2 retrieves data in the advertiser/company database 10 based on his/her customer registration information, selects advertisers and companies that can provide distribution data matching his/her taste, and introduces the above selected advertisers and companies to the customer 3 via the portable dedicated terminal 7A-7N.

As a result, if the customer 3 selects an advertiser/company wanting to contract from among the advertisers and the companies that were introduced to him/her, the system management site 2 provides a part of his/her customer registration information to the selected advertiser/company as investment information, and introduces the customer 3 to the advertiser/company.

Thereby, the system management site 2 can make the customer 3 using the Internet and the advertiser/company selected by the above customer 3 mutually negotiate and close contract. If the contract is concluded, various distribution data such as the advertisement of merchandise desired by the above customer 3 is provided from the advertiser/company site 6 to the portable dedicated terminal 7A-7N rented to the customer 3 via the system management site 2.

In this manner, in the data providing system 1, only the advertiser/company that can provides desired distribution data can be introduced to the customer 3, and the customer 3 can easily select desired one. At the same time, even if the customer 3 does not own device for connecting to the Internet, only desired distribution data can be efficiently provided to him/her via the portable dedicated terminal 7A-7N being rented to the customer 3.

In this connection, since if the customer permission data is sent from the customer 3, the system management site 2 introduces the customer 3 who is beneficial for the advertiser/company to the advertiser/company, if the system management site 2 transmits the investment information to the advertiser/company, the system management site 2 receives a consideration for that from the above advertiser/company.

Furthermore, if the system management site 2 introduces the customer 3 to the advertiser/company, it forms a customer introduction database 11 based on the investment information on the above customer 3 without regard to the presence/absence of an advertiser and/or a company to which the customer 3 wants to contract. The above customer introduction database 11 will be used when advertisers and/or companies to be introduced to the customer 3 will be newly selected after that.

Here, if the customer 3 accessed the agency 4A-4N to request content data from the portable dedicated terminal 7A-7N via the system management site 2, the agency 4A-4N returns a content selecting screen to be used to select content data to the portable dedicated terminal 7A-7N so that the customer 3 selects desired content data on that content selecting screen.

The agency 4A-4N customizes the content selecting screen to be displayed at the display part of the portable dedicated terminal 7A-7N according to a request by the customer 3. Thus, when the customer 3 requests content data, a content selecting screen matching the request by the customer 3 can be displayed at the display part of the portable dedicated terminals 7A to 7N.

In this connection, if the customer 3 specifies his/her favorite color on a case body at the time of renting the portable dedicated terminal 7A-7N, the agency 4A-4N switches the above portable dedicated terminal 7A-7N to be rented to another portable dedicated terminal 7A-7N painted in his/her favorite color. In addition to the customizing software, also the hardware of a case body can be customized.

If the customer 3 requests the agency 4A-4N to customize the case body of the portable dedicated terminal 7A-7N in rental (that is, to change the color of the case body), the agency 4A-4N moves all data in the portable dedicated terminal 7A-7N rented by the customer 3 (that is, the content data, the desired distribution data provided from the advertiser, etc.) into the other portable dedicated terminal 7A-7N in the color specified by the customer 3, and changes them.

By the way, when the agency 4A-4N starts to rent content data with the portable dedicated terminal 7A-7N to the customer 3, the customer 3 can arbitrary choice the rental terms of the above portable dedicated terminal 7A-7N and the content data respectively. Moreover, the customer 3 can freely extend the rental term once chosen by a request.

The agency 4A-4N monitors the end of the rental term of the content data being rented to the customer 3. If the rental term of the content data expires before the expiration of the rental term of the portable dedicated terminal 7A-7N, that is informed to the portable dedicated terminal 7A-7N being rented to the customer.

If terminating the rental of the content data according to the period is replied from the portable dedicated terminal 7A-7N being rented to the customer 3 via the system management site 2, the agency 4A-4N prompts the customer 3 to bring the portable dedicated terminal 7A-7N to the above agency 4A-4N. If the customer 3 brings that portable dedicated terminal 7A-7N, the agency 4A-4N erases the content data from the internal recording medium and is returns the portable dedicated terminal 7A-7N to the customer 3.

On the other hand, if extending the rental term of the content data is replied from the portable dedicated terminal 7A-7N being rented to the customer 3 via the system management site 2, the agency 4A-4N monitors the end of that extended rental term of the above content data.

Although the rental term of the content data has expired, if the customer 3 does not bring that portable dedicated terminal 7A-7N, for instance, the agency 4A-4N sends an erasing command to erase the content data that the rental term has expired to the portable dedicated terminal 7A-7N for return. Thereby, in the portable dedicated terminal 7A-7N, the specified content data is erased from the internal recording medium to prevent its illegal use.

If the portable dedicated terminal 7A-7N in rental is returned from the customer 3, the agency 4A-4N erases the content data from the recording medium in the above portable dedicated terminal 7A-7N, and that the portable dedicated terminal 7A-7N can be rented again.

If the customer requests to change the content (for example, the content data of a single tune) occupying by purchasing or renting the portable dedicated terminal 7A-7N to packaged media storing the same content data (for example, a single CD), the agency 4A-4N transmits equivalent exchange information composed of a price when the customer obtained the occupying content data (that is, the purchase price or the rental price), the selling price of the packaged media, and a difference between both these prices to the portable dedicated terminal 7A-7N via the system management site 2.

As a result, if the customer 3 notifies the agency 4A-4N of the approval of exchanging them by the portable dedicated terminal 7A-7N via the system management site 2, the agency 4A-4N performs electronic accounting only for the difference between the price to obtain the content data being occupied by the customer 3 and the selling price of the packaged media read from the customer database 8 at the system management site 2. It is because the purchase/rental price for the content data being occupied by the customer 3 being the same as the content data stored in the packaged media has been already paid. Then, the agency 4A-4N hands the packaged media to the customer 3 at the shop or delivers it by the delivery company 9 from the sales company 5.

In this manner, the agency 4A-4N makes the exchange value of the content data being occupied by the customer for the packaged media to be almost equal, and exchanges the content data for the above packaged media (hereinafter, this exchange is referred to as equivalent exchange). Thereby, wasting the content data purchased/rented by the portable dedicated terminal 7A-7N when that portable dedicated terminal 7A-7N is returned can be prevented, and the packaged media can be provided by a minimum investment without making the customer 3 wastefully invest in both of the content data and the packaged media.

In this connection, the system management site 2 collects charges for the use of the Internet from the customer 3 every time when the customer 3 uses the Internet (that is, every time when the customer 3 purchases/rents content data and the portable dedicated terminal 7A-7N). The system management site 2, however, issues a point to give a privilege such as a discount to the customer 3 according to the using state of the above Internet, and stores it in the customer database 8.

At the agency 4A-4N, the customer 3 can use the obtaining point for electronical accounting instead of a part or all of the payment, when in purchasing/renting content data and a portable dedicated terminal 7A-7N, and when in exchanging content data for packaged media, etc.

Furthermore, the agency 4A-4N can accept also payment by cash and a prepaid card at the shop, instead of electronical accounting, when the customer 3 purchases/rents a portable dedicated terminal 7A-7N, or exchanges content data for packaged media, or the like.

Here, if electronical accounting for the purchase of the portable dedicated terminal 7A-7N is executed responding to the purchase request of the portable dedicated terminal 7A-7N by that the customer 3 notified from the request terminal or the portable dedicated terminal 7A-7N in rental via the system management site 2, the agency 4A-4N directly hands that portable dedicated terminal 7A-7N to the customer 3 or delivers it to the customer 3 from the sales company 5 by the delivery company 9.

In this connection, if the customer 3 requests to purchase the portable dedicated terminal 7A-7N, the agency 4A-4N sells the portable dedicated terminal 7A-7N having a case body in a color specified by the above customer 3.

Figure 3:
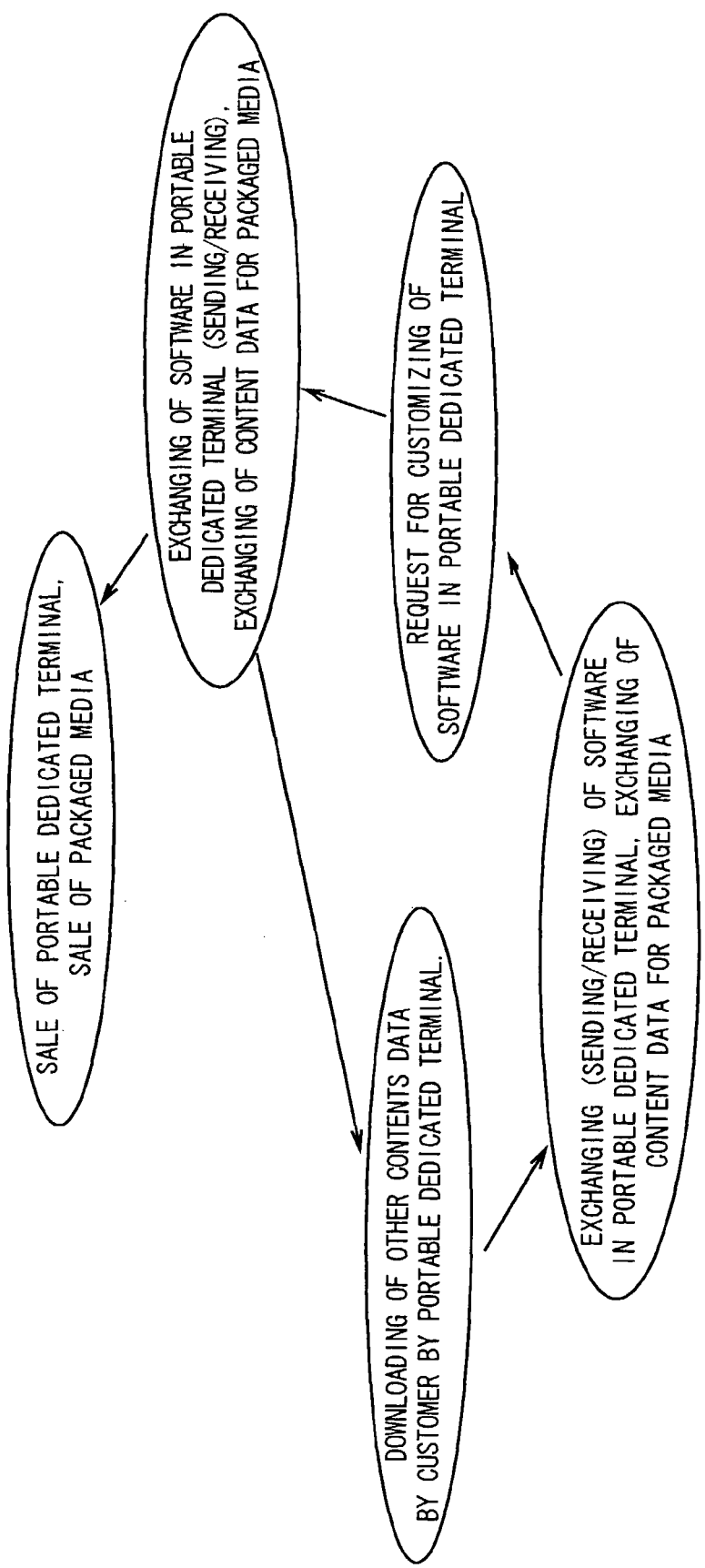
FIG. 3 is a schematic diagram showing the usage pattern of a portable dedicated terminal that was sold to the customer.

As shown in FIG. 3, the customer 3 who purchased the portable dedicated terminal 7A-7N can purchase/rent desired content data only from the agency 4A-4N that sold the portable dedicated terminal 7A-7N, by the above portable dedicated terminal 7A-7N via the Internet, and can obtain desired distribution data by contracting to an advertiser and/or a company similarly to the case described above with reference to FIG. 2.

Furthermore, the customer 3 who purchased the portable dedicated terminal 7A-7N can customize a content selecting screen that will be sent from the agency 4A-4N when the customer 3 requests to purchase/rent content data by the above portable dedicated terminal 7A-7N. In the case where the exchange values of the content data being occupied by the customer 3 by the purchase/rental and the packaged media storing the same content data are equal, they can be exchanged.

In the above data providing system 1, instead of the portable dedicated terminal 7A-7N, the customer 3 can use the Internet by using a device for connecting to the Internet such as a personal computer, similarly to the case described above with reference to FIGS. 2 and 3.

In the data providing system 1, both of a business system using the Internet, and an existent business system so that merchandise is practically sold and/or rented in retailing stores or the, like can be compatibly used. Thereby, a new business model in which the customer 3 who does not own a device for connecting to the Internet and agencies 4A to 4N having the feeling of crisis in the popularization of the Internet can freely and easily use the Internet for business can be formed.

(2) First Embodiment

Figure 4:
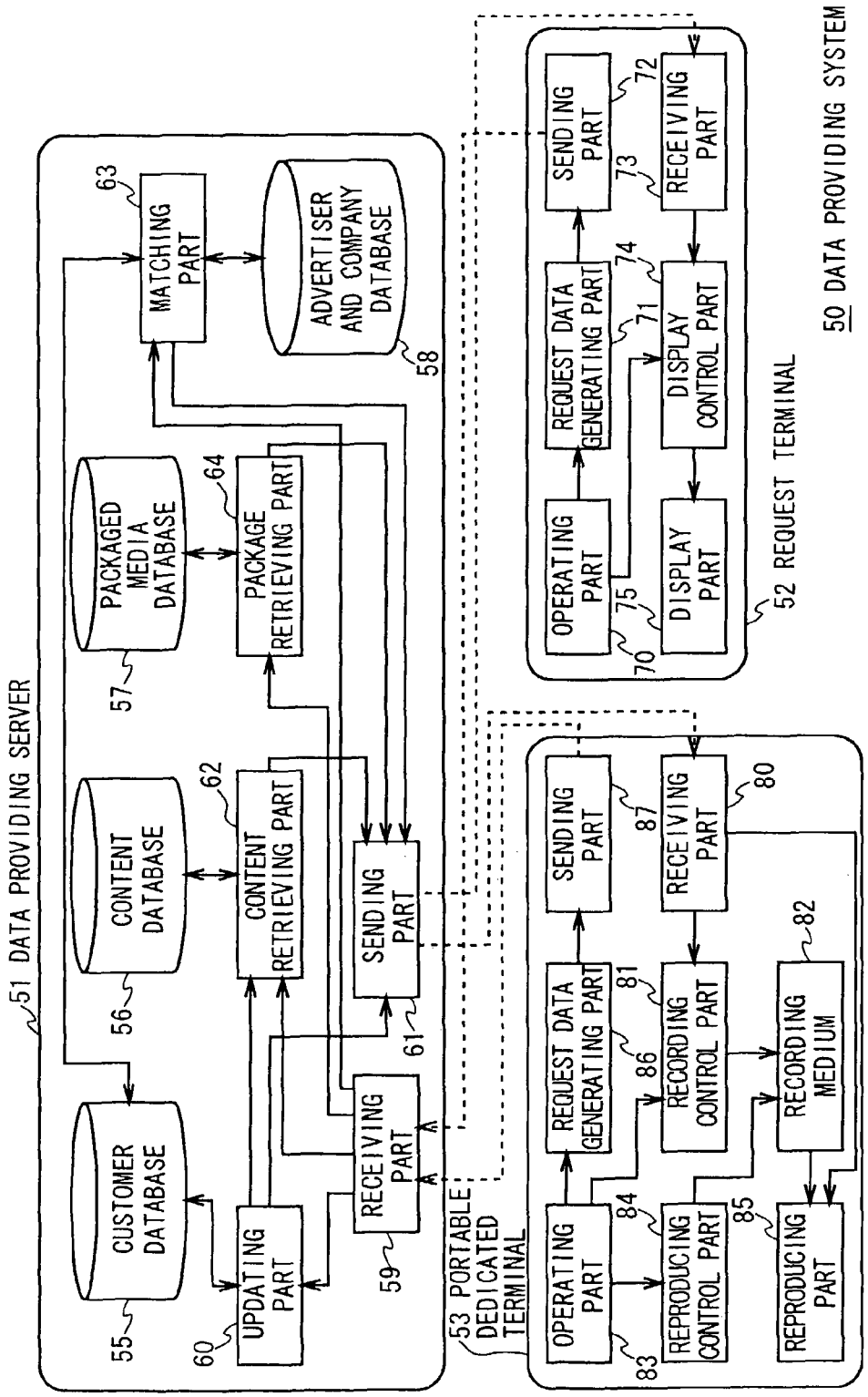
FIG. 4 is a block diagram showing the configuration of a first embodiment of a data providing system according to the present description.

Referring to FIG. 4, a reference numeral 50 generally shows a data providing system according to a first embodiment. The agencies 4A to 4N and the sales company 5 described above with reference to FIGS. 1 to 3, a request terminal 52 corresponding to the customer 3 described above with reference to FIGS. 1 to 3 (that is, the request terminal used by the customer 3) and a portable dedicated terminal 53 only for the agencies 4A to 4N corresponding to the portable dedicated terminals 7A to 7N described above with reference to FIGS. 1 to 3 are connected to a data providing server 51 corresponding to the system management site 2.

The data providing server 51 has a customer database 55 for storing customer registration information and customer registering screen data, a content database 56 for storing a lot of content data and content selecting screen data or the like, a packaged media database 57 for storing a data table by listing the selling prices and the rental prices of content data, and the selling prices and the titles or the like of packaged media that can be exchanged for the above content data, and an advertiser/company database 58 for storing advertiser/company registration information obtained from advertisers and companies establishing an advertiser/company site.

If registration request data for requesting the registration of the customer is sent from the request terminal 52, the data providing server 51 receives this by a receiving part 59, reads customer registering screen data from the customer database 55 based on that registration request data by an updating part 60, and sends the above read customer registering screen data from a sending part 61 to the request terminal 52.

If customer information that was entered on a customer registering screen based on the customer registering screen data is sent from the request terminal 52 as customer information data, the data providing server 51 receives this by the receiving part 59, and stores customer information based on that customer information data as customer registration information by the updating part 60, and registers the customer. Thereby, the above customer becomes possible to use the Internet.

If obtaining request data for requesting to obtain content data is sent from the request terminal 52 by operation by the registered customer, the data providing server 51 receives this by the receiving part 59, reads content selecting screen data from the content database 56 based on that obtaining request data by a content retrieving part 62, and transmits the above read content selecting screen data from the sending part 61 to the request terminal 52.

As a result, if desired content data is selectively specified on the content selecting screen based on the content selecting screen data, either of the systems to obtain the content data and the portable dedicated terminal 53, purchase or rental is selectively specified respectively, and reservation data for representing these specified information (hereinafter, this is referred to as customer reservation information) is transmitted from the request terminal 52. The data providing server 51 receives this by the receiving part 59.

At this time, the data providing server 51 reads the specified content data from the content database 56 based on the reservation data by the content retrieving part 62, and transmits the above read content data from the sending part 61 to the portable dedicated terminal 53 for recording before it is delivered to the customer.

In this manner, the data providing server 51 can prepare the customer the portable dedicated terminal 53 storing the content data according to the customer's request for purchase and rental. Thus, the portable dedicated terminal 53 can be sold and rented to the customer by directly handing or delivery.

Then, if obtaining request data for requesting the obtaining of content data is sent from the portable dedicated terminal 53 sold or rented to the customer, the data providing server 51 receives this by the receiving part 59, reads content selecting screen data from the content database 56 based on that obtaining request data by the content retrieving part 62, and transmits the above read content selecting screen data from the sending part 61 to the customer.

As a result, if desired content data is specified on the content selecting screen based on that content selecting screen data and the way to obtain the content data, purchase or rental, is specified, and content specifying data representing these specified information (hereinafter, this is referred to as specifying information) is transmitted from the portable dedicated terminal 53 sold or rented to the customer, the data providing server 51 receives this by the receiving part 59.

At this time, the data providing server 51 reads the specified content data from the content database 56 based on that content specifying data by the content retrieving part 62, and transmits the above read content data from the sending part 61 to the customer's portable dedicated terminal 53 for recording.

In this manner, the data providing server 51 enables the customer to easily use content distribution on the Internet, and freely obtain desired content data by the portable dedicated terminal 53.

By the way, the data providing server 51 issues customer identification information peculiar to each customer (hereinafter, this is referred to as customer ID) in a customer registration, adds this to customer information, and stores them in the customer database 55 as customer registration information to manage the above stored customer registration information by the customer ID.

The data providing server 51 transmits the customer ID issued to the customer in the customer registration from the sending part 61 to the request terminal 52 and notifies the customer of this. Thereafter, when the customer makes various requests of various agencies by means of the request terminal 52 and the portable dedicated terminal 53, the data providing server 51 makes the customer use that customer ID to identify the customer who made a request of these various agencies by the customer ID.

If the data providing server 51 receives various data (e.g. content specifying data) from the request terminal 52 and the portable dedicated terminal 53 sold/rented to the customer by the receiving part 59, the data providing server 51 sends the contents of that data (information such as the title and the rental term of the content data that will be purchased/rented by the customer) to the customer database 55 as additional customer information to add that additional customer information to customer registration information on the customer who requested the obtaining of the content data, and updates the above customer registration information, by the updating part 60.

The data providing server 51 can grasp customer's taste or the like based on the customer registration information in the customer database 55.

Then, if customer permission data meaning that the customer permitted the data providing server 51 to release the customer information to the advertiser/company is transmitted from the portable dedicated terminal 53 sold/rented to the customer, the data providing server 51 receives this by the receiving part 59, reads the customer registration information on the customer who permitted from the customer database 55 based on that customer permission data by a matching part 63, and retrieves advertiser/company registration information in the advertiser/company database 58 based on the above read customer registration information.

As a result of the retrieval of advertiser/company registration information by the matching part 63, if an advertiser and/or a company that can provide distribution data matching to the customer's tastes, the data providing server 51 generates advertiser/company introducing data based on advertiser/company registration information on the above selected advertiser/company, and sends this from the sending part 61 to the customer's portable dedicated terminal 53. Thus, the data providing server 51 can introduce the advertiser and/or company that can provide distribution data matching to the customer's tastes to the customer.

In this manner, the data providing server 51 enables the customer to easily select an advertiser and/or a company that can provide desired distribution data to the customer from among many advertisers and/or companies. Moreover, advertisers and companies can efficiently provide distribution data to the customer as requested.

If customizing request data for customizing the portable dedicated terminal 53 purchased/rented to the customer is transmitted, the data providing server 51 receives this by the receiving part 59, reads customizing registering screen data previously stored in the content database 56 based on the above received customizing request data by the content retrieving part 62, and sends this from the sending part 61 to the portable dedicated terminal 53.

As a result, if screen customizing information for the content selecting screen that was entered on a customizing registering screen based on the customizing registering screen data is sent from the portable dedicated terminal 53 sold/rented to the customer, the data providing server 51 receives this by the receiving part 59, and supplies that screen customizing information to the customer database 55 to add this to the customer registration information on the above customer, and updates that customer registration information by the updating part 60.

Thereafter, if obtaining request data is sent from the portable dedicated terminal 53 by the customer who requested the customizing of the content selecting screen, the data providing server 51 receives this by the receiving part 59, reads the screen customizing information added to the customer registration information from the customer database 55 by the updating part 60, and supplies this to the content retrieving part 62.

The data providing server 51 reads content selecting screen data from the content database 56 by the content retrieving part 62, converts this based on the screen customizing information, and sends thus obtained customized screen data from the sending part 61 to the customer's portable dedicated terminal 53.

In this manner, the data providing server 51 customizes the content selecting screen based on the screen customizing data every time when obtaining request data is sent from the customer requesting the customizing of the content selecting screen by the portable dedicated terminal 53. The customer can select content data on thus customized screen.

In this connection, in the portable dedicated terminal 53 rented to the customer, also sending information for customizing the color of the case body of the above portable dedicated terminal 53 can be selected on the customizing registering screen. If the case body customizing information for specifying the color of the case body is sent from the portable dedicated terminal 53, the data providing server 51 receives this by the receiving part 59, supplies this to the customer database 55, and adds this to the customer registration information on the above customer and updates the customer registration information by the updating part 60.

Thus, thereafter, when the customer rents/purchases a portable dedicated terminal 53, the portable dedicated terminal 53 in a color specified by the case body customizing information can be delivered.

Furthermore, if equivalent exchange request data for requesting the equivalent exchange of the content data (e.g. a single tune) purchased/rented for packaged media (e.g. a single CD) is sent from the portable dedicated terminal 53 sold/rented to the customer, the data providing server 51 receives this by the receiving part 59.

The data providing server 51 reads the customer registration information on the customer who requested the equivalent exchange from the customer database 55 based on that equivalent exchange request data, and detects the way of the obtaining of the content data that the customer requested to equivalently exchange (that is, purchase or rental) by the updating part 60. Then, the data providing server 51 retrieves a data table in the packaged media database 57 based on that equivalent exchange request data and the detected result by the updating part 60 by a package retrieving part 64. Thereby, the obtaining price of the content data occupied by the customer, and the selling price and the title of packaged media storing the above content data are detected as the target of the equivalent exchange.

The data providing server 51 computes a balance between thus detected obtaining price of the content data occupied by the customer and the selling price of the packaged media by the package retrieving part 64, and transmits the above computed balance from the sending part 61 to the customer's portable dedicated terminal 53 as retrieval result information, with these obtaining price of the content data and the selling price and the title of the packaged media.

The customer has already paid the purchase or the rental price of the content data stored in the packaged media by the purchase or the rental via the portable dedicated terminal 53. Thus, if exchange acceptance data to accept the equivalent exchange is sent from the portable dedicated terminal 53 sold/rented to the customer, the data providing server 51 electronically performs accounting only for the balance between the obtaining price of the content data occupied by the customer and the selling price of the packaged media. Then, the packaged media is delivered to the above customer directly or by delivery.

In this manner, in the data providing server 51, the exchange value of the content data occupied by the customer for the packaged media to be exchanged is equal, and they can be equivalently exchanged. Therefore, the data providing server 51 can provide the packaged media to the customer by exchanging the content data purchased/rented by the portable dedicated terminal 53 for the packaged media by a minimum investment.

In this connection, the data providing server 51 issues a point to give a privilege such as discount to the customer according to the using state by a point issuing part not shown, every time when the customer uses the Internet by the request terminal 52 and/or the portable dedicated terminal 53. The above issued point is transmitted to the customer database 55, sequentially added to the customer registration information, and the above customer registration information is updated by the updating part 60.

If the customer requests to use the point for equivalent exchange or the like instead of money, the data providing server 51 balances the difference between the obtaining price of the content data occupied by the customer and the selling price of the packaged media by using the point issued for the above customer.

Furthermore, if the customer rents content data, the data providing server 51 constantly retrieves customer registration information in the customer database 55 by the updating part 60 to detect whether or not the rental term of the content data in rental expires. If the expiration of the rental term of the above content data is near, the data providing server 51 sends confirmation screen data to confirm whether or not the rental finishes from the sending part 61 to the customer's portable dedicated terminal 53.

If a rental finish notification to finish the rental of the content data as the term is sent from the portable dedicated terminal 53 sold/rented to the customer, the data providing server 51 receives this by the receiving part 59, adds this to corresponding customer registration information in the customer database 55 and updates the customer registration information by the updating part 60. And the data providing server 51 sends coming-to-shop request screen data to prompt the customer to return the content data (that is, to erase the content data from the portable dedicated terminal 53) at the agency, from the sending part 61 to the above portable dedicated terminal 53.

On the contrary, as a result of that the confirmation screen data was sent to the portable dedicated terminal 53, if a rental extending notification to extend the rental term of the content data is transmitted, the data providing server 51 receives this by the receiving part 59, adds this to the corresponding customer registration information in the customer database 55 and updates the customer registration information by the updating part 60.

If although its rental term has expired, the content data has not been returned, the data providing server 51 adds erasing information to forcibly erase the content data to the corresponding customer registration information in the customer database 55 and updates the customer registration information by the updating part 60. At the same time, the data providing server 51 transmits the erasing command of the content data of which the rental term expires from the sending part 61 to the portable dedicated terminal 53, and erases that content data in the above portable dedicated terminal 53.

On the other hand, if the customer enters a customer registration request via an operating part 70, the request terminal 52 generates registration request data representing that registration request by a request data generating part 71, and sends this from a sending part 72 to the data providing server 51.

As a result, if the request terminal 52 receives customer registering screen data from the data providing server 51 by a receiving part 73, the request terminal 52 transmits this from a display control part 74 to a display part 75, and displays a customer registering screen based on the customer registering screen data.

In the request terminal 52, if customer information is entered on the customer registering screen according to the operation of the operating part 70 by the customer, the request terminal 52 sends the customer information from the sending part 72 to the data providing server 51 as customer information data via the request data generating part 71.

If a content data obtaining request is entered by the customer via the operating part 70, the request terminal 52 generates obtaining request data representing the obtaining request by the request data generating part 71, and sends this from the sending part 72 to the data providing server 51.

As a result, if the request terminal 52 receives content selecting screen data from the data providing server 51 by the receiving part 73, the request terminal 52 transmits this from the display control part 74 to the display part 75, and displays a content selecting screen based on the content selecting screen data.

If the customer entered reservation information by customer on the content selecting screen according to the operation of the operating part 70, the request terminal 52 generates reservation data by the request data generating part 71, and sends this from the sending part 72 to the data providing server 51.

Thereby, the portable dedicated terminal 53 before it is sold/rented to the customer receives the content data sent from the data providing server 51 by a receiving part 80, and records this in a recording medium 82 by a recording control part 81. Then, the portable dedicated terminal 53 will be sold/rented to the customer in this state.

In the portable dedicated terminal 53 that was actually sold/rented to the customer, if a reproducing command is entered by the customer via an operating part 83, the portable dedicated terminal 53 reproduces the content data from the recording medium 82 based on that reproducing command by a reproducing control part 84, and transmits the above reproduced content data to a reproducing part 85 composed of a display control part, a display part, a speaker or the like. Thus, the customer can enjoy the content.

If a content data obtaining request is entered by the customer via the operating part 83, the portable dedicated terminal 53 generates obtaining request data representing that obtaining request by a request data generating part 86, and sends the above generated obtaining request data from a sending part 87 to the data providing server 51.

As a result, if the portable dedicated terminal 53 receives content selecting screen data from the data providing server 51 by the receiving part 80, the portable dedicated terminal 53 transmits this to the reproducing part 85 to display a content selecting screen based on the content selecting screen data.

Then, if content data is selectively specified (including the specifying of purchase and/or rental) on the content selecting screen according to the operation of the operating part 83 by the customer, the portable dedicated terminal 53 generates content specifying data by the request data generating part 86, and transmits this from the sending part 87 to the data providing server 51.

If the portable dedicated terminal 53 receives the content data from the data providing server 51 by the receiving part 80, the portable dedicated terminal 53 records this in the recording medium 82 by the recording control part 81. Thus, thereafter, that content data can be reproduced from the recording medium 82 by a reproducing control part 84 according to the operation of the operating part 83 by the customer.

Furthermore, if the customer permits the release of the customer information via the operating part 83, the portable dedicated terminal 53 generates customer permission data representing that permission by the request data generating part 86, and sends this from the sending part 87 to the data providing server 51.

As a result, if the portable dedicated terminal 53 receives advertiser/company introducing data from the data providing server 51 by the receiving part 80, the portable dedicated terminal 53 transmits this to the reproducing part 85 to displaying it. In this state, the customer selects desired advertiser and/or company by operating the operating part 83.

Then, the portable dedicated terminal 53 sends information on the advertiser and/or company selected by the customer to the data providing server 51 sequentially via the request data generating part 86 and the sending part 87. As a result, if the customer concludes a contract to the advertiser and/or company that he/she selected, the portable dedicated terminal 53 receives desired distribution data such as advertisement sent from the advertiser and company site by the receiving part 80, and records this in the recording medium 82 by the recording control part 81.

The portable dedicated terminal 53 reproduces that distribution data from the recording medium 82 by the reproducing control part 84 according to the operation of the operating part 83 by the customer, and transmits the above reproduced distribution data to the reproducing part 85. Thus, the customer can enjoy the distribution data provided from the advertiser and company site.

In addition to this, if the customer enters a customizing request via the operating part 83, the portable dedicated terminal 53 generates customizing request data representing that customizing request by the request data generating part 86, and sends this from the sending part 87 to the data providing server 51.

As a result, if the portable dedicated terminal 53 receives customizing registering screen data from the data providing server 51 by the receiving part 80, the portable dedicated terminal 53 transmits this to the reproducing part 85 to display a customizing registering screen based on that customizing registering screen data.

If screen customizing information for customizing the content selecting screen is entered on the customizing registering screen according to the operation of the operating part 83 by the customer, the portable dedicated terminal 53 sends this to the data providing server 51 sequentially via the request data generating part 86 and the sending part 87.

The customer can enter also case-body customizing information for customizing the color of the case body of the portable dedicated terminal 53 on the customizing registering screen by operating the operating part 83. If the case-body customizing information is entered, the portable dedicated terminal 53 sends this from the sending part 87 to the data providing server 51 via the request data generating part 86.

In this manner, the customer can request the data providing server 51 to customize the content selecting screen and the case body of the portable dedicated terminal 53. Therefore, after the customer requested such customizing, the customer can selectively specify content data while viewing the display of the customized selecting screen that was obtained by processing the content selecting screen based on the screen customizing information, and also the customer can switch the portable dedicated terminal 53 to a portable dedicated terminal 53 in a color that the customer specified.

Furthermore, in the portable dedicated terminal 53, if the customer enters an equivalent exchange request via the operating part 83, the portable dedicated terminal 53 generates equivalent exchange request data representing that equivalent exchange request by the request data generating part 86, and sends this from the sending part 87 to the data providing server 51.

As a result, if retrieval result information on the equivalent exchange is sent from the data providing server 51, the portable dedicated terminal 53 receives this by the receiving part 80, and transmits this to the reproducing part 85 to display the obtaining price of the content data that the customer occupies by purchase or rental, the selling price and the title of packaged media, and the difference between these prices based on that retrieval result information.

If the customer approves the equivalent exchange via the operating part 83, the portable dedicated terminal 53 generates exchange approval data representing the approval by the request data generating part 86, and sends this from the sending part 87 to the data providing server 51. Then, electronical accounting for the difference between the obtaining price of the content data that the customer occupies and the selling price of the packaged media is performed by a method that the customer specified (that is, payment by money or points). Therefore, the customer can obtain the packaged media by a minimum investment.

In this connection, if confirmation screen data for content data that the rental term is near expiration is sent from the data providing server 51, the portable dedicated terminal 53 receives this by the receiving part 80, and transmits this to the reproducing part 85 to display a confirmation screen based on that confirmation screen data, and notifying the customer of that the rental term of the content data will expire by the above confirmation screen.

Then, at this time, if terminating or extending the rental term is specified by the customer via the operating part 83, the portable dedicated terminal 53 notifies the data providing server 51 of that from the sending part 87 via the request data generating part 86.

Furthermore, if the rental term of the content data has expired before the content data is returned, an erasing command to erase the content data is sent from the data providing server 51 to the portable dedicated terminal 53. The portable dedicated terminal 53 receives this by the receiving part 80, and erases the content data of which the rental term has expired from the recording medium 82 based on that erasing command by the recording control part. Thus, illegal use (reproducing) of the content data can be prevented.

According to the above configuration, in this data providing system 50, the data providing server 51 records content data specified by the customer in a portable dedicated terminal 53 only for an agency that the customer specified according to reservation data sent from a request terminal 52 by customer's operation, and they are sold/rented to the customer.

Then, if the customer sends content specifying data from the portable dedicated terminal 53, the data providing server 51 reads content data from the content database 56 according to the content specifying data, and sends the above read content data to that portable dedicated terminal 53 for recording.

Furthermore, in the data providing server 51, customer registration information on the customer who purchased or is renting the portable dedicated terminal 53 is registered in the customer database 55. The customer registration information is updated according to the using state of the portable dedicated terminal 53 every time when the customer uses the portable dedicated terminal 53 for purchasing or renting content data. If the release of the customer information is permitted from the customer by the portable dedicated terminal 53, the data providing server 51 retrieves advertiser/company registration information in the advertiser/company database 58 based on the customer registration information, selects an advertiser and/or a company that can provide distribution data matching to the customer's tastes, and introduces it to the customer.

If customizing a content selecting screen is requested from the customer by the portable dedicated terminal 53, the data providing server 51 customizes the content selecting screen according to that request, and provides a customized screen obtained by customizing the above content selecting screen to the customer's portable dedicated terminal 53 so that the customer can select content data on the customized screen.

In addition to this, if the equivalent exchange of the purchased/rented content data for packaged media is requested from the customer by the portable dedicated terminal 53, the data providing server 51 provides the packaged media to the customer by the payment of the difference between the obtaining price of the content data occupied by the customer and the selling price of the packaged media.

Accordingly, in this data providing system 50, even if the customer does not have a device for accessing the Internet, by previously reserving the purchase or the rental of a portable dedicated terminal 53 that can record and reproduce content data by a request terminal 52 installed in a KIOSK or the like, the customer can obtain content data distributed to the portable dedicated terminal 53 after the customer received the reserved portable dedicated terminal 53.

In this data providing system 50, by using the portable dedicated terminal 53, the customer can easily select content data on a customized screen that was customized by a customer's request, and also the customer can exchange the content data obtained by distribution for packaged media storing the same content data by a minimum investment. Furthermore, the customer can easily select an advertiser and/or a company that can provide distribution data matching to customer's tastes from many advertiser and company sites, and can use distribution data.

As a result, in the data providing system 50, also a customer who does not have a device for accessing the Internet can easily use this system while sufficiently enjoying the convenience of the Internet.

In this data providing system 50, the customer uses the portable dedicated terminal 53 only for an agency by purchase and/or rental. Therefore, agencies can easily get customers who use not only the Internet but also the agencies, and also can easily use and can participate in the Internet.

According to the above configuration, in the data providing server 51, the portable dedicated terminal 53 only for an agency that can record and reproduce content data is sold or rented to the customer according to reservation data sent from the request terminal 52. Content data is distributed according to content specifying data sent from the sold/rented portable dedicated terminal 53, and is recorded in the portable dedicated terminal 53. An advertiser and/or a company is selected based on customer registration information according to customer's permission sent from that portable dedicated terminal 53, and is introduced to the customer. A content selecting screen is customized according to a customizing request sent from the above portable dedicated terminal 53, and is provided to the portable dedicated terminal 53. And the exchange values of the content data occupied by the customer by distribution and packaged media storing the same content data are equal, and they are equivalently exchanged according to an equivalent exchange request sent from the portable dedicated terminal 53. Thereby, a customer who does not have a device for accessing the Internet can easily use this system while sufficiently enjoying the convenience of the Internet. By the portable dedicated terminal 53 only for an agency that uses the Internet, this system can easily get customers. Thus, a data providing system that can further popularize the Internet can be accomplished.

Note that, in the aforementioned first embodiment, it has dealt with the case where the customer requests a customer registration and the purchase or the rental of the portable dedicated terminal 53 by the request terminal 52. However, this invention is not only limited to this but also the customer may request the customer registration and the purchase or the rental of the portable dedicated terminal 53 by a device for accessing the Internet such as a personal computer. Thereby, in addition to a customer who does not have a device for accessing the Internet, a customer who owns the above device can enjoy the convenience of the Internet more than the present by using the portable dedicated terminal 53.

(3) Second Embodiment

Figure 5:
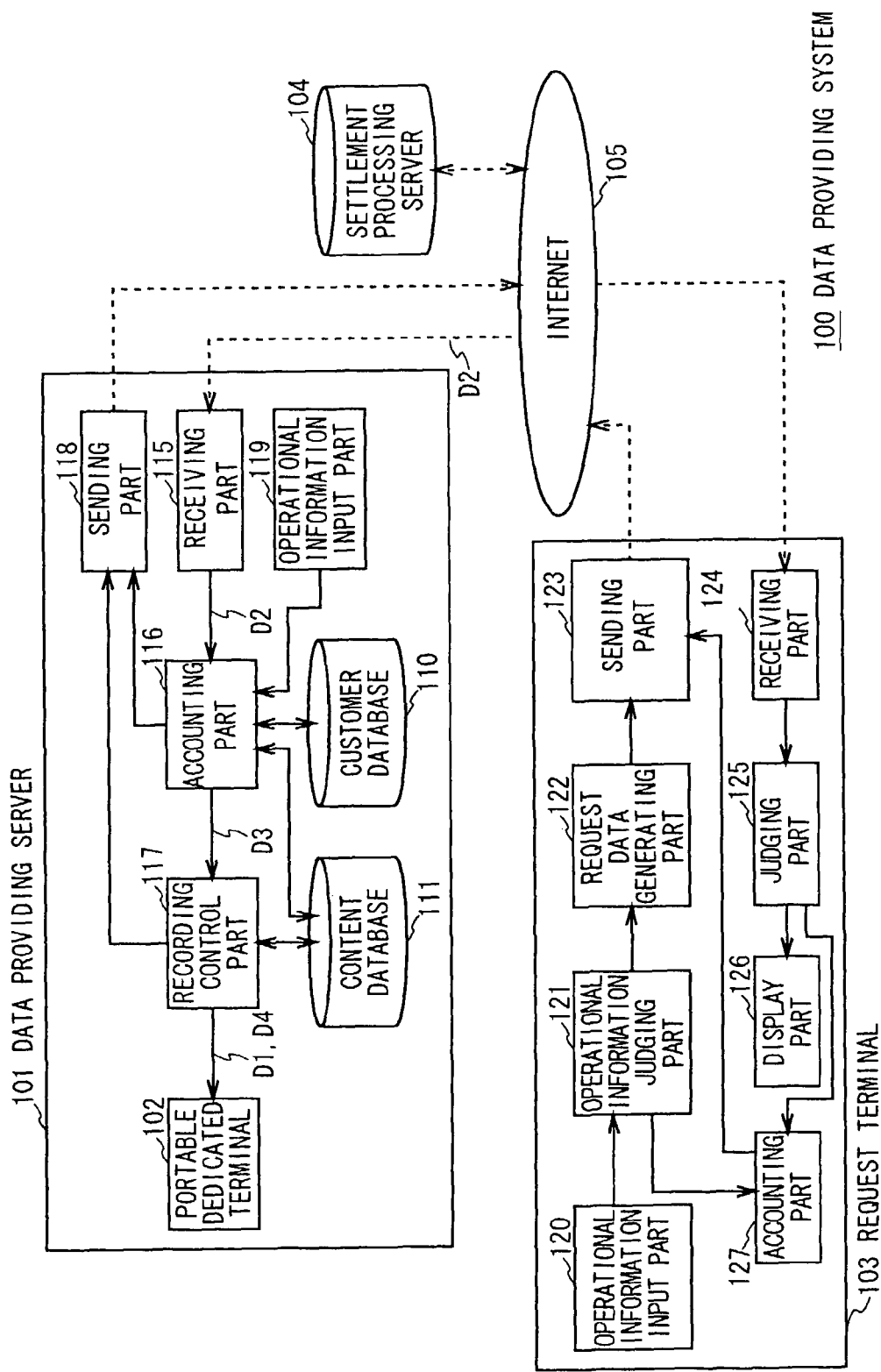
FIG. 5 is a block diagram showing the configuration of a data providing system according to a second embodiment.

FIG. 5 shows a data providing system 100 according to a second embodiment. A portable dedicated terminal 102 similar to the portable dedicated terminals 7A to 7N described above with reference to FIGS. 1 to 3 is directly connected to a data providing server 101 that corresponds to the system management site 2 and the agencies 4A to 4N described above with reference to FIGS. 1 to 3. A request terminal 103 that corresponds to the customer 3 described above with reference to FIGS. 1 to 3 (that is, the request terminal that the customer 3 had been used) and a settlement processing server 104 are connected to the above data providing server 101 on the Internet 105, respectively.

The data providing server 101 has a customer database 110 and a content database 111. In the customer database 110, customer registration information generated by executing a customer registration similar to the customer registration described above with reference to FIGS. 1 to 4 (composed of a customer's name, a customer ID, an account number in a bank that the customer deals with, etc.) will be stored.

Furthermore, the data providing server 101 stores a lot of content data in the content database 111, and also a data table generated by listing content additional information composed of content identification information peculiar to each of the content data (hereinafter, this is referred to as content ID), a title (for example, the title of tune), prices (selling price and rental price), etc.

If customer reservation information to reserve content data by rental (hereinafter, specially this is referred to as rental reservation request data) is sent as reservation request data, from the request terminal 103 via the Internet 105 by operation by the customer who wants to rent the content data, the data providing server 101 receives this by a receiving part 115, converts the above received rental reservation request data into recording control data by an accounting part 116, and transmits this to a recording control part 117.

Here, the data providing server 101 generates rental reservation acceptance data including dedicated terminal identification information (hereinafter, this is referred to as dedicated terminal ID) peculiar to the portable dedicated terminal 102 for recording the content data that the customer requested to rent by the recording control part 117, and transmits this to the request terminal 103 from a sending part 118 via the Internet 105 to notify the customer of that the rental reservation of the desired content data has been accepted.

The data providing server 101 reads the content data that the customer requested to rent from the content database 111 according to the recording control data by the recording control part 117, and sends this to the portable dedicated terminal 102 having the dedicated terminal ID that notified to the customer, so that the content data is recorded in a recording medium in the portable dedicated terminal 102.

In this manner, the data providing server 101 makes the portable dedicated terminal 102 having a content data recording and reproducing function record the content data requested from the customer. Then, when the customer came to, for example, an agency installing the above data providing server 101, the content data that the customer requested to rent is handed to the customer with the portable dedicated terminal 102.

By the data providing server 101, content data can be rented to the customer with the portable dedicated terminal 102 according to a rental term. The customer can enjoy the content data by reproducing this by the portable dedicated terminal 102.

Figure 6:
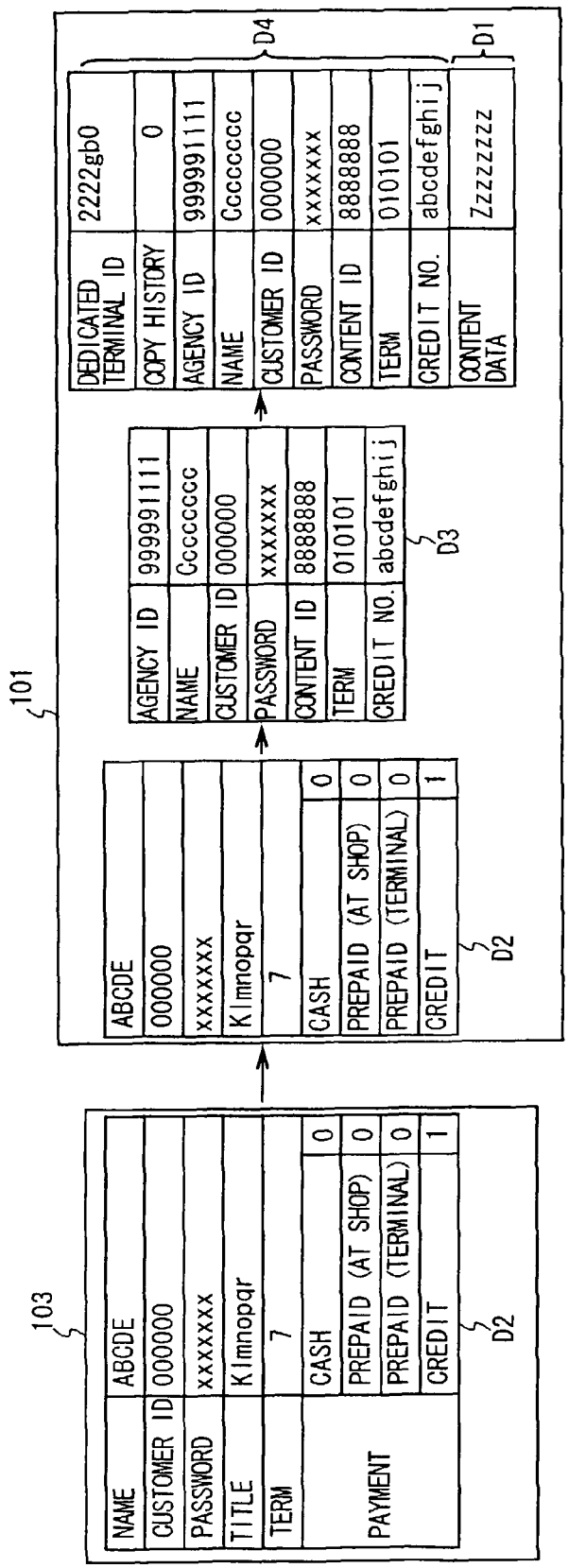
FIG. 6 is a schematic diagram showing the data format of header data to be added to content data.

By the way, as shown in FIGS. 5 and 6, rental reservation request data D2 sent from the request terminal 103 has information such as a customer's name, a customer ID, a password, the title of content data D1 of which the rental is requested, a rental term, a paying method of rental charges (payment by cash or prepaid card at shop, payment by prepaid card by request terminal, payment by credit).

If the data providing server 101 receives the rental reservation request data D2 from the request terminal 103 by the receiving part 115, the data providing server 101 extracts information on the paying method of the rental charge (hereinafter, this is referred to as payment data) from the rental reservation request data D2 by the accounting part 116.

If payment specified by the payment information is credit, the data providing server 101 reads the customer registration information on the customer who requested to rent the content data D1 from the content database 111 based on the customer ID included in the rental reservation request data D2 by the accounting part 116, retrieves a data table in the content database 111 based on the title of the content data D1 included in the above rental reservation request data D2, and reads the additional information on the content data D1 that the customer is requesting to rent.

The data providing server 101 executes accounting by the accounting part 116, based on the rental charge for the portable dedicated terminal 102 and an account number in the dealing bank of the agency previously stored in the contents database 111, the rental reservation request data D2, the customer registration information, and the additional information on the content data D1. Thereby, the data providing server 101 generates accounting information representing the amount of charge according to the rental term of the content data D1 to the customer, the account numbers of the agency and the customer, etc., and sends this from the sending part 118 to the settlement processing server 104 via the Internet 105.

If the electronical settlement processing based on the accounting information is completed and a settlement completion notification is sent from the settlement processing server 104, the data providing server 101 receives this by the receiving part 115, recognizes this and adds the agency ID to the rental reservation request data D2 and generates recording control data D3 by the accounting part 116, and sends this to the recording control part 117.

In this connection, when in generating the recording control data D3 by the accounting part 116, the data providing server 101 changes the customer's name included in the rental reservation request data D2 to a coded customer's name registered as the customer registration information, changes the title of the content data D1 to the content ID, encodes the number of days of the rental term, and adds the customer's account number to the recording control data D3.

If the data providing server 101 transmits the recording control data D3 from the accounting part 116 to the recording control part 117, the data providing server 101 generates rental reservation acceptance data by the above recording control part 117, and sends this from the sending part 118 to the request terminal 103.

Then, the data providing server 101 generates header data D4 based on the recording control data D3 by adding the dedicated terminal ID of the portable dedicated terminal 102 storing the content data D1 that the customer requested to rent, and copy history information showing a copy history when the above content data D1 had illegally copied, to the above recording control data D3 as the content by the recording control part 117. The data providing server 101 adds this to the content data D1 that the customer requested to rent, and they are recorded in the portable dedicated terminal 102.

Thereby, in the data providing server 101, that the portable dedicated terminal 102 rented to the customer and the content data D1 were rented at the shop installing the data providing server 101 can be easily recognized by the header data D4.

Furthermore, the portable dedicated terminal 102 rented to the customer monitors whether or not the rental term of the content data D1 has expired according to information on the rental term stored in the header data D4. In the case where although the rental term has passed, the above content data D1 has not been returned (that is, in the case where the content data D1 was not returned with the portable dedicated terminal 102), the portable dedicated terminal 102 forbids reproducing the content data D1. Thus, the illegal use of the rented content data D1 can be prevented after the expiration of the rental term.

Furthermore, if the content data D1 in rental is illegally copied while it has been rented to the customer, the portable dedicated terminal 102 records the number of the times of copy as copy history information in the header data D4. Thereby, when the portable dedicated terminal 102 is returned to the agency, the agency can know that the customer illegally copied the content data D1 from the copy history information in the header data D4.

On the other hand, if payment by a prepaid card by the request terminal 103 is specified by the rental reservation request data D2 from the request terminal 103, the data providing server 101 executes accounting according to the rental charges for the portable dedicated terminal 102, the rental reservation request data D2, and the additional information on the content data D1, by the accounting part 116. The data providing server 101 computes the amount of charges to the customer according to the rental term of the content data D1, and sends information on the above computed amount of charges as accounting data from the sending part 118 to the request terminal 103 via the Internet 105.

If the data providing server 101 receives payment-by-prepaid completion data from the request terminal 103 by the receiving part 115 by that the payment by a prepaid card has completed based on the accounting data, the data providing server 101 generates recording control data D3 by adding the agency ID to the rental reservation request data D2 storing information representing that the payment by the prepaid card has completed by the request terminal 103, instead of the customer's account number by an accounting part 116, and transmits this to the recording control part 117.

Then, if the data providing server 101 transmits the recording control data D3 from the accounting part 116 to the recording control part 117, the data providing server 101 sends rental reservation acceptance data from the sending part 118 to the request terminal 103 by the recording control part 117 similarly to the above. At the same time, the data providing server 101 generates header data D4 based on that recording control data D3, and records this in the portable dedicated terminal 102 with the content data D1.

Furthermore, if payment by cash or a prepaid card at the shop is specified by the rental reservation request data D2 sent from the request terminal 103, the data providing server 101 generates recording control data D3 by adding the agency ID to the rental reservation request data D2 storing information representing that the payment by cash or a prepaid card at the shop has completed instead of the customer's account number by the accounting part 116, and sends this to the recording control part 117.

Also in this case, the data providing server 101 transmits the recording control data D3 from the accounting part 116 to the recording control part 117 similarly to the above, and sends rental reservation acceptance data from the sending part 118 to the request terminal 103 by the above recording control part 117. At the same time, the data providing server 101 generates header data D4 based on the recording control data D3, and records this in the portable dedicated terminal 102 with the content data D1.

In this connection, in the data providing server 101, a slot for a prepaid card is provided on the accounting part 116. When the payment by a prepaid card at the shop is specified, an amount of charge to the customer according to the rental term of the content data D1 is computed by the accounting part 116. And if the customer inserts his/her prepaid card into the slot when the customer came to receive the portable dedicated terminal 102, the rental charges is settled by the prepaid card.

Note that, the above data providing server 101 also can be used in the case where the customer came to the shop and requested to rent content data D1. In this case, a clerk in the shop inputs rental information having the same contents as the rental reservation request data D2 described above with reference to FIG. 6 via an operational information input part. The above entered rental information is transmitted to the accounting part 116. Thereby, the content data D1 is recorded in the portable dedicated terminal 102 similarly to the aforementioned rental reservation by the request terminal 103.

On the other hand, if the customer inputs rental reservation information having the same contents as the aforementioned rental reservation request data D2 via an operational information input part 120, the request terminal 103 (FIG. 5) generates the aforementioned rental reservation request data D2 based on that rental reservation data by a request data generating part 122 via an operational information discriminating part 121, and sends this from a sending part 123 to the data providing server 101 on the Internet 105.

If rental reservation acceptance data is sent from the data providing server 101 via the Internet 105, the request terminal 103 receives this by a receiving part 124, and transmits this from a discriminating part 125 to a display part 126. Thus, completion of the acceptance of the rental reservation of the desired content data requested by the customer is notified to the customer, with the dedicated terminal ID of the portable dedicated terminal 102 that will be rented with the above content data D1.

In this connection, in the request terminal 103, an accounting part 127 having a slot for a prepaid card is provided. If payment by a prepaid card by the request terminal 103 is specified by the customer via the operational information input part 120, the operational information discriminating part 121 discriminates this and notifies the accounting part 127 of this.

The request terminal 103 receives account data transmitted by sending the rental reservation request data D2 to the data providing server 101 by the receiving part 124, discriminates this by the discriminating part 125, and transmits this to the accounting part 127.

If a customer's prepaid card is inserted into the slot of the accounting part 127, the request terminal 103 settles the rental charges to the customer by the prepaid card based on the account data by the accounting part 127. And then, the request terminal 103 generates payment-by-prepaid completion data, and sends this from the sending part 123 to the data providing server 101 via the Internet 105.

Figure 7:
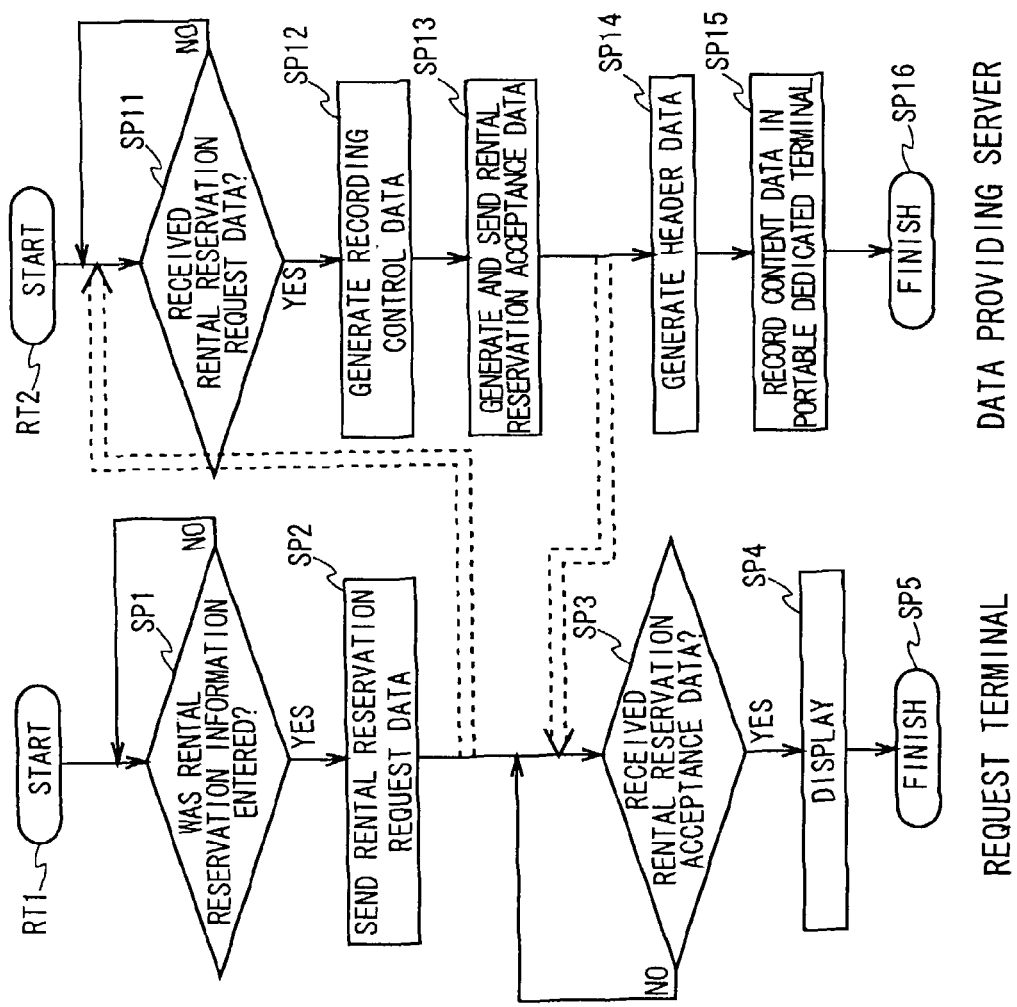
FIGS. 7A and 7B are flowcharts showing a rental reservation processing procedure in a data providing system.

Here, a rental reservation processing procedure by the data providing server 101 and the request terminal 103 in the data providing system 100 will be described except for payment for rental charges (that is, accounting). As shown in FIG. 7A, the request terminal 103 enters routine RT1 from the start step and proceeds to step SP1.

In step SP1, the request terminal 103 awaits that the customer inputs rental reservation information via the operational information input part 120. If rental reservation information is inputted, the request terminal 103 proceeds to the next step SP2 to generate rental reservation request data D2 by the request data generating part 122, sends this from the sending part 123 to the data providing server 101 via the Internet 105, and proceeds to step SP3.

At this time, as shown in FIG. 7B, the data providing server 101 enters routine RT2 from the start step and proceeds to the next step SP11. In step SP11, the data providing server 101 awaits that the rental reservation request data D2 is transmitted from the request terminal 103. It the data providing server 101 receives the rental reservation request data D2 from the request terminal 103 by a receiving part 119, it proceeds to step SP12.

In step SP12, the data providing server 101 generates recording control data D3 by the accounting part 116 by means of the rental reservation request data D2, and proceeds to the next step SP13.

In step SP13, the data providing server 101 generates rental reservation acceptance data and sends this from the sending part 118 to the request terminal 103, on the Internet 105, and it proceeds to step SP14.

At this time, in step SP3, the request terminal 103 awaits that the rental reservation acceptance data is transmitted from the data providing server 101. If the request terminal 103 receives the rental reservation acceptance data from the data providing server 101 in step SP3, the request terminal 103 proceeds to the next step SP4.

In step SP4, the request terminal 103 transmits that rental reservation acceptance data to the display part 126 to display it thereon, and notifies the customer of completion of the acceptance of the rental reservation of the content data D1 with the dedicated terminal ID of the portable dedicated terminal 102 that will be rented with the above content data D1, and it proceeds to the next step SP5 to finish the processing in the above request terminal 103.

On the other hand, in step SP14, the data providing server 101 generates header data D4 based on the recording control data D3, and proceeds to step SP15. In step SP15, the data providing server 101 adds the header data D4 to the content data D1 requested by the customer, and records this in a recording medium in the portable dedicated terminal 102 by the recording control part 117. Then, the data providing server 101 proceeds to step SP16 to finish the processing in the above data providing server 101. In this manner, the data providing system 100 finishes the rental reservation processing for the content data D1.

According to the above configuration, in this data providing system 100, a lot of content data D1 have been stored in the content database 111 in the data providing server 101 installed at an agency. If the customer requests the rental reservation of desired content data D1 with the request terminal 103, the above data providing server 101 records that content data D1 in the portable dedicated terminal 102. And then, when the customer came to the agency, the reserved content data D1 is rented to the customer with the portable dedicated terminal 102.

Accordingly, even if the customer does not own a device that has functions to record and reproduce content data D1 and can obtain the content data D1 by connecting to the Internet, such as a personal computer (hereinafter, this is referred to as content obtaining apparatus), this data providing system 100 can easily provide a content to the customer as data by the portable dedicated terminal 102 rented at the agency.

Furthermore, in the data providing system 100, when the customer rents content data D1, the customer can previously reserve the rental of the desired content data D1 for the data providing server 101 by the request terminal 103. Therefore, when the customer came to the agency without making the customer wait during the recording of the content data D1 in the portable dedicated terminal 102, the agency can smoothly hand the portable dedicated terminal 102 storing the content data D1 to the customer.

Moreover, in this data providing system 100, also when the customer reserves the rental of the content data D1 by operating the request terminal 103, the above customer is notified of the acceptance of the rental reservation at a time point that the recording control data D3 to record the content data D1 in the portable dedicated terminal 102 has been generated. Therefore, the customer can make a reservation for the rental of the content data D1 without waiting in front of the portable dedicated terminal 102 while the content data D1 is being recorded in the portable dedicated terminal 102.

In this connection, that when in using the distribution of content data D1 on the Internet 105, it has been already described. However, also knowledge of the Internet 105 is necessary. Therefore, sometimes, a person who does not have knowledge of the Internet 105 is hard to easily receive the distribution of the content data D1.

To obviate this, if the customer uses the data providing system 100 according to the second embodiment, although the customer uses the Internet 105 when in reserving the rental of the content data D1, the customer can reserve the rental of the content data D1 only by directly accessing to a data providing server 101 by the request terminal 103 by a simple operation. Therefore, in addition to the customer who does not own a content obtaining device, the customer who does not have knowledge of the Internet 105 can easily obtain content data.

According to the above configuration, the customer reserves the rental of desired content data D1 for the data providing server 101 having the content database 111 storing a lot of content data D1 by means of the request terminal 103. That requested content data D1 is recorded in the portable dedicated terminal 102 by the above data providing server 101, and the portable dedicated terminal 102 is rented to the customer with the above content data D1. Thereby, the content data can be further easily provided to the customer who does not own a content obtaining device. Thus, a data providing system in that the usability can be remarkably improved can be realized.

Note that, in the aforementioned second embodiment, it has dealt with the case where the portable dedicated terminal 102 dedicated to the agency is rented with content data D1. However, this invention is not only limited to this but also the portable dedicated terminal 102 may be sold to the customer and the content data D1 may be recorded in the above portable dedicated terminal 102 for purchase or rental. Thereby, even if the customer requests further purchase of content data D1, the content data D1 similarly purchased can be recorded and stored in the portable dedicated terminal 102 that the customer purchased. Thus, the usability of the data providing system 100 can be further improved.

In the aforementioned second embodiment, it has dealt with the case where content data D1 that the customer requested to rent is recorded in the portable dedicated terminal 102 dedicated to the agency. However, this invention is not only limited to this but also content data D1 that the customer requested to rent or purchase may be recorded in a portable recording and reproducing device such as a portable telephone, and a portable Mini Disc ((MD) trademark by Sony Corp.) player, that the customer brought into an agency. Thereby, also a customer who owns a content obtaining apparatus can easily use the data providing system, and the versatility of the above data providing system can be improved.

Furthermore, in the aforementioned second embodiment, it has dealt with the case where content data is recorded in the portable dedicated terminal 102 at an agency according to reservation data by customer from the request terminal 103. However, this invention is not only limited to this but also for instance content data may be recorded using the Internet or the like, in the state where the portable dedicated terminal 102 is in a manufacture company or a sales company or the like. Thereby, even if the portable dedicated terminal 102 is directly handed to the customer from a factory or the like, the content data can be accurately rented.

(4) Third Embodiment

Figure 8:
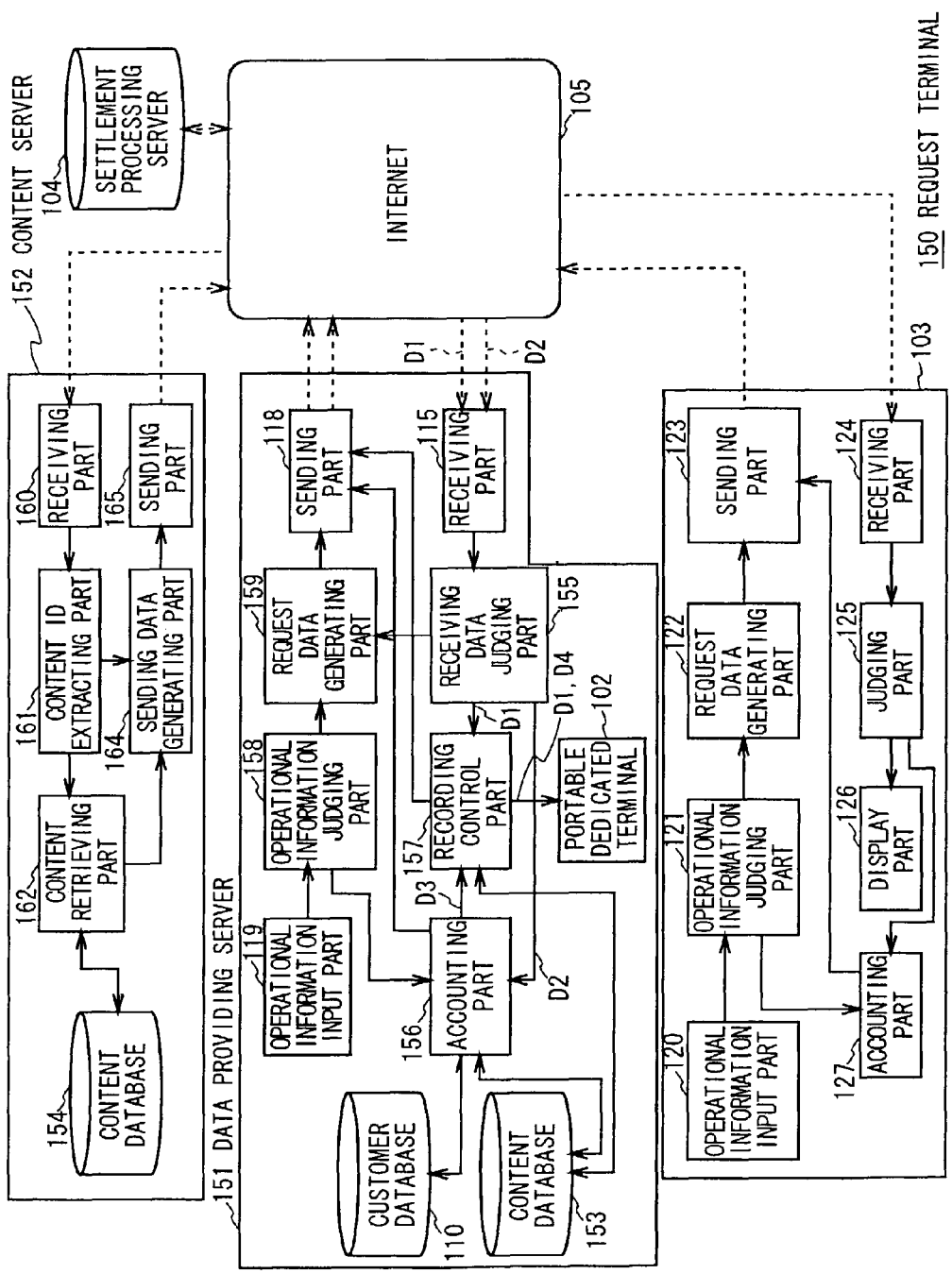
FIG. 8 is a block diagram showing the configuration of a data providing system according to a third embodiment.

FIG. 8 in which the same reference numerals are added to corresponding parts in FIG. 5 shows a data providing system 150 according to a third embodiment. The data providing system 150 is formed similarly to the data providing system 100 according to the second embodiment except for the configuration of a data providing server 151 corresponding to the system management site 2 and the agencies 4A to 4N described above with reference to FIGS. 1 to 3 and the configuration that a content server 152 corresponding to the system management site 2 described above with reference to FIGS. 1 to 3 is connected to the above data providing server 151 via the Internet 105.

In this case, in the content server 152, a content database 154 storing many content data D1 more than the content data D1 stored in a content database 153 in the data providing server 151, and a data table generated by listing the additional information on the above content data D1 (composed of content ID, title, selling price, rental price, etc.) is provided.

In the content database 153 stored in the data providing server 151, a part of many content data D1 stored in the content database 154 in the content server 152, and a new data table generated by making a correspondence, information representing the content data D1 stored in the data providing server 151 with the data table stored in the above content database 154 in the content server 152, are stored.

Furthermore, in the data providing server 151, a receiving data judging part 155 for judging the type of data received by the receiving part 115 is provided. If the receiving part 115 receives rental reservation request data D2 from the request terminal 103 on the Internet 105, the data providing server 151 transmits this from the receiving data judging part 155 to an accounting part 156.

The data providing server 151 retrieves a data table in the content database 153 based on that rental reservation request data D2 by the accounting part 156, and judges whether or not content data D1 requested to rent by the customer has been stored in the content database 153.

If that the content data D1 has been stored in the content database 153 is confirmed by the accounting part 156, the data providing server 151 successively transmits recording control data D3 to a recording control part 157 from the accounting part 156.

Thereby, the data providing server 151 sends rental reservation acceptance data from the sending part 118 to the request terminal 103 by the recording control part 157. At the same time, the data providing server 151 generates header data D4 based on that recording control data D3 and records this in the portable dedicated terminal 102 with the content data D1.

Figure 9:
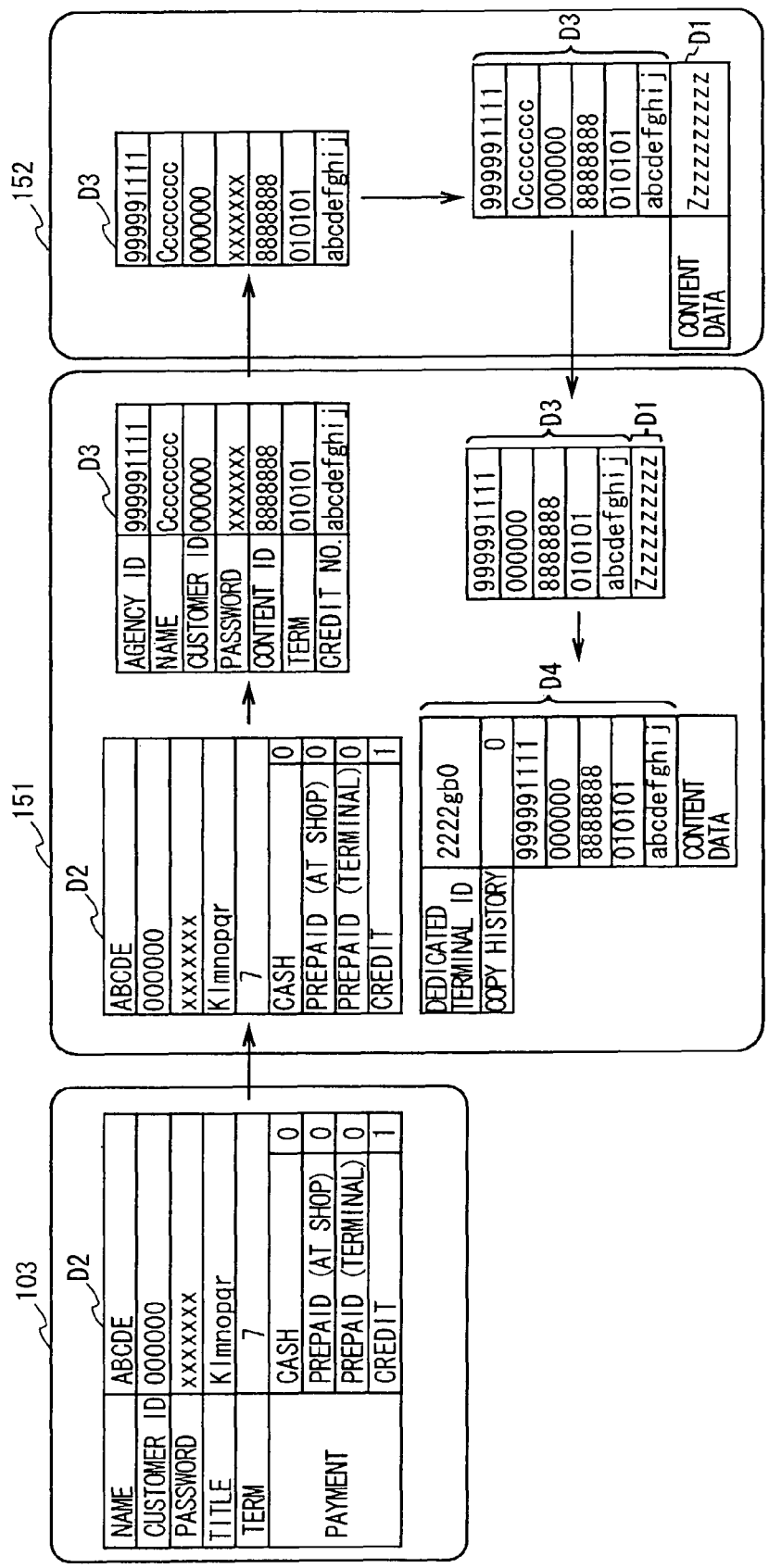
FIG. 9 is a schematic diagram showing the data format of content obtaining request data for obtaining content data from a content server.

On the contrary, as shown in FIGS. 8 and 9, if that the content data D1 requested by the customer has not been stored in the content database 153 is confirmed by the accounting part 156, the data providing server 151 generates recording control data D3 by using the rental reservation request data D2 similarly to the accounting part 116 of the data providing server 101 (FIG. 5) according to the second embodiment described above with reference to FIGS. 5 and 6 (it also executes accounting) by the accounting part 156. Although, the data providing server 151 transmits the recording control data D3 from the sending part 118 to the content server 152 via the Internet 105 as content obtaining request data.

As a result, if the requested content data D1 is sent from the content server 152 via the Internet 105 with the content obtaining request data, the data providing server 151 receives them by the receiving part 115, takes them in the receiving data judging part 155, and transmits them to the recording control part 157.

The data providing server 151 generates header data D4 by adding the information on the dedicated terminal ID and copy history to the content obtaining request data (i.e., recording control data D3) by the recording control part 157, and records the above generated header data D4 in the portable dedicated terminal 102 with the content data D1 obtained from the content server 152.

In this manner, even if the rental of the content data D1 that has not been stored in the content database 153 is requested, the data providing server 151 can rent the content data D1 to the customer by obtaining this from the content server 152.

In this connection, when the data providing server 151 obtains the content data D1 from the content server 152, it takes a time for processing for accepting the rental reservation comparing to the case where the content data D1 requested by the customer has been stored in the content database 153 of the data providing server 151.

To obviate this, the data providing server 151 generates rental reservation acceptance data by the receiving data judging part 155 and sends this to the portable dedicated terminal 102, and informs the customer of the acceptance of the rental reservation to at the time point that the content data D1 had obtained from the content server 152.

Furthermore, when the customer came to an agency and requested to rent content data D1, a clerk of the agency inputs rental information having the same contents as the entered rental reservation request data D2 via an operational information input part 119. The data providing server 151 transmits this from the operational information judging part 158 to the accounting part 156. Thus, the content data D1 is recorded in the portable dedicated terminal 102 similarly to the aforementioned rental reservation by means of the request terminal 103.

If content information including a content ID to newly store the content data D1 is entered to the content database 153 via the operational information input part 119, the data providing server 151 transmits this from the operational information judging part 158 to a request data generating part 159 to generate content request data according to the content information, and sends this from the sending part 118 to the content server 152 via the Internet 105.

If the desired content data D1 and its additional information are sent from the content server 152, the data providing server 151 receives this by the receiving part 115, and transmits them from the receiving data judging part 155 to the recording control part 157 to store them in the content database 153 by the above recording control part 157.

Thereby, though it comparatively takes a time to obtain the content data D1 from the content server 152, if content data for example of which the rental request is comparatively many among the content data D1 not stored in the content database 153, it is previously obtained from the content server 152 and has been stored in the content database 153. Thus, the data providing server 151 can rapidly respond to the rental request by the customer.

On the other hand, if the content obtaining request data is sent from the data providing server 151 via the Internet 105, the content server 152 (FIG. 8) receives this by a receiving part 160, extracts the content ID from that content obtaining request data by a content ID extracting part 161, and transmits this to a content retrieving part 162 as well as transmitting the above content obtaining request data to a sending data generating part 164.

The content server 152 retrieves data in the content database 154 based on that content ID by the content retrieval part 162, reads the corresponding content data D1, and transmits this to the sending data generating part 164. At the same time, the content server 152 adds the content obtaining request data to that content data D1 by the above sending data generating part 164, and sends them from a sending part 165 to the data providing server 151 via the Internet 105.

Furthermore, if the content request data is sent from the data providing server via the Internet 105, the content server 152 receives this by the receiving part 160, extracts the content ID from that content request data by the content ID extracting part 161, and transmits this to the content retrieval part 162.

The content server 152 retrieves data in the content database 154 based on that content ID by the content retrieval part 162, reads corresponding content data D1 and additional information, and sends them from the sending part 165 via the sending data generating part 164 to the data providing server 151 on the Internet 105.

In this manner, the content server 152 can provide the content data D1 to the data providing server 151.

Figure 10:
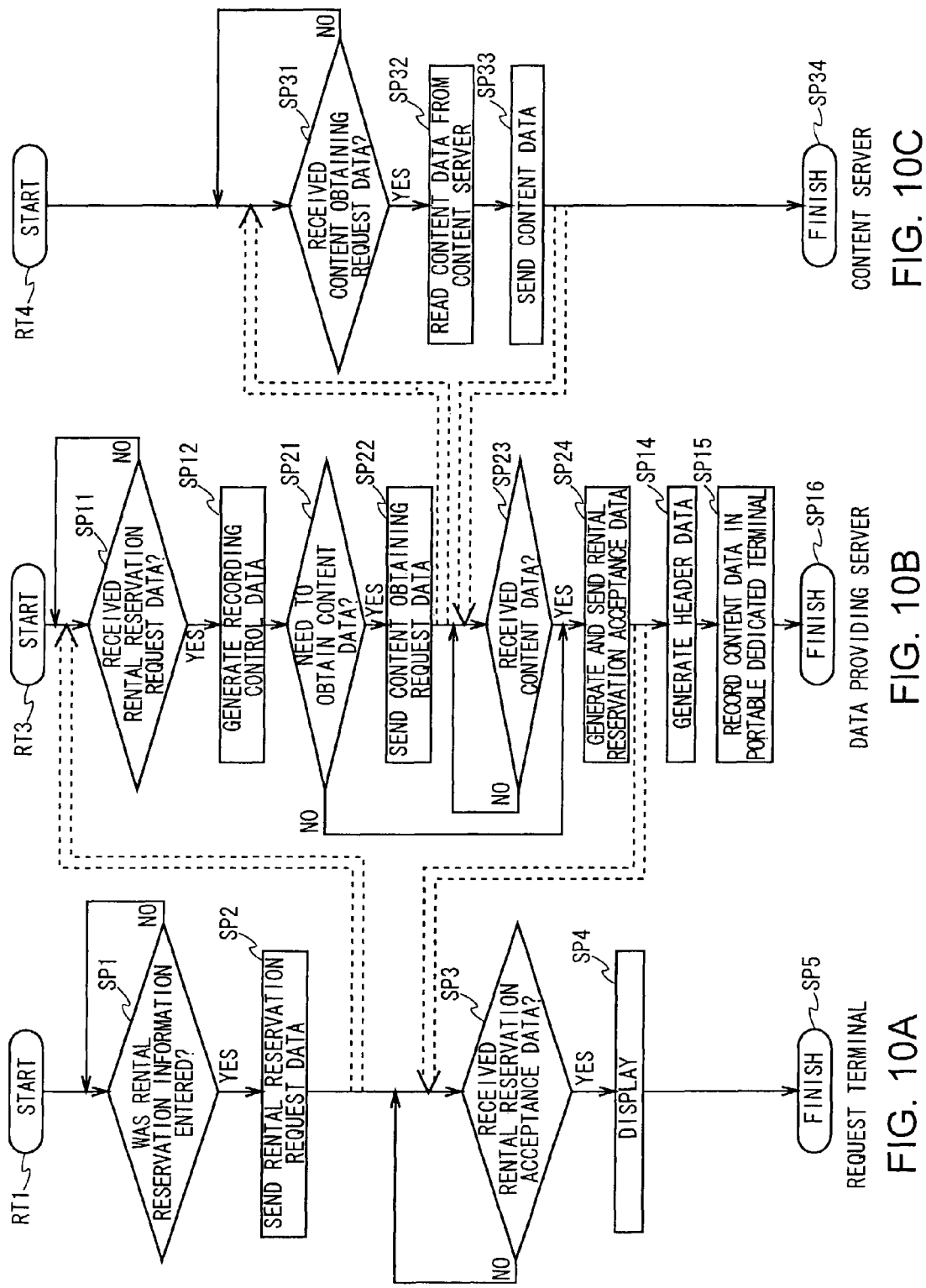
FIG. 10 is a flowchart showing a rental reservation processing procedure in a data providing system.

Here, rental reservation processing procedures by the data providing server 151, the request terminal 103 and the content server 152 in the data providing system 150 will be described except for the payment of rental charges (i.e. accounting). As shown in FIG. 10A, first, the request terminal 103 enters routine RT1 from the start step, and executes similar processing to the case described above with reference to FIG. 7A.

On the other hand, as shown in FIG. 10B in that the same reference numerals are added to corresponding parts in FIG. 7B, the data providing server 151 enters routine RT3 from the start step and sequentially executes the processing at steps SP11 and SP12. And then, the data providing server 151 proceeds to step SP21 to retrieve a data table in the content database 153 by the accounting part 156 and judging whether or not it is necessary to obtain the content data D1 that the customer requested to rent from the content server 152.

Obtaining an affirmative result in this step SP21 means that the content data D1 has not been stored in the content database 153 in the data providing server 151. At this time, the data providing server 151 proceeds to step SP22 to send the recording control data D3 generated by the accounting part 156 as content obtaining request data from the sending part 118 to the content server 152 via the Internet 105, and it proceeds to step SP23.

Here, as shown in FIG. 10C, the content server 152 enters routing RT4 from the start step, and proceeds to the next step SP31. In step SP31, the content server 152 awaits that the content obtaining request data is sent from the data providing server 151. If the content server 152 receives the content obtaining request data from the data providing server 151 by the receiving part 160, the content server 152 proceeds to step SP32.

In step SP32, the content server 152 retrieves the content data D1 in the content database 154 by the content retrieval part 162 based on the content ID extracted from the content obtaining request data by the content ID extracting part 161, and reads the content data D1 having that content ID from the above content database 154. Then, the content server 152 proceeds to step SP33.

In step SP33, the content server 152 adds the content obtaining request data to the content data D1 read from the content database 154 by the sending data generating part 164, sends them from the sending part 165 to the data providing server 151 via the Internet 105, and proceeds to the next step SP34 to finish the above processing by the content server 152.

On the other hand, in step SP23, the data providing server 151 which sent the content obtaining request data to the content server 152 awaits that the content data D1 is sent from the above content server 152. If the data providing server 151 receives the content data D1 (with the content obtaining request data) from the above content server 152 by the receiving part 115, the data providing server 151 proceeds to step SP24.

In step SP24, the data providing server 151 transmits the received content data D1 and content obtaining request data from the receiving data judging part 155 to the recording control part 157, and generates rental reservation acceptance data by the receiving data judging part 155, and sends this from the sending part 118 to the request terminal 103 via the Internet 105. Successively, the data providing server 151 sequentially executes the processing at steps SP14 and SP15. And then, the data providing server 151 proceeds to step SP16 to finish the processing by the above data providing server 151. In this manner, the data providing server 151 finishes the rental reservation processing for the content data D1.

In this connection, obtaining a negative result in the aforementioned step SP21 means that the content data D1 that the customer requested to rent has been stored in the content database 153 in the data providing server 151. At this time, the data providing server 151 proceeds to step SP24 to generate rental reservation acceptance data by the recording control part 157 that received the recording control data D3 from the accounting part 156, and sends this from the sending part 118 to the request terminal 103 via the Internet 105, and then, the data providing server 151 proceeds to step SP14.

According to the above configuration, in this data providing system 150, the data providing server 151 having the content database 153 storing many content data D1 is connected to the content server 152 having the content database 154 storing further more content data D1 than the above content database 153 on the Internet 105.

In this data providing system 150, if the data providing server 151 receives the rental reservation request data D2 from the request terminal 103 by the customer's operation, the data providing server 151 judges whether or not the content data D1 that the customer requested to rent has been stored in the content database 153 in the data providing server 151. If the content data D1 has not been stored, the data providing server 151 obtains the content data D1 from the content server 152, and records this in the portable dedicated terminal 102 that will be rented to the customer.

Accordingly, in this data providing system 150, the scale of the content database 153 in the data providing server 151 can be comparatively small. And even if the scale of the content database 153 is reduced, various content data D1 requested by the customer can be accurately rented.

In this connection, in this data providing system 150, since the scale of the content database 153 in the data providing server 151 can be reduced, the agency that installs it can largely reduce investment in equipment.

According to the above configuration, the data providing server 151 having the content database 153 storing many content data D1 is connected to the content server 152 having the content database 154 storing further more content data D1 than the above content database 153. In the data providing server 151 for receiving a rental request from the customer, in the case where content data D1 that the customer requested to rent has not been stored in the content database 153, the data providing server 151 obtains the content data D1 from the content server 152 and rents this to the customer. Thereby, in addition to the effects obtained by the aforementioned second embodiment, the scale of the content database 153 in the data providing server 151 can be largely reduced. And even if the scale of the content database 153 is reduced, a data providing system that can accurately rent various content data D1 requested to the customer can be realized.

Note that, in the aforementioned third embodiment, it has dealt with the case where a part of many content data D1 stored in the content database 154 of the content server 152 is stored in the content database 153 of the data providing server 151. However, this invention is not only limited this but also different content data D1 may be stored in the content database 154 of the content server 152 and the content database 153 of the data providing server 151, respectively. Furthermore, different content data D1 may be separatively stored in the content databases of many data providing servers 151 and content servers 152, respectively. Thereby, the scale of the content databases in the data providing servers 151 and the content servers 152 as a whole can be further reduced.

In the aforementioned third embodiment, it has dealt with the case where the data providing server 151 obtains content data D1 from the content server 152. However, this invention is not only limited this but also a changer for automatically selecting and reproducing content data D1 from packaged media that was purchased by the agency for sale or rental may be installed in the agency, and the data providing server 151 may obtain the content data D1 from the changer, or the content server 152 may be used together with the changer.

In the aforementioned third embodiment, it has dealt with the case where the portable dedicated terminal 102 dedicated to the agency is rented to the customer together with content data D1. However, this invention is not only limited this but also the portable dedicated terminal 102 may be sold to the customer, and the content data D1 may be recorded in the above portable dedicated terminal 102 for sale and/or rental.

Furthermore, in the aforementioned third embodiment, it has dealt with the case where content data D1 that the customer requested to rent is recorded in the portable dedicated terminal 102 dedicated to the agency. However, this invention is not only limited this but also the content data D1 that the customer requested to purchase/rent may be recorded in a portable recording and/or reproducing device or the like such as a portable telephone, a portable MD player carried into the agency by the customer.

(5) Fourth Embodiment

Figure 11:
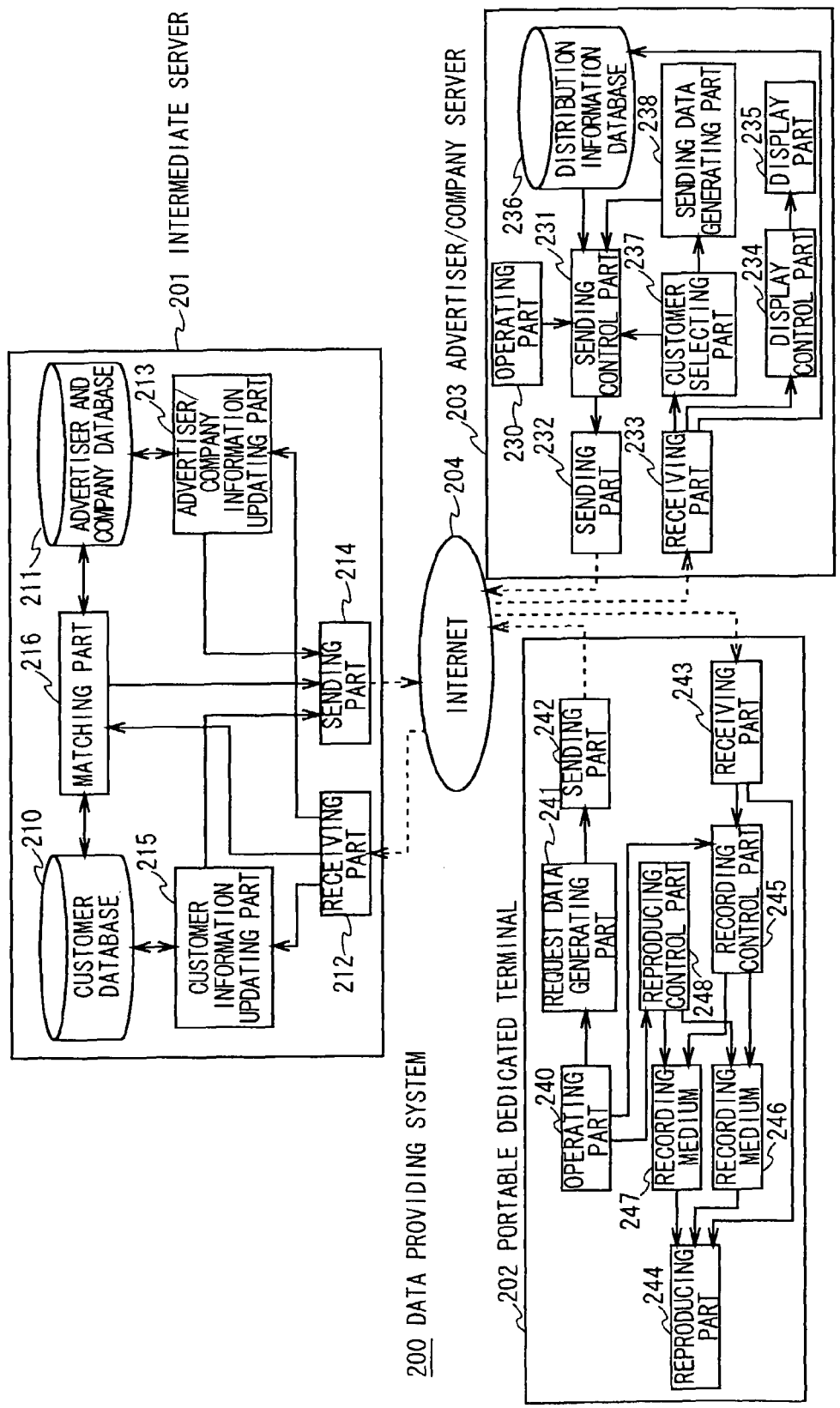
FIG. 11 is a block diagram showing the configuration of a data providing system according to a fourth embodiment.

FIG. 11 shows a data providing system 200 according to a fourth embodiment. The data providing system 200 is formed by that a portable dedicated terminal 202 corresponding to the portable dedicated terminals 7A to 7N described above with reference to FIGS. 1 to 3 and an advertiser/company server 203 corresponding to the advertiser and company site 6 described above with reference to FIGS. 1 and 3 are connected to an intermediate server 201 corresponding to the system management site 2 described above with reference to FIGS. 1 to 3, respectively, on the Internet 204.

The intermediate server 201 has a customer database 210 for registering a customer using the Internet 204 via the intermediate server 201, and an advertiser and company database 211 for registering advertisers and companies that want to provide distribution data such as advertisement to the customer via the Internet 204.

In the advertiser and company database 211, advertiser/company registering screen data has been previously stored. If registration request data for requesting registration is sent from the advertiser/company server 203 of an advertiser/company that wants an advertiser/company registration, the intermediate server 201 receives this by a receiving part 212, reads the advertiser/company registering screen data from the advertiser/company database 211 according to the registration request data by an advertiser/company information updating part 213, and sends this from a sending part 214 to the advertiser/company server 203 on the Internet 204.

As a result, if advertiser/company information shown in FIG. 12A, that was entered by an operator on an advertiser/company registering screen based on the advertiser/company registering screen data, is sent from the advertiser/company server 203 as advertiser/company registration information data, the intermediate server 201 receives this by the receiving part 212.

Here, as shown in FIG. 12A, the advertiser/company information sent from the advertiser/company server 203 to the intermediate server 201 is composed of various information peculiar to each advertiser or company, such as a company's name (that is, advertiser's name information or company's name information), a telephone number and an e-mail address, business contents information including distribution genre information representing the genre of distribution data that the advertiser/company provides (e.g., Japanese cars and/or imported cars, rock music and/or classic music, Hollywood motion pictures or Japanese motion pictures), a comment such as the catchphrase of the advertiser/company, and a term number representing a term when the advertise/company concludes a contract to the customer. They are generated by that the operator in the advertiser/company directly inputs or selects from among various items shown by the intermediate server 201.

If the intermediate server 201 obtains such advertiser/company information, the intermediate server 201 issues peculiar advertiser/company identification information to each advertiser/company requesting the registration (hereinafter, this is referred to as advertiser/company ID) by the advertiser/company information updating part 213, and sends this from the sending part 214 to the advertiser/company server 203 of the advertiser/company requesting the registration, via the Internet 204.

In addition to this, as shown in FIG. 12B, the intermediate server 201 adds the advertiser/company ID to the advertiser/company information obtained from the above advertiser/company by the advertiser/company information updating part 213, and stores them as advertiser/company registration information in the advertiser and company database 211 to register the advertiser/company. In this manner, the intermediate server 201 accepts a registration request from an advertiser or a company at any time, and executes advertiser/company registering processing.

On the other hand, in the customer database 210, customer registering screen data has been previously stored. If registration request data for requesting registration is sent from the portable dedicated terminal 202 by that the customer who requests a registration operates an operating part 240, the intermediate server 201 receives this by the receiving part 212, reads the customer registering screen data from the customer database 210 according to the registration request data by a customer information updating part 215, and sends this from the sending part 214 to the portable dedicated terminal 202 on the Internet 204.

As a result, if customer information that the customer entered on a customer registering screen based on the customer registering screen data, as shown in FIG. 13A, is sent from the portable dedicated terminal 202 as customer registration information data, the intermediate server 201 receives this by the receiving part 212.

Here, as shown in FIG. 13A, the customer information sent from the customer to the intermediate server 201 is composed of various personal information such as a customer's name, sex and age, information about a genre that the customer has interest (e.g., Japanese cars and/or imported cars, rock music and/or classic music, Hollywood motion pictures and/or Japanese motion pictures, etc.) (hereinafter, this is referred to as customer's favorite genre information), and taste information for representing a customer's taste or the like by a comment, a term number representing a term when the customer contracts to an advertiser/company, and an e-mail address that has been previously allotted to the portable dedicated terminal 202 used by the customer. They are generated by that the customer directly inputs or selects from among various items shown by the intermediate server 201.

In this connection, the terms in the case where the customer contracts with an advertiser/company are as FIG. 14: "The advertiser/company pays a part of customer's communication charges.", "The advertiser/company discounts the purchase of merchandise etc. by the customer.", "The customer can use the point of Internet mileage that the customer got in payment for the purchase of merchandise etc.", "The advertiser/company gives a present to the customer according to the point of the Internet mileage that the customer got.", "The customer accesses the site of the advertiser/company for a predetermined time or over every month.", "The customer purchases merchandise etc. from the advertiser/customer for a predetermined amount or over every month.", etc.

If the aforementioned customer information is obtained, the intermediate server 201 issues a customer ID to the customer by the customer information updating part 215, and sends this from the sending part 214 to the customer's portable dedicated terminal 202 via the Internet 204 for storing.

At this time, as shown in FIG. 13B, the intermediate server 201 adds the customer ID to the customer information by the customer information updating part 215, and stores them in the customer database 210 as customer registration information to register the customer. In this manner, the intermediate server 201 accepts a registration request from a customer at any time, and executes the customer registration processing.

Thereafter, if content specifying data including the customer ID is sent from the portable dedicated terminal 202 to request the distribution of content data to various agencies by an operation by that the registered customer operates the operating part 240, the intermediate server 201 temporarily receives this by the receiving part 212.

The intermediate server 201 retrieves the customer registration information in the customer database 210 based on the customer ID included in the content specifying data. And if it detects the customer's registration information, it adds this to the contents of the content specifying data as additional customer information, and updates them. Then, the intermediate server 201 sends the content specifying data from the sending part 214 to the agency via the Internet 204.

Figures 15, 16:
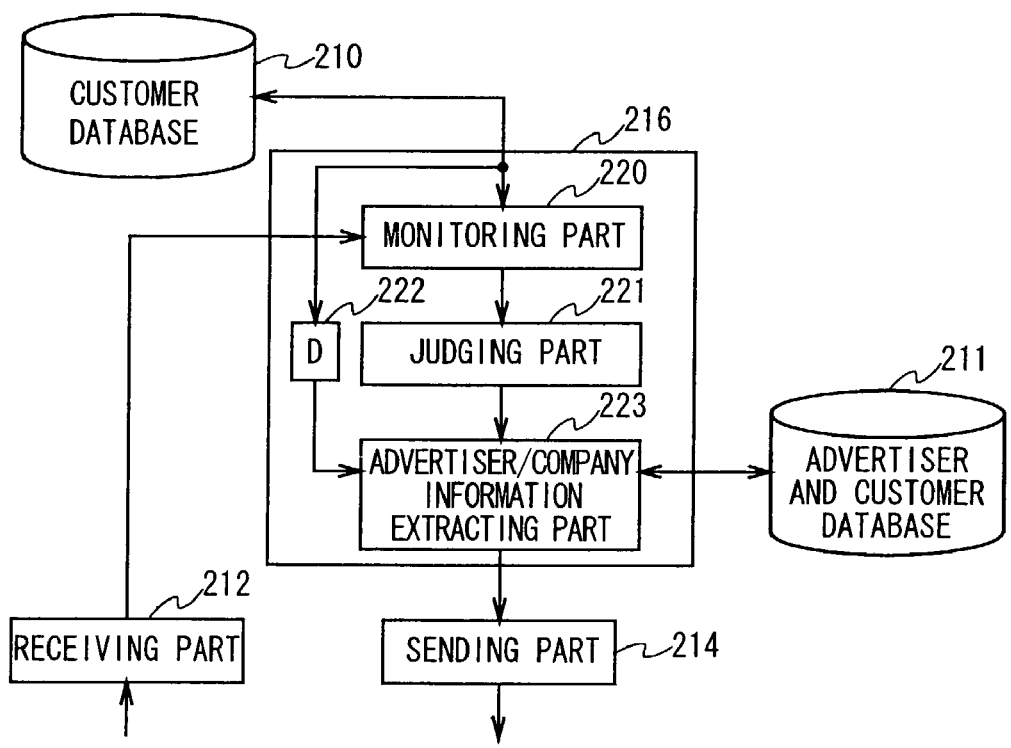
FIG. 15 is a schematic diagram showing the configuration of customer registration information updated on the Internet by the customer.
FIG. 16 is a block diagram showing the configuration of a matching part.

In this manner, the intermediate server 201 relays content data from the portable dedicated terminal 202 to the agency every time when the customer uses the agency on the Internet 204, so that as shown in FIG. 15, the intermediate server 201 adds accessed genre information representing the genre of the content data that the customer obtained from the agency, access counter information representing the number of times that the customer obtained content data of that genre, and information about the amount of money that the customer paid to obtain the above content data, to the customer registration information, and sequentially updates the contents of that customer registration by the customer information updating part 215.

In this connection, the intermediate server 201 issues a point to give the customer a privilege such as a discount (Internet mileage) every time when the customer uses the agency by the portable dedicated terminal 202 by the customer information updating part 215, according to the using state (purchase of content data, rental price, using time of the Internet, etc.). Also that point will be added to the customer registration information every issue.

Therefore, the intermediate server 201 can grasp the customer's taste or the like based on the customer registration information in the customer database 210.

By the way, if approval-by-customer data (including the customer ID) to approve the release of the customer information to an advertiser/company, in order to contract to the advertiser/customer to obtain distribution data, is sent from the portable dedicated terminal 202 by a customer's operation, the intermediate server 201 (FIG. 11) receives this by the receiving part 212, and takes this in a matching part 216.

In this case, as shown in FIG. 16, the matching part 216 takes the approval-by-customer data in a monitoring part 220. In the monitor part 220, the customer registration information on the customer who approved the release is read from the customer database 210 based on the customer ID included in the approval-by-customer data, and is transmitted to a judging part 221, and to an advertiser/company information extracting part 223 via a delay part 222.

The matching part 216 judges whether or not there is a genre showing the number of times that the customer obtained the content data more than a threshold value previously set (for example, 100 times) as the genre of the content data that the customer obtained, from the accessed genre information and the access counter information in the customer registration information, by the judging part 221.

If there is a genre showing the number of the times of obtaining more than the threshold value in the customer registration information, the matching part 216 detects the genre as a genre matching to the current customer's taste, and judges that the intermediate server 201 can introduce the customer to an advertiser and/or a company, by the judging part 221. The matching part 216 notifies the advertiser/company information extracting part 223 of that genre as customer's taste information.

The matching part 216 compares distribution genre information included in the advertiser/company registration information in the advertiser and company database 211 with the customer's taste information to retrieve advertiser/company registration information that they are matching, and reads the advertiser/company registration information (FIG. 12B) of the advertiser/company that can provide distribution data in the genre shown by the above customer's taste information, by the advertiser/company information extracting part 223. The matching part 216 excepts the advertiser/company ID from thus read advertiser/company registration information, and generates advertiser/company introducing information to introduce the advertiser/company to the customer, as shown in FIG. 17.

The matching part 216 sends the advertiser/company introducing information from the sending part 214 to the portable dedicated terminal 202 via the Internet 204 as advertiser/company introducing data, according to the e-mail address shown in the customer registration information supplied from the delay part 222, by the advertiser/company information extracting part 223. Thereby, the advertiser/company that can provide the distribution data matching with the customer's taste can be introduced to the customer.

On the contrary, if there is no genre showing the number of the times of obtaining more than the threshold value in the customer registration information, the matching part 216 judges that because the customer's taste is not clear, the intermediate server 201 cannot introduce the customer to advertisers and/or companies, by the judging part 221, and notifies the above judged result to the advertiser/company information extracting part 223.

The matching part 216 generates introduction-of-advertiser-and/or-company impossibility information representing that an advertiser and/or a company that can provide distribution data matching with the customer's taste could not be found by the advertiser/company information extracting part 223, and sends this from the sending part 214 to the portable dedicated terminal 202 via the Internet 204 introduction-of-advertiser-and/or-company impossibility data, according to the e-mail address shown in the customer registration information supplied from the delay part 222. Thereby, that an advertiser and/or a company that can provide distribution data matching with the customer's taste could not be found at the present time is notified to the customer.

As a result of that the advertiser and/or company was introduced to the customer, if advertiser and/or company selecting data (including the customer ID) showing the advertiser and/or company that the customer selected from among the introduced advertisers and/or companies is sent from the portable dedicated terminal 202 by the customer's operation, the intermediate server 201 receives this by the receiving part 212, and takes this in the advertiser/company information extracting part 223 from the monitoring part 220 of the matching part 216 via the judging part 221.

If the advertiser and/or company introducing information is generated, the matching part 216 temporarily stores the customer registration information and the customer's taste information that were used to generate that, in the advertiser/company information extracting part 223.

Therefore, if the matching part 216 takes the advertiser and/or company selecting data in the advertiser/company information extracting part 223, the matching part 216 generates customer introducing information in that the matching taste information in the customer registration information (FIG. 13B) is selectively used based on the customer's taste information as shown in FIG. 18, to introduce the customer to the advertiser and/or company, and sends this as customer introducing data, from the sending part 214 to the advertiser/company server 203 of the advertiser/company that the customer selected on the Internet 204, according to the advertiser and/or company selecting data.

Thereby, the intermediate server 201 shown in FIG. 11 can introduce the advertiser and/or company that can provide distribution data useful for the customer, to the customer who requested the introduction of advertisers and/or companies. At the same time, the intermediate server 201 can introduce the customer who needs their providing of distribution data to the advertisers/companies.

In this connection, as a result of that the advertiser and/or company was introduced to the customer, if selection-of-advertiser/company impossible data representing that the customer could not find an advertiser and/or a company wanting to contract is sent from the portable dedicated terminal 202, the intermediate server 201 receives this by the receiving part 212, forbids the matching part 216 to generate customer introducing information, and awaits sending of approval-by-customer data from the portable dedicated terminal 202 of the above customer again.

Note that, when the intermediate server 201 introduces the customer to an advertiser and/or a company, it collects charges for the introduction of the customer from the advertiser and/or company.

As a result of that the intermediate server 201 sent the customer introducing data to the advertiser/company server 203, if the advertiser and/or company contracts with the customer and contract conclusion data is sent from the advertiser/company server 203, the intermediate server 201 receives this by the receiving part 212, and then sends this from the sending part 214 to the portable dedicated terminal 202 on the Internet 204. Thereby, the conclusion of the contract between the advertiser/company is notified to the customer.

At this time, as shown in FIG. 19, the intermediate server 201 adds contracting customer ID information representing the customer's ID who contracted with the above advertiser and/or company to the advertiser/company registration information in the advertiser and company database 211 based on the contract conclusion data, and updates the advertiser/company registration information, by the advertiser/company information updating part 213. At the same time, as shown in FIG. 20, the intermediate server 201 adds contracting advertiser/company ID information representing the advertiser's/customer's ID of the advertiser/company that contracted with the above customer to the customer registration information in the customer database 210 based on that contract conclusion data, and updates the customer registration information, by the customer information updating part 215.

Thereby, the intermediate server 201 can grasp the contracting state between the customer and advertiser/company from thus updated customer registration information and advertiser/company registration information. Thus, when the release of the customer information is approved from the customer who is under contraction with the advertiser/company to newly contract with an advertiser and/or a company, it can be prevented that the intermediate server 201 introduces that advertiser/company being under contraction with the customer again.

Furthermore, as a result of that the intermediate server 201 sent the customer introducing data to the advertiser/company server 203, if the advertiser/company abandons the contract with the customer and contract inconclusion data is sent from the advertiser/company server 203, the intermediate server 201 receives this by the receiving part 212, and sends this from the sending part 214 to the portable dedicated terminal 202 via the Internet 204. Thereby, that the contract with the advertiser/company was not concluded is notified to the customer.

In this connection, when in generating the advertiser/company introducing information and customer introducing information described above with reference to FIGS. 17 and 18, the intermediate server 201 excepts the contracting customer ID information and the contracting advertiser/company ID information from the original advertiser/company registration information and customer registration information. Thereby, leakage of personal information unnecessary for the contract can be prevented.

On the other hand, as shown in FIG. 11, if an operator enters a registration request by an operating part 230, the advertiser/company server 203 sends the registration request as registration request data, from a sending part 232 to the intermediate server 201 via the Internet 204, by a sending control part 231.

The advertiser/company server 203 receives advertiser/company registering screen data from the intermediate server 201 by a receiving part 233, and transmits this from a display control part 234 to a display part 235. Thereby, an advertiser/company registering screen based on the advertiser/company registering screen data is displayed on the display part 235.

Then, if the operating part 230 is operated by the operator while the advertiser/company registering screen is displayed on the display part 235, the advertiser/company server 203 sends the advertiser/company information that was entered on the advertiser/company registering screen according to the above operation of the operating part 230, as advertiser/company registration information data described above with reference to FIG. 12A, from the sending part 232 to the intermediate server 201 by the sending control part 231 via the Internet 204.

The advertiser/company server 203 receives the advertiser/company ID sent from the intermediate server 201 that finished the registration of the advertiser/company by the receiving part 233 via the Internet 204, and stores this in a distribution information database 236. Thereafter, when in accessing the intermediate server 201, the advertiser/company server 203 uses that advertiser/company ID for identification.

After the advertise/company server 203 was registered in the intermediate server 201, if the customer introducing information described above with reference to FIG. 17 is sent from the above intermediate server 201 via the Internet 204 as customer introducing data, the advertiser/company server 203 receives this by the receiving part 233, and takes this in a customer selecting part 237.

In this case, the advertiser/company server 203 judges whether or not a contract should be concluded with the customer introduced from the intermediate server 201, by referring to the contract terms and the using state of the Internet or the like, by the customer selecting part 237 based on the customer introducing data.

If the advertiser/company server 203 decides to contract with the customer introduced from the intermediate server 201 by the customer selecting part 237, the advertiser/company server 203 generates contract conclusion data by a sending data generating part 238, and sends this to the intermediate server 201 sequentially via the sending control part 231, the sending part 232 and the Internet 204.

At this time, the advertiser/company server 203 notifies the sending control part 231 of that to contract with the customer was decided, by the customer selecting part 237. Thereby, the advertiser/company server 203 properly selects and reads distribution data matching with the customer's taste from among various distribution data previously stored in the distribution information database 236, and sends thus read distribution data from the sending part 232 to the customer's portable dedicated terminal 202 via the Internet 204, by the sending control part 231.

In this manner, the advertiser/company server 203 can properly provide distribution data matching with the customer's taste to the contracting customer.

In this connection, if the advertiser/company server 203 decides not to contract with the customer introduced from the intermediate server 201 by the customer selecting part 237, the advertiser/company server 203 generates contract inconclusion data by the sending data generating part 238, and sends this to the intermediate server 201 sequentially via the sending control part 231, the sending part 232 and the Internet 204.

In the portable dedicated terminal 202, if the customer who wants a registration in the intermediate server 201 enters a registration request by the operating part 240, the portable dedicated terminal 202 generates registration request data by a request data generating part 241, and sends this from a sending part 242 to the intermediate server 201 via the Internet 204.

The portable dedicated terminal 202 receives customer registering screen data sent from the intermediate server 201 by a receiving part 243 via the Internet 204, and transmits this to a reproducing part 244 composed of a display control part, a display part, a speaker, etc. Thereby, a customer registering screen based on the customer registering screen data is displayed by the reproducing part 244.

Then, if customer information is entered by that customer operates the operating part 240 in the state where the customer registering screen is displayed by the reproducing part 244, the portable dedicated terminal 202 sends the customer information from the sending part 242 to the intermediate server 201 by the request data generating part 241 via the Internet 204, described above with reference to FIG. 13(A) as customer registration information data.

The portable dedicated terminal 202 receives the customer ID from the intermediate server 201 that finished the customer registration by the receiving part 243 via the Internet 204, and takes that customer ID in a recording control part 245.

The portable dedicated terminal 202 can identify various data that were taken in the recording control part 245 via the receiving part 243, by the above recording control part 245 based on an identifier that has been previously added to the data.

If the portable dedicated terminal 202 obtains the customer ID, the portable dedicated terminal 202 records the customer ID in a recording medium for customer 246 by the recording control part 245. Thereafter, when in accessing the intermediate server 201 or the agency via the above intermediate server 201, the portable dedicated terminal 202 uses that customer ID. Thereby, the intermediate server 201 and the agency can identify the customer.

If the customer is registered in the intermediate server 201, the portable dedicated terminal 202 sends information for specifying desired content data that the customer entered by operating the operating part 240 from the sending part 242 to the agency by the request data generating part 241 via the intermediate server 201, as content specifying data accompanied with the customer ID.

Then, if the portable dedicated terminal 202 receives the content data from the agency by the receiving part 243, the portable dedicated terminal 202 identifies that by the recording control part 245, and records this in an recording medium for agency 247. Thereafter, the portable dedicated terminal 202 reproduces the content data from the recording medium for agency 247 by the reproducing control part 248, according to the customer's operation of the operating part 240, and transmits thus reproduced content data to the reproducing part 244. Thereby, the customer can enjoy the content.

If the customer enters approval information for approving the release of the customer information by the operating part 240, the portable dedicated terminal 202 generates approval-by-customer data representing that approval information by the request data generating part 241, and sends this from the sending part 242 to the intermediate server 201 via the Internet 204.

As a result, if advertiser/company introducing data is sent from the intermediate server 201 via the Internet 204, the portable dedicated terminal 202 receives this by the receiving part 243, and transmits this to the reproducing part 244. An advertiser and/or company to be introduced from the intermediate server 201 is shown to the customer by an advertiser/company introducing screen based on that advertiser/company introducing data.

If the customer selects desired advertiser and/or company by the operating part 240, the portable dedicated terminal 202 generates advertiser/company selecting data representing that selected advertiser/company by the request data generating part 241, and sends this from the sending part 242 to the intermediate server 201 via the Internet 204.

As a result, if contract conclusion data is sent from the intermediate server 201 via the Internet 204 by that the advertiser or the company contracted with the customer, the portable dedicated terminal 202 receives this by the receiving part 243, and transmits this to the reproducing part 244. Thereby, the conclusion of the contract with the advertiser/company is notified to the customer.

If the distribution data is sent from the advertiser/company server 203 being under contraction with the customer, the portable dedicated terminal 202 receives this by the receiving part 243, identifies the above received distribution data and records this in the recording medium for customer 246 by the recording control part 245. Thereafter, the portable dedicated terminal 202 reproduces the distribution data from the recording medium for customer 246 by the reproducing control part 248 according to the customer's operation of the operating part 240, and transmits the above reproduced distribution data to the reproducing part 244. Thereby, various information based on that distribution data can be shown to the customer.

On the contrary, if contract inconclusion data is sent from the intermediate server 201 by that the advertiser or the company abandon the contract with the customer, the portable dedicated terminal 202 receives this by the receiving part 243, and transmits this to the reproducing part 244. Thereby, the inconclusion of the contract with the advertiser/company is notified to the customer.

In this connection, as a result of that the portable dedicated terminal 202 sent the approval-by-customer data to the intermediate server 201, if introduction-of-advertiser-and/or-company disapproval data is sent, the portable dedicated terminal 202 receives this by the receiving part 243, and transmits this to the reproducing part 244. Thereby, that the intermediate server 201 could not find an advertiser and/or a company introducible to the customer at the present time is notified to the customer.

As a result of that the advertisers and/or company introduced from the intermediate server 201 were shown to the customer, if selection disapproval information representing that the customer could not find an advertiser and/or a company that he/she wants to contract from among the introduced advertiser and/or company is entered by the above customer by the operating part 240, the portable dedicated terminal 202 generates selection-of-advertiser-and/or-company disapproval data representing that selection disapproval information by the request data generating part 241, and sends this from the sending part 242 to the intermediate server 201 via the Internet 204.

By the way, the recording medium for customer 246 and the recording medium for agency 247 have been provided in this portable dedicated terminal 202 as described above. So that, the data obtained from the intermediate server 201 and the advertiser/company server 203 (customer ID and distribution data) will be recorded in the recording medium for customer 246 by separating that from the data obtained from the agency (content data).

Thereby, in the advertiser/company server 202, when the content data rented from the agency is erased from the recording medium for agency 247 on the expiration of the rental term, that the data such as the customer ID and the distribution data obtained for the customer from the servers are erroneously erased with the above content data, can be surely prevented.

Here, an advertiser/company registration processing procedure by the intermediate server 201 and the advertiser/company server 203 in the data providing system 200 will be collectively described. First, as shown in FIG. 21A, the advertiser/company server 203 enters routine RT10 from the start step, and proceeds to step SP101.

In step SP101, the advertiser/company server 203 awaits that a registration request is entered by the operating part 230. If it is entered, the advertiser/company server 203 proceeds to step SP102.

In step SP102, the advertiser/company server 203 sends the registration request from the sending part 232 to the intermediate server 201 as registration request data by the sending control part 231, and proceeds to step SP103.

At this time, as shown in FIG. 21B, the intermediate server 201 enters routine RT11 from the start step, and proceeds to step SP111 to await the registration request data from the advertiser/company server 203. If the intermediate server 201 receives the registration request data from the above advertiser/company server 203 by the receiving part 212, it proceeds to step SP112.

In step SP112, the intermediate server 201 reads advertiser/company registering screen data from the advertiser and company database 211 based on the received registration request data by the advertiser/company information updating part 213, and sends this from the sending part 214 to the advertiser/company server 203, and it proceeds to step SP103.

At this time, in step SP103, the advertiser/company server 203 awaits the advertiser/company registering screen data from the intermediate server 201. If the advertiser/company server 203 receives the advertiser/company registering screen data by the receiving part 233, it proceeds to step SP104.

In step SP104, the advertiser/company server 203 sends advertiser/company information that was entered on an advertiser/company registering screen based on the advertiser/company registering screen data by the operator with the operating part 230, from the sending part 232 to the intermediate server 201 by the sending control part 231 as advertiser/company registration information data, and it proceeds to step SP105.

At this time, in step SP113, the intermediate server 201 awaits the advertiser/company registration information data from the advertiser/company server 203. If the intermediate server 201 receives the advertiser/company registration information data by the receiving part 212, it proceeds to step SP114.

In step SP114, the intermediate server 201 issues an advertiser/company ID to the advertiser/company that requested a registration by the advertiser/company information updating part 213, and sends this from the sending part 214 to the advertiser/company server 203. At the same time, the intermediate server 201 and adds the advertiser/company ID to the advertiser/company information based on the advertiser/company registration information data obtained from the above advertiser/company server 203 and sets this as advertiser/company registration information, and stores this in the advertiser and company database 211 to register the advertiser/company that requested the registration. Then, the intermediate server 201 proceeds to step SP115 to finish the processing in the intermediate server 201.

Furthermore, in step SP105, the advertiser/company server 203 awaits the advertiser/company ID from the intermediate server 201. If the advertiser/company server 203 receives the advertiser/company ID by the receiving part 233, it proceeds to step SP106 to store the advertiser/company ID in the distribution information database 236. Then, the advertiser/company server 203 proceeds to the next step SP107 to finish the processing in the advertiser/company server 203. In this manner, the data providing system 200 finishes all the advertiser/company registering processing procedures in the intermediate server 201 and the advertiser/company server 203.

Figure 22A:
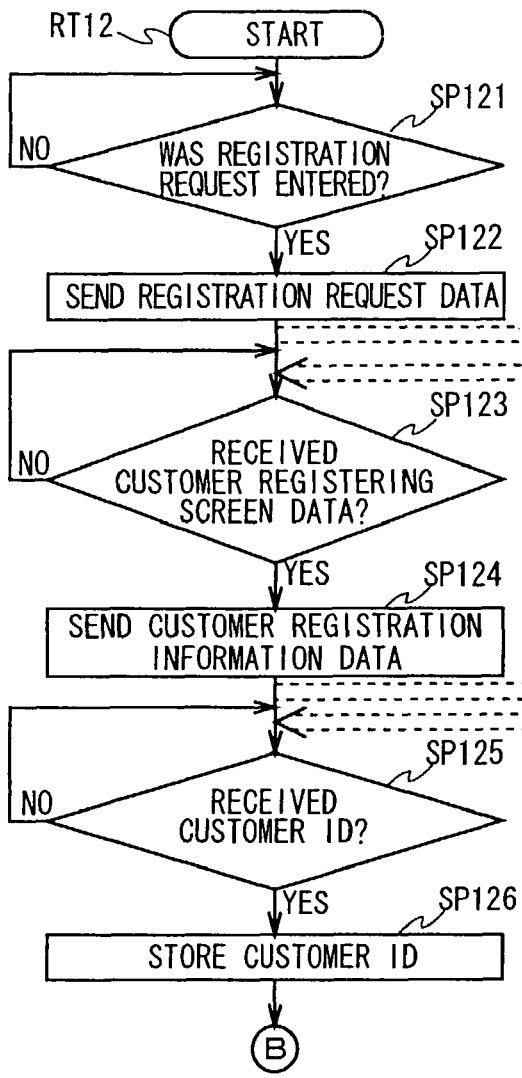
FIGS. 22A and 22B are flowcharts showing an advertiser/company introducing processing procedure in a data providing system.

An advertiser/company introducing processing procedures by the intermediate server 201 and the portable dedicated terminal 202 in the data providing system 200 will be collectively described. First, as shown in FIGS. 22A and 23A, the portable dedicated terminal 202 enters routing RT12 from the start step, and proceeds to step SP121.

In step SP121, the portable dedicated terminal 202 awaits that the customer enters a registration request by the operating part 240. If the registration request is entered, the portable dedicated terminal 202 proceeds to step SP122.

In step SP122, the portable dedicated terminal 202 sends the registration request from the sending part 242 to the intermediate server 201 as registration request data by the request data generating part 241, and it proceeds to step SP123.

Figure 22B:
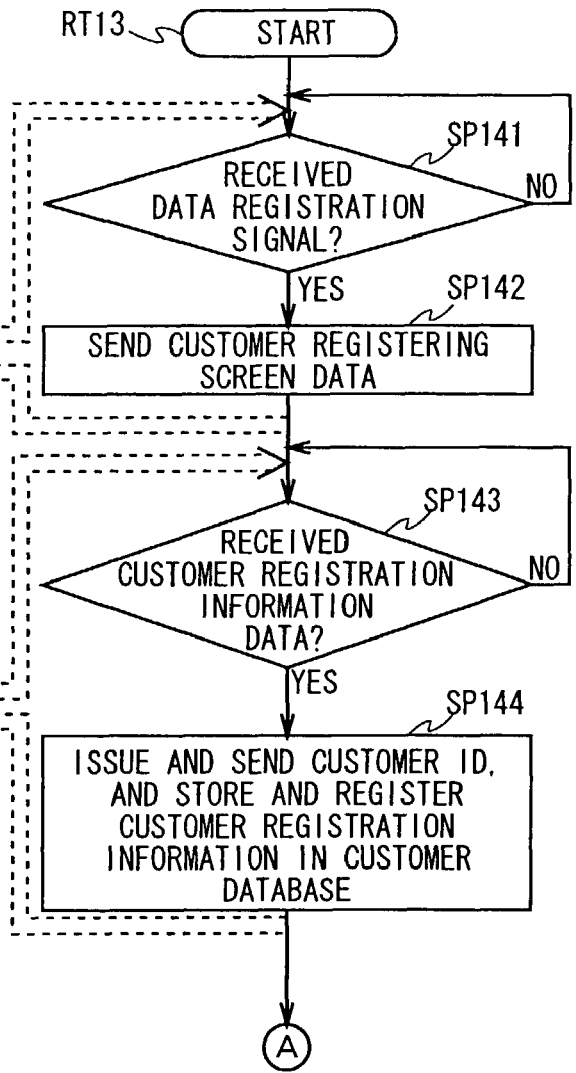

At this time, as shown in FIGS. 22B and 23B, the intermediate server 201 enters routine RT13 from the start step, and proceeds to step SP141 to await the registration request data from the portable dedicated terminal 202. If the intermediate server 201 receives the registration request data from the portable dedicated terminal 202 by the receiving part 212, it proceeds to step SP142.

In step SP142, the intermediate server 201 reads customer registering screen data from the customer database 210 by the customer information updating part 215 based on the registration request data, and sends this from the sending part 214 to the portable dedicated terminal 202, and proceeds to step SP143.

At this time, in step SP123, the portable dedicated terminal 202 awaits the customer registering screen data from the intermediate server 201. If the portable dedicated terminal 202 receives the customer registering screen data by the receiving part 243, it proceeds to step SP124.

In step SP124, the portable dedicated terminal 202 sends customer information that was entered on a customer registering screen based on the customer registering screen data by the customer with the operating part 240, from the sending part 242 to the intermediate server 201 by the request data generating part 241 as customer registration information data, and it proceeds to step SP125.

At this time, in step SP143, the intermediate server 201 awaits the customer registration information data from the portable dedicated terminal 202. If the intermediate server 201 receives the customer registration information data by the receiving part 212, it proceeds to step SP144.

In step SP144, the intermediate server 201 issues a customer ID to the customer who requested a registration by the customer information updating part 215, and sends this from the sending part 214 to the portable dedicated terminal 202. At the same time, the intermediate server 201 adds the customer ID to the customer information based on the above customer registration information data obtained from the portable dedicated terminal 202 and sets this as customer registration information, and stores this in the customer database 210 to register the above customer who requested the registration. Then, the intermediate server 201 proceeds to step SP145.

At this time, in step SP125, the portable dedicated terminal 202 awaits the customer ID from the intermediate server 201. If the portable dedicated terminal 202 receives the customer ID by the receiving part 243, it proceeds to step SP126 to record that customer ID in the recording medium for customer 246, and proceeds to step SP127.

In step SP127, the portable dedicated terminal 202 awaits that the customer enters a request with the operating part 240. If a request is entered, the portable dedicated terminal 202 proceeds to step SP128 to determine whether or not that is a request to permit the release of the customer information.

Obtaining a negative result in this step SP128 means that the customer's request is specifying information for example to obtain content data from various agencies. At this time, the portable dedicated terminal 202 proceeds to step SP129 to generate content specifying data representing the specifying information including the customer ID by the request data generating part 241, and sends this from the sending part 242 to the agencies via the intermediate server 201, and it returns to step SP127.

Thereafter, until the customer requests the permission of the release of the customer information, the portable dedicated terminal 202 repeats the processing loop of steps SP127-SP128-SP129 every time when content data specifying information is entered by the customer.

Obtaining an affirmative result in step SP128 means that the permission of the release of the customer information was requested by that the customer wanted to contract with an advertiser and/or a company. At this time, the portable dedicated terminal 202 proceeds to step SP130 to generate customer approval data representing the permission of the release of the customer information and including the customer ID by the request data generating part 241, and sends this from the sending part 242 to the intermediate server 201. Then, the portable dedicated terminal 202 proceeds to step SP131.

On the other hand, in step SP145, the intermediate server 201 awaits that data is sent from the portable dedicated terminal 202. If the intermediate server 201 receives data from the above portable dedicated terminal 202 by the receiving part 212, it proceeds to step SP146 to determine whether or not the received data is the customer approval data.

Obtaining a negative result in step SP146 means that the intermediate server 201 received content specifying data from the portable dedicated terminal 202 for relay to the agency. At this time, the intermediate server 201 proceeds to step SP147 to update the customer registration information based on the content specifying data by the customer information updating part 215. Then, the intermediate server 201 proceeds to step SP145.

In this manner, until the customer approval data is sent from the portable dedicated terminal 202, the intermediate server 201 repeats the processing loop of steps SP145-SP146-SP147 every time when content specifying data is received from the above portable dedicated terminal 202, and sequentially updates the customer registration information.

Obtaining an affirmative result in step SP146 means that the intermediate server 201 received the customer approval data by that the customer permitted the release of the customer information to contract with an advertiser and/or company. At this time, the intermediate server 201 proceeds to step SP148 to determine whether or not there is a genre showing the number of the times of obtaining more than the threshold value, for the content data obtained by the customer by the matching part 216 based on the customer registration information.

Obtaining a negative result in this step SP148 means that because there is no genre, it is hard to specify the customer's taste at the present time. At this time, the intermediate server 201 generates advertiser and company introduction disapproval data by the matching part 216, and sends this from the sending part 214 to the portable dedicated terminal 202 to notify the customer of that an advertiser and/or a company introducible to the customer cannot be found at the present time. Then, the intermediate server 201 returns step SP145.

On the contrary, obtaining an affirmative result in step SP148 means that there is a genre representing the number of the times of obtaining more than the threshold value, for the content data that the customer obtained. That genre is specified as the customer's taste at the present time. At this time, the intermediate server 201 proceeds to step SP149.

In step SP149, the intermediate server 201 retrieves advertiser/company registration information in the advertiser and company database 211 based on the customer's taste that was specified in step SP148, by the matching part 216, and reads the advertiser/company registration information on an advertiser and a company that can provide distribution data matching with the customer's taste.

The intermediate server 201 generates advertiser and/or company introducing information based on the advertiser/company registration information read from the advertiser and company database 211 by the matching part 216, and sends this from the sending part 214 to the portable dedicated terminal 202 as advertiser and/or company introducing data, to introduce the advertiser and/or company to the customer. Then, the intermediate server 201 returns to step SP145 and repeats the processing of steps SP145-SP146-SP147-SP148-SP149 again.

After sending the customer approval data to the intermediate server 201, in step SP131, the portable dedicated terminal 202 awaits the advertiser and/or company introducing data or the advertiser/company introduction disapproval data from the intermediate server 201. If the portable dedicated terminal 202 receives the advertiser and/or company introducing data or the advertiser and company introduction disapproval data from the intermediate server 201 by the receiving part 243, it proceeds to the next step SP132.

If the portable dedicated terminal 202 receives the advertiser and company introduction disapproval data by the receiving part 243, in step SP132, the portable dedicated terminal 202 transmits this to the reproducing part 244 to notify the customer of that the intermediate server 201 could not find an advertiser and a company for the customer. Then, the portable dedicated terminal 202 returns to step SP127 and repeats the processing of steps SP127-SP128-SP129-SP130-SP131-SP132 again.

If the portable dedicated terminal 202 receives the advertiser and/or company introducing data by the receiving part 243, in step SP132, the portable dedicated terminal 202 transmits this to the reproducing part 244 to show the customer the advertiser and/or the company that was introduced from the intermediate server 201. Then, the portable dedicated terminal 202 returns to step SP127 and repeats the processing of steps SP127-SP128-SP129-SP130-SP131-SP132 again. The advertiser and/or company introducing processing procedures in the data providing system 200 are executed as the above.

Contracting processing procedures by the intermediate server 201, the portable dedicated terminal 202 and the advertiser/company server 203 in the data providing system 200 will be described. First, as shown in FIG. 24A, the portable dedicated terminal 202 which received the advertiser and/or company introducing data from the intermediate server 201 enters routine RT14 from the start step, and proceeds to step SP161.

In step SP161, the portable dedicated terminal 202 shows the customer the advertiser and/or company introduced from the intermediate server 201 by the reproducing part 244. If the customer selects the advertiser and/or company wanting to contract with the operating part 240, the portable dedicated terminal 202 proceeds to step SP162.

In step SP162, the portable dedicated terminal 202 generates advertiser and/or company selecting data representing the advertiser and/or the company selected by the customer by the request data generating part 241, and sends this from the sending part 242 to the intermediate server 201 via the Internet 204. Then, the portable dedicated terminal 202 proceeds to the next step SP163.

At this time, as shown in FIG. 24B, the intermediate server 201 enters routine RT15 from the start step, and proceeds to step SP171 to await the advertiser/company selecting data from the portable dedicated terminal 202. If the intermediate server 201 receives the advertiser/company selecting data from the portable dedicated terminal 202 by the receiving part 212, it proceeds to step SP172.

In step SP172, the intermediate server 201 generates customer introducing information from the customer registration information based on the advertiser and/or company selecting data by the matching part 216, and sends this from the sending part 214 to the advertiser/company server 203 as customer introducing data via the Internet 204. Then, the intermediate server 201 proceeds to step SP173.

Here, at this time, as shown in FIG. 24C, the advertiser/company server 203 enters routine RT16 from the start step, and proceeds to step SP181 to await the customer introducing data from the intermediate server 201. If the advertiser/company server 203 receives the customer introducing data from the intermediate server 201 by the receiving part 233, it proceeds to step SP182.

In step SP182, the advertiser/company server 203 judges whether or not to contract with the customer by the customer selecting part 237, by referring to the contract terms and the using state of the Internet 204 based on the customer introducing data.

Obtaining a negative result in step SP182 means that the contract terms shown by the customer and the using state of the Internet 204 did not match with the request of the advertiser/company and the contract was abandoned. At this time, the advertiser/company server 203 proceeds to step SP183 to generate contract inconclusion data by the sending data generating part 238, and sends this from the sending part 232 to the intermediate server 201 via the Internet 204. Then, the advertiser/company server 203 proceeds to step SP184 to finish the processing in the advertiser/company server 203.

On the contrary, obtaining an affirmative result in step SP182 means that the contract terms shown by the customer and the using state of the Internet 204 matched with the request of the advertiser/company and the advertiser/company decided to contract with the customer. At this time, the advertiser/company server 203 proceeds to step SP185 to generate contract conclusion data by the sending data generating part 238, and sends this from the sending part 232 to the intermediate server 201 via the Internet 204. Then, the advertiser/company server 203 proceeds to step SP186.

In step SP186, the advertiser/company server 203 properly reads distribution data matching with the taste of the contracting customer from the distribution information database 236 by the sending control part 231, and sends this from the sending part 232 to the customer's portable dedicated terminal 202 via the Internet 204. Then, the advertiser/company server 203 proceeds to step SP184 to finish the processing in the advertiser/company server 203.

In step SP173, the intermediate server 201 awaits that data representing the conclusion/inconclusion of a contract with the customer is sent from the advertiser/company server 203. If the intermediate server 201 receives the above data from the advertiser/company server 203 by the receiving part 212, it proceeds to step SP174.

In step SP174, the intermediate server 201 determines whether or not the data received from the advertiser/company server 203 is the contract conclusion data.

Obtaining a negative result in step SP174 means that the advertiser/company abandoned to contract with the customer and the intermediate server 201 received contract inconclusion data from the advertiser/company server 203. At this time, the intermediate server 201 proceeds to step SP175 to send the contract inconclusion data from the sending part 214 to the portable dedicated terminal 202 via the Internet 204 to notify the customer of that a contract with the advertiser/company did not conclude. Then, the intermediate server 201 proceeds to step SP176 to finish the processing in the intermediate server 201.

On the contrary, obtaining an affirmative result in step SP174 means that the advertiser/company contracted with the customer and the intermediate server 201 received contract conclusion data from the advertiser/company server 203. At this time, the intermediate server 201 proceeds to step SP177 to send the contract conclusion data from the sending part 214 to the portable dedicated terminal 202 via the Internet 204 to notify the customer of that the contract with the advertiser/company has concluded. Then, the intermediate server 201 proceeds to step SP178.

In step SP178, the intermediate server 201 updates the customer registration information in the customer database 210 by the customer information updating part 215 based on the contract conclusion data, and also updates the advertiser/company registration information in the advertiser and company database 211 by the advertiser/company information updating part 213 based on that contract conclusion data. Then, the intermediate server 201 proceeds to step SP176 to finish the processing in the intermediate server 201.

Furthermore, in step SP163, the portable dedicated terminal 202 awaits that data representing the conclusion/inconclusion of a contract with the advertiser/company is sent from the intermediate server 201. If the portable dedicated terminal 202 receives the above data from the intermediate server 201, it proceeds to step SP164.

In step SP164, the portable dedicated terminal 202 determines whether or not the data received from the intermediate server 201 is the contract conclusion data.

Obtaining a negative result in step SP164 means that the advertiser/company abandoned the contract and the portable dedicated terminal 202 received the contract inconclusion data from the intermediate server 201. At this time, the portable dedicated terminal 202 transmits the contract inconclusion data to the reproducing part 244 to notify the customer of that the contract with the advertiser/company did not conclude. Then, the portable dedicated terminal 202 proceeds to step SP165 to finish the processing in the portable dedicated terminal 202.

On the contrary, obtaining an affirmative result in step SP164 means that the advertiser/company contracted with the customer and the portable dedicated terminal 202 received the contract conclusion data from the intermediate server 201. At this time, the portable dedicated terminal 202 transmits the contract conclusion data to the reproducing part 244 to notify the customer of that the contract with the advertiser/company was concluded. Then, the portable dedicated terminal 202 proceeds to step SP166.

In step SP166, the portable dedicated terminal 202 awaits distribution data from the advertiser/company server 203 of the advertiser/company that contracted with the customer. If the portable dedicated terminal 202 receives distribution data from the advertiser/company server 203 by the receiving part 243, it proceeds to step SP167.

In step SP167, the portable dedicated terminal 202 recognizes thus received distribution data and records this in the recording medium for customer 246 by the recording control part 245. Thereby, the customer can freely reproduce and view the distribution data. Then, the portable dedicated terminal 202 proceeds to step SP165 to finish the processing in the portable dedicated terminal 202. In this manner, all the contracting processing procedure in the data providing system 200 is finished.

According to the above configuration, in this data providing system 200, an advertiser or a company that provides distribution data to the customer on the Internet 204 is registered by that the intermediate server 201 obtains advertiser/company information from the advertiser/company server 203 of the advertiser/company and stores this in the advertiser and company database 211 as advertiser/company registration information.

Furthermore, in the data providing system 200, the customer is registered by that the intermediate server 201 obtains customer information from the intermediate server 201 of the customer who wants to use the Internet 204 by the portable dedicated terminal 202, issues a customer ID, adds the customer ID to the above obtained customer information, and stores this in the customer database 210 as customer registration information.

In this data providing system 200, every time when the customer sends content specifying data including the customer ID from the above portable dedicated terminal 202 to the agency to obtain content data, the content specifying data is relayed by the intermediate server 201, and the contents of the above content specifying data is added to the customer registration information in the customer database 210, and the customer registration information is updated.

In this manner, in the data providing system 200, if the customer approval data representing that the customer permits the release of the customer information is sent from the portable dedicated terminal 202, the customer's taste is judged based on the customer registration information in the customer database 210 in the intermediate server 201. The advertiser/company registration information in the advertiser and company database 211 is retrieved based on the above judged customer's taste, and the advertiser/company registration information on the advertiser/company that can provide distribution data matching with the customer's taste is read, the advertiser and/or company introducing data is generated, and this is sent to the portable dedicated terminal 202.

Accordingly, in this data providing system 200, the customer can easily select an advertiser and/or a company that can provide distribution data matching with the customer's taste while time and cost is remarkably reduced.

In this data providing system 200, as a result that the advertiser and/or company was introduced to the customer, if the customer selects desired advertiser and/or company, the intermediate server 201 generates the customer introducing data based on the customer registration information being the customer's personal information, provides this only to the advertiser/company server 203 of the advertiser/company selected by the customer, to make the advertiser/company decide whether or not to contract with the customer. Therefore, it can be surely prevented that the customer's personal information is illegally released on the Internet.

In this data providing system 200, the customer is introduced to the advertiser and/or company as the above, and also the advertiser/company can easily and properly select the customer who requested to obtain distribution data from the advertiser/company, so that distribution data can be efficiently and properly provided to the customer.

In this data providing system 200, the customer uses the portable dedicated terminal 202 dedicated to the agency, and the customer obtains distribution data from the advertiser and/or company by the above portable dedicated terminal 202. Thereby, the versatility of the portable dedicated terminal 202 can be expanded, and the usability can be remarkably improved.

In this data providing system 200, if the portable dedicated terminal 202 obtains distribution data from the server, it records the distribution data in the recording medium for customer 246 different from the recording medium for agency 247 by discriminating this from the content data recorded in the recording medium for agency 247. Thereby, when the content data rented from the agency is erased, it can be surely prevented that the distribution data is erroneously erased.

According to the above configuration, the intermediate server 201 has the customer database 210 for storing the customer information obtained from the portable dedicated terminal 202 by the customer to register the customer, and the advertiser and company database 211 for storing the advertiser/company information obtained from the advertiser/company server 203 by the advertiser/company as the advertiser/company registration information to register the advertiser/company. Every time when the content specifying data including the customer ID that was issued in the customer registration is sent from the portable dedicated terminal 202 to the agency, the intermediate server 201 adds the contents of the above content specifying data to the customer registration information in the customer database 210, and updates the customer registration information. If the intermediate server 201 receives the customer approval data from the above portable dedicated terminal 202, the intermediate server 201 retrieves the advertiser/company registration information in the advertiser and company database 211 based on the customer's taste that was judged by the customer registration information in the customer database 210, generates the advertiser and/or company introducing data based on the advertiser/company registration information on the selected advertiser and/or company, and sends this to the portable dedicated terminal 202. Thereby, the customer can easily select an advertiser and/or a company that can provide distribution data matching with the customer's taste. Thus, a data providing system in that the customer can easily and accurately obtain desired distribution data can be realized.

Note that, in the aforementioned fourth embodiment, it has dealt with the case where if the intermediate server 201 receives the customer approval data from the portable dedicated terminal 202, the intermediate server 201 judges the customer's taste by the customer registration information in the customer database 210, and retrieves the advertiser and/or the company in the advertiser and company database 211. However, this invention is not only limited to this but also the intermediate server 201 may constantly judge the customer's taste by the customer registration information in the customer database 210, when the intermediate server 201 judges the customer's taste (that is, when the number of the times of obtaining of the content data by the customer is the threshold value or over), it may inquire the customer of whether or not having an intension of releasing the customer information by the portable dedicated terminal 202, and if as a result, the customer approval data that permits the release of the customer information is sent from the customer via the portable dedicated terminal 202, the intermediate server 201 may retrieve the advertiser/company registration information in the advertiser and company database 211. Thereby, it can be surely prevented that although the customer permitted the release of the customer information on term that the customer will contract with an advertiser and/or a customer, the intermediate server 201 cannot judge the customer's taste and cannot introduce an advertiser and/or a company to the customer.

In the aforementioned fourth embodiment, it has dealt with the case where if the intermediate server 201 receives the customer approval data, the intermediate server 201 retrieves the advertiser/company registration information in the advertiser and company database 211 based on the customer's taste judged by the customer registration information in the customer database 210. However, this invention is not only limited to this but also in addition to the customer's taste judged by the customer registration information in the customer database 210, the advertiser/company registration information in the advertiser and company database 211 may be retrieved also by using the contract terms described in the above customer registration information. Thereby, when the customer introducing data is sent to the advertiser/company server 203, it can be remarkably reduced that the advertiser and/or company abandons the contract with the customer owing to the contract term. Thus, a probability that the contract is concluded between the customer and the advertiser and/or company can be improved, and the request of the customer that wants to contract with the advertiser and/or company can be further accurately taken up.

In the aforementioned fourth embodiment, it has dealt with the case where if the intermediate server 201 receives the customer approval data, the intermediate server 201 retrieves the advertiser/company registration information in the advertiser and company database 211 based on the customer's taste that was judged by the customer registration information in the customer database 210. However, this invention is not only limited to this but also the advertiser/company registration information in the advertiser and company database 211 may be retrieved based on the taste information in the customer information being a basis for the customer registration information stored in the customer database 210. Thereby, in the matching part 216, the processing for extracting the customer's taste from the customer registration information can be excepted, and load on the processing can be reduced.

Furthermore, in the aforementioned fourth embodiment, it has dealt with the case where the customer uses the intermediate server 201 by means of the portable dedicated terminal 202. However, this invention is not only limited to this but also provided that it is an apparatus connectable to the Internet 204 such as a personal computer, a portable telephone and a personal digital assistance (PDA), the customer can use the intermediate server 201 by means of such various data obtaining apparatuses. Thereby, further more customers can use introduction by the intermediate server 201 to an advertiser and/or company, and the system can be widely popularized.

(6) Fifth Embodiment

Figure 25:
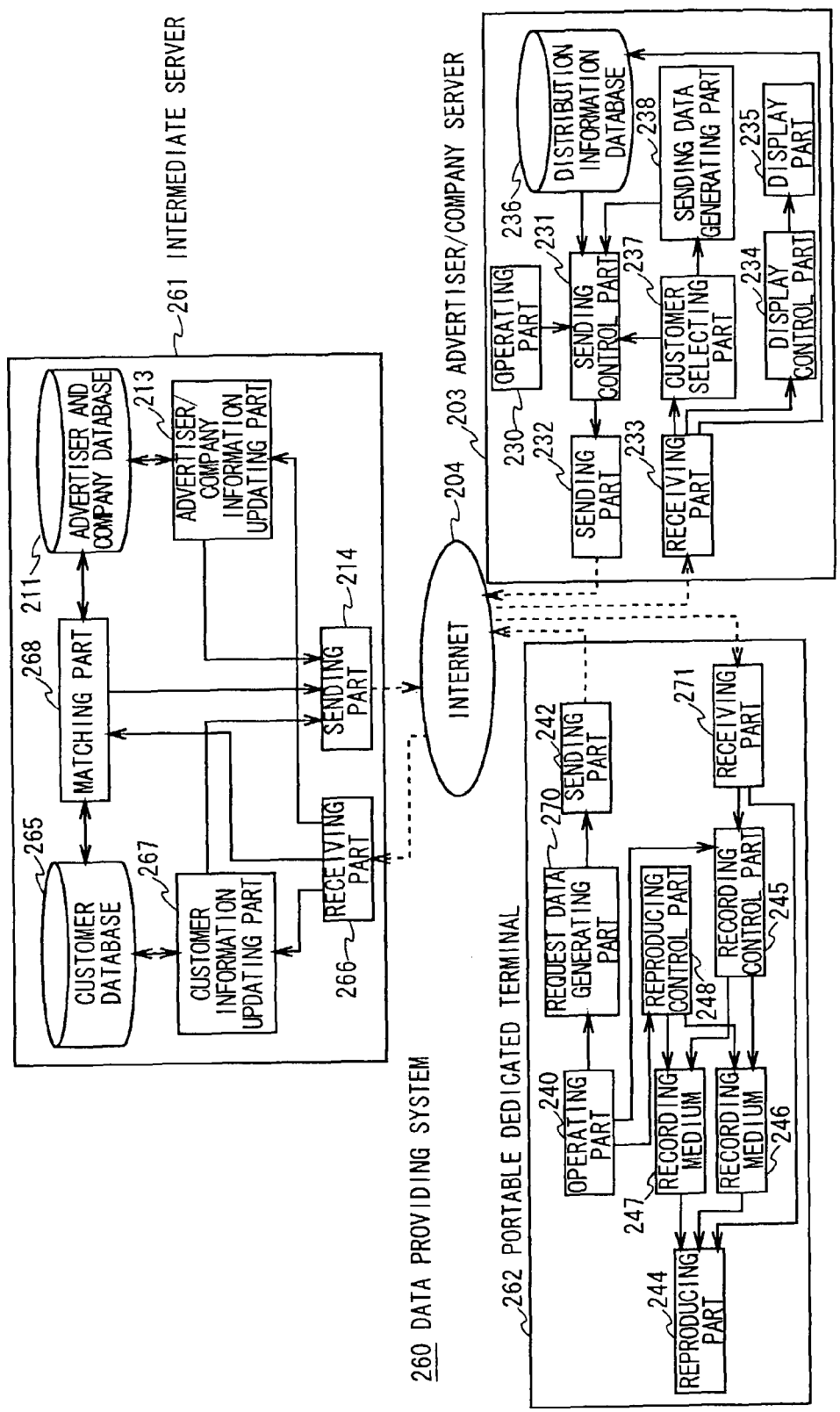
FIG. 25 is a block diagram showing the configuration of a data providing system according to a fifth embodiment.

FIG. 25 in which the same reference numerals are added to corresponding parts in FIG. 11 shows a data providing system 260 according to a fifth embodiment. The data providing system 260 is formed similarly to the aforementioned data providing system 200 according to the fourth embodiment except for the configuration of an intermediate server 261 corresponding to the system management site 2 described above with reference to FIGS. 1 to 3, and the configuration of a portable dedicated terminal 262 corresponding to the portable dedicated terminals 7A to 7N described above with reference to FIGS. 1 to 3.

In this case, the intermediate server 261 registers the customer who uses the Internet 204 by means of the portable dedicated terminal 262 by storing the customer registration information in a customer database 265 similarly to the intermediate server 201 described above with reference to FIG. 11, and also registers an advertiser/company that can provide distribution data to the customer on the Internet 204 by means of the advertiser/company server 203 by storing the advertiser/company registration information in the advertiser and company database 211.

Furthermore, the intermediate server 261 updates the customer registration information in the customer database 265 every time when the customer uses the Internet 204 to obtain content data by the portable dedicated terminal 262, similarly to the intermediate server 201 described above with reference to FIG. 11.

In addition to the customer registration information and the customer registering screen data, the intermediate server 261 previously stores customer information input screen data to input customer information in the customer database 265. If the intermediate server 261 receives the customer approval data that was sent from the portable dedicated terminal 262 by customer's operation by a receiving part 266, the intermediate server 261 reads the customer information input screen data from the customer database 265 by a customer information updating part 267, and sends this from the sending part 214 to the portable dedicated terminal 262 via the Internet 204.

If the customer information like the customer information described above with reference to FIG. 13A, that is entered on the customer information input screen based on the customer information input screen data according to customer's operation is sent from the portable dedicated terminal 262 as customer information data, the intermediate server 261 receives this by a receiving part 266 and takes this in a matching part 268.

Figure 26:
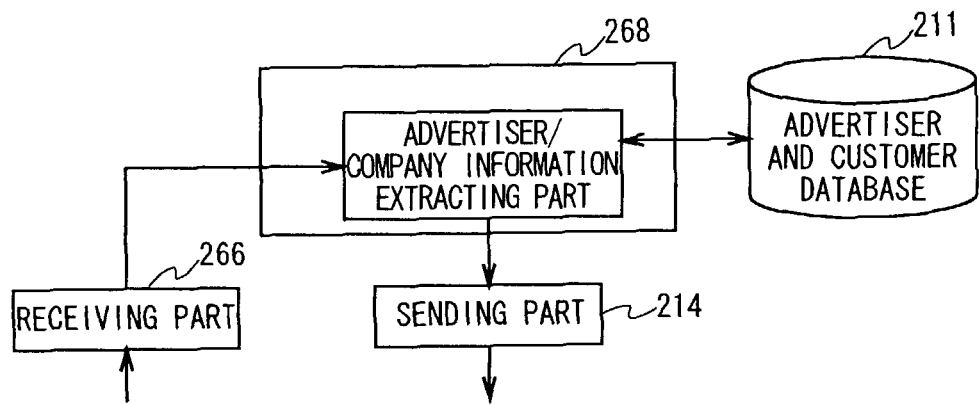
FIG. 26 is a block diagram showing the configuration of a matching part.

Here, as shown in FIG. 26, the matching part 268 is formed by an advertiser/company information extracting part. The matching part 268 extracts customer's taste genre information in the customer information data that was taken in from the receiving part 266 as information representing the customer's taste, retrieves the advertiser/company registration information in the advertiser and company database 211 based on thus extracted customer's taste genre information, and reads the advertiser/company registration information having distribution genre information in the same genre as the genre shown in the customer's taste genre information.

Then, the matching part 268 generates the advertiser and company introducing information described above with reference to FIG. 17 from the advertiser/company registration information read from the advertiser and company database 211, and sends this from the sending part 214 to the portable dedicated terminal 262 via the Internet 204 as advertiser/company introducing data.

In this manner, the intermediate server 261 introduces an advertiser and/or company that can provide distribution data matching with customer's taste to the customer who permitted the release of the customer information to the advertiser and/or the company.

On the other hand, as shown in FIG. 25, the portable dedicated terminal 262 executes a customer registration for the intermediate server 261 similarly to the portable dedicated terminal 202 described above with reference to FIG. 11, and also sends various requests to the agency to obtain content data.

If an approval request for the release of the customer information to the advertiser/company is entered via the operating part 240 by customer's operation, the portable dedicated terminal 262 generates customer approval data by a request data generating part 270, and sends this from the sending part 242 to the intermediate server 261 via the Internet 204.

As a result, if the customer information input screen data is sent from the intermediate server 261 via the Internet 204, the portable dedicated terminal 262 receives this by a receiving part 271, and transmits this to the reproducing part 244. Thus, a customer information input screen based on the customer information input screen data is displayed.

If customer information is entered on the customer information input screen according to the operation of the operating part 240 by the customer, the portable dedicated terminal 262 generates customer information data representing the customer information by the request data generating part 270, and sends this from the sending part 242 to the intermediate server 261 via the Internet 204.

In this manner, the portable dedicated terminal 262 can receive the introduction of an advertiser/company that can provide distribution data matching with the customer's taste based on the advertiser/company introducing data provided from the intermediate server 261.

In this data providing system 260, after the intermediate server 261 introduces the advertiser/company, the above intermediate server 261 executes a contract processing procedure similar to the contract processing procedure in the data providing system 200 (FIG. 11) described above with reference to FIGS. 24A to 24C, between the portable dedicated terminal 262 and the advertiser/company server 203. Thereby, the customer and the advertiser/company can make a contract.

Figure 27A:
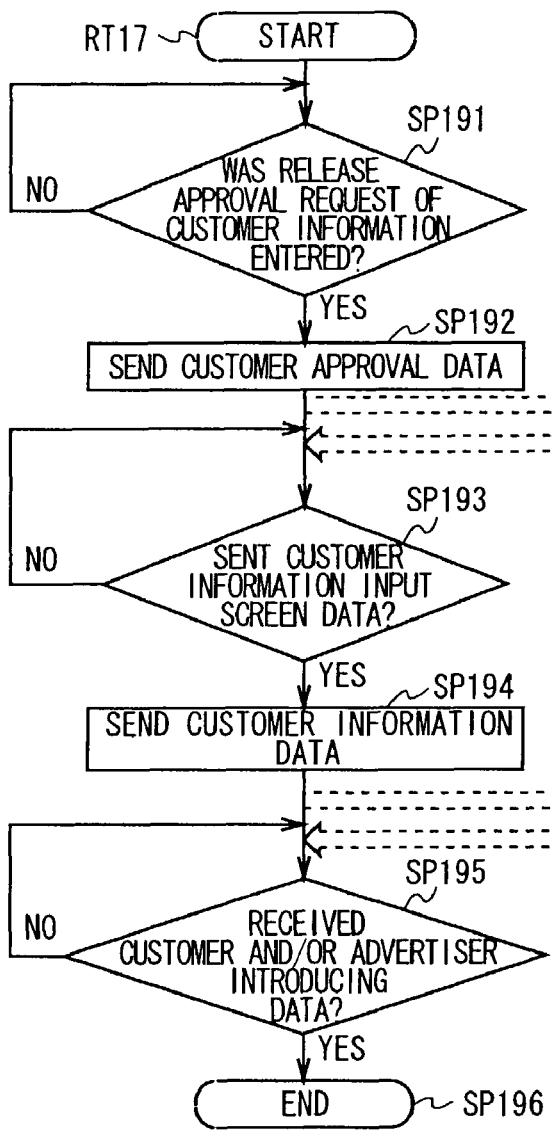
FIGS. 27A and 27B are flowcharts showing an advertiser/company introducing processing procedure in the data providing system.

Here, advertiser/company introducing processing procedures by the intermediate server 261 and the portable dedicated terminal 202 in the data providing system 260 will be collectively described. First, as shown in FIG. 27A, the portable dedicated terminal 262 enters a routine RT17 from the starting step, and proceeds to the next step SP191 to await that the approval request for the release of the customer information is entered. If the approval request is entered via the operating part 240 by customer's operation, the portable dedicated terminal 262 proceeds to step SP192.

In step SP192, the portable dedicated terminal 262 generates customer approval data by the request data generating part 270, and sends this from the sending part 242 to the intermediate server 261, and then proceeds to step SP193.

Figure 27B:
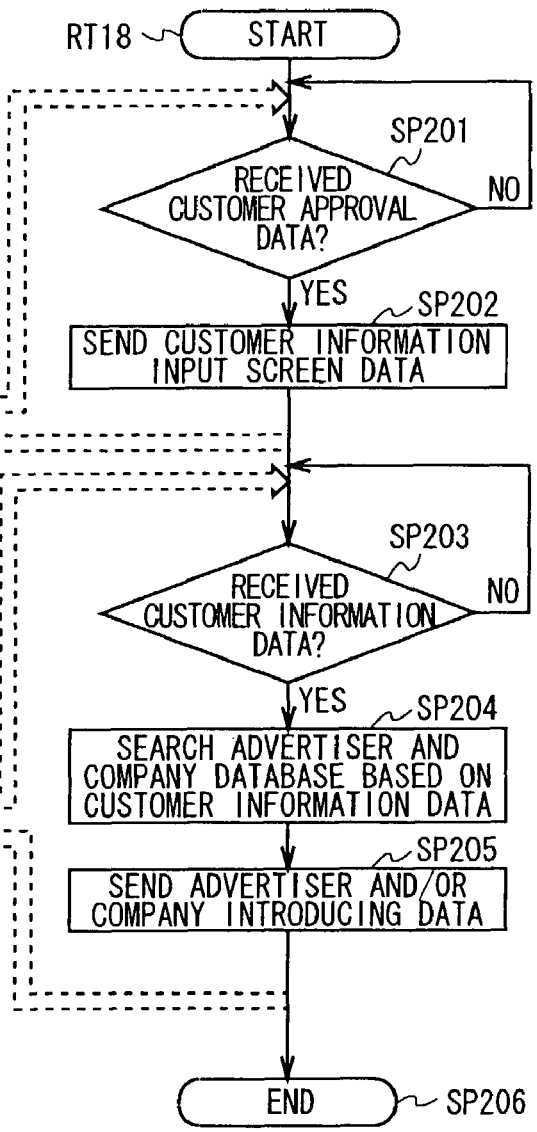

At this time, as shown in FIG. 27B, the intermediate server 261 enters routine RT18 from the start step, and proceeds to the next step SP201 to await that the customer approval data is sent from the portable dedicated terminal 262. If the intermediate server 261 receives the above customer approval data by the receiving part 266, it proceeds to step SP202.

In step SP202, the intermediate server 261 reads customer information input screen data from the customer database 265 based on the received customer approval data by the customer information updating part 267, and sends this from the sending part 214 to the portable dedicated terminal 262, and then proceeds to step SP203.

At this time, in step SP193, the portable dedicated terminal 262 awaits that the customer information input screen data is sent from the intermediate server 261. If the portable dedicated terminal 262 receives the above customer information input screen data by the receiving part 271, it proceeds to step SP194.

In step SP194, in the state where the customer information input screen is displayed by that the customer information input screen data is transmitted to the reproducing part 244, if the customer enters customer information via the operating part 240, the portable dedicated terminal 262 generates customer information data by the request data generating part 270, and sends this from the sending part 242 to the intermediate server 261, and then it proceeds to step SP195.

At this time, in step SP203, the intermediate server 261 awaits that the customer information data is sent from the portable dedicated terminal 262. If the intermediate server 261 receives the above customer information data by the receiving part 266, it proceeds to step SP204.

In step SP204, the intermediate server 261 retrieves advertiser/company registration information in the advertiser and company database 211 based on customer's taste genre information in the customer information data, and reads advertiser/company registration information including distribution genre information having the same contents as the above customer's taste genre information, and then it proceeds to step SP205.

In step SP205, the intermediate server 261 generates advertiser and/or company introducing data based on the advertiser/company registration information read from the advertiser and company database 211, and sends this from the sending part 214 to the portable dedicated terminal 262 to introduce the advertiser and/or the company to the customer. Then, the intermediate server 261 proceeds to step SP206 to finish the processing in the intermediate server 261.

At this time, in step SP195, the portable dedicated terminal 262 awaits that the advertiser and/or company introducing data is sent from the intermediate server 261. If the portable dedicated terminal 262 receives the above advertiser and/or company introducing data by the receiving part 271, it transmits this to the reproducing part 244 to show the advertiser and/or company introduced from the intermediate server 261 to the customer. Then, the portable dedicated terminal 262 proceeds to step SP196 to finish the processing in the portable dedicated terminal 262. Thereby, all the advertiser and/or company introducing processing procedure in the data providing system 260 is finished.

According to the above configuration, in this data providing system 260, if the release of the customer information to the advertiser and/or company is permitted by the customer, the intermediate server 261 sends the customer information input screen data to the portable dedicated terminal 262 responding to the customer approval data sent from the portable dedicated terminal 262.

As a result, in the data providing system 260, the intermediate server 261 retrieves the advertiser/company registration information in the advertiser and company database 211 based on the customer's taste genre information in the customer information data returned from the portable dedicated terminal 262, reads the advertiser/company registration information including the distribution genre information having the same contents as the customer's taste genre information, generates the advertiser and/or company introducing data based on the above read advertiser/company registration information, and sends this to the portable dedicated terminal 262. Thereby, the intermediate server 261 can introduce the advertiser and/or company that can provide distribution data matching with the customer's taste to the customer.

Accordingly, in this data providing system 260, if the release of the customer information to the advertiser and/or company is permitted by the customer, the intermediate server 261 obtains the customer information, and retrieves the advertiser/company registration information based on the above obtained customer information. Therefore, if the customer requests the providing of distribution data from an advertiser and/or a company, the intermediate server 261 can introduce the advertiser and/or company can while accurately reflecting the customer's interest.

That is, in this data providing system 260, even if the customer's interest has changed in the time from the customer registration in the intermediate server 261 till the approval of the release of the customer information to the advertiser and/or company, or even at the time when the customer does not use the Internet 204 frequently because the customer just began to use the portable dedicated terminal 262, the intermediate server 261 can accurately grasp the customer's interest, and can introduce the advertiser and/or the company that can provide distribution data desired by the customer to the customer.

According to the above configuration, the intermediate server 261 sends the customer information input screen data to the portable dedicated terminal 262 responding to the customer approval data sent from the portable dedicated terminal 262, retrieves the advertiser/company registration information in the advertiser and company database 211 based on the customer's taste genre information in the customer information data returned from the portable dedicated terminal 262 as the result of the sending, reads the advertiser/company registration information including the distribution genre information having the same contents as the above customer's taste genre information, generates the advertiser and/or company introducing data based on that advertiser/company registration information, and sends this to the portable dedicated terminal 262. Thereby, in addition to the effects obtained by the aforementioned fourth embodiment, the intermediate server 261 can introduce the advertisers and/or the company to the customer while accurately reflecting the customer's interest at the time point that the customer requested the providing of distribution data from an advertiser and/or a company. Thus, a data providing system in which the customer can further accurately obtain desired distribution data can be accomplished.

Note that, in the aforementioned fifth embodiment, it has dealt with the case where the intermediate server 261 retrieves the advertiser/company registration information in the advertiser and company database 211 based on the customer's taste genre information in the customer information data. However, this invention is not only limited to this but also, instead of the customer's taste genre information in the customer information data, it may retrieve the advertiser/company registration information in the advertiser and company database 211 by matching a comment or a word in the comment that represents the customer's taste in the above customer information data with a comment or a word in the comment such as the catchphrase of an advertiser/company in the advertiser/company registration information, or may retrieve the advertiser/company registration information in the advertiser and company database 211 by using all of to the customer's taste genre information and the comment, and the mutual contract terms, or by using them by coupling. Thereby, the intermediate server 261 can introduce an advertiser and/or a company by further accurately reflecting the customer's taste.

In the aforementioned fifth embodiment, it has dealt with the case where the intermediate server 261 retrieves the advertiser/company registration information in the advertiser and company database 211 based on the customer approval data obtained when the customer permitted the release of registration information. However, this invention is not only limited to this but also the customer may arbitrary select the method that the intermediate server 261 retrieves the advertiser/company registration information in the advertiser and company database 211 based on the customer approval data obtained when the customer permitted the release of the registration information, or the method that the intermediate server 261 retrieves the advertiser/company registration information in the advertiser and company database 211 based on the customer registration information according to the aforementioned fourth embodiment, and the intermediate server 261 may execute it. Thereby, a data providing system can be used by both of a customer whose interest does not almost always change and a customer whose interest comparatively frequently change, and the usability of the data providing system can be improved.

Furthermore, in the aforementioned fifth embodiment, it has dealt with the case where the customer uses the intermediate server 261 by means of the portable dedicated terminal 262. However, this invention is not only limited to this but also, provided that it is a device by which the customer can connect to the Internet 204 such as a personal computer, a portable telephone, a PDA, the intermediate server 261 can be used by means of various data obtaining devices other than that. Thereby, further more customers can use the introduction of an advertiser and/or a company by the intermediate server 261, and the system can be widely popularized.

(7) Sixth Embodiment

Figure 28:
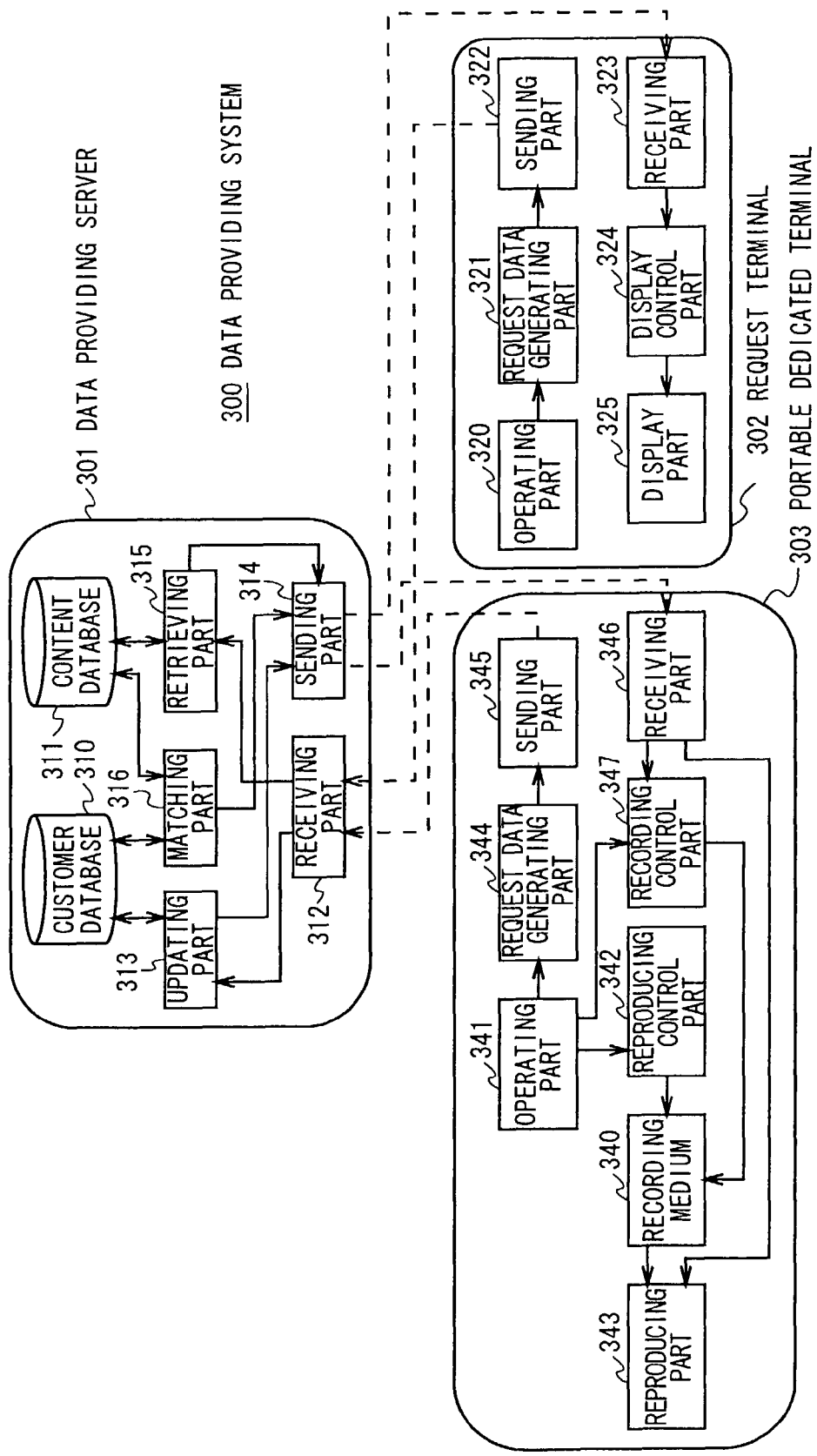
FIG. 28 is a block diagram showing the configuration of a data providing system according to a sixth embodiment.

FIG. 28 shows a data providing system 300 according to a sixth embodiment. A request terminal 302 corresponding to the customer 3 described above with reference to FIGS. 1 to 3 (that is, the request terminal used by the customer 3), and a portable dedicated terminal 303 corresponding to the portable dedicated terminals 7A to 7N described above with reference to FIGS. 1 to 3 dedicated to the agencies 4A to 4N, and only accessible the data providing server 301 are connected to a data providing server 301 corresponding to the agencies 4A to 4N described above with reference to FIGS. 1 to 3 on the Internet (not shown), respectively.

The data providing server 301 has a customer database 310 for storing customer registration information and customer registering screen data, and a content database 311 for storing many content data, content selecting screen data, and customizing registering screen data to customize the content selecting screen data according to the customer's request.

If registration request data to request the registration of the customer is sent from the request terminal 302, the data providing server 301 receives this by a receiving part 312 and takes this in an updating part 313. The data providing server 301 reads the customer registering screen data from the customer database 310 based on the registration request data by the updating part 313, and sends this from a sending part 314 to the request terminal 302.

As a result, if customer information that was entered on a customer registering screen based on the customer registering screen data is sent from the request terminal 302, the data providing server 301 receives this by the receiving part 312 and taking this in the updating part 313. The data providing server 301 issues a customer ID to the customer who requested the registration, and adds this to the customer information, by the above updating part 313. The data providing server 301 stores the customer information with the added customer ID in the customer database 310 as customer registration information to register the customer.

In this connection, if the data providing server 301 registers the customer by the updating part 313, the data providing server 301 generates registration completion data including the customer ID, and sends this from the sending part 314 to the request terminal 302, and notifies the customer of the completion of the registration and the customer ID.

If the data providing server 301 obtains request data for requesting the obtaining of content data is sent from the request terminal 302, receives this by the receiving part 312, takes this in a retrieving part 315, reads content selecting screen data from the content database 311 based on the obtaining request data by the above retrieving part 315, and sends this from the sending part 314 to the request terminal 302.

As a result, if reservation information is entered on the content selecting screen based on the content selecting screen data and reservation data representing the above reservation information is sent from the request terminal 302, the data providing server 301 receives this by the receiving part 312.

The data providing server 301 reads the specified content data from the content database 311 based on the reservation data by the retrieving part 315, and sends this from a dedicated terminal not shown to a portable dedicated terminal 303 that is not still delivered to the customer (not shown) and is directly connected to the data providing server 301 by a cable or the like for recording.

In this manner, the data providing server 301 previously prepares the portable dedicated terminal 303 by accepting an advance reservation for the purchase/rental of content data and the portable dedicated terminal 303 from the customer with the request terminal 302, and recording the above content data that will be purchased/rented within the portable dedicated terminal 303 that will be similarly purchased/rented. Then, if the customer comes to an agency installing the above data providing server 301, the agency sells/rents and hands the portable dedicated terminal 303 to the customer.

The data providing server 301 can be connected to the portable dedicated terminal 303 that was purchased/rented to the customer on the Internet. If the data providing server 301 obtains request data for requesting the obtaining of content data (by purchase or rental) is sent from the portable dedicated terminal 303, receives this by the receiving part 312, and takes this in the retrieving part 315.

At this time, the data providing server 301 reads content selecting screen data from the content database 311 based on thus obtained request data by the retrieving part 315, and sends this from the sending part 314 to the customer's portable dedicated terminal 303.

As a result, if content data specifying information for specifying the content data is entered on a content selecting screen based on the content selecting screen data and content specifying data representing the content specifying information is sent from the portable dedicated terminal 303, the data providing server 301 receives this by the receiving part 312 and takes this in the retrieving part 315.

The data providing server 301 reads the specified content data from the content database 311 based on that content specifying data by the retrieving part 315, and sends this from the sending part 314 to the portable dedicated terminal 303 for recording.

In this manner, the data providing server 301 sends the content data to the portable dedicated terminal 303 that was sold/rented to the customer via the Internet. Thereby, the customer can buy/rent the content data by means of that portable dedicated terminal 303.

Furthermore, if customizing request data for customizing the portable dedicated terminal 303 is sent, the data providing server 301 receives this by the receiving part 312, takes this in the retrieving part 315, reads customizing registering screen data that has been previously stored in the content database 311 based on that customizing request data by the above retrieving part 315, and sends this from the sending part 314 to the portable dedicated terminal 303.

As a result, if screen customizing information for the content selecting screen that was entered on the customizing registering screen based on the customizing registering screen data is sent from the portable dedicated terminal 303 by the customer's operation as screen customizing data, the data providing server 301 receives this by the receiving part 312, and takes this in the updating part 313 and the retrieving part 315.

The data providing server 301 reads the content selecting screen data from the content database 311 by the retrieving part 315, performs processing on the contents selecting screen based on the screen customizing data, and sends thus obtained customized screen data from the sending part 314 to the portable dedicated terminal 303.

In this manner, the data providing server 301 shows the customer the customized screen based on the customized screen data on the portable dedicated terminal 303 to make the customer confirm whether or not the content selecting screen has been customized as wanted. If confirmation data representing the confirmation of that the above content selecting screen is customized as the customer wanted is sent, the data providing server 301 adds the screen customizing data to the customer registration information in the customer database 310 and updates the customer registration information by the updating part 313.

Thereafter, if obtaining request data is sent from the customer who requested the customizing of the content selecting screen by the portable dedicated terminal 303, the data providing server 301 receives this by the receiving part 312, takes this in the updating part 313, reads the screen customizing information added to the customer registration information from the customer database 310 by the above updating part 313, and transmits this to a matching part 316.

The data providing server 301 reads the content selecting screen data from the content database 311 by the matching part 316, performs processing on the content selecting screen based on the screen customizing information, and sends thus obtained customized screen data from the sending part 314 to the portable dedicated terminal 303.

Thereby, every time when obtaining request data is sent from the customer who requested the customizing of the content selecting screen by the portable dedicated terminal 303, the data providing server 301 makes the customer specify the purchase/rental of content data on the customized screen based on the customized screen data according to the customizing request by the customer.

In this connection, in the portable dedicated terminal 303 rented by the customer, also information for customizing the color of the case body of the portable dedicated terminal 303 can be selected on the customizing registering screen. If case body customizing information for specifying the color of the case body is sent from the portable dedicated terminal 303 as case body customizing data, the data providing server 301 receives this by the receiving part 312, takes this in the updating part 313, adds the case body customizing information to the customer registration information in the customer database 310, and updates the customer registration information by the above updating part 313.

Thereby, when the customer rents a portable dedicated terminal 303 again, or when the above customer purchases a portable dedicated terminal 303 after that, the portable dedicated terminal 303 in a color specified by the case body customizing information is delivered to the customer.

On the other hand, if the customer enters customer registration information by an operating part 320, the request terminal 302 generates registration request data representing a registration request by a request data generating part 321, and sends this from a sending part 322 to the data providing server 301.

As a result, if the request terminal 302 receives customer registering screen data from the data providing server 301 by a receiving part 323, the request terminal 302 transmits this from a display control part 324 to a display part 325 to display a customer registering screen based on the customer registering screen data thereon.

If customer information is entered on the customer registering screen by the customer's operation of the operating part 320, the request terminal 302 generates customer information data by the request data generating part 321, and sends this from the sending part 322 to the data providing server 301 for the customer registration.

If the customer enters a content data obtaining request by the operating part 320, the request terminal 302 generates obtaining request data representing that obtaining request by the request data generating part 321, and sends this from the sending part 322 to the data providing server 301.

As a result, if the request terminal 302 receives content selecting screen data from the data providing server 301 by the receiving part 323, it transmits this from the display control part 324 to the display part 325 to display a content selecting screen based on the content selecting screen data thereon.

If reservation information is entered on the content selecting screen by the customer's operation of the operating part 320, the request terminal 302 generates reservation data by the request data generating part 321, and sends this from the sending part 322 to the data providing server 301. And the reservation of the purchase/rental of the content data and the portable dedicated terminal 303 by the customer is finished.

With respect to the portable dedicated terminal 303 sold/rented to the customer in the state where the content data has been recorded in the internal recording medium 340, if a reproducing command is entered by an operating part 341, the portable dedicated terminal 303 reproduces the content data that the customer previously purchased/rented from the recording medium 340 by a reproducing control part 342, and transmits this to a reproducing part 343 composed of a display control part, a display part, a speaker, etc. Thus, the customer can enjoy the content.

If the customer enters a content data obtaining request by the operating part 341, the portable dedicated terminal 303 generates obtaining request data representing that obtaining request by a request data generating part 344, and sends this from a sending part 345 to the data providing server 301.

As a result, if the portable dedicated terminal 303 receives content selecting screen data from the data providing server 301 by a receiving part 346, the portable dedicated terminal 303 transmits this to the reproducing part 343 to display a content selecting screen based on the content selecting screen data.

If information for specifying content data is entered on the content selecting screen by the customer's operation of the operating part 341, the portable dedicated terminal 303 generates content specifying data representing that specifying information by the request data generating part 344, and sends this from the sending part 345 to the data providing server 301.

If the portable dedicated terminal 303 receives the content data from the data providing server 301 by the receiving part 346, the portable dedicated terminal 303 records this in the recording medium 340 by a recording control part 347. Thereby, after that, the content data will be reproduced from the recording medium 340 by the reproducing control part 342 according to the customer's operation of the operating part 341.

Furthermore, if the customer enters a customizing request by the operating part 341, the portable dedicated terminal 303 generates customizing request data representing the customizing request by the request data generating part 344, and sends this from the sending part 345 to the data providing server 301.

As a result, if the portable dedicated terminal 303 receives customizing registering screen data from the data providing server 301 by the receiving part 346, the portable dedicated terminal 303 transmits this to the reproducing part 343 to display a customizing registering screen based on that customizing registering screen data.

If screen customizing information is entered on the customizing registering screen by the customer's operation of the operating part 341, the portable dedicated terminal 303 generates screen customizing data representing the screen customizing information by the request data generating part 344, and sends this from the sending part 345 to the data providing server 301.

As a result of that the screen customizing data was sent to the data providing server 301, if the portable dedicated terminal 303 receives customized screen data from the data providing server 301 by the receiving part 346, the portable dedicated terminal 303 sends this to the reproducing part 343. Thereby, a customized screen based on the customized screen data is shown to the customer.

As a result, if the customer enters confirmation information for confirming that the content selecting screen is customized as he/she requested by the operating part 341, the portable dedicated terminal 303 generates confirmation data by the request data generating part 344, and sends this from the sending part 345 to the data providing server 301 to store the screen customizing information representing the contents of customizing that the customer requested in the data providing server 301.

After the screen customizing data was stored in the data providing server 301, the portable dedicated terminal 303 sends content obtaining request data to the data providing server 301. The portable dedicated terminal 303 receives the customized screen data from the data providing server 301 by the receiving part 346, and transmits this to the reproducing part 343. Thereby, the customer can select content data for purchase and rental on the customized content selecting screen.

In this connection, if case body customizing information to customize the color of the case body of the portable dedicated terminal 303 is entered on the customizing registering screen by the customer's operation of the operating part 341, the portable dedicated terminal 303 generates case body customizing data representing the case body customizing information by the request data generating part 344, and sends this from the sending part 345 to the data providing server 301. Thus, the case body customizing information on the portable dedicated terminal 303 is stored in the data providing server 301.

In addition to the above configuration, in this sixth embodiment, when in forming the content database 311 by obtaining many content data from a content server (not shown) being the provider of the content data and corresponding to the system management site described above with reference to FIGS. 1 to 3, the data providing server 301 obtains a predetermined developmental tool for forming a content selecting screen from the above content server.

The data providing server 301 generates content selecting screen data in that the inside of the shop of the agency is represented as three-dimensional virtual reality space pictures by means of that developmental tool and the customer can select content data as if he/she selects packaged media from shelves while practically walking in the shop of the agency by the above three-dimensional virtual reality space pictures. The above generated content selecting screen data is stored in the content database 311.

In this connection, the data providing server 301 stores the same content data as content data in many packaged media practically sold or rented at the agency in the content database 311, and generates the content selecting screen data so that the layout of the shelves, checkout counters, steps, etc. in the shop of the agency, and the layout of the packaged media in the above shelves or the like is almost faithfully reproduced.

The data providing server 301 updates the content selecting screen data at a constant timing or an arbitrary timing by synchronizing with the time when new packaged media are put on the shelves in the shop of the agency (that is, it is also the time when new content data is obtained from a content server) and the time when the inside of the shop of the agency is remodeled. Thereby, this system can provide the feeling when in practically selecting packaged media in the shop of the agency to the customer selecting content data on the content selecting screen.

Figure 29:
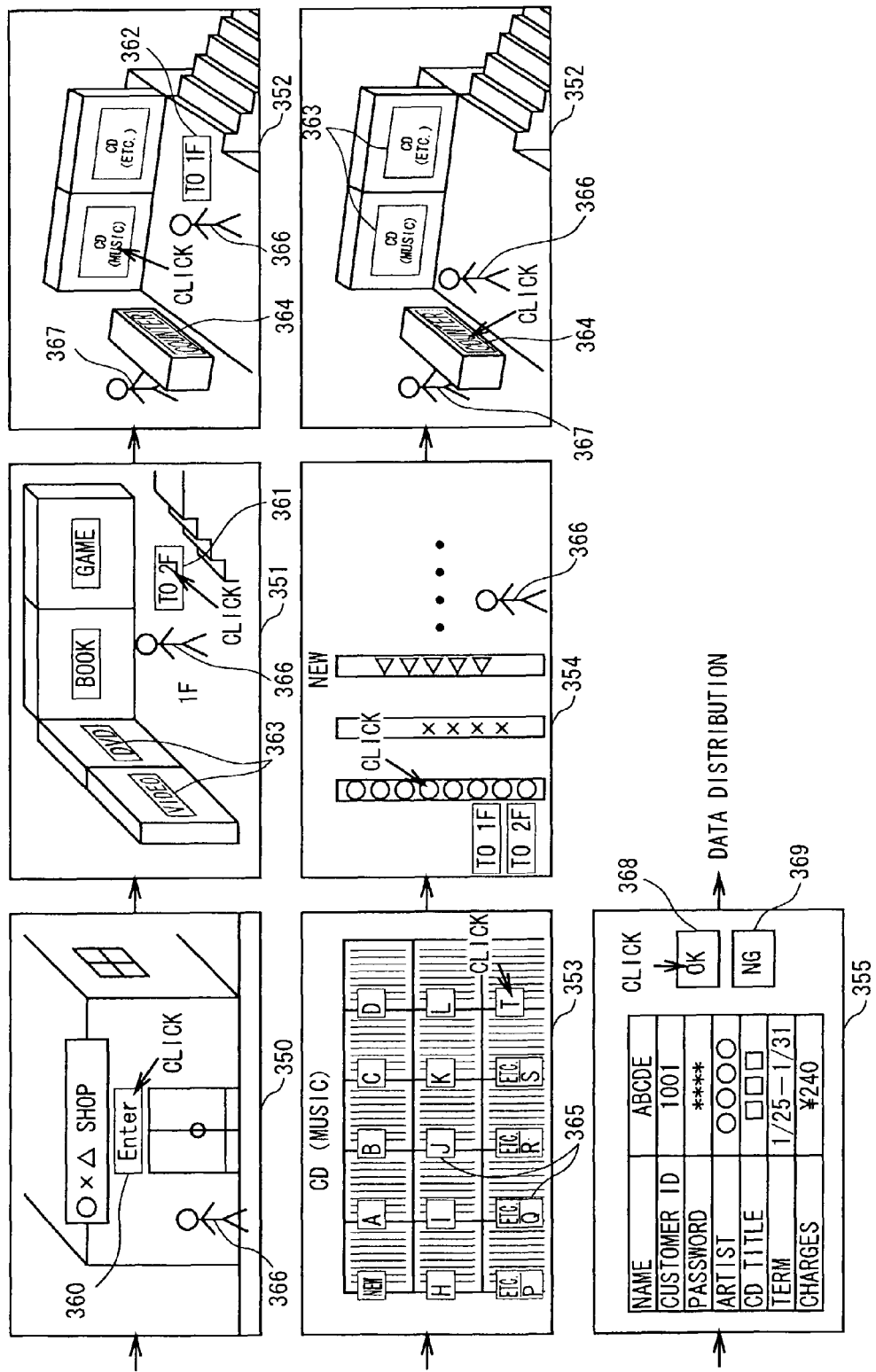
FIG. 29 is a schematic diagram showing the configuration of content selecting screens using three-dimensional virtual reality space pictures representing the inside of an agency.

Practically, as shown in FIG. 29, the content selecting screen data is composed of plural picture data by adding a selection confirming screen 355 being a two-dimensional picture to confirm content data selected by the customer, to the three-dimensional virtual reality space pictures such as a "picture of exterior of shop" 350 that represents the exterior of the agency (entrance), a "picture of first floor in shop" 351 and a "picture of second floor in shop" 352, that represent each floor of the shop, a "picture of shelf in shop" 353 that represents each of plural shelves containing packaged media by genre in the shop with an enlargement, a content selecting screen 354 to select content data by enlarging the backbone of the packaged media aligned on the shelves.

In this case, in the picture of exterior of shop 350, an entering button 360 to enter the shop and switch the display to the picture of first floor 351 is provided.

In the picture of first floor 351 and the picture of second floor 352, move buttons 361 and 362 to switch the display to the picture of second floor in shop 352 or the picture of first floor in shop 351, that is, to another floor, a shelf selecting button 363 to select a shelf by genre and switch the display to the picture of shelf in shop 353, and a checkout counter button 364 to switch the display to a selection confirming screen 355 after the customer selected content data for purchase or rental, are provided.

Furthermore, in the picture of shelf in shop 353, the packaged media have been classified in alphabetical order, and a detail button 365 to switch the display to the content selecting screen 354 by the above classified packaged media is provided.

In the picture of exterior of shop 350, the picture of first floor in shop 351, the picture of second floor in shop 352 and the content selecting screen 354, the picture of a human being representing the customer (hereinafter, this is referred to as picture of customer) 366 and the picture of a human being representing a clerk (hereinafter, this is referred to as picture of clerk) 367 are displayed. By moving the picture of customer 366 as if it is practically walking in the shop and by overlapping it on the entering button 360, the move buttons 361 and 362, the shelf selecting button 363, the checkout counter button 364, the backbone of packaged media in the content selecting screen 354, etc. or approximating it to them and selectively specifying (clicking) these buttons, picture specifying commands previously allocated to the above buttons can be entered.

In addition to this, in the picture of shelf in shop 353 and the selection confirming screen 355, a cursor is inversely displayed on detail buttons 365, a confirmation button 368, a cancel button 369, etc. (not shown) by overlapping, respectively. By that the customer moves the cursor and selectively specifies (clicks) one of these buttons, a command previously allocated to the button can be entered.

Specifically, the portable dedicated terminal 303 which received the content selecting screen data first displays the picture of exterior of shop 350 being a content selecting screen by the reproducing part 343, and moves the picture of customer 366 on the picture of exterior of shop 350 according to the customer's operation of the operating part 341. If the entering button 360 is selectively specified, the portable dedicated terminal 303 displays the picture of first floor in shop 351, instead of the picture of exterior of shop 350.

The portable dedicated terminal 303 moves the picture of customer 366 on the picture of first floor in shop 351 according to the customer's operation of the operating part 341. If the move button 361 is selectively specified, the portable dedicated terminal 303 displays the picture of second floor in shop 352 instead of the above picture of first floor in shop 351.

In this manner, the portable dedicated terminal 303 moves the picture of customer 366 on the picture of first floor in shop 351 and the picture of second floor in shop 352 according to the customer's operation of the operating part 341. If one of the shelf selecting buttons 363 is selectively specified, the portable dedicated terminal 303 displays the picture of shelf in shop 353 corresponding to the above shelf selecting button 363 selectively specified instead of the picture of first floor in shop 351 or the picture of second floor in shop 352.

The portable dedicated terminal 303 moves the cursor on the picture of shelf in shop 353 according to the customer's operation of the operating part 341. If one of the detail buttons 365 is selectively specified, the portable dedicated terminal 303 displays a corresponding content selecting screen 354 instead of the above picture of shelf in shop 353.

After the picture of customer 366 was moved on the content selecting screen 354 and content data was selectively specified as one of packaged media according to the customer's operation of the operating part 341, if the move button 361 or 362 is selectively specified, the portable dedicated terminal 303 displays the picture of first floor in shop 351 or the picture of second floor in shop 352 again instead of the above content selecting screen 354. In this manner, for instance, if the picture of customer 366 is moved on the picture of second floor in shop 352 and the checkout counter button 364 is selectively specified, the portable dedicated terminal 303 displays the selection confirming screen 355 instead of the above picture of second floor in shop 352.

Here, in the selection confirming screen 355, the title of the content data selected by the customer, customer's name, customer ID, password, etc. are displayed. The portable dedicated terminal 303 moves the cursor according to the customer's operation of the operating part 341, so that the rental term or purchase of content data can be entered. If the rental term or purchase is entered, charges for the rental/purchase of the content data are displayed responding to that.

If the portable dedicated terminal 303 moves the cursor on the selection confirming screen 355 and selectively specifies the confirmation button 368 according to the customer's operation of the operating part 341, the portable dedicated terminal 303 generates content specifying data by the request data generating part 344 by using information in the selection confirming screen 355 as specifying information by the request data generating part 344, and sends the above generated content specifying data from the sending part 345 to the data providing server 301. Thereby, the customer can obtain the content data that he/she specified.

On the contrary, if the portable dedicated terminal 303 moves the cursor on the selection confirming screen 355 and selectively specifies the cancel button 369 according to the customer's operation of the operating part 341, the portable dedicated terminal 303 displays for example the picture of first floor in shop 351, instead of the above selection confirming screen 355. Thereby, the customer can select content data again.

Figure 30A:
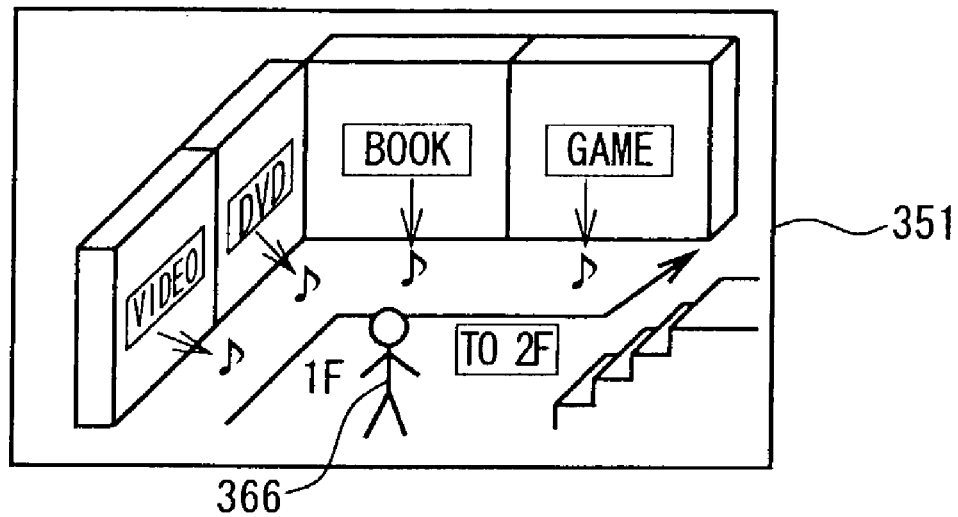
FIGS. 30A and 30B are schematic diagrams for explaining the reproducing of commercial data in a content selecting screen.
Figure 30B:
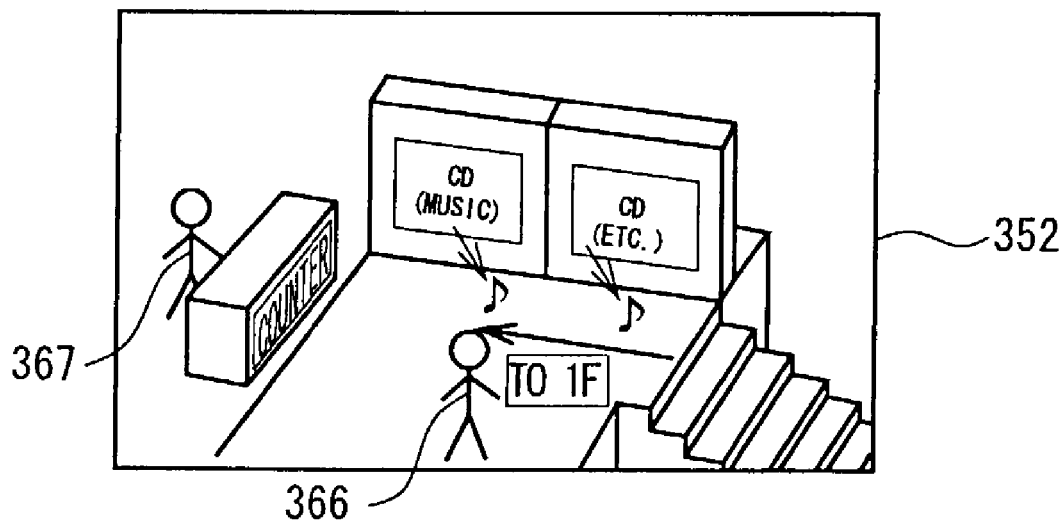

In addition to this, as shown in FIGS. 30A and 30B, if the portable dedicated terminal 303 moves the picture of customer 366 and passes this in front of each shelf on the picture of first floor in shop 351 or the picture of second floor in shop 352 according to the customer's operation of the operating part 341, the portable dedicated terminal 303 reproduces content data set by the agency of which the advertisement for few seconds by matching with the genre of each shelf. Thereby, the customer views the content data intended by the agency, and it can be advertised to the customer.

In this connection, the data quantity of such content selecting screen data is comparatively large. Therefore, if the data providing server 301 receives the obtaining request data from the portable dedicated terminal 303, the data providing server 301 first sends the data of the picture of exterior of shop 350 to the portable dedicated terminal 303 as content selecting screen data. Then, if the entering button 360 is selectively specified on the above picture of exterior of shop 350, the data providing server 301 receives a notification of that, and sends the data of the picture of first floor in shop 351. In this manner, the data providing server 301 receives the notification of the specified button and sends corresponding picture data, every time when the switching of the display to another picture is specified from the portable dedicated terminal 303 by the entering button 360, the move button 361 or 362, etc. on each picture forming the content selecting screen data.

Furthermore, if the picture of customer 366 is moved to a specified coordinate position that has been previously specified to reproduce content data for advertisement on the picture of first floor in shop 351 and the picture of second floor in shop 352 and that specified coordinate position is notified from the portable dedicated terminal 303 to the data providing server 301, the data providing server 301 reads the predetermined part of the content data corresponding to the above notified specified coordinate position that has been previously stored in the content database 311 as commercial data by the retrieving part 315, and sends this from the sending part 314 to the portable dedicated terminal 303.

The data providing server 301 divides the content selecting screen data into the data of each picture and content data for advertisement, and sequentially sends this to the portable dedicated terminal 303. Thereby, it can be prevented that the capacity of the recording medium 340 in the above portable dedicated terminal 303 becomes large.

By the way, in the data providing server 301, on the customizing registering screen to be provided to the portable dedicated terminal 303 according to a customizing request by the customer, various screen customizing information such as change of a picture specifying command previously and addition of a new input part to an arbitrary picture that have been previously allocated to the buttons (the entering button 360 etc.) in each picture forming the content selecting screen described above with reference to FIG. 29, and also the rearrangement of packaged media in the content selecting screen 354 into for example the order of created date of content data, arbitrary change of the background color of the above content selecting screen 354 and selection confirming screen 355 can be entered.

Figure 31:
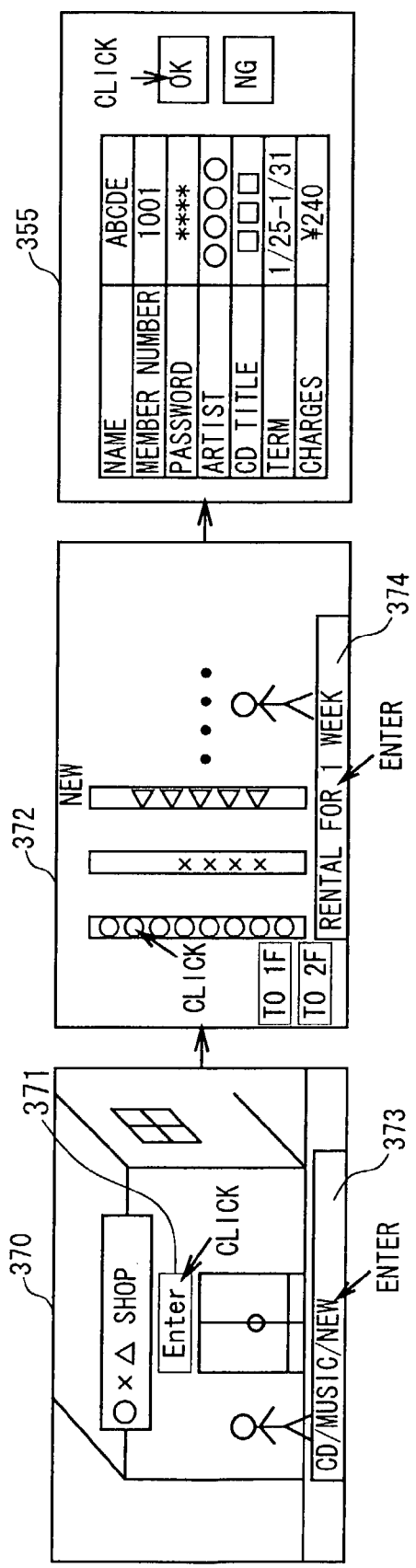
FIG. 31 is a schematic diagram showing the configuration of content selecting screens customized according to a customer's request.

Thereby, for instance, as shown in FIG. 31, the data providing server 301 switches the display of the content selecting screen from the picture of exterior of shop 370 to a content selecting screen 372 based on the screen customizing data obtained from the portable dedicated terminal 303 by that the customer selectively specified an entry-to-shop button 371. Then, the data providing server 301 switches the display from the above content selecting screen 372 to the selection confirming screen 355, or provides a new input part 373 on the picture of exterior of shop 370 to make the customer arbitrary enter the genre of desired content data and switches the display to the content selecting screen 372 corresponding to that input, or newly provides an input part 374 also on the content selecting screen 372 to make the customer enter the rental term or the purchase of content data by specifying. In this manner, the display of the content selecting screen can be customized according to the customer's request.

Accordingly, in the data providing server 301, the usability of the content selecting screen can be remarkably improved for the customer who frequently obtains content data by the portable dedicated terminal 303 and also the customer who obtains content data in the comparatively same genre.

In this connection, also if the data providing server 301 receives the obtaining request data from the request terminal 302, the data providing server 301 sends the content selecting screen data composed of the data of the pictures described above with reference to FIG. 29, to the above request terminal 302.

Here, content providing processing procedures using the content selecting screen data by the data providing server 301 and the portable dedicated terminal 303 in the data providing system 300 will be collectively described. First, as shown in FIG. 32A, the portable dedicated terminal 303 enters routine RT20 from the start step, and proceeds to step SP211.

In step SP211, the portable dedicated terminal 303 awaits that an obtaining request is entered by customer's operation via the operating part 341. If the obtaining request is entered, the portable dedicated terminal 303 proceeds to step SP212.

In step SP212, the portable dedicated terminal 303 generates obtaining request data by the request data generating part 344 and sends this from the sending part 345 to the data providing server 301, and proceeds to step SP213.

Figures 32A, 32B:
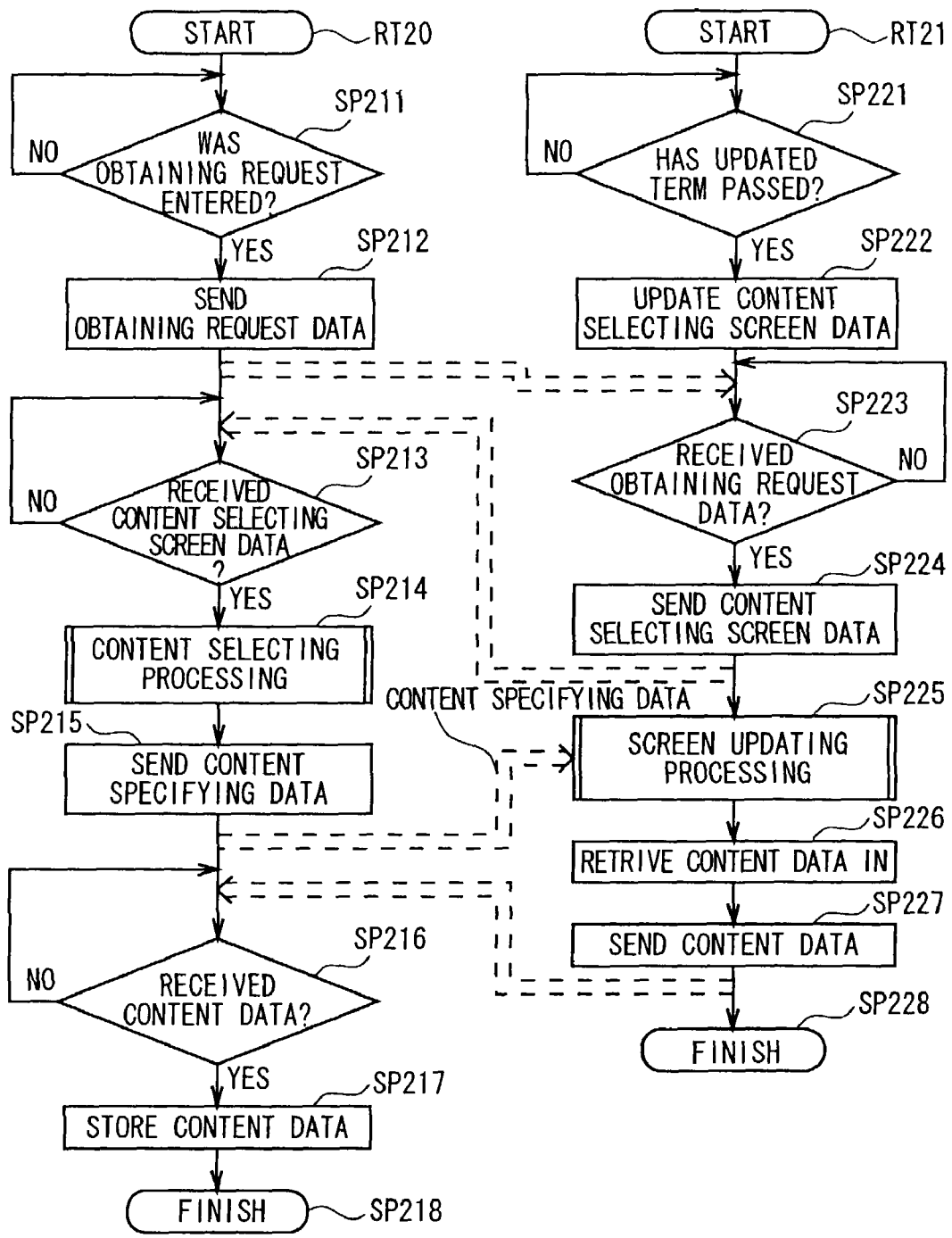
FIGS. 32A and 32B are flowcharts showing a content providing processing procedure using content selecting screen data in the data providing system.

Here, as shown in FIG. 32B, the data providing server 301 enters routine RT21 from the starting step, and proceeds to step SP221. In step SP221, the data providing server 301 awaits the time to update the content selecting screen data. If the time arrived, the data providing server 301 proceeds to step SP222 to update the content selecting screen data, and proceeds to step SP223.

In step SP223, the data providing server 301 awaits that obtaining request data is sent from the portable dedicated terminal 303. If the data providing server 301 receives the obtaining request data by the receiving part 312, the data providing server 301 proceeds to step SP224 to read the content selecting screen data from the content database 311 by the retrieving part 315, and sends this from the sending part 314 to the portable dedicated terminal 303, and then proceeds to step SP225.

At this time, in step SP213, the portable dedicated terminal 303 awaits that content selecting screen data is sent from the data providing server 301. If the portable dedicated terminal 303 receives the content selecting screen data by the receiving part 346, it transmits the content selecting screen data to the reproducing part 343 to display the picture of exterior of shop 350 being the content selecting screen, and then proceeds to step SP214.

In step SP214, the portable dedicated terminal 303 starts a subroutine described later. If specifying information is entered on each picture forming the content selecting screen by the customer's operation of the operating part 341, the portable dedicated terminal 303 proceeds to step SP215.

In step SP215, the portable dedicated terminal 303 generates content specifying data by the request data generating part 344, and sends this from the sending part 345 to the data providing server 301, and then proceeds to step SP216.

At this time, in step SP225, the data providing server 301 starts a subroutine described later. The data providing server 301 properly reads each picture data forming the content selecting screen data and commercial data from the content database 311 by the retrieving part 315, and sends this from the sending part 314 to the portable dedicated terminal 303. Then, if the data providing server 301 receives content specifying data from the portable dedicated terminal 303, it proceeds to step SP226.

In step SP226, the data providing server 301 retrieves content data in the content database 311 based on the content specifying data by the retrieving part 315, and reads the specified content data, and then proceeds to step SP227.

In step SP227, the data providing server 301 sends the content data read from the content database 311 from the sending part 314 to the portable dedicated terminal 303, and then proceeds to step SP228 to finish the above processing by the data providing server 301.

On the other hand, in step SP216, the portable dedicated terminal 303 awaits that the content data is sent from the data providing server 301. If the portable dedicated terminal 303 receives the content data, it proceeds to step SP217 to record the content data in the recording medium 340 by the recording control part 347. Then, the portable dedicated terminal 303 proceeds to step SP218 to finish the above processing by the portable dedicated terminal 303. Thus, the data providing server 301 finishes all the content providing processing procedures by means of the content selecting screen data.

In this connection, as shown in FIG. 33A, the portable dedicated terminal 303 starts a subroutine in step SP214 and enters step SP231. In the above step SP231 and the next step SP232, the portable dedicated terminal 303 awaits that a picture specifying command is entered on each picture: the picture of exterior of shop 350 etc., forming the content selecting screen displayed by the reproducing part 343 described above with reference to FIG. 29 by the customer's operation of the operating part 341 (that is, awaits that the entry-to-shop button 360 or the like is selectively specified), and awaits that the picture of customer 366 is moved to the specified coordinate position on the above picture (the picture of first floor in shop 351 or the like).

In step SP231, if the picture specifying command is entered by moving the picture of customer 366 and selectively specifying the entry-to-shop button 360 or the like on the picture of exterior of shop 350 or the like by the customer's operation of the operating part 341, the portable dedicated terminal 303 proceeds to step SP233 to generate picture request data representing the picture specifying command that has been previously allocated to the above selectively specified button by the request data generating part 344, and sends this from the sending part 345 to the data providing server 301, and proceeds to step SP234.

At this time, as shown in FIG. 33B, the data providing server 301 starts a subroutine in step SP225 and enters step SP251. In the above step SP251 and the next step SP252, the data providing server 301 awaits that the picture request data and specified coordinate position data are sent from the portable dedicated terminal 303. In step SP251, if the data providing server 301 receives the picture request data from the portable dedicated terminal 303 by the receiving part 312, it proceeds to step SP253.

In step SP253, the data providing server 301 retrieves content data in the content database 311 based on the picture request data by the retrieving part 315 and reads the specified picture data, and sends this from the sending part 314 to the portable dedicated terminal 303, and then proceeds to step SP254.

At this time, in step SP234, the portable dedicated terminal 303 awaits the picture data from the data providing server 301. If the portable dedicated terminal 303 receives the picture data by the receiving part 346, it proceeds to step SP235.

In step SP235, the portable dedicated terminal 303 transmits the received picture data to the reproducing part 343 to newly display a picture based on the picture data instead of the picture of the content selecting screen being displayed at present. Then, the portable dedicated terminal 303 proceeds to step SP236 to determine whether or not the confirmation button 368 was selectively specified on the selection confirming screen 355.

Obtaining a negative result in this step SP236 means that the selection confirming screen 355 has not been displayed yet by the reproducing part 343 or that although it has been displayed, the confirmation button 368 is not selectively specified because of in the middle of entering to specify purchase or rental for the content data. At this time, the portable dedicated terminal 303 returns to step SP231.

In step SP232, the portable dedicated terminal 303 moves the picture of customer 366 to the specified coordinate position on the picture of first floor in shop 351 or the like according to the customer's operation of the operating part 341, and proceeds to step SP237 to generate specified coordinate position data representing the specified coordinate position by the request data generating part 344 and send this from the sending part 345 to the data providing server 301, and then proceeds to step SP238.

At this time, in step SP252, the data providing server 301 awaits the specified coordinate position data from the portable dedicated terminal 303. If the data providing server 301 receives the specified coordinate position data by the receiving part 312, it proceeds to step SP255 to retrieve commercial data in the content database 311 based on the specified coordinate position data by the retrieving part 315, read specified commercial data, and send this from the sending part 314 to the portable dedicated terminal 303, and then it proceeds to step SP254.

In step SP254, the data providing server 301 determines whether or not it received the content specifying data from the portable dedicated terminal 303, and sequentially repeats the processing loop of steps SP251-SP252-SP253-SP254SP255 until it receives the content specifying data, and sends the picture data and the commercial data corresponding to the picture request data and the specified coordinate position data sent from the portable dedicated terminal 303.

If the data providing server 301 receives the content specifying data in step SP254, it pulls out of this subroutine, and proceeds to step SP226 in the content providing processing procedure in the data providing server 301 described above with reference to FIG. 32B.

On the other hand, in step SP238, the portable dedicated terminal 303 awaits the commercial data from the data providing server 301. If the portable dedicated terminal 303 receives the commercial data by the receiving part 346, it proceeds to step SP239 to transmit the commercial data to the reproducing part 343. Thereby, the customer views a part of a content based on the commercial data and the content can be advertised to the customer. Then, the portable dedicated terminal 303 proceeds to step SP236.

Until an affirmative result is obtained in step SP236, the portable dedicated terminal 303 returns to step SP231 and sequentially repeats the processing loop of the above steps SP231-SP232-SP233-SP234-SP235-SP236-SP237-SP238-SP239. Thereby, the portable dedicated terminal 303 can make the customer select desired content data by displaying each picture of the content selecting screen while properly switching the display while mixing the advertisement of a content by the reproducing part 343.

Then, in step SP236, if the portable dedicated terminal 303 confirms that the confirmation button 368 was selectively specified on the selection confirming screen 355 of the content selecting screen, it pulls out of this subroutine and proceeds to step SP215 of the content providing processing procedure in the portable dedicated terminal 303 described above with reference to FIG. 32A.

A content selecting screen customizing processing procedure by the data providing server 301 and the portable dedicated terminal 303 in this data providing system 300 will be collectively described. First, as shown in FIG. 34A, the portable dedicated terminal 303 enters routine RT22 from the start step and proceeds to step SP261.

In step SP261, the portable dedicated terminal 303 awaits that the customer enters a customizing request via the operating part 341. If the customizing request is entered, the portable dedicated terminal 303 proceeds to step SP262 to generate customizing request data by the request data generating part 344, and sends this from the sending part 345 to the data providing server 301, and then it proceeds to step SP263.

Figures 34A, 34B:
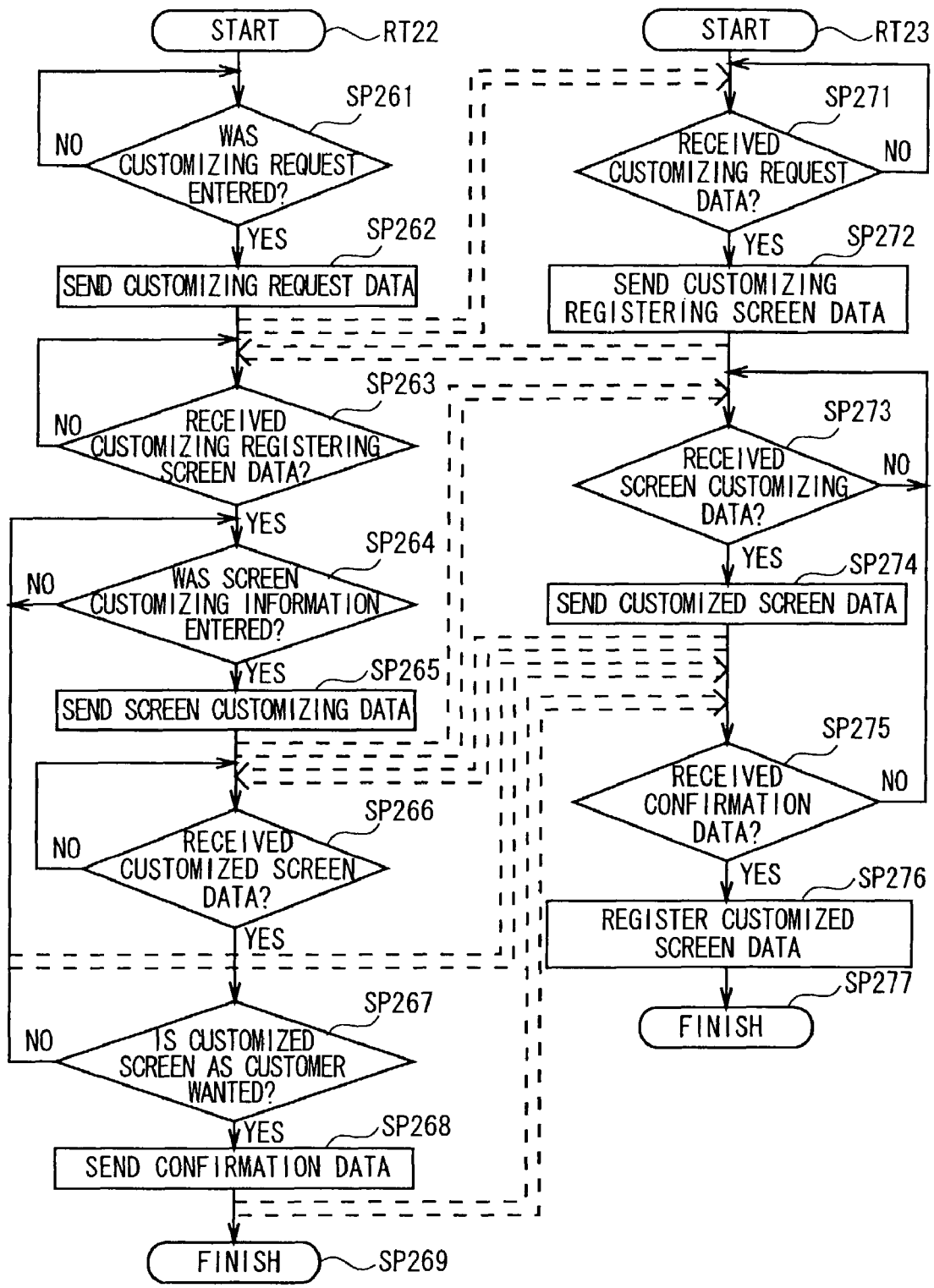
FIGS. 34A and 34B are flowcharts showing a customizing processing procedure in the data providing system.

At this time, as shown in FIG. 34B, the data providing server 301 enters routine RT23 from the starting step and proceeds to step SP271 to await the customizing request data from the portable dedicated terminal 303. If the data providing server 301 receives the customizing request data by the receiving part 312, it proceeds to step SP272 to read customizing registering screen data from the content database 311 by the retrieving part 315, and sends this from the sending part 314 to the portable dedicated terminal 303, and then it proceeds to step SP273.

In step SP263, the portable dedicated terminal 303 awaits the customizing registering screen data from the data providing server 301. If the portable dedicated terminal 303 receives the customizing registering screen data by the receiving part 346, it transmits this to the reproducing part 343 to display a customizing registering screen based on the customizing registering screen data, and proceeds to step SP264.

In step SP264, the portable dedicated terminal 303 awaits that screen customizing information is entered on the customizing registering screen by the customer's operation of the operating part 341. If the screen customizing information is entered, the portable dedicated terminal 303 proceeds to step SP265 to generate screen customizing data by the request data generating part 344 and sends this from the sending part 345 to the data providing server 301, and then it proceeds to step SP266.

At this time, in step SP273, the data providing server 301 awaits the screen customizing data from the portable dedicated terminal 303. If the data providing server 301 receives the screen customizing data by the receiving part 312, it proceeds to step SP274.

In step SP274, the data providing server 301 reads the content selecting screen data from the content database 311 by the retrieving part 315, performs processing on this based on the screen customizing data, and sends thus obtained customized screen data from the sending part 314 to the portable dedicated terminal 303, and then it proceeds to step SP275.

On the other hand, in step SP266, the portable dedicated terminal 303 awaits the customized screen data from the data providing server 301. If the portable dedicated terminal 303 receives the customized screen data by the receiving part 346, it sends this to the reproducing part 343 to display a customized screen based on the customized screen data, and then it proceeds to step SP267.

In step SP267, as a result of that the customized screen was shown to the customer by the reproducing part 343, if that the present setting is not desired customizing is entered by the customer via the operating part 341, the portable dedicated terminal 303 generates recustomizing data to generate screen customizing information again by the request data generating part 344, and sends thus generated recustomizing data from the sending part 345 to the data providing server 301. Then, the portable dedicated terminal 303 returns to step SP264, and repeats the processing loop of steps SP264-SP265-SP266-SP267 again.

On the contrary, in step SP267, if that the present customizing is desired customizing is entered by the customer via the operating part 341, the portable dedicated terminal 303 proceeds to step SP268 to generate confirmation data by the request data generating part 344 and send this from the sending part 345 to the data providing server 301, and it proceeds to step SP269 to finish the above processing in the portable dedicated terminal 303.

On the other hand, in step SP275, the data providing server 301 receives the recustomizing data or the confirmation data from the portable dedicated terminal 303 by the receiving part 312. If the data providing server 301 receives the recustomizing data by the receiving part 312, it returns to step SP273, and repeats the processing loop of steps SP273-SP274-SP275 again.

In step SP275, if the data providing server 301 receives the confirmation data by the receiving part 312, it proceeds to step SP276 to add the screen customizing data to the customer registration information in the customer database 310 and update the customer registration information by the updating part 313, and it proceeds to step SP277 to finish the above processing in the data providing server 301. Thus, all the customizing processing procedures in the data providing system 300 are finished.

Figures 35A, 35B:
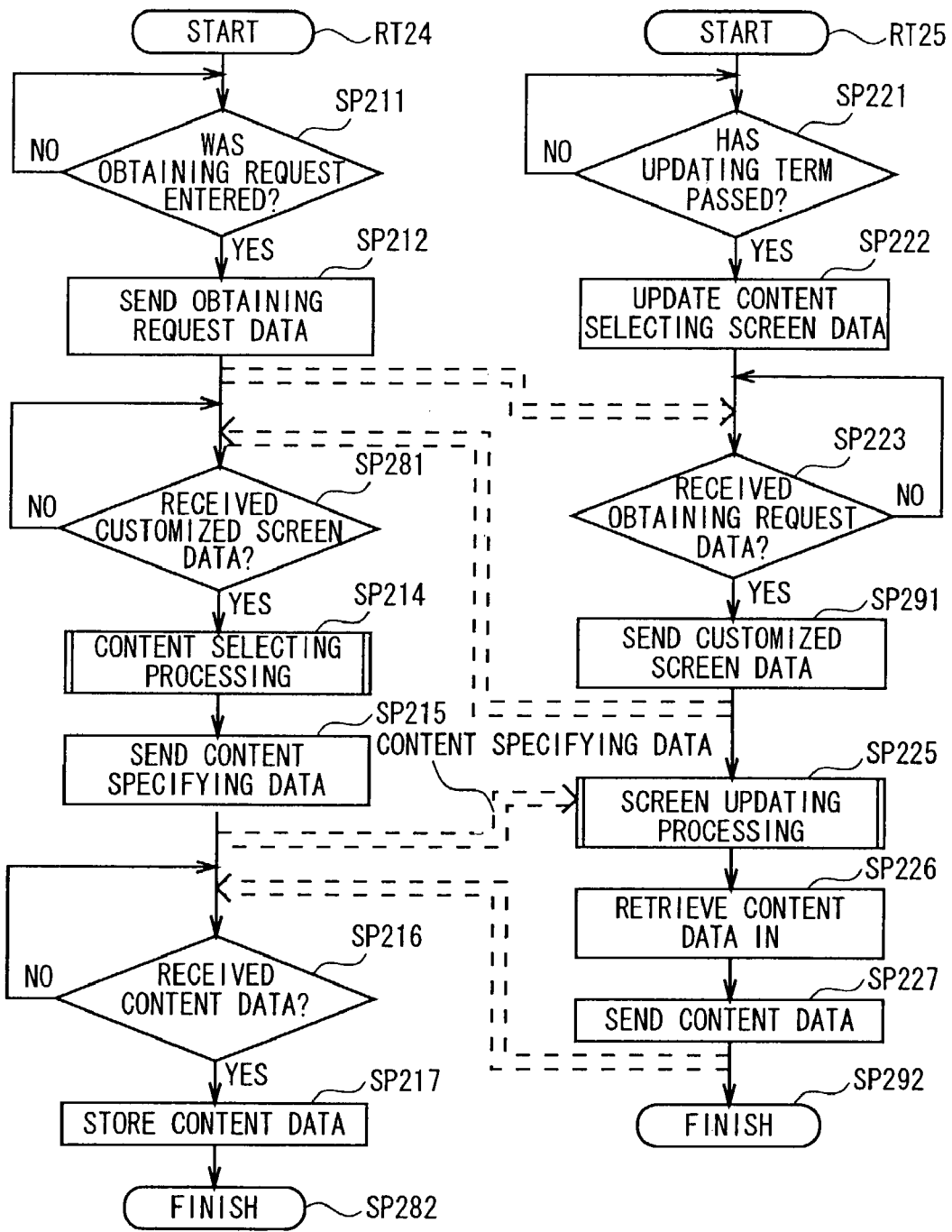
FIGS. 35A and 35B are flowcharts showing a content providing processing procedure using customized screen data in the data providing system.

A content providing processing procedure by means of the customized screen data by the data providing server 301 and the portable dedicated terminal 303 in the data providing system 300 will be collectively described. Referring to FIG. 35A shown by adding the same reference numerals to corresponding parts in FIG. 32A, the portable dedicated terminal 303 enters routine RT24 from the start step, proceeds to step SP211, sequentially executes the processing of the above step SP211 and the next step SP212 to send obtaining request data to the data providing server 301, and then proceeds to step SP281.

At this time, referring to FIG. 35B shown by adding the same reference numerals to corresponding parts in FIG. 32B, the data providing server 301 enters routine RT25 from the start step, proceeds to step SP221, sequentially executes the processing of the above step SP221 and the following step SP222 and step SP223 to receive the obtaining request data from the portable dedicated terminal 303, and then it proceeds to step SP291.

In step SP291, the data providing server 301 reads the screen customizing data added to the customer registration information on the customer who requested to obtain the content data from the customer database 310 by the updating part 313, performs processing on the content selecting screen data read from the content database 311 based on the screen customizing data by the retrieving part 315, and sends thus obtained customized screen data from the sending part 314 to the portable dedicated terminal 303, and then proceeds to step SP225.

The data providing server 301 sequentially executes the processing of the above steps SP225 to SP227, and then proceeds to step SP292 to finish the above processing in the data providing server 301.

On the other hand, in step SP281, the portable dedicated terminal 303 awaits the customized screen data from the data providing server 301. If the portable dedicated terminal 303 receives the customized screen data by the receiving part 346, it transmits the customized screen data to the reproducing part 343 to display for example the customized picture of the exterior of the shop 370, and then proceeds to step SP214.

In step SP214, the portable dedicated terminal 303 sequentially executes the processing of steps SP214 to SP217, and proceeds to step SP282 to finish the above processing in the portable dedicated terminal 303. Thereby, all the content providing processing procedures by means of the customized screen data in the data providing system 300 are finished.

According to the above configuration, in this data providing system 300, if the data providing server 301 receives the customizing request data from the portable dedicated terminal 303 that is dedicated to the agency and only can access the above data providing server 301, the data providing server 301 sends the customizing registering screen data to the portable dedicated terminal 303 according to that. If the screen customizing information for the content selecting screen that was entered on the customizing registering screen based on the customizing registering screen data is sent from the above portable dedicated terminal 303 to the data providing server 301 as screen customizing data, the data providing server 301 receives and adds this to the corresponding customer registration information in the customer database 310, and registers the screen customizing data.

Then, in this data providing system 300, if the data providing server 301 receives the obtaining request data from the portable dedicated terminal 303 of the customer who registered the screen customizing data by the data providing server 301, the data providing server 301 reads the above screen customizing data from the customer database 310, and the content selecting screen data from the content database 311, and performs processing on the content selecting screen data based on the screen customizing data, and sends thus obtained customized screen data to the portable dedicated terminal 303. Thereby, the customer can select desired content data on the customized screen obtained by customizing the content selecting screen according to the customer's request.

In this data providing system 300, since the portable dedicated terminal 303 only can access the data providing server 301 for providing content data, the content selecting screen can be easily customized matching with the customer's taste of content data (that is, genre). Thus, the usability of the content selecting screen can be remarkably improved.

Moreover, in this data providing system 300, the content selecting screen previously generated by mixing the three-dimensional virtual reality space pictures that represent the outside/inside of the shop of the agency is provided from the data providing server 301 to the portable dedicated terminal 303 so that the customer can easily select content data. The content selecting screen can be customized according to the customer's request. Thereby, the usability of the above content selecting screen can be further improved.

Furthermore, in this data providing system 300, if the data providing server 301 obtains the screen customizing data from the portable dedicated terminal 303, it customizes the content selecting screen data based on the screen customizing data, and the customer can confirm this on the portable dedicated terminal 303. Thereby, the content selecting screen can be properly customized as the customer desired.

In this data providing system 300, the portable dedicated terminal 303 only can access the data providing server 301 for providing content data, and the content selecting screen which will be provided to the portable dedicated terminal 303 when the customer requested to obtain content data can be customized according to the customer's request. Thereby, the customer who uses the portable dedicated terminal 303 for the purpose of obtaining content data can remarkably easily use the data providing system 300.

As a result, in this data providing system 300, the percentage of the customers who use the data providing server 301 also being the agency to obtain content data can be remarkably improved.

Furthermore, in this data providing system 300, the customer can use such portable dedicated terminal 303 only accessible the data providing server 301 by either of purchase and rental. Thereby, the customer who does not own a device for using the Internet, the customer who although owns such device, is inexperienced in operations for connecting to the Internet, and the customer who almost does not have a knowledge of the Internet, can easily obtain content data from the data providing server 301 by the portable dedicated terminal 303.

According to the above configuration, the data providing server 301 sends the customizing registering screen data according to the customizing request data that was sent from the portable dedicated terminal 303 dedicated to the agency and only accessible the above data providing server 301 to the portable dedicated terminal 303, and the data providing server 301 registers the screen customizing data sent from the above portable dedicated terminal 303 in the customer database 310. Then, the data providing server 301 performs processing on the content selecting screen data based on the screen customizing data read from the customer database 310 according to the obtaining request data sent from the portable dedicated terminal 303, and sends thus obtained customized screen data to the portable dedicated terminal 303. Thereby, the content selecting screen can be easily customized matching with the customer's taste, and the usability of the above content selecting screen can be remarkably improved. Thus, a data providing system in which the customer can easily select content data can be accomplished.

Note that, in the aforementioned sixth embodiment, it has dealt with the case where the data providing server 301 is installed in the agency. However, this invention is not only limited to this but also provided that the data providing server 301 can be connected to the Internet, the place to install the data providing server 301 may not be particularly prescribed. And by providing a database for managing plural agencies in the data providing server 301 and by previously storing their agency IDs peculiar to each of them, content selecting screen data and customizing registering screen data in the above database by making a correspondence, when the portable dedicated terminal 303 accessed, the data providing server 301 may send content selecting screen data and customizing registering screen data for an agency corresponding to the portable dedicated terminal 303 or for an agency arbitrary selected to the above portable dedicated terminal 303.

In the aforementioned sixth embodiment, it has dealt with the case where in the data providing server 301, the content selecting screen data is generated by the developmental tool that was provided from the content server. However, this invention is not only limited to this but also content selecting screen data may be generated by entrusting it to a company for generating content selecting screen data or the like from the data providing server 301.

In the aforementioned sixth embodiment, it has dealt with the case where the content selecting screen data representing the inside of the shop of the agency by three-dimensional virtual reality space pictures is provided from the data providing server 301. However, this invention is not only limited to this but also content selecting screen data generated in a home page by listing the titles of many content data or the like may be provided.

Figure 36:
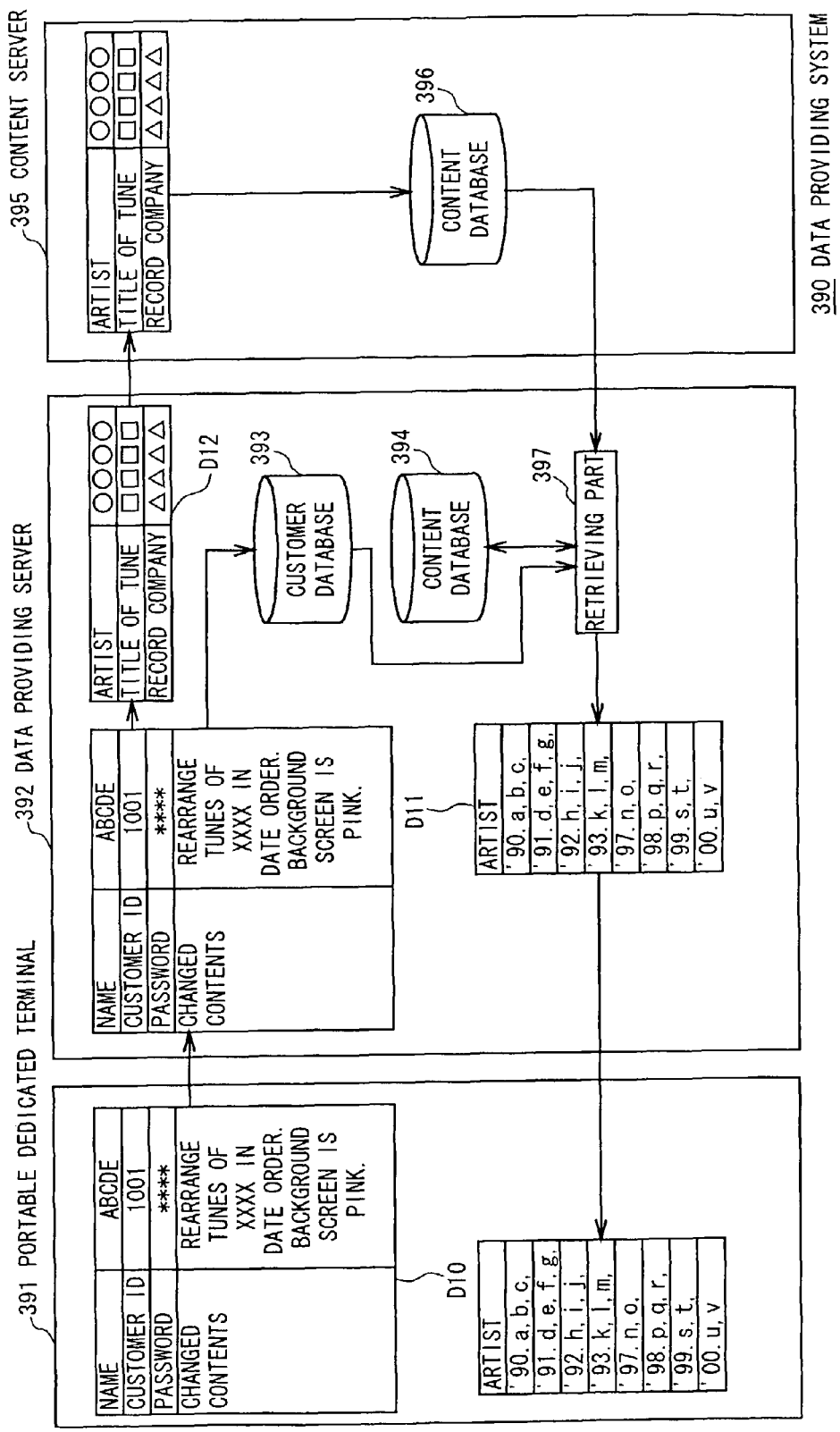
FIG. 36 is a conceptual view for explaining the customizing of a content selecting screen according to another embodiment than the sixth embodiment.

As shown in FIG. 36, in a data providing system 390 for providing content selecting screen data generated in a home page, as screen customizing data D10 to be sent from a portable dedicated terminal 391 to a data providing server 392, customizing such as the rearrangement of tunes (i.e., content data) by an arbitrary artist (or genre) in date order, and the specifying of background color of the content selecting screen data can be performed. If the data providing server 392 receives obtaining request data from the portable dedicated terminal 391 after it registered the received screen customizing data D10 in a customer database 393, the data providing server 392 performs processing on the content selecting screen data in the customer database 393 based on the screen customizing data D10 by a retrieving part 397, and sends thus obtained customized screen data D11 to the portable dedicated terminal 391.

In this connection, in the data providing system 390, if the data providing server 392 receives the screen customizing data D1O, the data providing server 392 determines whether or not satisfactory amount of content data for the request by the screen customizing data D10 has been stored in a content database 394. If it has not, the data providing server 392 generates content obtaining request data D12 and send this to a content server 395, so that the content server 395 reads specified content data from the content database 396 and supplies this to the data providing server 392. Thereby, the content selecting screen data can be customized while further surely satisfying the customer's request. Note that, such supply of content data from the content server 395 to the data providing server 392 also can be applied to the aforementioned sixth embodiment.

Furthermore, in the aforementioned sixth embodiment, it has dealt with the case where the data providing server 301 simply obtains many content data provided from a content server and stores this in the content database 311. However, this invention is not only limited to this but also the data providing server 301 may obtain compressed content data from the content server, stores this in the content database 311 as it has been compressed, and provides this to the portable dedicated terminal 303. Thereby, the content database 311 in the data providing server 301 and the recording medium 340 in the portable dedicated terminal 303 that have a limited capacity can be effectively used to record content data.

Figure 37:
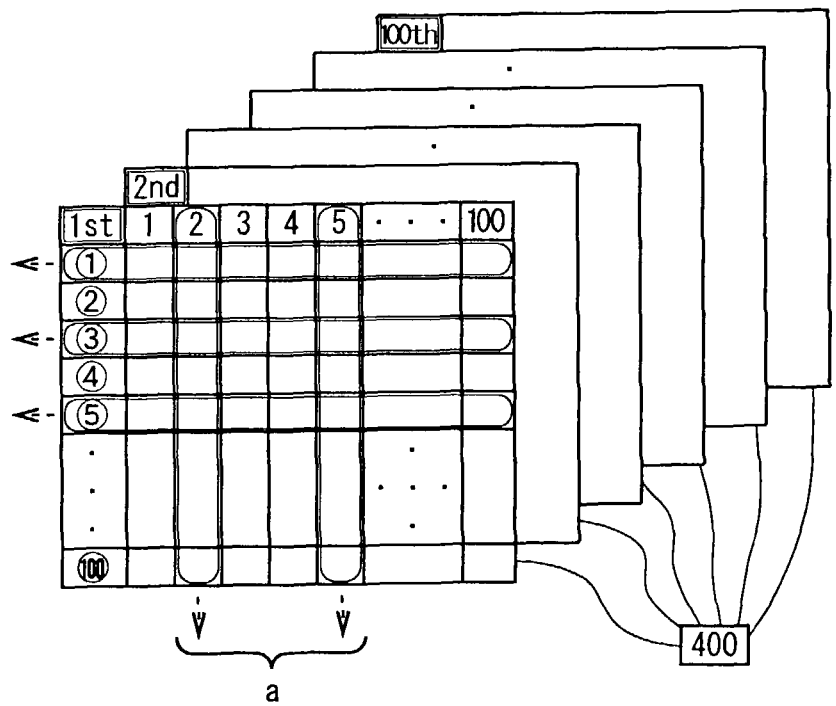
FIG. 37 is a schematic diagram for explaining a method of providing content data from a content server to a data providing server.

In this connection, as shown in FIG. 37, in the content server, not only many content data but also many data tables 400 in which the above content data are represented by classified by genre have been stored in the content database. If the genre of content data to be treated for providing is specified from data providing servers and/or agencies by preceding the start of the distribution of content data, content data in the specified genre are selected from the above data table at random, and thus selected content data group "a" are provided to the different data providing servers and/or agencies, respectively. Thereby, content data in which a part of or all of them are different in the same genre can be provided to the data providing servers and/or the agencies. As a result, the customer can use many data providing servers dealing in different content data in the same genre.

(8) Seventh Embodiment

Figure 38:
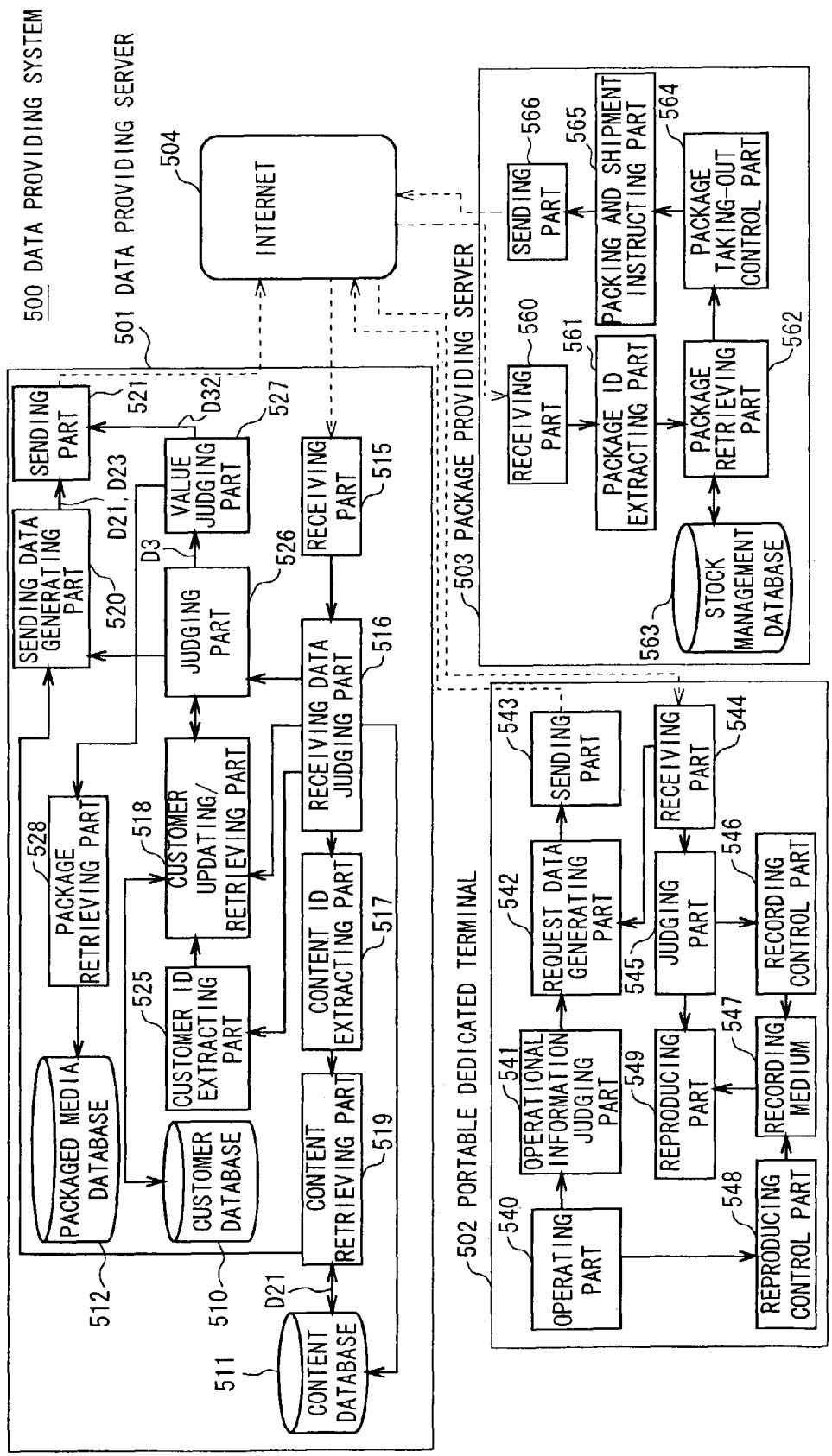
FIG. 38 is a block diagram showing the configuration of a data providing system according to a seventh embodiment.

FIG. 38 shows a data providing system 500 according to a seventh embodiment. A portable dedicated terminal 502 that corresponds to the portable dedicated terminals 7A to 7N described above with reference to FIGS. 1 to 3 and only can accessible a data providing server 501, and a package providing server 503 that corresponds to the sales company 5 described above with reference to FIGS. 1 to 3 are connected to a data providing server 501 corresponding to the agencies 4A to 4N described above with reference to FIGS. 1 to 3, respectively, on the Internet 504.

The data providing server 501 has a customer database 510, a content database 511 and a packaged media database 512. The customer can use the data providing server 501 by that customer registration information composed of customer information such as the name, address, and account number, and a customer ID issued to the customer are stored in the customer database 510 and the customer is registered.

In the content database 511, content data composed of many single tunes has been stored as content data that will be provided to the customer, and a data table formed by listing content additional information composed of a content ID peculiar to each of the above content data, title (the title of tune), selling price, rental price, etc., has been stored.

In the data providing server 501, content data being a single tune is equivalent to packaged media storing the same content data, and they are equivalently exchangeable. According to this, in the packaged media database 512, a data table formed by listing the title of the content data being a single tune, the title of the packaged media storing the above content data being a single CD, the selling price of the above packaged media, package identification information peculiar to packaged media (hereinafter, this is referred to as package ID), etc. by making a correspondence.

For instance, the registered customer sends specifying information on content data wanting to rent from the portable dedicated terminal 502 (purchased/rented by the customer) as content specifying data, the data providing server 501 receives this by a receiving part 515 and takes this in a receiving data judging part 516.

Figure 39:
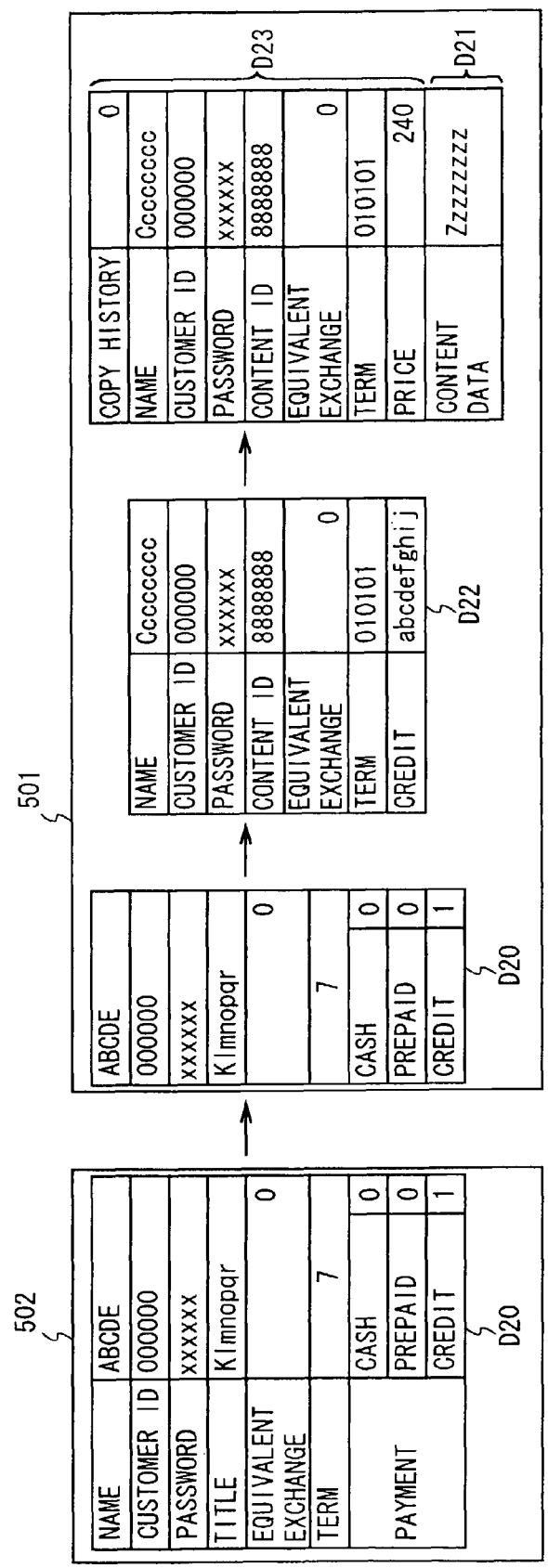
FIG. 39 is a schematic diagram for explaining the rental of content data.

Here, as shown in FIGS. 38 and 39, in the content specifying data D20 sent from the portable dedicated terminal 502, information such as the customer's name, customer ID, password, title of the content data D21 that the customer wants to rent, equivalent exchange information representing whether or not equivalent exchange had performed, rental term, and method of payment for rental charge is included.

In this connection, the customer ID was issued in the customer registration in the data providing server 501 and has been stored in the portable dedicated terminal 502. The customer ID will be stored in various data to be sent from the above portable dedicated terminal 502 to identify the customer.

The equivalent exchange information shows for example, "0" in the case where the customer's purpose is to obtain the content data D21 and the customer does not hope equivalent exchange. On the contrary, in the case where the customer hopes equivalent exchange, the equivalent exchange information shows "1", for example.

The data providing server 501 identifies the above content specifying data D20 as data to obtain the content data D21 based on the equivalent exchange information stored in the content specifying data D20 by the receiving data judging part 516.

Then, the data providing server 501 retrieves a data table in the content database 511 based on the title of the content data D21, changes the title to a content ID, generates read-of-content control data D22, and sends this to a content ID extracting part 517, by the receiving data judging part 516.

In this connection, when in generating the read-of-content control data D22 from the content specifying data D20 by the receiving data judging part 516, the data providing server 501 retrieves the customer registration information in the customer database 510 based on the customer ID, and detects the coded name of the customer stored therein by a customer updating/retrieving part 518. As the method of payment for rental charges, if credit has been specified, the data providing server 501 detects the account number of the customer, stores thus detected customer's coded name and account number in the read-of-content control data D22 by the receiving data judging part 516.

The data providing server 501 extracts the content ID from the read-of-content control data D22 by the content ID extracting part 517, and transmits this to a content retrieving part 519 with the read-of-content control data D22. The data providing server 501 retrieves the content data D21 in the content database 511 and reads this by the above content retrieving part 519, and transmits the read content data D21 to a sending data generating part 520 with the read-of-content control data D22.

The data providing server 501 adds copy history information to the read-of-content control data D22, generates header data D23, and adds the header data D23 to the content data D21 by the sending data generating part 520, and then sends this from a sending part 521 to the portable dedicated terminal 502 via the Internet 504. Thereby, the customer can rent the content data D21 that he/she specified.

In this connection, the data providing server 501 has an accounting part not shown. In the case where the customer specified payment for rental charges by credit, the data providing server 501 executes accounting by that accounting part before the specified content data D21 is sent to the portable dedicated terminal 502. The data providing server 501 generates accounting data based on the rental charges according to the term to rent the content data D21 (that is, charge amount to the customer), the account number of the customer in the customer registration information, and the account number of, for example, an agency following the data providing server 501.

As a result of that the data providing server 501 sent the account data from the sending part 521 to a specified settlement processing server (not shown) via the Internet 504, if the completion of electronical settlement processing based on the account data is notified from the above settlement processing server, the data providing server 501 adds information such as the title and the content ID of the content data D21, the amount that the customer paid for the rental, to the customer registration information in the customer database 510, and updates the customer registration information. The data providing server 501 can grasp the information on the content data D21 rented by the customer, the state of payment for the above rental, or the like, by the customer registration information.

At this time, the data providing server 501 also notifies the sending data generating part 520 of the notification received from the settlement processing server, and stores the information on the amount that the customer paid for the rental of the content data D21 in the header data D23 instead of the account number by the above sending data generating part 520. In this manner, if the customer completes the payment for the rental charges, the data providing server 501 sends the content data D21 with the header data D23 to the portable dedicated terminal 502 for rental In this manner, in the data providing system 500, the content data D21 is rented to the customer from the data providing server 501 by means of the portable dedicated terminal 502. If the rental term of the above content data D21 is finished, and the customer brings that portable dedicated terminal 502 into the agency, the agency erases the content data D21 for return.

In this data providing system 500, although the rental term has passed, if the customer does not bring the portable dedicated terminal 502 into the agency, that content data D21 is erased or made into the irreproducible state for return by the internal mechanism of the above portable dedicated terminal 502.

By the way, if equivalent exchange request data D30 for requesting the equivalent exchange of the content data owned by the customer by rental (single tune) for packaged media (single CD) is sent from the portable dedicated terminal 502, the data providing server 501 receives this by the receiving part 515, and takes this in the receiving data judging part 516.

Figure 40:
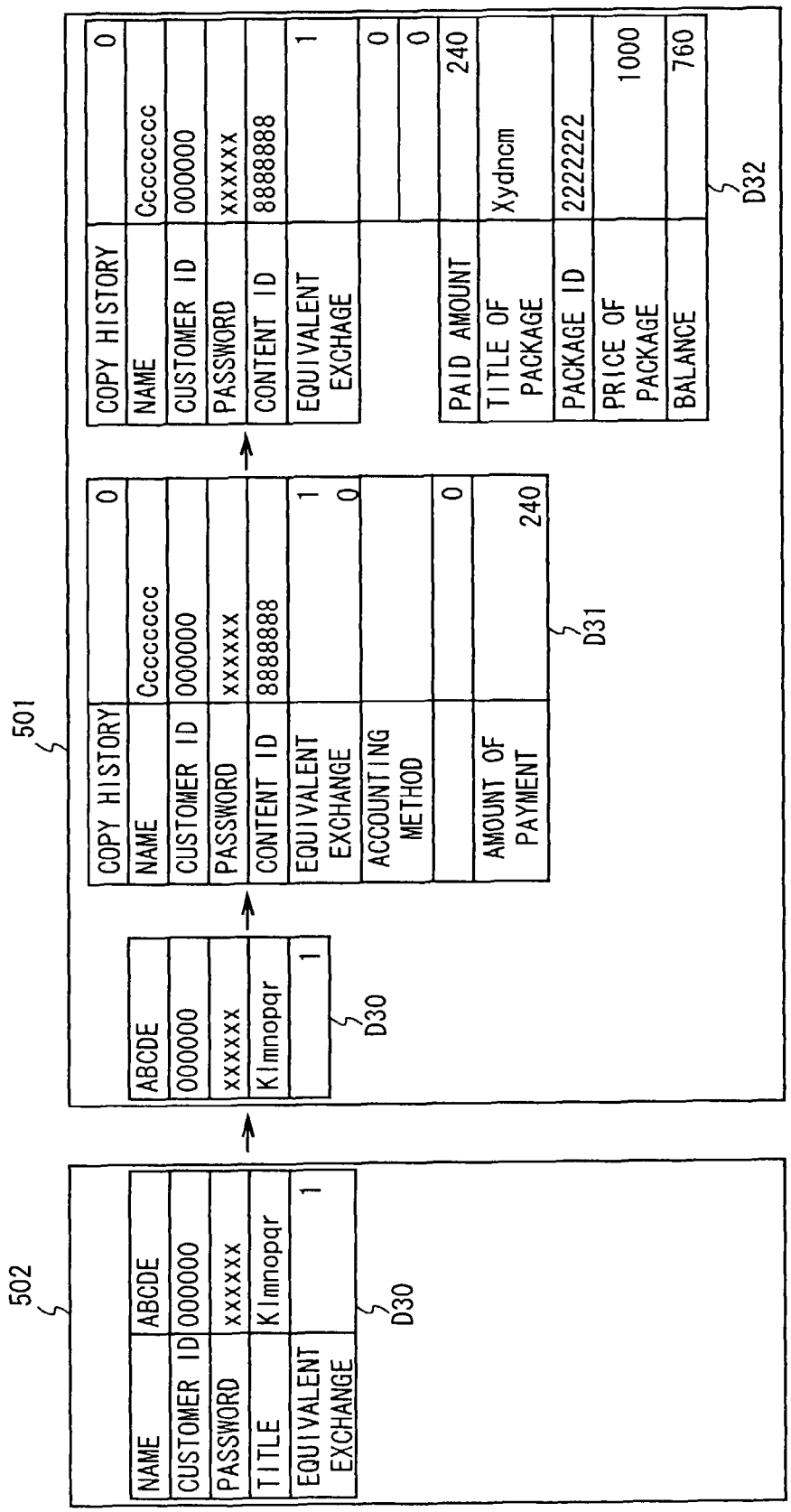
FIG. 40 is a schematic diagram for explaining the request of an equivalent exchange.

Here, as shown in FIGS. 38 and 40, in the equivalent exchange request data D30, the equivalent exchange information is composed of the customer's name, customer ID, password, title of the content data D21 that the customer specified for the equivalent exchange, and whether or not being an equivalent exchange (in this case, "1" is shown).

The data providing server 501 judges the equivalent exchange request data D30 to be data for requesting an equivalent exchange of the content data D21 for packaged media based on the equivalent exchange information included in the equivalent exchange request data D30 by the receiving data judging part 516, and sends the equivalent exchange request data D30 to a customer ID extracting part 525.

The data providing server 501 extracts the customer ID from the equivalent exchange request data D30 by the customer ID extracting part 525, and transmits this to a customer updating/retrieving part 518 with the above equivalent exchange request data D30.

The data providing server 501 retrieves the customer registration information in the customer database 510 based on the customer ID by the customer updating/retrieving part 518, and based on thus obtained customer registration information, detects the customer's coded name, content ID of the content data D21, payment method of the rental charges for the content data D21, whether or not the above rental charges was already paid, and whether or not the customer did not commit illegality on the obtaining of the content data D21 in the past, and transmits the detected result to a judging part 526 with the equivalent exchange request data D30.

The data providing server 501 judges whether or not the equivalent exchange should be permitted based on the detected result by the judging part 526.

Here, if the customer already paid the rental charges for the content data D21 and especially did not commit illegality, the data providing server 501 permits the equivalent exchange and stores the detected data, the customer's coded name, the content ID of the content data D21, the paying method of the rental charges, and the amount that the customer practically paid, in the equivalent exchange request data D30, and generates equivalent exchange processing data D31 by the judging part 526, and transmits this to a value judging part 527.

The data providing server 501 retrieves a data table in the packaged media database 512 according to the retrieval conditions previously set in a package retrieving part 528, detects packaged media (single CD) storing the same tune as the content data D21 owned by the customer, as exchangeable packaged media, and reads the title, the selling price and the package ID of thus detected packaged media by the value judging part 527.

Then, the data providing server 501 compares the rental charges that the customer paid for the content data D21 (that is, the obtaining price of the content data D21) to the selling price of the detected packaged media and computing their balance by the value judging part 527. At this time, for instance, if the selling price of the packaged media is more expensive than the obtaining price of the content data D21, the term of the equivalent exchange that the customer pays their balance is set to make the exchange values equivalent.

The data providing server 501 stores the title and the package ID of the packaged media, and the term of the equivalent exchange in the equivalent exchange request data D30, and generates equivalent exchange term showing data D32, by the value judging part 527.

The data providing server 501 sends the equivalent exchange term showing data D32 from the sending part 521 to the portable dedicated terminal 502 via the Internet 504 to notify the customer of that the content data D21 can be equivalently exchanged for the packaged media, and that if the customer equivalently exchanges the content data D21 for the packaged media, he/she must pay the shown balance as the term.

As a result, if exchange acceptance data representing that the customer accepts the equivalent exchange is sent from the portable dedicated terminal 502, the data providing server 501 receives this by the receiving part 515, takes this in the receiving data judging part 516, and transmits this to the judging part 526. The data providing server 501 confirms that the customer accepted the equivalent exchange based on the exchange acceptance data by the judging part 526.

Then, the data providing server 501 generates package delivery ordering information from the package ID of the packaged media to be equivalently exchanged and delivered to the customer, the customer's name, the customer's address, etc., based on the customer registration information by the judging part 526, and transmits this to the sending data generating part 520.

The data providing server 501 generates package delivery ordering data representing the package delivery ordering information by the sending data generating part 520, and sends this from the sending part 521 to the package providing server 503 via the Internet 504, to order the delivery of the packaged media to the customer.

As a result, if delivery arrangement completion data representing that the arrangement of the delivery has completed is sent from the package providing server 503 via the Internet 504, the data providing server 501 receives this by the receiving part 515, and transmits this from the receiving data judging part 516 to the judging part 526.

At this time, as the paying method of the balance shown in the exchange acceptance data, if the customer specified the payment by credit, the data providing server 501 performs accounting by the accounting part similarly to the aforementioned case, and then receives the notification of the completion of the electronical settlement from the settlement processing server.

The data providing server 501 transmits the equivalent exchange approval information representing the approval for the equivalent exchange and the delivery method of the packaged media from the judging part 526 to the sending data generating part 520 to generate equivalent exchange approval data, and sends this from the sending part 521 to the portable dedicated terminal 502 via the Internet 504 to notify the customer of that the equivalent exchange was approved.

Then, the data providing server 501 adds information such as the content ID of the content data D21 to be equivalently exchanged, the package ID of the packaged media, whether or not the customer paid the balance, and the balance, to the customer registration information in the customer database 510, updates the customer registration information, and stores the history of the equivalent exchange, by the judging part 526 via the customer updating/retrieving part 518.

Thereby, the content data owned by the customer is erased from the portable dedicated terminal 502 (or is made into irreproducible state) for return, and the packaged media is delivered to the customer. In this manner, in the data providing server 501, as shown in FIGS. 41A and 41B, the content data D21 owned by the customer can be equivalently exchanged for the packaged media storing the content data D21 that should be normally purchased at the selling price.

In this connection, in the case where the customer specified payment by cash for the balance between the selling price of the packaged media and the obtaining price of the content data, the customer transfers the balance to the bank account. And in the case where the customer specified payment by prepaid card, the customer uses a request terminal or the like.

When the data providing server 501 received the equivalent exchange request data D30 from the portable dedicated terminal 502, if the customer had not paid the rental charges for the content data D21 specified for equivalent exchange, or if the customer had committed any illegality in the past, the data providing server 501 forbids the customer the equivalent exchange, and sends equivalent exchange forbidding information representing the forbidding of the above equivalent exchange to the sending data generating part 520 by the judging part 526.

The data providing server 501 generates equivalent exchange forbidding data representing that equivalent exchange forbidding information by the sending data generating part 520, and sends this from the sending part 521 to the portable dedicated terminal 502 via the Internet 504 to notify the customer of that the data providing server 501 cannot permit the equivalent exchange.

On the other hand, as shown in FIG. 38, if the customer enters specifying information on the content data wanting to rent by an operating part 540, the portable dedicated terminal 502 judges the specifying information as information for obtaining content data for example, according to the format of the specifying information, and adds equivalent exchange information showing "0" to that specifying information by an operational information judging part 541, and transmits this to a request data generating part 542.

The portable dedicated terminal 502 generates content specifying data D20 representing that specifying information including the customer ID by the request data generating part 542, and sends this from a sending part 543 to the data providing server 501 via the Internet 504.

As a result, if the content data D21 to which the header data D23 has been added is sent from the data providing server 501, the portable dedicated terminal 502 receives this by a receiving part 544, and transmits this to a recording control part 546 via a judging part 545. The portable dedicated terminal 502 records that content data D21 and header data D23 in a recording medium 547 by the above recording control part 546. In this manner, the customer can rent the desired content data D21.

Thereafter, if the customer enters a reproducing command with the operating part 540, the portable dedicated terminal 502 reproduces the content data D21 from the recording medium 547 by a reproducing control part 548, and supplies thus reproduced content data D21 to a reproducing part 549 composed of a display control part, a display part, a speaker, etc. Thereby, the customer can enjoy the content such as a single tune.

In this connection, the portable dedicated terminal 502 manages the rental term of the content data D21 by detecting it from the header data D23 by the recording control part 546 and the reproducing control part 548. If the customer does not bring the portable dedicated terminal 502 into the agency although the rental term of the above content data D21 has finished, the portable dedicated terminal 502 erases the content data D21 from the recording medium 547, or makes into a state where the content data D21 cannot be reproduced for return, by the reproducing control part 548.

Furthermore, if the customer enters an equivalent exchange request in which the content data D21 is specified for equivalent exchange by the operating part 540, the portable dedicated terminal 502 judges that the equivalent exchange request is a request for equivalently exchanging the content data D21 owned by the customer for (packaged media by the format of that equivalent exchange request, and adds equivalent exchange information showing "1" to the above equivalent exchange request by the operational information judging part 541, and supplies this to the request data generating part 542.

In this case, the portable dedicated terminal 502 generates equivalent exchange request data D30 representing that equivalent exchange request including the customer ID by the request data generating part 542, and sends this from the sending part 543 to the data providing server 501 via the Internet 504.

As a result, if the equivalent exchange term showing data D32 is sent from the data providing server 501 via the Internet 504, the portable dedicated terminal 502 receives this by the receiving part 544, and transmits this to the reproducing part 549 via the judging part 545, and notifies the customer of the title of exchangeable packaged media and that the customer must pay the balance occurred by the equivalent exchange as the term of the equivalent exchange.

If the customer approves the equivalent exchange via the operating part 540, the portable dedicated terminal 502 adds the equivalent exchange information representing "1" to the approval information, and transmits this to the request data generating part 542, by the operational information judging part 541. The portable dedicated terminal 502 generates exchange approval data representing the above approval information by the above request data generating part 542, and sends this from the sending part 543 to the data providing server 501 via the Internet 504.

If equivalent exchange permitting data is sent from the data providing server 501 via the Internet 504, the portable dedicated terminal 502 receives this by the receiving part 544, and transmits this from the judging part 545 to the reproducing part 549, and notifies the customer of that the equivalent exchange was permitted, and the delivery method of the packaged media or the like.

In this connection, if the equivalent exchange forbidding data is sent from the data providing server 501 via the Internet 504, the portable dedicated terminal 502 receives this by the receiving part 544, and transmits this to the reproducing part 549 via the judging part 545, and notifies the customer of that the equivalent exchange was not permitted.

If the package delivery ordering data is sent from the data providing server 501 via the Internet 504, the package providing server 503 receives this by a receiving part 560, transmits this to a package ID extracting part 561 to extract the package ID from the package delivery ordering data, and supplies this to a package retrieving part 562 with the package delivery ordering data.

Then, the package providing server 503 retrieves packaged data in a stock management database 563 according to the package ID, and detects the stock of the packaged media specified by the data providing server 501 and the keeping position on a package shelf not shown by the package retrieving part 562, and transmits information on the above detected keeping position to a package taking-out control part 564 with the package delivery ordering data.

After the specified packaged media is taken out of the packaged media keeping shelf based on the information on the keeping position by the package taking-out control part 564, the package providing server 503 packs that extracted packaged media and instructs a delivery center not shown to deliver this to the address of the customer shown in the package delivery ordering data by a packing and shipment instructing part 565, and then, sends delivery arrangement completion data from a sending part 566 to the data providing server 501.

Figure 42:
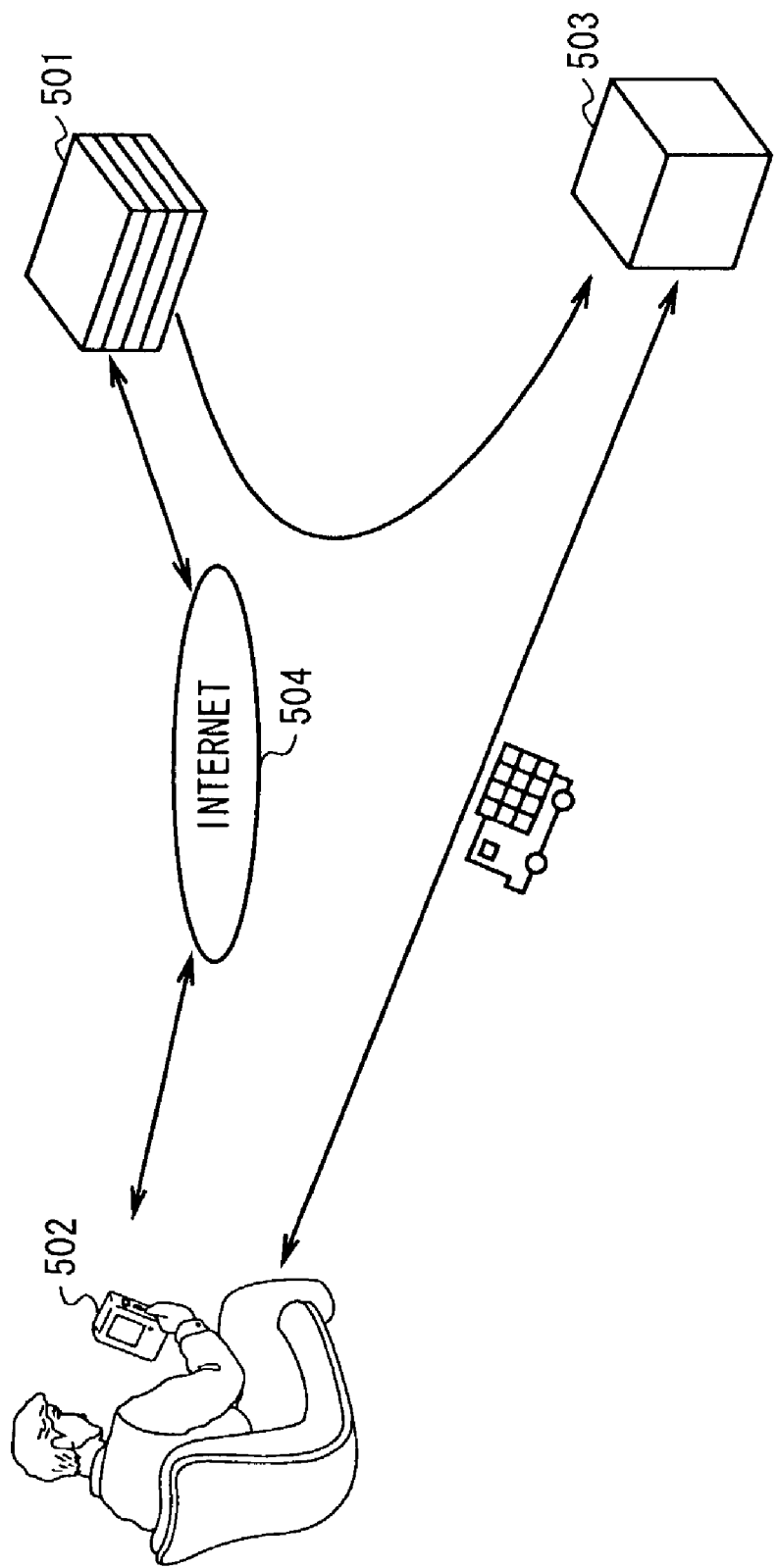
FIG. 42 is a conceptual view for explaining the delivery of packaged media by an equivalent exchange.

In this manner, in the data providing system 500, as shown in FIG. 42, if the equivalent exchange between the customer and the data providing server 501 is permitted, the package providing server 503 delivers the packaged media specified in the equivalently exchanged to the customer.

Figure 43:
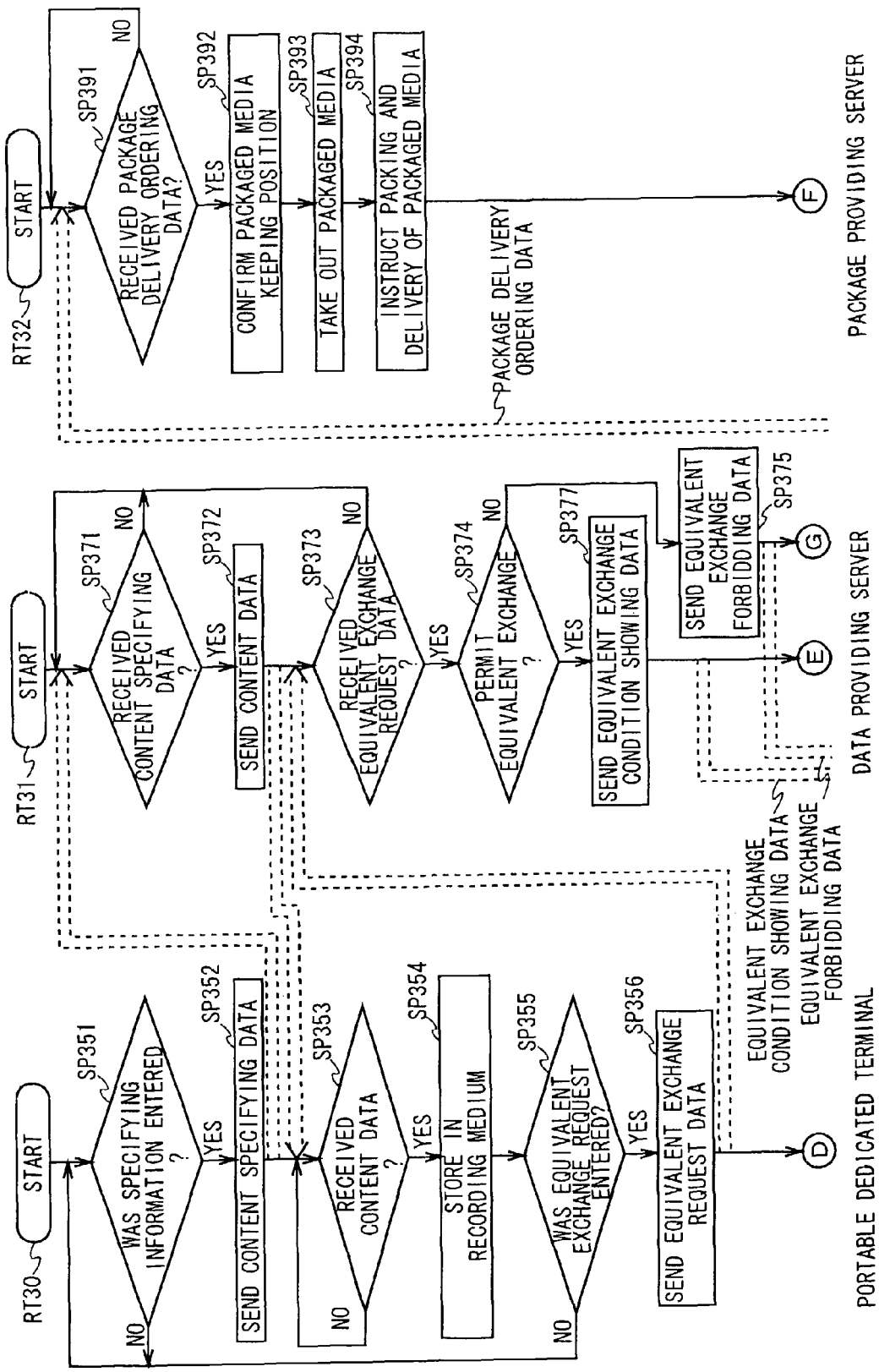
FIGS. 43A to 43C are flowcharts showing an equivalent exchange processing procedure in the data providing system.
Figure 44:
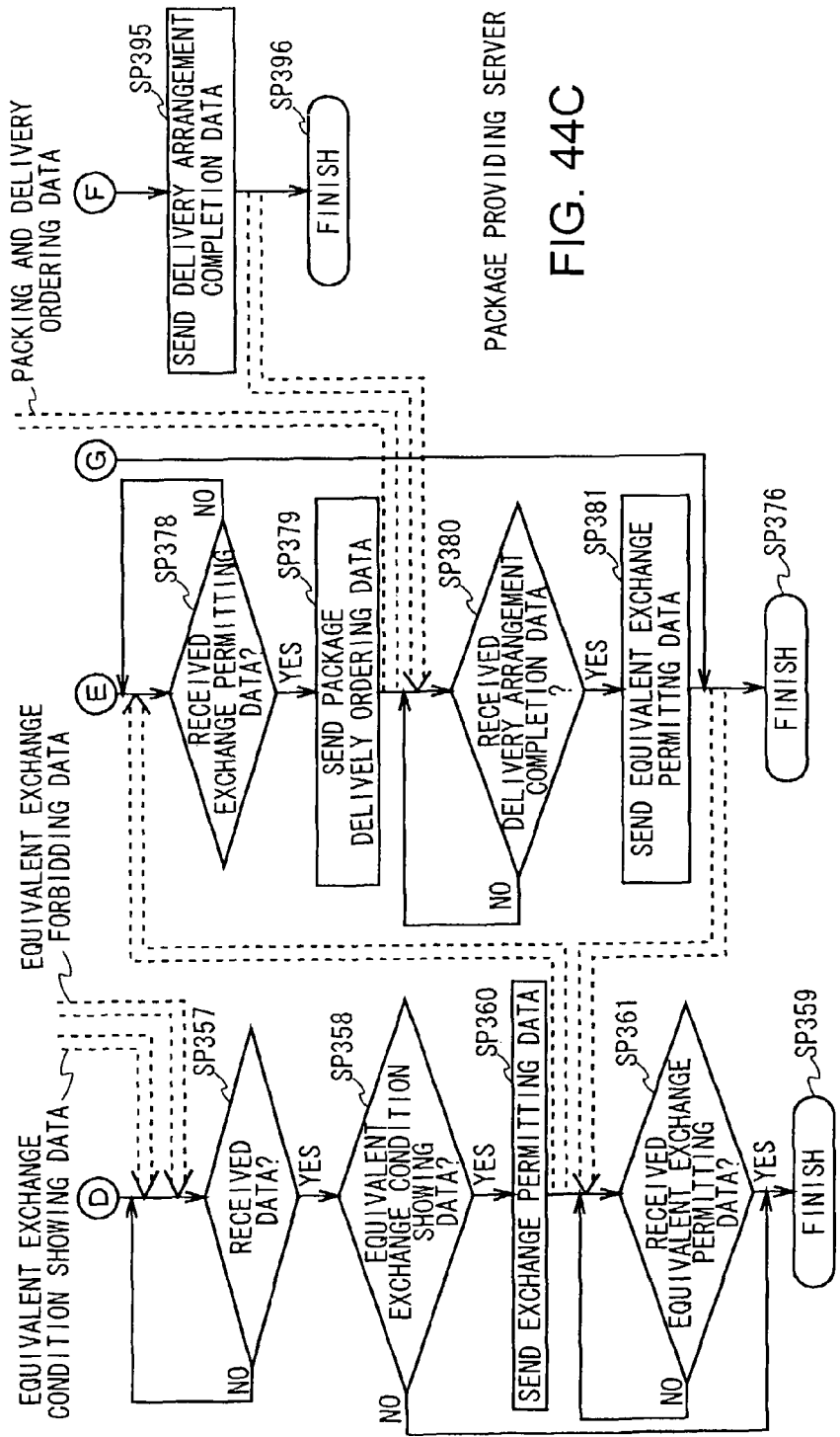
FIGS. 44A to 44C are flowcharts showing the equivalent exchange processing procedure in the data providing system.

Here, equivalent exchange processing procedures by the data providing server 501, the portable dedicated terminal 502 and the package providing server 503 in the data providing system 500 will be collectively described. As shown in FIGS. 43A and 44A, first, the portable dedicated terminal 502 enters routine RT30 from the starting step, and proceeds to step SP351.

In step SP351, the portable dedicated terminal 502 awaits that the customer enters specifying information for renting the content data D21 by the operating part 540. If the specifying information is entered, the portable dedicated terminal 502 proceeds to step SP352 to generate content specifying data D20 by the request data generating part 542, and sends this from the sending part 543 to the data providing server 501, and then proceeds to step SP353.

At this time, as shown in FIGS. 43B and 44B, the data providing server 501 enters routine RT31 from the start step, and proceeds to step SP371. In step SP371, the data providing server 501 awaits the content specifying data D20 from the portable dedicated terminal 502. If the data providing server 501 receives the content specifying data D20 by the receiving part 515, it proceeds to step SP372.

In step SP372, the data providing server 501 reads the specified content data D21 from the content database 511 by the content retrieving part 519, and sends this from the sending part 521 to the portable dedicated terminal 502, and then proceeds to step SP373.

Here, in step SP353, the portable dedicated terminal 502 awaits the content data D21 from the data providing server 501. If the portable dedicated terminal 502 receives the content data D21 by the receiving part 544, it proceeds to step SP354 to store that content data D21 in the recording medium 547 by the recording control part 546, and proceeds to step SP355. Thereby, the data providing server 501 rents the specified content data D21 to the customer. The content data D21 will be reproduced according to the customer's request. Thus, the customer can enjoy a content based on the content data D21.

In step SP355, the portable dedicated terminal 502 awaits that the customer enters an equivalent exchange request by the operating part 540. Until the equivalent exchange request is entered, the portable dedicated terminal 502 returns to step SP351 and repeats the processing loop of the following steps SP352-SP353-SP354-SP355.

In step SP355, if the equivalent exchange request is entered by the customer via the operating part 540, the portable dedicated terminal 502 proceeds to step SP356 to generate the equivalent exchange request data D30 by the request data generating part 542, and sends this from the sending part 543 to the data providing server 501, and then proceeds to step SP357.

In step SP373, the data providing server 501 determines whether or not the equivalent exchange request data D30 was sent from the portable dedicated terminal 502. Until the data providing server 501 receives the above equivalent exchange request data D30, the data providing server 501 returns to step SP371 and repeats the processing loop of the following steps SP372 and SP373. In step SP373, if the data providing server 501 receives the equivalent exchange request data D30 from the portable dedicated terminal 502 by the receiving part 515, it proceeds to step SP374.

In step SP374, the data providing server 501 checks the using history of the above customer who requested the equivalent exchange based on the customer registration information, and judges whether to permit or forbid the equivalent exchange by the judging part 526.

Obtaining a negative result in this step SP374 means that the rental charges of the content data D21 that the customer for the equivalent exchange has not been paid yet or that the above customer might illegally use the equivalent exchange because he/she committed any illegality in the past. At this time, the data providing server 501 proceeds to step SP375 to send the equivalent exchange forbidding data generated by the judging part 526, from the sending part 521 to the portable dedicated terminal 502 by the sending data generating part 520. Then, the data providing server 501 proceeds to step SP376 to finish the above processing by the data providing server 501.

On the contrary, obtaining an affirmative result in step SP374 means that the customer will not illegally use the equivalent exchange because he/she already paid the rental charges for the content data D21 that the customer specified for the equivalent exchange and he/she has not been done any illegality in the past. At this time, the data providing server 501 proceeds to step SP377.

In step SP377, the data providing server 501 generates the equivalent exchange term showing data D32 representing the term to make the exchange value between the content data D21 owned by the customer and the packaged media equal in a equivalent exchange by the value judging part 527, and sends this from the sending part 521 to the portable dedicated terminal 502, and then proceeds to step SP378.

At this time, in step SP375, the portable dedicated terminal 502 awaits the equivalent exchange term showing data D32 or the equivalent exchange forbidding data from the data providing server 501. If the portable dedicated terminal 502 receives either data by the receiving part 544, it proceeds to step SP358.

In step SP358, the portable dedicated terminal 502 determines whether the data received by the receiving part 544 is the equivalent exchange term showing data D32 or the equivalent exchange forbidding data by the judging part 545. If the above received data is the equivalent exchange forbidding data, the portable dedicated terminal 502 proceeds to step SP359 to finish the processing by the above portable dedicated terminal 502.

In step SP358, if the received data is the equivalent exchange term showing data D32, the portable dedicated terminal 502 proceeds to step SP360 to send the exchange permitting data from the sending part 543 to the data providing server 501 according to the customer's operation of the operating part 540, and proceeds to step SP361.

In step SP378, the data providing server 501 awaits the exchange approval data from the portable dedicated terminal 502. If the data providing server 501 receives the exchange permitting data by the receiving part 515, it proceeds to step SP379 to generate package delivery ordering data to deliver the packaged media to the customer by the judging part 526, and sends this from the sending part 521 to the package providing server 503, and then proceeds to step SP380.

At this time, as shown in FIGS. 43C and 44C, the package providing server 503 enters routine RT32 from the start step, and proceeds to step SP391. In step SP391, the package providing server 503 awaits the package delivery ordering data from the data providing server 501. If the package providing server 503 receives the package delivery ordering data by the receiving part 560, it proceeds to step SP392.

In step SP392, the package providing server 503 confirms the keeping position of the specified packaged media on the package keeping shelf based on the package delivery ordering data by the package retrieving part 562, and proceeds to step SP393 to take the specified packaged media out of the package keeping shelf by the package taking-out control part 564, and then it proceeds to step SP394.

In step SP394, the package providing server 503 instructs the delivery center to pack and deliver the packaged media to the customer by the packing and shipment instructing part 565, and proceeds to step SP395 to send delivery arrangement completion data from the sending part 566 to the data providing server 501. Then, the package providing server 503 proceeds to step SP396 to finish the above processing by the package providing server 503.

At this time, in step SP380, the data providing server 501 awaits the delivery arrangement completion data from the package providing server 503. If the data providing server 501 receives the delivery arrangement completion data by the receiving part 515, it proceeds to step SP381 to generate the equivalent exchange permitting data by the judging part 526 and send this from the sending part 521 to the portable dedicated terminal 502. Then, the data providing server 501 proceeds to step SP376 to finish the above processing by the data providing server 501.

On the other hand, in step SP361, the portable dedicated terminal 502 awaits the equivalent exchange permitting data from the data providing server 501. If the portable dedicated terminal 502 receives the equivalent exchange permitting data by the receiving part 544, it notifies the customer of that the equivalent exchange was permitted by the reproducing part 549. Then, the portable dedicated terminal 502 proceeds to step SP359 to finish the above processing by the portable dedicated terminal 502. Thus, all the equivalent exchange processing procedures in the data providing system 500 are finished.

According to the above configuration, in this data providing system 500, if the content specifying data for requesting the rental of the content data D21 is sent from the portable dedicated terminal 502, the data providing server 501 sends the specified content data D21 to the portable dedicated terminal 502 responding to the request for storing. In this manner, the content data D21 is rented to the customer by means of the portable dedicated terminal 502.

In this data providing system 500, if the equivalent exchange request data D30 of the content data D21 (single tune) owned by the customer by rental is sent from the portable dedicated terminal 502, the data providing server 501 detects packaged media (single CD) storing the same content data D21 that can be equivalently exchanged for the content data D21, and computes the balance of the selling price of the packaged media and the obtaining price of the content data owned by the customer to make the exchange value between them equal.

In this manner, in the data providing system 500, the data providing server 501 sends the equivalent exchange term showing data D32 showing the title of the exchangeable packaged media, and the balance that the customer must pay for the equivalent exchange as the term of the equivalent exchange, to the portable dedicated terminal 502.

As a result, in the data providing system 500, if the equivalent exchange approval data representing that the customer approves the equivalent exchange is sent from the portable dedicated terminal 502, the data providing server 501 makes the customer pay the balance occurred by the equivalent exchange, and erases the content data owned by the customer from the portable dedicated terminal 502 for return, and delivers the packaged media to the customer. In this manner, the exchange value between the content data D21 owned by the customer and the packaged media storing the content data D21 is made to be equal, and the content data D21 is exchanged for the packaged media.

Accordingly, in this data providing system 500, in the case where the customer renting the content data D21 by means of the portable dedicated terminal 502 wants to enjoy that content data D21 by reproducing by another device, or the customer is anxious about the safekeeping of the content data D21 by the portable dedicated terminal 502 and wants the safekeeping by packaged media, the exchange value between the above content data D21 and the packaged media is made to be equal, and the content data D21 can be provided to the customer by a minimum investment by exchanging the content data D21 for the packaged media.

As a result, in this data providing system 500, the customer can remarkably easily obtain the content data D21 distributed on the Internet.

In this data providing system 500, such equivalent exchange between the content data D21 and the packaged media is executed. Thus, the customer can remarkably easily use that system.

Furthermore, in this data providing system 500, only the customer who uses the portable dedicated terminal 502 only accessible the data providing server 501 can use the equivalent exchange. Thereby, it can be surely prevented that the above customer illegally uses the equivalent exchange by means of content data that was obtained from a server other than the data providing server 501 at a price different from the providing price by the data providing server 501, or that the customer illegally uses the equivalent exchange by means of content data that was downloaded from packaged media.

According to the above configuration, the data providing server 501 sends the specified content data D21 according to the rental request from the customer's portable dedicated terminal 502 to the portable dedicated terminal 502 for storing and rental. Then, an exchange of the rented content data D21 for packaged media is requested from the portable dedicated terminal 502, the data providing server 501 detects exchangeable packaged media, and shows a term to make the exchange value between the packaged media and the content data D21 owned by the customer equal. Thereby, even if the customer obtained the content data by distribution, the customer can exchange his/her content data D21 for the packaged media by a minimum investment. Thereby, the customer can remarkably easily obtain the content data D21 distributed on the Internet 504. Thus, a data providing system that can popularize the distribution of content data can be accomplished.

Note that, in the aforementioned seventh embodiment, it has dealt with the case where the content data D21 rented by the customer is equivalently exchanged for the packaged media by the data providing server 501. However, this invention is not only limited to this but also content data sold to the customer may be equivalently exchanged for packaged media by the data providing server 501.

In this connection, in the aforementioned seventh embodiment, since the content data D21 being rented is equivalently exchanged for the packaged media, the above content data D21 is erased for return when the rental term passed. However, in the case where content data sold to the customer is equivalently exchanged for packaged media storing the same content data, it can be said that the above customer does not illegally own different content data. Therefore, the content data equivalently exchanged for the packaged media may be erased, or the customer may hold that as it is.

In the aforementioned seventh embodiment, it has dealt with the case where the packaged media specified for the equivalent exchange is delivered to the customer by the package providing server 503. However, this invention is not only limited to this but also the packaged media may be directly handed to the customer at the agency when the customer came to return the content data D21.

Furthermore, in the aforementioned seventh embodiment, it has dealt with the case where the content data D21 being a single tune owned by the customer is equivalently exchanged for the packaged media being a single CD. However, this invention is not only limited to this but also the content data D21 being a single tune may be equivalently exchanged for packaged media being an album CD.

In the aforementioned seventh embodiment, it has dealt with the case where the musical content data and the musical packaged media were equivalently exchanged (a single tune and a single CD). However, this invention is not only limited to this but also various content data other than that, such as a motion picture and a book can be adapted. Thereby, the convenience and the versatility of a data providing system can be remarkably improved, and the distribution of content data can be further popularized.

In the aforementioned seventh embodiment, it has dealt with the case where the customer pays the balance in the equivalent exchange by money. However, this invention is not only limited to this but also the data providing server 501 may issue a point to give a privilege such as a discount to the customer according to the rental and the purchase of content data, and the customer may accumulate and use the points for the payment of the balance instead of a part of or all of the money.

In the aforementioned seventh embodiment, it has dealt with the case where the customer rents the content data D21 from the data providing server 501 by the portable dedicated terminal 502 only accessible the above data providing server 501, and equivalently exchanges the content data D21 for the packaged media. However, this invention is not only limited to this but also, provided that it is a device connectable to the Internet 504 such as a personal computer, a portable telephone, the customer may purchase or rent content data from the data providing server 501 by such device, and may equivalently exchange content data that the customer purchased or rented for packaged media.

In this connection, in the case where the customer uses the data providing server 501 by means of another device different from the portable dedicated terminal 502, such as a personal computer and a portable telephone, server identifying information for identifying the data providing server 501 being the provider of content data is added to content data purchased or rented from the data providing server 501, in the above device. If an equivalent exchange is requested by the customer, when the data providing server 501 judges whether to permit or forbid the equivalent exchange, the data providing server 501 judges whether or not the content data specified for the equivalent exchange was provided from the data providing server 501 by the server identifying information. If the specified content data was obtained from another data providing server, the data providing server 501 forbids the equivalent exchange. Thereby, it can be prevented that the data providing server 501 suffers losses by executing the equivalent exchange of the content data provided by the other data providing server.

Furthermore, in the case where content data rented by a device different from the portable dedicated terminal 502 is equivalently exchanged for packaged media, the data providing server 501 erases the content data in that device when it received exchange approval data from the device, and on the confirmation of that, it permits the equivalent exchange. Thereby, it can be prevented that the customer illegally commits an equivalent exchange by using the content data that was equivalently exchanged once in the device different from the portable dedicated terminal 502, again.

(9) Eighth Embodiment

Figure 45:
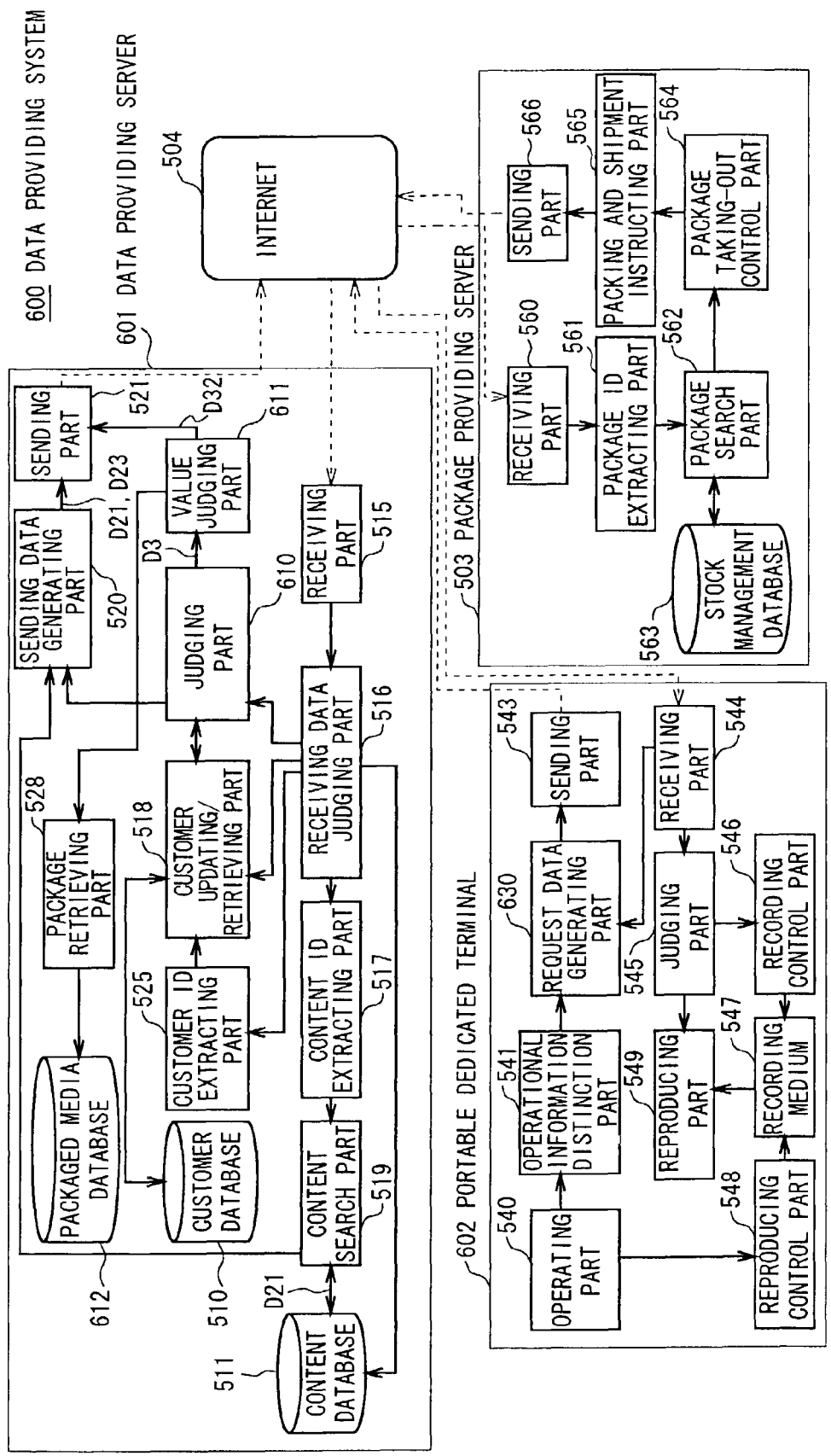
FIG. 45 is a block diagram showing the configuration of a data providing system according to an eighth embodiment.

FIG. 45 in which the same reference numerals are added to corresponding parts in FIG. 38 shows a data providing system 600 according to an eighth embodiment. The data providing system 600 is configured similarly to the aforementioned data providing system 500 according to the seventh embodiment except for the configuration of a data providing server 601 and a portable dedicated terminal 602 only accessible the data providing server 601.

In this case, if the data providing server 601 receives content specifying data from the portable dedicated terminal 602 by the receiving part 515, it performs processing similarly to the data providing server 501 according to the seventh embodiment described above with reference to FIGS. 38 and 39, and sends content data D21 in which header data D23 has been added from the sending part 521 to the portable dedicated terminal 602 via the Internet 504. In this manner, the specified content data D21 is rented to the customer.

In this connection, when the rental term of the content data D21 expired, if the customer brings the portable dedicated terminal 602 into the agency, the agency erases the content data D21 for return. Although the rental term expired, if the customer does not bring the portable dedicated terminal 602 into the agency, the content data D21 is erased or made to be irreproducible for return by the internal mechanism of the portable dedicated terminal 602.

By the way, in the data providing server 601, the customer can equivalently exchange his/her one or plural content data D21 being a single tune for packaged media being a single CD or an album CD.

Specifically, if the customer sends equivalent exchange request data D40 for requesting an equivalent exchange, for example, of plural content data D21 (single tunes) that the customer owns by rental for packaged media (album CD) from the portable dedicated terminal 602, the data providing server 601 receives this by the receiving part 515, and takes this in the receiving data judging part 516.

Figure 46:
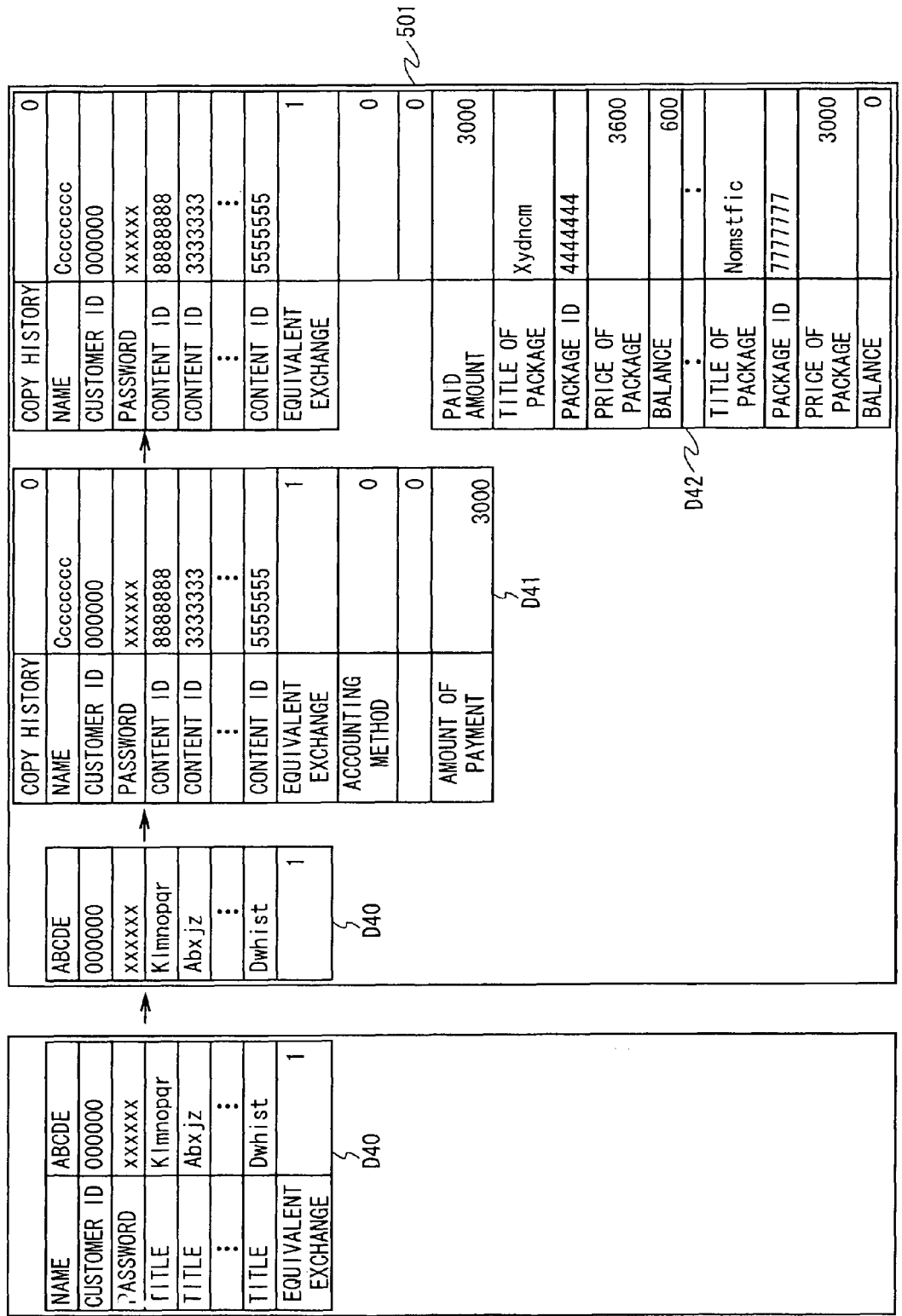
FIG. 46 is a schematic diagram for explaining the request of an equivalent exchange.

Here, as shown in FIGS. 45 and 46, in the equivalent exchange request data D40, equivalent exchange information representing the customer's name, customer ID, password, titles of the plural content data D21 that the customer specified for the equivalent exchange, and the presence/absence of equivalent exchange (in this case, "1" is represented) has been stored.

The data providing server 601 transmits the equivalent exchange request data D40 from the receiving data judging part 516 to a judging part 610 sequentially via the customer ID extracting part 525 and the customer data updating/retrieving part 518.

The data providing server 601 judges whether to permit or forbid the equivalent exchange by the judging part 610, similarly to the case described above with reference to FIGS. 38 and 40. In the case where the data providing server 601 permits the equivalent exchange, the data providing server 601 adds information about the customer's coded name, content ID of the content data D21 specified for the equivalent exchange, paying method of the rental charges, and amount that the customer practically paid, to the equivalent exchange request data D40, and generates equivalent exchange processing data D41, and transmits this to a value judging part 611.

Here, as shown in FIGS. 47A to 47C, in a packaged media database 612 provided in the data providing server 601, a content data table 620 for content data D21, a single data table 621 for single being a single CD, and an album data table 622 for packaged media being an album CD have been previously stored.

In this case, the content data table 620 is formed by making correspondence between the title of content data D21 that the data providing server 501 sells/rents and a content ID, and for example, among a point to be allocated according to the ranking of the year (hereinafter, this is referred to as ranking point) (for instance, if the content data D21 is the tune that got the first rank in the ranking of the year, obtaining requests may be comparatively many, so that 10 points are allocated, and if the content data D21 is the tune at the lowest rank, obtaining requests may be comparatively few, so that 1 point is allocated, a point to be allocated according to the date of release (hereinafter, this is referred to as date point) (for instance, if the date of release that the content data D21 was released at first is recent, obtaining requests may be comparatively many, so that 10 points are allocated, and if the content data D21 is a tune quite old, obtaining requests may be comparatively few, 1 point is allocated), and a total point obtained by totaling up these ranking points and date points, are corresponded to the content data D21 as market value.

The single data table 621 is formed by making correspondence among the title of packaged media being a single CD, a package ID, market value composed of the ranking point and the date point, and a selling price. And the album data table 622 is formed by making correspondence among the title of packaged media being an album CD, a package ID, market value composed of the ranking point and the date point, and a selling price.

The data providing server 601 retrieves a data table in the content data table 620 in the packaged media database 612 according to retrieval conditions previously set in the package retrieving part 528, and reads out and adds all of the total points respectively allocated to the plural content data D21 respectively (single tunes) that the customer specified for the equivalent exchange, and computes the total points of these plural content data D21 (hereinafter, this is referred to as total points) by the value judging part 611.

The data providing server 601 retrieves a data table in the album data table 622 in the packaged media database 612 based on the total points computed by the value judging part 611 by the package retrieving part 528, and detects one or plural exchangeable packaged media being an album CD and reads the title, the package ID and the selling price of the above detected packaged media.

In this manner, if the data providing server 601 detects one or plural exchangeable packaged media that, the data providing server 601 compares the selling price of the above packaged media with the rental charges that the customer paid for the plural content data D21, and computes the balance, in order to make the exchange value between them equal by the value judging part 611.

The data providing server 601 stores the title and the package ID of the one or plural packaged media, the equivalent exchange request data D31 for, and the terms of the equivalent exchange, for example, "the customer pays the balance", "the data providing server pays the balance to the customer", or "the equivalent exchange can be executed without paying the balance because the selling price and the rental charges are the same amount", and generates equivalent exchange term showing data D42 by the value judging part 611.

Then, the data providing server 601 sends the equivalent exchange term showing data D42 from the sending part 521 to the portable dedicated terminal 602 via the Internet 504. Thereby, as shown in FIGS. 48A to 48C, the one or plural exchangeable packaged media and the term are notified to the customer.

As a result, if exchange approval data that represents the approval of the equivalent exchange, and in the case where there are plural exchangeable packaged media that represents packaged media selected by the customer from among these packaged media is sent from the portable dedicated terminal 602, the data providing server 601 receives this by the receiving part 515, and transmits this from the receiving data judging part 516 to the judging part 610. The data providing server 601 confirms that the customer approved the equivalent exchange and the selected packaged media by the exchange approval data by the above judging part 610.

Then, the data providing server 601 generates package delivery ordering information by means of the package ID of the packaged media that the customer selected for the equivalent exchange by the judging part 610, and transmits this to the sending data generating part 520 to generate package delivery ordering data, and transmits this from the sending part 521 to the package providing server 503 via the Internet 504.

Thereafter, the data providing server 601 performs processing similarly to the data providing server 501 according to the seventh embodiment described above with reference to FIG. 38. In this manner, the plural content data D21 that the customer owns and one packaged media being an album CD are made equivalent, and they are equivalently exchanged.

On the other hand, in the portable dedicated terminal 602 shown in FIG. 45, if the customer enters specifying information on content data that the customer wants to rent by the operating part 540, the portable dedicated terminal 602 executes the similar processing to the portable dedicated terminal 502 according to the seventh embodiment described above with reference to FIG. 38, and the content data D21 is rented to the customer from the data providing server 601.

Furthermore, if the customer enters an equivalent exchange request specifying the plural content data D21 for the equivalent exchange by the operating part 540, the portable dedicated terminal 602 generates the equivalent exchange request data D40 described above with reference to FIG. 46 by a request data generating part 630, and sends this from the sending part 543 to the data providing server 601 via the Internet 504.

As a result, if the equivalent exchange term showing data D42 is sent from the data providing server 601 via the Internet 504, the portable dedicated terminal 602 receives this by the receiving part 544, and transmits this to the reproducing part 549 via the judging part 545. Thus, the title of the one or plural packaged media to be equivalently exchanged, and the term for the equivalent exchange for each packaged media (to pay/receive the balance, or there is no balance) are notified to the customer.

As a result, if the customer sends the approval of the equivalent exchange and information representing the packaged media that the customer selected for the equivalent exchange from among the plural packaged media by the operating part 540, the portable dedicated terminal 602 generates exchange approval data representing the above approval and selected packaged media by the request data generating part 630, and sends this from the sending part 543 to the data providing server 601 via the Internet 504.

Thereafter, if the equivalent exchange permitting data is sent from the data providing server 601 via the Internet 504, the portable dedicated terminal 602 receives this by the receiving part 544, and transmits this to the reproducing part 549 via the judging part 545. Thereby, the permission of the equivalent exchange, the delivery method of the packaged media, etc. are notified to the customer.

In this connection, if equivalent exchange forbidding data is sent from the data providing server 601 via the Internet 504, the portable dedicated terminal 602 receives this by the receiving part 544 and transmits this from the judging part 545 to the reproducing part 549. Thus, that the forbidding of the equivalent exchange is notified to the customer.

Here, equivalent exchange processing procedures by the data providing server 601, the portable dedicated terminal 602 and the package providing server 503 in the data providing system 600 will be collectively described. As shown in FIGS. 49A and 50A in that the same reference numerals are added to corresponding part in FIGS. 43A and 44A, first, the portable dedicated terminal 602 enters routine RT35 from the starting step, proceeds to step SP351 and sequentially executes the processing of the aforementioned steps SP351 to SP354, and proceeds to step SP401.

In step SP401, the portable dedicated terminal 602 awaits that the customer enters the equivalent exchange request specifying plural content data D21 for the equivalent exchange by the operating part 540. Until the equivalent exchange request is entered, the portable dedicated terminal 602 returns to step SP351 and repeats the processing loop of steps SP352-SP353-SP354-SP401.

In step SP401, if the equivalent exchange request is entered via the operating part 540, the portable dedicated terminal 602 proceeds to step SP402 to generate the equivalent exchange request data D40 by the request data generating part 630 and transmit this from the sending part 543 to the data providing server 601, and then it proceeds to step SP357.

On the other hand, as shown in FIGS. 49B and 50B in that the same reference numerals are added to corresponding parts in FIGS. 43B and 44B, the data providing server 601 enters routine RT36 from the start step, proceeds to step SP371, and sequentially executes the processing of the aforementioned steps SP371 to SP375. In step SP374, if the data providing server 601 permits the equivalent exchange, it proceeds to step SP411.

In step SP411, the data providing server 601 detects one or plural packaged media having the same total points as the plural content data D21 owned by the customer, as exchangeable packaged media, generates the equivalent exchange term showing data D42 representing a term to make the exchange value between them equal by the value judging part 611, and transmits this from the sending part 521 to the portable dedicated terminal 602, and then proceeds to step SP412.

At this time, in step SP357, the portable dedicated terminal 602 awaits the equivalent exchange term showing data D42 or the equivalent exchange forbidding data from the data providing server 601. If the portable dedicated terminal 602 receives either data by the receiving part 544, it proceeds to step SP358. If the received data is the equivalent exchange term showing data D42, the portable dedicated terminal 602 proceeds to step SP403.

In step SP403, the portable dedicated terminal 602 generates the exchange approval data representing the approval of the equivalent exchange and packaged media that the customer selected for the equivalent exchange from among the plural packaged media by the request data generating part 630 according to the customer's operation of the operating part 540, transmits the above generated exchange approval data from the sending part 543 to the data providing server 601, and proceeds to step SP361. Thereafter, if the portable dedicated terminal 602 receives the equivalent exchange permitting data by the receiving part 544, it proceeds to step SP404 to finish the above processing.

Furthermore, in step SP412, the data providing server 601 awaits that the exchange approval data is sent from the portable dedicated terminal 602. If the data providing server 601 receives the above exchange approval data by the receiving part 515, it sequentially executes the processing of the aforementioned steps SP379 to SP381, and then proceeds to step SP413 to finish the above processing. Thus, all of the equivalent exchange processing procedure in the data providing system 600 is finished.

According to the above configuration, in this data providing system 600, if content specifying data for requesting the rental of content data D21 is sent from the portable dedicated terminal 602 to the data providing server 601, the data providing server 601 sends the specified content data D21 to the portable dedicated terminal 602 for storing. Thus, the customer can rent the content data D21 within the portable dedicated terminal 602.

Then, in this data providing system 600, if equivalent exchange request data D30 for requesting the equivalent exchange of the lumped plural content data D21 (single tunes) owned by the customer by rental for one packaged media (album CD) is sent from the portable dedicated terminal 602 to the data providing server 601, the data providing server 601 detects the total points of these plural content data D21, detects the packaged media (album CD) having the same total points as the above detected total point as exchangeable packaged media, and sends equivalent exchange term showing data D42 showing a term to make the exchange value between each of the above detected packaged media and the plural content data owned by the customer equal, to the portable dedicated terminal 602.

As a result, in the data providing system 600, if equivalent exchange approval data representing the approval of the equivalent exchange and packaged media that the customer selected for equivalent exchange is sent from the portable dedicated terminal 602 to the data providing server 601, the balance in the equivalent exchange is settled, the plural content data owned by the customer are erased for return from the portable dedicated terminal 602, and the packaged media is delivered to the customer. In this manner, the exchange value between the plural content data D21 owned by the customer and the packaged media being an album CD is made to be equal, and the plural content data D21 is exchanged for the packaged media.

Accordingly, in this data providing system 600, when in retrieving exchangeable packaged media, the total points of the plural content data D21 and the total points of the packaged media are matched. Therefore, the plural content data D21 owned by the customer can be equivalently exchanged for the packaged media being an album CD storing content data same as or different from them.

Then, in this data providing system 600, by performing such matching by points in the data providing server 601, for instance, plural content data D21 can be equivalently exchanged for packaged media being one single CD, or even one content data D21 can be equivalently exchanged for packaged media being an album CD. Thus, the convenience of equivalent exchange can be remarkably improved.

As a result, in this data providing system 600, the customer can further remarkably easily use the system. If the number of users of the present system increases by this, the distribution of content data on the Internet can be further popularized.

According to the above configuration, the data providing server 601 sends the content data D21 that was specified by the rental request from the customer's portable dedicated terminal 602 to the portable dedicated terminal 602 for storing and rental. Thereafter, if the customer requests to equivalently exchange the content data D21 that he/she rents for packaged media by the portable dedicated terminal 602, the data providing server 601 detects exchangeable packaged media by matching points of the above specified content data D21 with points of the packaged media that was selected according to the market value, and shows a term to make the exchange value between them equal. Thereby, in addition to the effect obtained by the aforementioned seventh embodiment, convenience in equivalent exchange in a data providing system can be remarkably improved. Thus, the data providing system that can further popularize the distribution of content data on the Internet can be accomplished.

Note that, in the aforementioned eighth embodiment, it has dealt with the case where the points are allocated to the content data, the packaged media being a single CD and the packaged media being an album CD respectively, according to the ranking of the year and the date of release. However, this invention is not only limited to this but also, in addition to the ranking of the year and the date of release, 1 point may be allocated to media that were comparatively sold a lot, because its scarcity value may be relatively low, and 10 points may be allocated to media that were not almost sold, because its scarcity value may be relatively high. Furthermore, points may be allocated according to one of them, the ranking of the year, the date of release, and the sales, or by combining them.

In the aforementioned eighth embodiment, it has dealt with the case where the content data D21 being rented by the customer is equivalently exchanged for the packaged media by the data providing server 601. However, this invention is not only limited to this but also content data sold to the customer may be equivalently exchanged for packaged media by the data providing server 601.

In this connection, in the aforementioned eighth embodiment, since the content data D21 being rented was equivalently exchanged for the packaged media, the above content data D21 was erased for return when the rental term had expired. However, in the case where the customer requested an equivalent exchange of content data that he/she purchased for packaged media storing the same content data, it can be said that the customer may not illegally own different content data, so that the content data already equivalently exchanged for the packaged media may be kept by the customer as it is.

In the aforementioned embodiment, it has dealt with the case where the packaged media to be equivalently exchanged for the content data D21 owned by the customer is delivered to the customer by the package providing server 503. However, this invention is not only limited to this but also the packaged media may be directly handed to the customer at the agency.

In the aforementioned eighth embodiment, it has dealt with the case where the equivalently-exchanged content data and package data are musical data (single tune and single CD). However, this invention is not only limited to this but also, as content data and packaged media to be equivalently exchanged, various contents other than that, such as a motion picture, and a book can be applied. Thereby, the convenience and the versatility of a data providing system can be remarkably improved, and the distribution of content data on the Internet can be further popularized.

In the aforementioned eighth embodiment, it has dealt with the case where the balance to make the exchange value in the equivalent exchange between the content data D21 owned by the customer and the packaged media equal is settled by money. However, this invention is not only limited to this but also points to give the customer a privilege such as a discount may be issued according to the amount of the rental and the purchase of content data by the data providing server 601 and stored in the data providing server 601, and the balance may be settled by that points that the customer obtained, instead of a part of or all of money.

Furthermore, in the aforementioned eighth embodiment, it has dealt with the case where the rental of the content data D21 is performed from the data providing server 601 by means of the portable dedicated terminal 602 that is only accessible the above data providing server 601, and equivalently exchanged the above content data D21 for the packaged media. However, this invention is not only limited to this but also, provided that it is a device connectable to the Internet 504 such as a personal computer and a portable telephone, the customer may purchase/rent content data from the data providing server 601 by means of such device, and may equivalently exchange the content data for packaged media.

In this connection, when in using the data providing server 601 by means of another device other than the portable dedicated terminal 602, such as a personal computer and a portable telephone, the data providing server 601 previously adds server identification information for identifying the data providing server 601 being the provider of content data to be purchased/rented from the data providing server 601. If the customer requests to equivalently exchange content data owned by the customer for packaged media, the data providing server 601 judges whether to permit the equivalent exchange by the server identification information: whether or not the content data specified by the customer is data which was provided from the data providing server 601. If the content data specified by the customer is data that was provided from another data providing server, the data providing server 601 does not permit the equivalent exchange. Thereby, it can be prevented that the data providing server suffers losses by executing the equivalent exchange of content data provided from another data providing server.

Furthermore, in the case where the customer equivalently exchanges content data renting from a device other than the portable dedicated terminal 602 for packaged media, the portable dedicated terminal 602 erases the content data that has been recorded in that device when the portable dedicated terminal 602 received the exchange approval data from the above device, and the data providing server 601 permits the equivalent exchange of the above content data for the packaged media upon that confirmation has got. Thereby, it can be prevented that the customer commits illegal equivalent exchange by using the content data for rental that was equivalently exchanged once by the device other than the portable dedicated terminal 602, again.

(10) Ninth Embodiment

Figure 51:
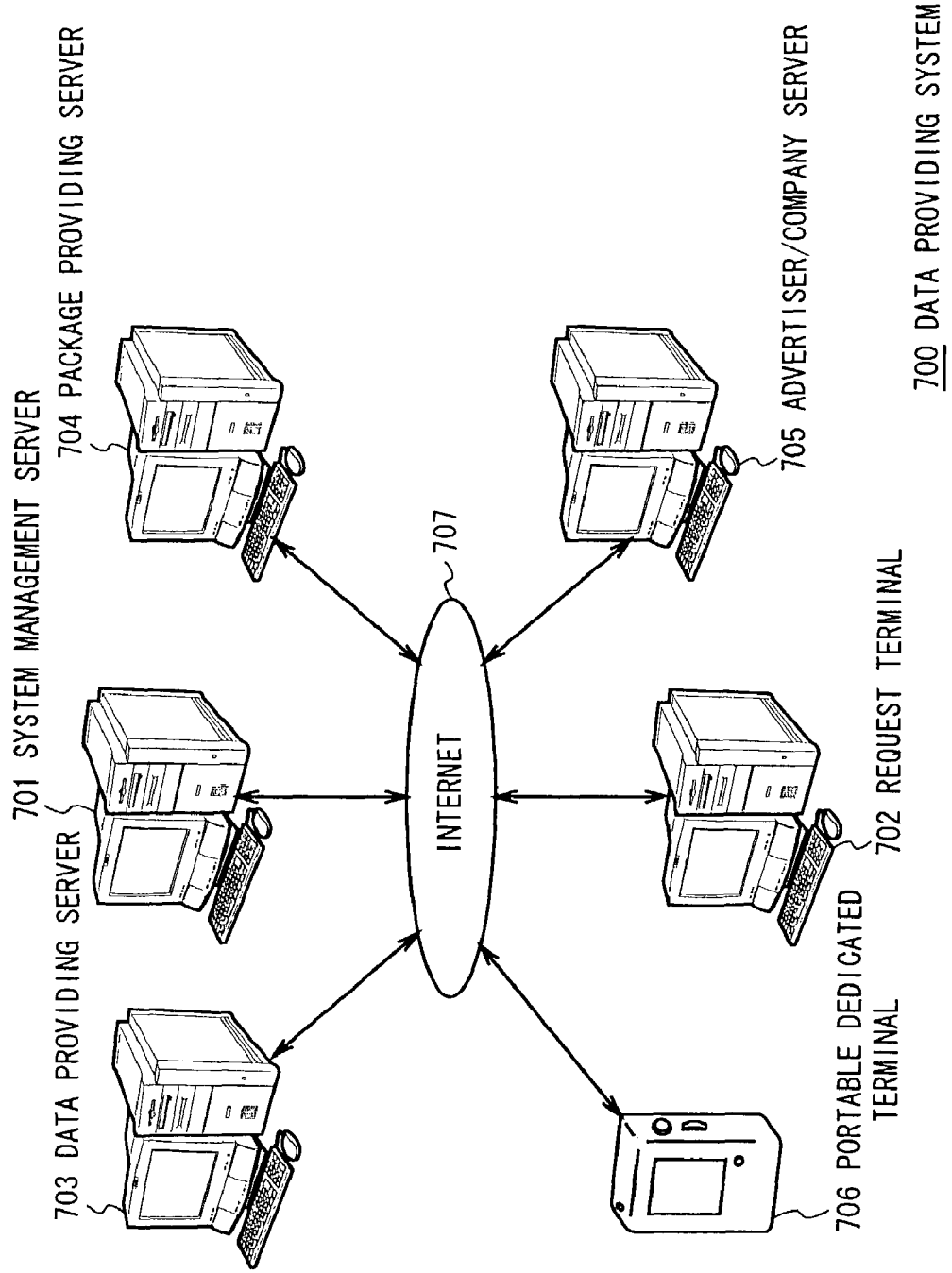
FIG. 51 is a schematic diagram showing the configuration of a data providing system according to a ninth embodiment.

FIG. 51 shows a data providing system 700 according to a ninth embodiment. In the data providing system 700, a request terminal 702 being a personal computer corresponding to the request terminal used by the customer 3 described above with reference to FIGS. 1 to 3, a data providing server 703 being a personal computer corresponding to the agencies 4A to 4N described above with reference to FIGS. 1 to 3, a package providing server 704 being a personal computer corresponding to the sales company 5 described above with reference to FIGS. 1 to 3, and an advertiser/company server 705 being a personal computer corresponding to the advertiser/company site 6 described above with reference to FIGS. 1 to 3, and a portable dedicated terminal 706 corresponding to the portable dedicated terminals 7A to 7N described above with reference to FIGS. 1 to 3 are respectively connected to a system management server 701 being a personal computer corresponding to the system management site 2 described above with reference to FIGS. 1 to 3 on the Internet 707.

Figure 52:
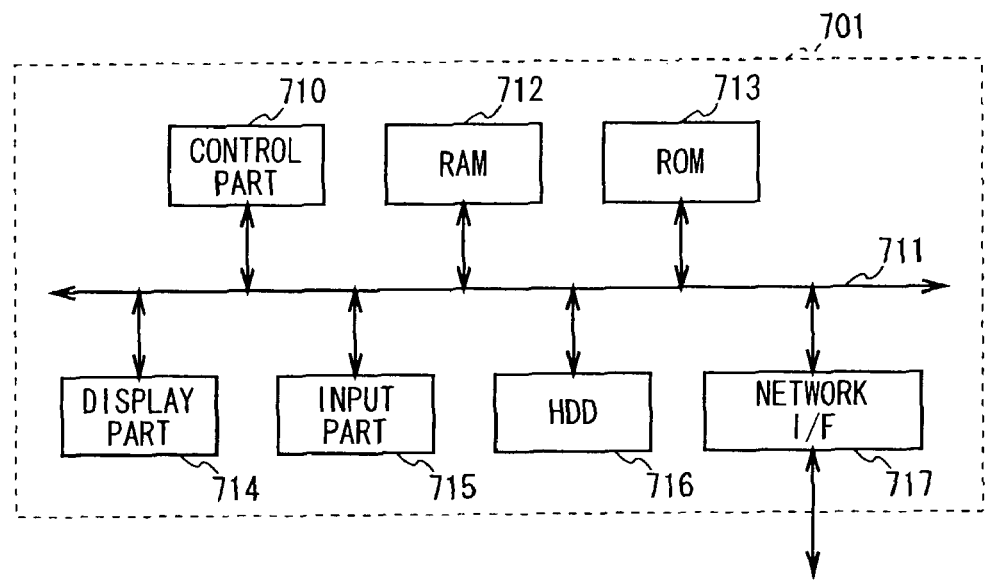
FIG. 52 is a block diagram showing the circuit configuration of a system management server.

As shown in FIG. 52, in the system management server 701, a random access memory (RAM) 712, a read only memory (ROM) 713, a display part 714, an input part 715, a hard disk drive (HDD) 716 and a network interface 717 are connected to a control part 710 such as a central processing unit (CPU) via a bus 711.

In this case, the control part 710 reads various programs previously stored from the ROM 713 and expands them on the RAM 712. By these various programs, the system management server 701 can execute the processing similar to the updating part 60 and the matching part 63 described above with reference to FIG. 4, the accounting part 116 described above with reference to FIG. 5, the accounting part 156, the content ID extracting part 161, the content retrieving part 162 and the sending data generating part 164 described above with reference to FIG. 8, the advertiser/company information updating part 213, the customer information updating part 215 and the matching part 216 described above with reference to FIG. 11, and the matching part 268 described above with reference to FIG. 25.

In this connection, the system management server 701 executes the processing similar to them according to the various programs previously stored in the ROM 713. However, these various processing may be executed by providing a program storing medium that stores these various programs in the system management server 701.

Note that, such program storing medium is not only limited to packaged media such as a flexible disk, a CD-ROM, and a DVD but also it may be a semiconductor memory, a magnetic disc, etc., that can temporarily or permanently store the various programs. Furthermore, as means for storing these various programs in the program storing medium, a cable or radio communication medium such as a local area network, the Internet, and digital satellite broadcasting can be used, and they may be stored via various communication interfaces such as a router and a modem.

The control part 710 stores and manages various information such as the customer registration information, and the advertiser/company registration information, that will be used in the whole system, in the hard disk drive 716.

Furthermore, the control part 710 can send/receive information such as the customer information, the advertiser/company information, the customer introducing information, and the advertiser/customer introducing information, to/from the request terminal 702, the data providing server 703, the package providing server 704, the advertiser/company server 705 and the portable dedicated terminal 706 via the network interface 717.

In this manner, the system management server 701 being a personal computer can function in similar to the system management site 2 described above with reference to FIG. 1 according to the various programs.

In this connection, the system management server 701 uses the input part 715 and the display part 714 to confirm the various information stored in the hard disk drive 716.

Figure 53:
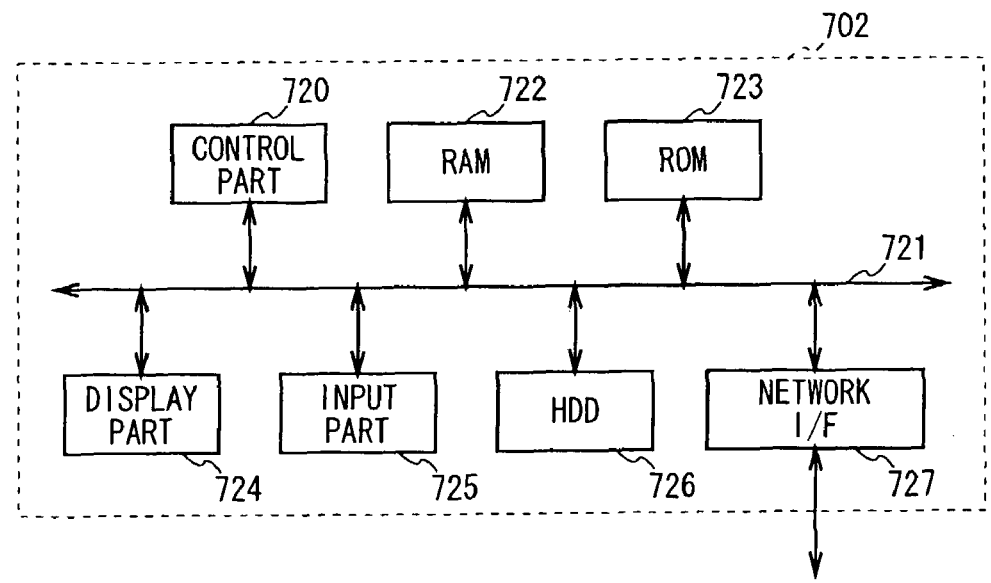
FIG. 53 is a block diagram showing the circuit configuration of a request terminal.

As shown in FIG. 53, in the request terminal 702, a RAM 722, a ROM 723, a display part 724, an input part 725, a hard disk drive 726 and a network interface 727 are connected to a control part 720 such as a CPU, via a bus 721.

In this case, the control part 720 reads various programs previously stored in the ROM 723, and expands them on the RAM 722. By these various programs, the request terminal 702 can execute processing similar to the request data generating part 71 and the display control part 74 described above with reference to FIG. 4, the operational information judging part 121, the request data generating part 122, the judging part 125 and the accounting part 127 described above with reference to FIG. 5, and the request data generating part 321 and the display control part 324 described above with reference to FIG. 28.

In this connection, the request terminal 702 executes the processing similar to them according to the various programs previously stored in the ROM 723. However, these various processing may be executed by providing a program storing medium in that these various programs have been stored in the request terminal 702.

Note that, such program storing medium is not only limited to packaged media such as a flexible disk, a CD-ROM, and a DVD, but also it may be a semiconductor memory, a magnetic disc, etc., that can temporarily or permanently store the various programs. As means for storing the various programs in the program storing medium, a cable or radio communication medium such as a local area network, the Internet, and digital satellite broadcasting may be used, and they may be stored via various communication interfaces such as a rooter and a modem.

The control part 720 stores and manages various information such as address information on the accessible system management server 701 and the data providing server 703 in the hard disk drive 726.

Furthermore, the control part 720 can send/receive various information such as the customer information and a content data obtaining request to/from the system management server 701 and the data providing server 703 via the network interface 727.

In this connection, in the request terminal 702, when the customer performs the rental reservation of content data and the portable dedicated terminal 706 to the data providing server 703, the input part 725 and the display part 724 are used.

Figure 54:
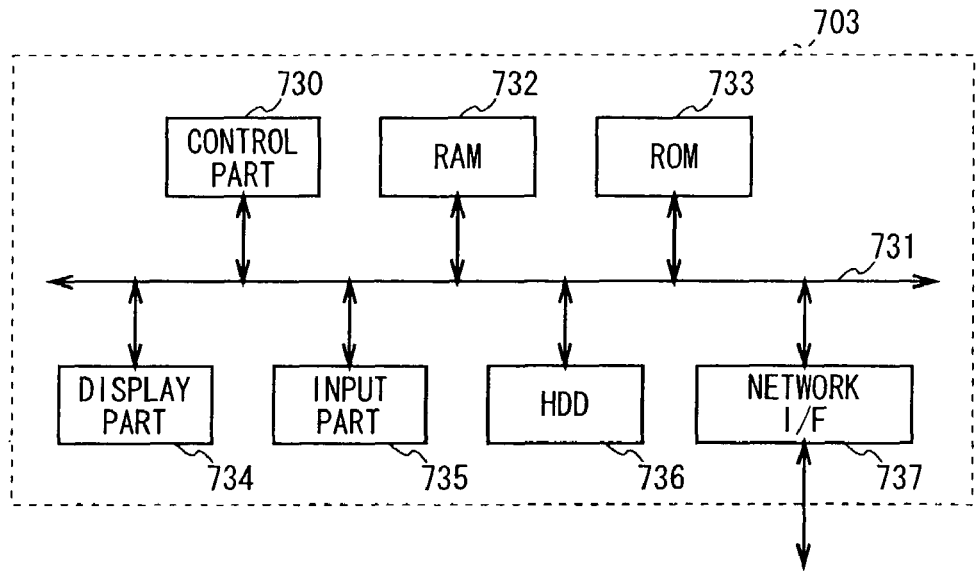
FIG. 54 is a block diagram showing the circuit configuration of a data providing server.

As shown in FIG. 54, in the data providing server 703, a RAM 732, a ROM 733, a display part 734, an input part 735, a hard disk drive 736 and a network interface 737 are connected to a control part 730 such as a CPU, via a bus 731.

In this case, the control part 730 reads various programs previously stored from the ROM 733, and expands them on the RAM 732. By these various programs, the data providing server 703 can execute processing similar to the content retrieving part 62 and the package retrieving part 64 described above with reference to FIG. 4, the recording control part 117 described above with reference to FIG. 5, the receiving data judging part 155, the recording control part 157, the operational information judging part 158 and the request data generating part 159 described above with reference to FIG. 8, the retrieving part 315 and the matching part 316 described above with reference to FIG. 28, the receiving data judging part 516, the content ID extracting part 517, the customer updating/retrieving part 518, the content retrieving part 519, the sending data generating part 520, the customer ID extracting part 525, the judging part 526, the value judging part 527 and the package retrieving part 528 described above with reference to FIG. 38, and the judging part 610 and the value judging part 611 described above with reference to FIG. 45.

In this connection, the data providing server 703 performs the processing similar to them according to the various programs previously stored in the ROM 733. However, these various processing may be performed by providing a program storing medium storing these various programs in the data providing server 703.

Note that, such program storing medium is not only limited to packaged media such as a flexible disk, a CD-ROM, and a DVD but also it may be a semiconductor memory, a magnetic disc, etc., that can temporarily or permanently store the various programs. Furthermore, as means for storing the various programs in the program storing medium, a cable or radio communication medium such as a local area network, the Internet, and digital satellite broadcasting may be used, and they may be stored via various communication interfaces such as a rooter and a modem.

The control part 730 stores and manages various information such as customer registration information on the customer using the agency, content data to be provided to the portable dedicated terminal 706 in the hard disk drive 736.

Furthermore, the control part 730 can send/receive various information such as the customer information, content data, and package delivery ordering data to/from the system management server 701, the package providing server 704, and the request terminal 702 and the portable dedicated terminal 706 connected via the above system management server 701, via the network interface 737.

In this connection, in the data providing server 703, when in requesting the system management server 701 to send content data, and when in confirming various information stored in the hard disk drive 736, the input part 735 and the display part 734 are used.

Figure 55:
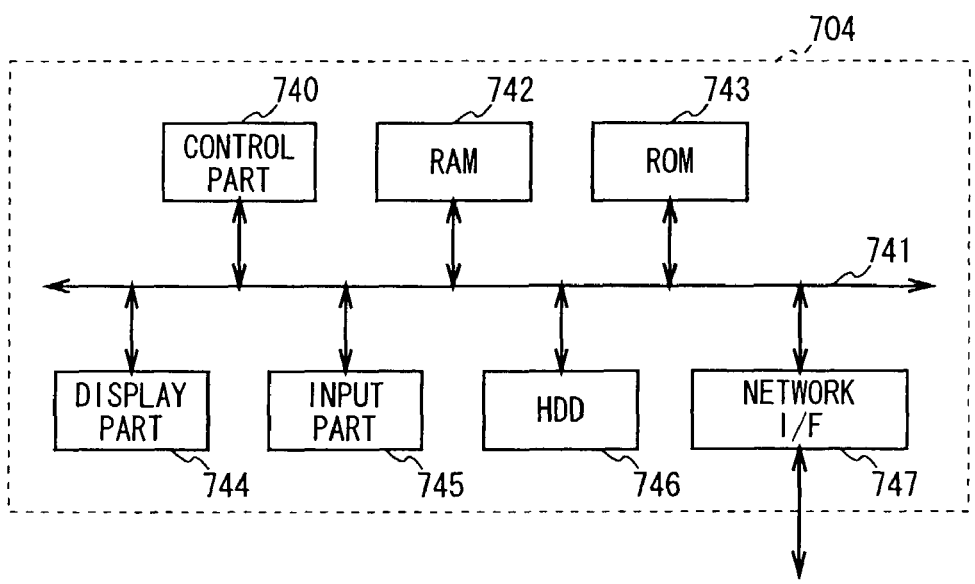
FIG. 55 is a block diagram showing the circuit configuration of a package providing server.

As shown in FIG. 55, in the package providing server 704, a RAM 742, a ROM 743, a display part 744, an input part 745, a hard disk drive 746 and a network interface 747 are connected to a control part 740 such as a CPU, via a bus 741.

In this case, the control part 740 reads various programs previously stored in the ROM 743, and expands them on the RAM 742. By these various programs, the package providing server 704 can execute processing similar to the package ID extracting part 561, the package retrieving part 562, the package taking-out control part 564 and the packing and shipment instructing part 565 described above with reference to FIG. 38.

In this connection, the package providing server 704 executes the processing similar to them according to the various programs previously stored in the ROM 743. However, these various processing may be executed by providing a program storing medium storing these various programs in the package providing server 704.

Note that, such program storing medium is not only limited to packaged media such as a flexible disk, a CD-ROM, and a DVD, but also it may be a semiconductor memory, a magnetic disk, etc., that can temporarily or permanently store various programs. Furthermore, as means for storing the various programs in the program storing medium, a cable or radio communication medium such as a local area network, the Internet, and digital satellite broadcasting may be used, and they may be stored via various communication interfaces such as a rooter and a modem.

The control part 740 stores and manages various information such as the stock of packaged media and storing information in the hard disk drive 746.

Furthermore, the control part 740 can send/receive various information such as the package delivery ordering data and delivery arrangement completion data to/from the data providing server 703 via the network interface 747.

In this connection, in the package providing server 704, for instance, when in confirming the various information stored in the hard disk drive 746, the input part 745 and the display part 744 are used.

Figure 56:
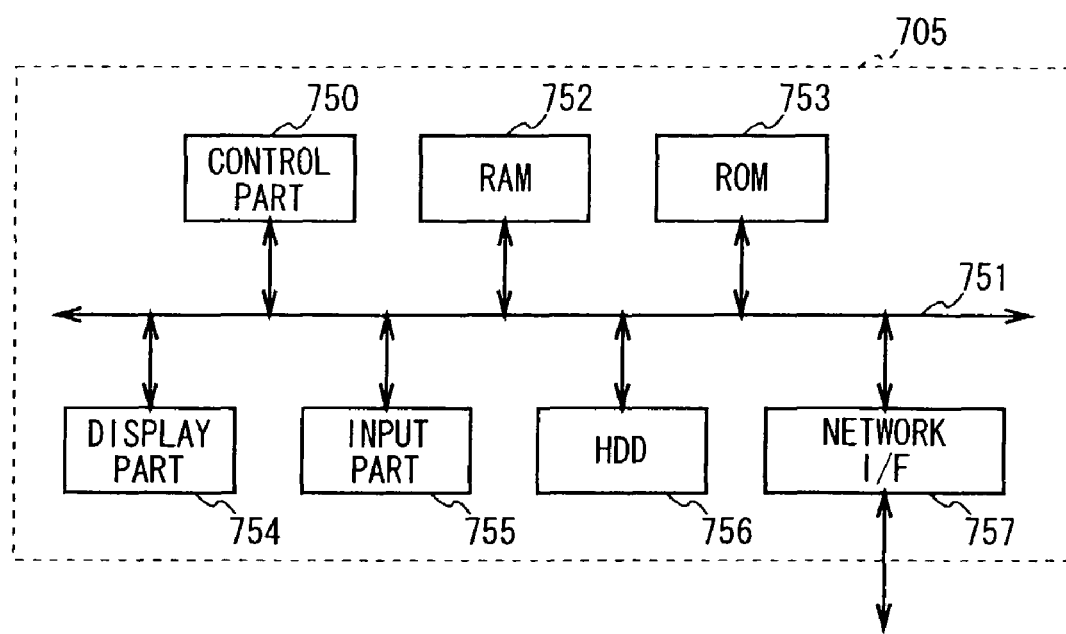
FIG. 56 is a block diagram showing the circuit configuration of an advertiser/company server.

As shown in FIG. 56, in the advertiser/company server 705, a RAM 752, a ROM 753, a display part 754, an input part 755, a hard disk drive 756 and a network interface 757 are connected to a control part 750 such as a CPU, via a bus 751.

In this case, the control part 750 reads various programs previously stored in the ROM 753, and expands them on the RAM 752. By these various programs, the advertiser/company server 705 can execute processing similar to the sending control part 231, the display control part 234, the customer selecting part 237 and the sending data generating part 238 described above with reference to FIG. 11.

In this connection, the advertiser/company server 705 executes the similar processing to them according to the various programs previously stored in the ROM 753. However, these various processing may be executed by providing a program storing medium storing these various programs in the advertiser/company server 705.

Note that, such program storing medium is not only limited to packaged media such as a flexible disk, a CD-ROM, and a DVD but also it may be a semiconductor memory, a magnetic disk, etc., that can temporarily or permanently store various programs. Furthermore, as means for storing the various programs in the program storing medium, a cable or radio communication medium such as a local area network, the Internet, and digital satellite broadcasting may be used, and they may be stored via various communication interfaces such as a rooter and a modem.

The control part 750 stores and manages various information such as distribution data to be provided on the Internet 707 in the hard disk drive 756.

Furthermore, the control part 750 can send/receive various information such as the advertiser/company information and the customer introducing information to/from the system management server 701, via the network interface 757.

In this connection, in the package providing server 705, when the advertiser/company information or the like is entered, the input part 755 and the display part 754 are used.

Figure 57:
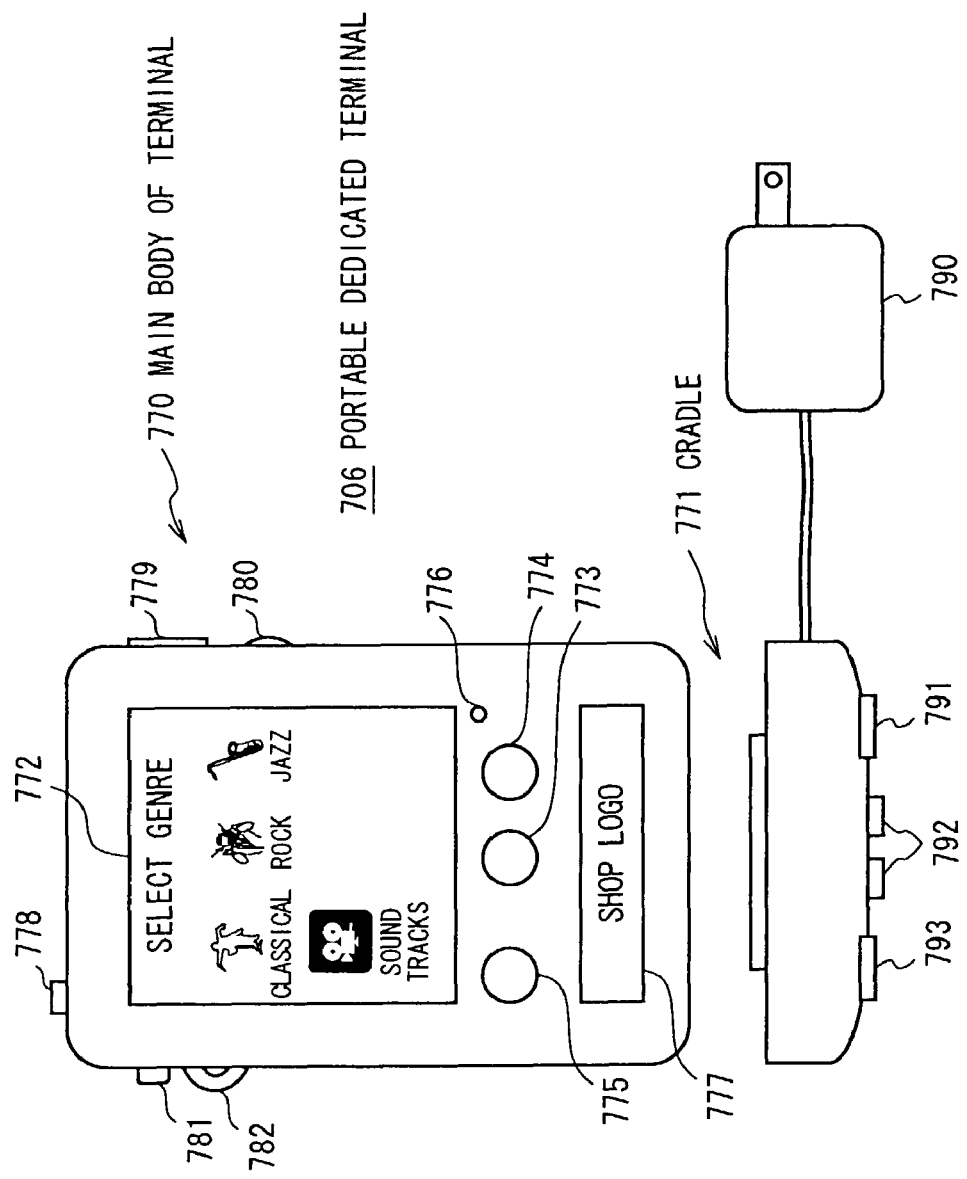
FIG. 57 is a schematic external view showing the configuration of a portable dedicated terminal.

As shown in FIG. 57, in the portable dedicated terminal 706, the main body of a terminal 770 which has a function to record and reproduce content data and is freely carriable can be attached to a cradle 771 that has a charging function to the above main body of the terminal 770 and a communication function using the Internet 707 in freely detachable.

In this case, in the main body of the terminal 770, a display part 772 being a liquid crystal display is provided at the front of the case. On the display part 772, pictures based on content data, various operational screens used to obtain content data or the like can be displayed.

At a lower part of the display part 772 on the front surface of the case, a reproducing start button 773, a play/stop button 774 and a send button 775 are provided. By means of these buttons, a reproducing starting command and a reproducing stop command of content data, and a send command to send various requests to the data providing server 703 or the like can be entered.

In this connection, on the front surface of the case, a charge lamp 776 that, when the main body of the terminal 770 is on charging, notifies the customer of that is provided, and the logotype 777 of the agency that sold and rented the portable dedicated terminal 706 is represented.

On the top of the case, a headphone jack 778 is provided. On the right side of the case, a power button 779 and a volume control dial 780 are provided. And on the left side of the case, a cancel button 781 and a rotational operating button that is freely rotatable and pushable (hereinafter, this is referred to as jog dial) 782 are provided as slightly projecting from the surface of the case.

The main body of the terminal 770 outputs sound obtained by reproducing content data from the headphone jack 778 to the headphones. The customer can listen the sound. At this time, the customer can control the volume by the volume control dial 780.

Furthermore, in the main body of the terminal 770, when an operating screen or the like is displayed on the display part 772, if the customer rotates the jog dial 782, the operating screen is scrolled according to the operation. If the customer erroneously entered information or a command on the above operating screen, the customer can cancel it by the cancel button 781.

On the other hand, in the cradle 771, an alternating current (AC) adapter 790 is provided. If the AC adapter 790 is connected to a main battery or the like in the state where the main body of the terminal 770 has been mounted, the battery of the main body of the terminal 770 can be charged.

In the cradle 771, a modular jack 791, an audio output terminal 792 and a Universal Serial Bus (USB) terminal 793 are provided. If content data received by communicating with the system management server 701 and the data providing server 703 via the above modular jack 791 or the like is sent to the main body of the terminal 770, audio data obtained from the main body of the terminal 770 is outputted to an external speaker or the like from the audio output terminal 792, and content data obtained from the outside can be taken in from the USB terminal 793 and it can be sent to the main body of the terminal 770.

Figure 58:
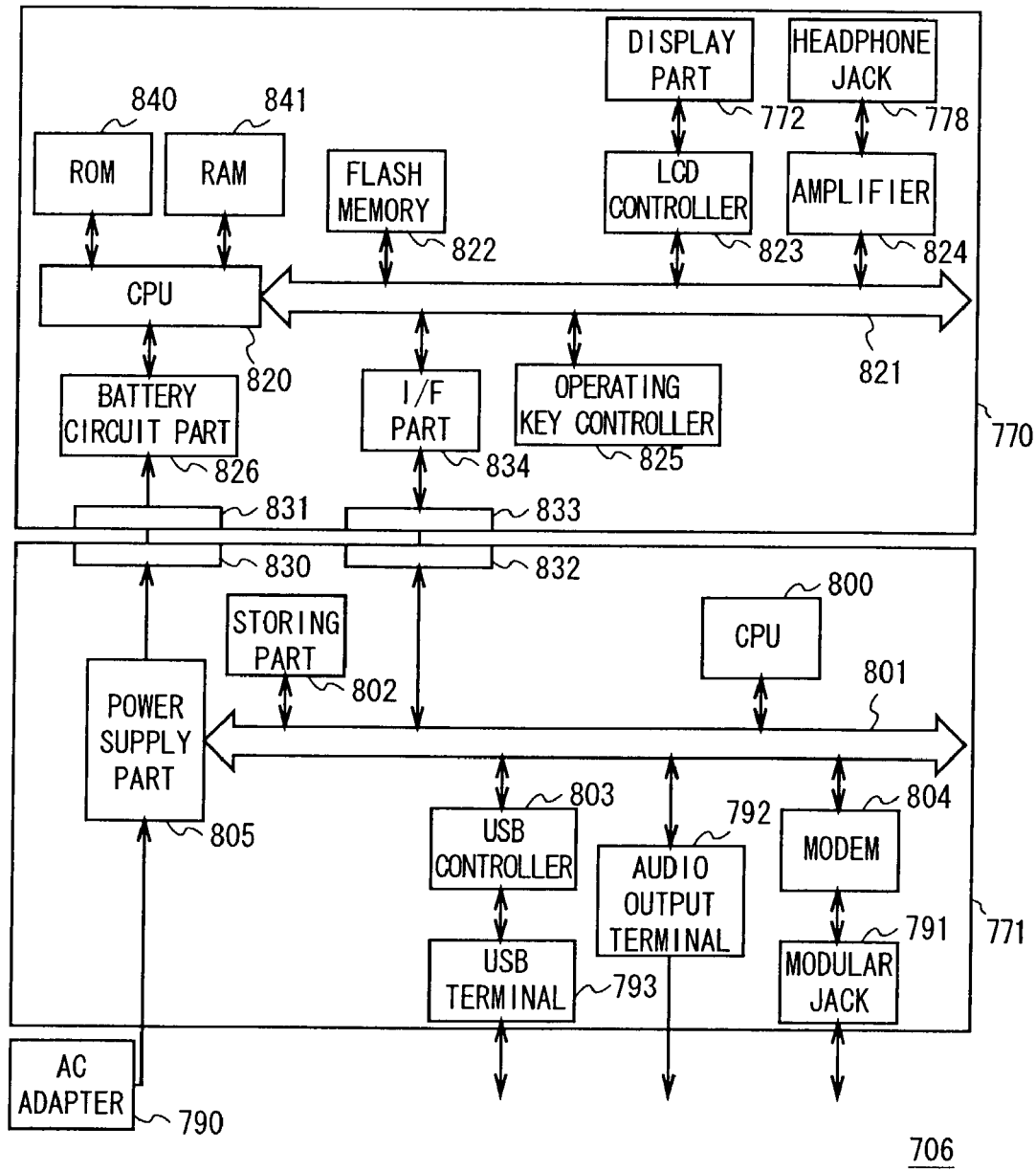
FIG. 58 is a block diagram showing the circuit configuration of the portable dedicated terminal.

Here, the circuit configuration of the portable dedicated terminal 706 will be described with reference to FIG. 58. First, in the cradle 771, a storing part 802, a USB controller 803, the audio output terminal 792 and a modem 804 are connected to a CPU 800 via a bus 801. Power supply voltage taken in from the AC adapter 790 is converted into the internal voltage of a predetermined voltage by a power supply part 805, and the voltage is supplied to the CPU 800 and each circuit block, so that the whole of the cradle 771 is driven.

In the main body of the terminal 770, a flash memory 822, a liquid crystal display (LCD) controller 823, an amplifier 824, and an operating key controller 825 are connected to a CPU 820 via a bus 821. By supplying the internal voltage from a battery circuit part 826 to the CPU 820 and each circuit block, the whole of the main body of the terminal 770 is driven.

When the main body of the terminal 770 is mounted on the cradle 771, a power input terminal 831 is connected to a power supply terminal 830 in the cradle 771. Thereby, power supply voltage supplied from the power supply part 805 in the cradle 771 sequentially via the power supply terminal 830 and the power input terminal 831 is taken in the battery circuit part 826, and the battery is charged. Thus, even if the main body of the terminal 770 is detached from the cradle 771, the portable dedicated terminal 706 can be freely used.

If the main body of the terminal 770 is mounted on the cradle 771, a main-body-side information input/output terminal 833 is connected to a cradle-side information input/output terminal 832 provided in the cradle 771, so that data and various information can be sent/received to/from the cradle 771.

Practically, in the portable dedicated terminal 706, the USB terminal 793 of the cradle 771 can be connected to the data providing server 703 via a USB cable (not shown). Content data sent from the data providing server 703 via the USB cable by a customer's rental reservation or the like is taken in the USB controller 803 in the cradle 771 from the USB terminal 793, and the above taken-in content data is sent from the cradle-side information input/output terminal 832 to the main body of the terminal 770.

In this case, the main body of the terminal 770 takes the content data sent from the cradle-side information input/output terminal 832 of the cradle 771 in the CPU 820 from the main-body-side information input/output terminal 833 via an interface part 834, and stores the content data in the flash memory 822.

In this manner, if the main body of the terminal 770 stores the content data in the flash memory 822, it takes a reproducing start command given from the operating key controller 825 in the CPU 820 according to the customer's operation of the reproducing start button 773, reproduces the content data from the flash memory 822, and sends the above reproduced content data from the amplifier 824 to the headphone jack 778 as well as sending the above content data from the LCD controller 823 to the display part 772. Thereby, the customer can enjoy the content.

Furthermore, if various information such as a request for the obtaining of content data is entered via the operating key controller 825, the main body of the terminal 770 takes this in the CPU 820, and sends this from the CPU 820 to the cradle 771 sequentially via the interface part 834 and the main-body-side information input/output terminal 833.

At this time, the cradle 771 takes in various information given from the main body of the terminal 770 from the cradle-side information input/output terminal 832, and sends the above taken-in various information from the modem 804 to the data providing server 703 or the like via the modular jack 791 and the system management server 701.

As a result, if the various information such as content data is sent from the data providing server 703 or the like via the system management server 701, the cradle 771 takes this in the CPU 800 from the modular jack 791 via the modem 804, and supplies the above received various information from the cradle-side information input/output terminal 832 to the main body of the terminal 770.

The main body of the terminal 770 takes various information sent from the cradle 771 in the CPU 820 from the main-body-side information input/output terminal 833 via the interface part 834, and notifies the customer of the content of that information via the display part 772 and the headphone jack 778, or stores the various information in the flash memory 822.

In this manner, in the main body of the terminal 770, the CPU 820 reads the various programs previously stored in the ROM 840 and expands them on the RAM 841. By these various programs, the main body of the terminal 770 can execute the processing similar to the recording control part 81, the reproducing control part 84 and the request data generating part 86 described above with reference to FIG. 4, the request data generating part 241, the recording control part 245 and the reproducing control part 248 described above with reference to FIG. 11, the request data generating part 270 described above with reference to FIG. 25, the reproducing control part 342, the request data generating part 344 and the recording control part 347 described above with reference to FIG. 28, the operational information judging part 541, the request data generating part 542, the judging part 545, the recording control part 546 and the reproducing control part 548 described above with reference to FIG. 38, and the request data generating part 630 described above with reference to FIG. 45.

In this connection, the main body of the terminal 770 of the portable dedicated terminal 706 executes the processing similar to them according to the various programs previously stored in the ROM 840. However, these various programs may be executed by providing a program storing medium storing these various programs in the main body of the terminal 770.

Note that, such program storing medium is not only limited to packaged media such as a flexible disk, a CD-ROM, and a DVD but also it may be a semiconductor memory, a magnetic disk, etc., that can temporarily or permanently store the various programs. Furthermore, as means for storing the various programs in the program storing medium, a cable or radio communication medium such as a local area network, the Internet, and digital satellite broadcasting may be used, and the various programs may be stored via various communication interfaces such as a rooter and a modem.

The cradle 771 stores various information such as the addresses of accessible servers in the storing part 802, so that the CPU 800 can communicate with the system management server 701 or the like according to the above various information.

According to the above configuration, in this data providing system 700, the system management server 701, the request terminal 702, the data providing server 703, the package providing server 704 and the advertiser/company server 705 have the configuration of a personal computer respectively.

Therefore, in this data providing system 700, it is unnecessary to newly create them as hardware. Thereby, the system can be easily constructed by means of these personal computers only by installing various programs in the existent personal computers.

In this data providing system 700, with respect to the portable dedicated terminal 706, hardware had newly prepared on purpose without applying a personal computer. However, this is because a person who does not own a personal computer or a person who is inexperienced in the operation of a personal computer can easily manage the portable dedicated terminal 706 without circumstance by that it is portable and the operating buttons were simplified.

According to the above configuration, the system is formed by using the system management server 701, the request terminal 702, the data providing server 703, the package providing server 704 and the advertiser/company server 705 that have the configuration of a personal computer. Therefore, existent personal computers can be used as them. Thus, the system construction is easy and can be simplified.

(11) Tenth Embodiment

Figure 59:
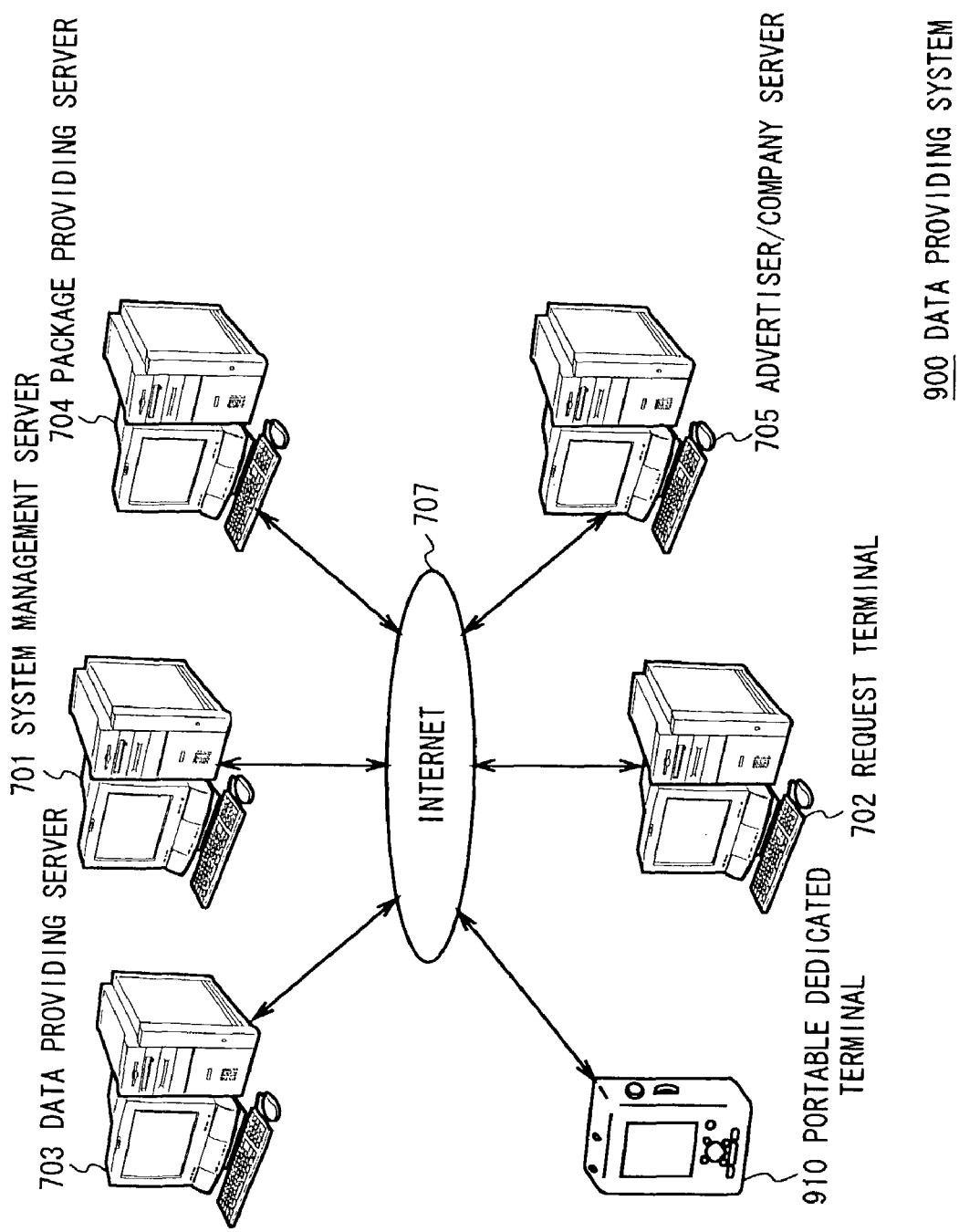
FIG. 59 is a schematic diagram showing the configuration of a data providing system according to a tenth embodiment.

FIG. 59 in which the same reference numerals are added to corresponding parts in FIG. 51 shows a data providing system 900 according to a tenth embodiment. The data providing system 900 is formed in similar to the data providing system 700 according to the ninth embodiment, except for the configuration of a portable dedicated terminal 910 that corresponds to the portable dedicated terminals 7A to 7N described above with reference to FIGS. 1 to 3.

Figure 60:
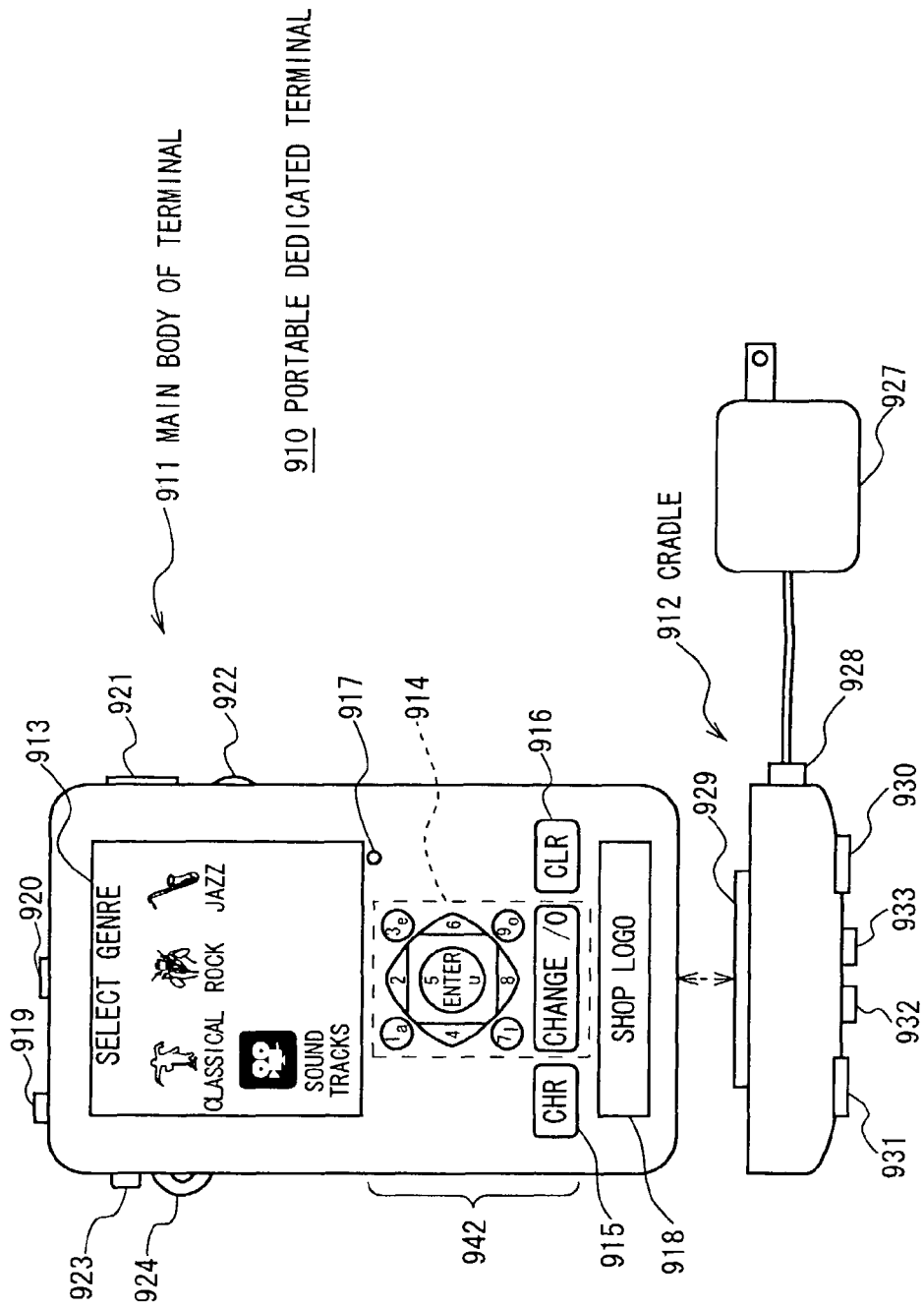
FIG. 60 is a schematic external view showing the configuration of a portable dedicated terminal.

In this case, as shown in FIG. 60, the portable dedicated terminal 910 has a function to record/reproduce content data. In the portable dedicated terminal 910, a main body of a terminal 911 freely portable can be freely detachably mounted on a cradle 912 that has a charging function to the main body of the terminal 911 and a communication function by using the Internet 707.

In the main body of the terminal 911, a display part 913 being a liquid crystal display is provided on the front surface of the case. On the display part 913, video based on content data, various operating screens used to obtain content data, or the like, can be displayed.

Under the display part 913 on the front surface of the case, a character input key group 914 being ten keys "0" to "9", a character type change key 915 and a cancel key 916 are provided. By using the character input key group 914 as ten key in the state where a content selecting screen is displayed on the display part 913, the customer can enter numerals for bar code as identification information previously made to correspond to a content and can selectively specify a desired content. At the same time, by using the character input key group 914 together with the character type change key 915 and the cancel key 916, the customer can enter the title of the content or the like in English letters (alphabets), numerals and symbols, Japanese characters (hiragana, katakana and Chinese characters), etc., and can selectively specify a desired content.

In this connection, on the front surface of the case, a charge lamp 917 that, when the main body of the terminal 911 is on charging, notifies the customer of that is provided, and the logotype 918 of the agency that sold/rented the portable dedicated terminal 910 is represented.

On the top of the case, a headphone jack 919 and a microphone 920 are provided. On the right side of the case, a power button 921 and a volume control dial 922 are provided.

In addition to this, a send button 923 to send various requests to the data providing server 703 or the like is provided on the left side of the case, and a jog dial 924 freely rotatable and pushable is provided as slightly projecting from the surface of the case.

In the main body of the terminal 911, by rotating and pushing the jog dial 924 in the state where an operating screen for reproducing of content data is displayed on the display part 913, the customer can enter various commands such as a reproducing start command and a reproducing stop command of content data.

The main body of the terminal 911 outputs voice obtained by reproducing content data from the headphone jack 919 to headphones (not shown), and displays pictures obtained by reproducing the content data on the display part 913. Thereby, the customer views the content. At this time, the customer can control the volume by turning the volume control dial 922.

Figure 61:
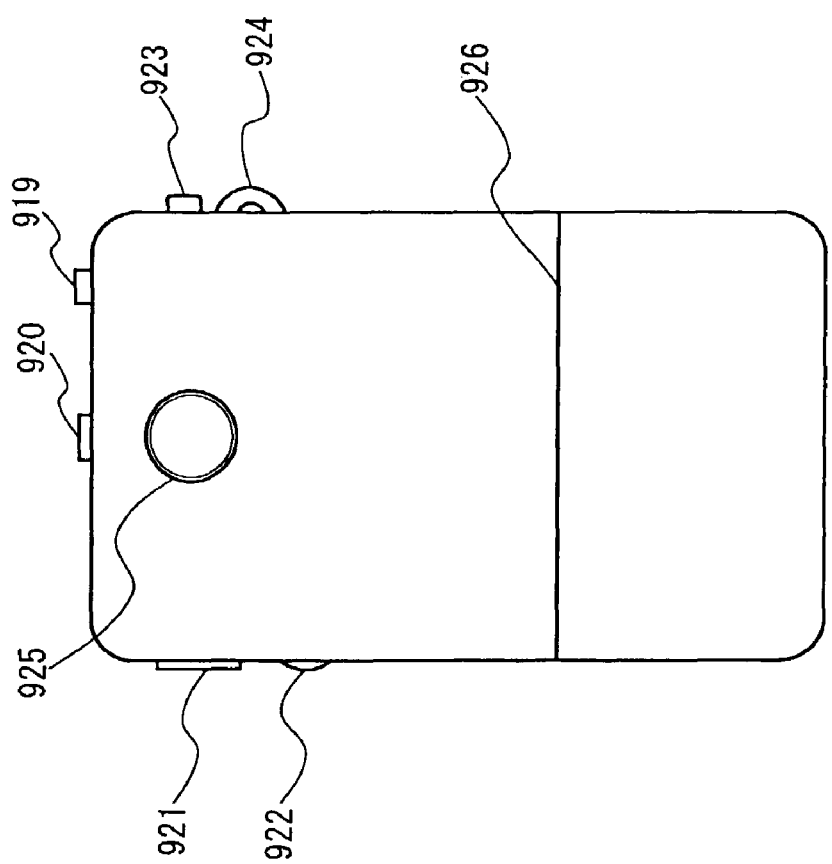
FIG. 61 is a schematic external view showing the configuration of the back of the main body of the terminal.

As shown in FIG. 61, in the main body of the terminal 911, a camera 925 for pattern recognition is provided at the upper center part of the back of the case. The main body of the terminal 911 picks up the picture of a bar code previously made to correspond to the content by that camera 925, so that the customer can selectively specify a desired content. And by that the customer uses the camera 925 together with the microphone 920, moving pictures and sound for a predetermined time (for several seconds) can be taken in as a memo of desired information.

Furthermore, at the lower part of the back of the case, a detachable battery pack 926 is mounted. Battery voltage is supplied from the above battery pack 926 to the internal various circuits by pushing the power button 921, and the portable dedicated terminal 910 is started up.

In this connection, on the bottom of the case, a connector that will be described later is provided, and the main body of the terminal 911 can be electrically connected to the cradle 912 via the above connector. When the connector 928 of an AC adapter 927 connected to the main power is connected to that connector, the battery pack 926 can directly charge without via the cradle 912.

On the other hand, in the cradle 912 (FIG. 60), a connector 929 is provided on the top surface of the case. By connecting the connector of the main body of the terminal 911 to the above connector 929 (that is, by mounting the main body of the terminal 911) on the cradle 912, the main body of the terminal 911 can be electrically connected to the main body of the terminal 911.

In the cradle 912, the connector 928 of the AC adapter 927 is provided freely detachably. If the AC adapter 927 is connected to the main power, power supply voltage is supplied to each of the internal circuits from the above AC adapter 927, and the portable dedicated terminal 910 is started up. If the main body of the terminal 911 is electrically connected to the cradle 912, power supply voltage is supplied from the AC adapter 927 to the battery pack 926 of the main body of the terminal 911 and the battery pack 926 charges.

In the cradle 912, a modular jack 930 for public network of which the communication speed is comparatively slow, and a jack for Ethernet (trademark) 931 of which the communication speed is remarkably faster than the public network (hereinafter, this is referred to as Ethernet jack) are provided.

If the main body of the terminal 911 is mounted on the cradle 912, the main body of the terminal 911 makes the customer arbitrarily select either the public network or the Ethernet (trademark) for a communication line to be used, and connects to the system management server 701 and the data providing server 703 via the modular jack 930 or the Ethernet jack 931 corresponding to thus selected public network or Ethernet (trademark).

In addition to this, in the cradle 912, a video output terminal 932 and an audio output terminal 933 are provided.

If the content data is reproduced in the state where the main body of the terminal 911 is mounted on the cradle 912, the main body of the terminal 911 sends video data and audio data forming the content data to an external device such as a television receiving set via the video output terminal 932 and the audio output terminal 933. Thus, the customer can view the content.

Figure 62:
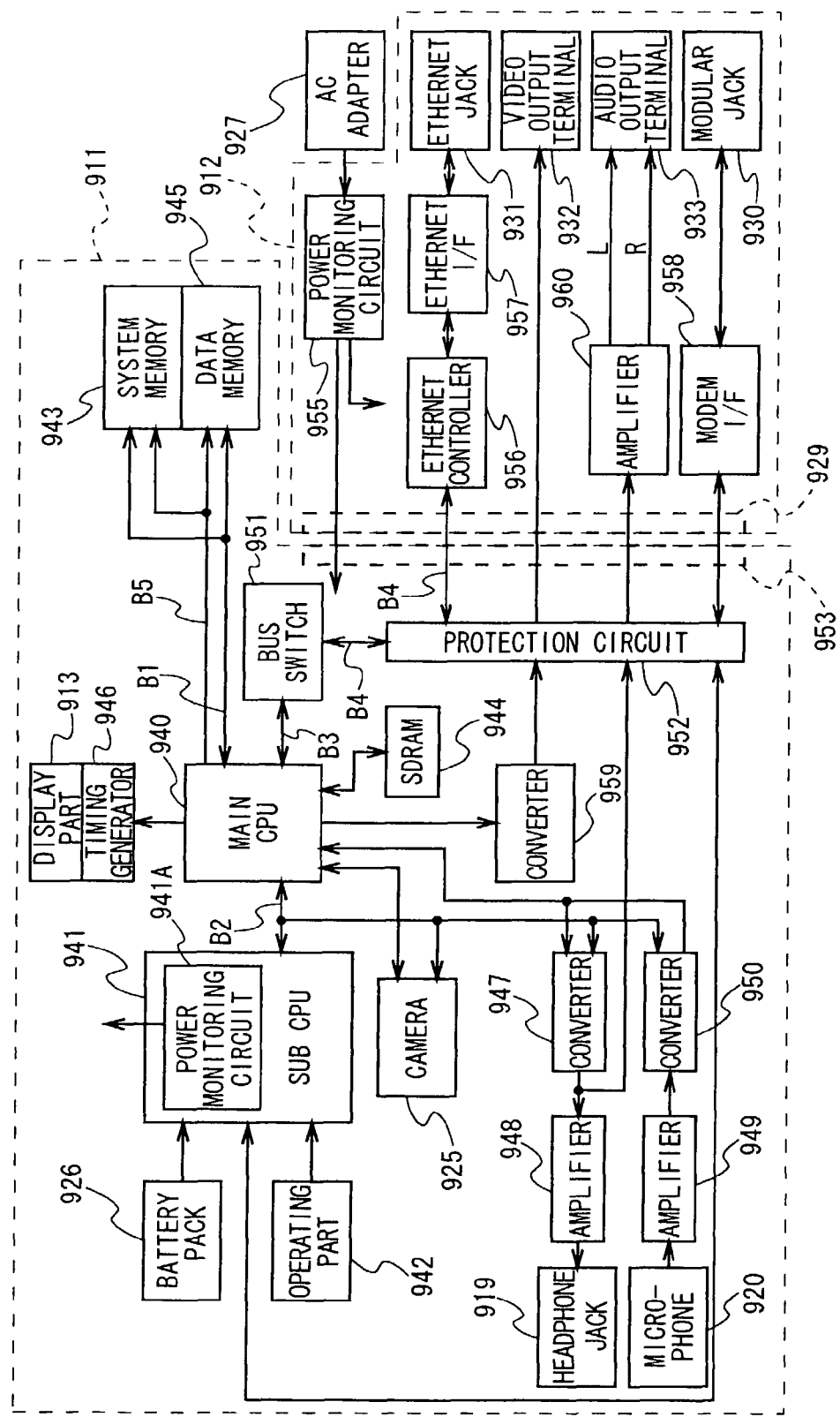
FIG. 62 is a block diagram showing the circuit configuration of the portable dedicated terminal.

Here, the circuit configuration of the portable dedicated terminal 910 will be described with reference to FIG. 62. First, in the main body of the terminal 911, a main CPU 940 for integratedly controlling the all circuits in the main body of the terminal 911 and the cradle 912 is provided.

Furthermore, in the main body of the terminal 911, a sub CPU 941 which controls starting-up/stop of each circuit in the main body of the terminal 911 and also has a function as a human interface is provided.

If the power button 921 is pushed and a starting-up command is sent from an operating part 942 composed of the above power button 921, the character input key group 914, the character type change key 915, the cancel key 916, the volume control dial 922, the send button 923 and the jog dial 924, the sub CPU 941 takes battery voltage supplied from the battery pack 926 in an internal power monitoring circuit 941A, converts the battery voltage into internal voltage at plural kinds of predetermined levels in the power monitoring circuit 941A, and supplies them to corresponding circuits in the main body of the terminal 911 respectively, and separatively starts up these circuits.

Then, the sub CPU 941 separatively controls starting-up/stop of each circuit in the main body of the terminal 911 according to the processing that the main CPU 940 executed. Thereby, wasteful consumption of battery voltage from the battery pack 926 can be reduced to the utmost.

If the main body of the terminal 911 starts, the main CPU 940 reads various programs previously stored in a system memory 943 being a flash ROM via a memory bus B1, and expands them on an SDRAM 944.

Thereby, the main CPU 940 can execute processing similar to the recording control part 81, the reproducing control part 84 and the request data generating part 86 described above with reference to FIG. 4, the request data generating part 241, the recording control part 245 and the reproducing control part 248 described above with reference to FIG. 11, the request data generating part 270 described above with reference to FIG. 25, the reproducing control part 342, the request data generating part 344 and the recording control part 347 described above with reference to FIG. 28, the operational information judging part 541, the request data generating part 542, the judging part 545, the recording control part 546 and the reproducing control part 548 described above with reference to FIG. 38, and the request data generating part 630 described above with reference to FIG. 45, by the various programs.

Specifically, in the main CPU 940, in advance of the sale or the rental of the portable dedicated terminal 910 at the agency, content data that the customer specified for purchase or rental, header data added to the above content data, the customer ID issued in the customer registration, etc., are recorded in a data memory 945 being a flash ROM in compressively-coded data.

After the user purchased/rented the portable dedicated terminal 910, if the customer enters a request to reproduce the content data by the operating part 942 sequentially via the sub CPU 941 and an I²C bus B2 being a serial bus (it is generally called system management (SM) bus), the main CPU 940 reads reproducing operation screen data from the system memory 943 via the memory bus B1, and sends this to a timing generator 946.

The timing generator 946 controls the display part 913 based on screen data and video data supplied from the main CPU 940 (controls the emitting timing and the emitting intensity of liquid crystals that correspond to the plural pixels of one screen on the display part 913, respectively). Thereby, if the reproducing operation screen data is sent from the main CPU 940, a reproducing operation screen based on the reproducing operation screen data is displayed on the display part 913.

If the customer specifies content data and its reproducing on the reproducing operation screen by an operating part 942 and a content data specifying command and a reproducing start command are given from the operating part 942 to the main CPU 940 sequentially via the sub CPU 941 and the I²C bus B2, the main CPU 940 reads the specified compressively-coded content data (hereinafter, this is referred to as compressed content data) from the data memory 945 via the memory bus B1.

Then, the main CPU 940 decodes the compressed content data read from the data memory 945. The main CPU 940 transmits the video data of thus obtained content data to the timing generator 946, and converts the audio data of the content data into an analog audio signal by a digital-to-analog converter 947 and sends the audio signal to the headphone jack 919 via a headphone amplifier 948.

Thereby, the main CPU 940 displays the video of the content based on the video data on the display part 913 via the timing generator 946, and outputs the sound of the content based on the audio signal from headphones (not shown) connected to the headphone jack 919. Thus, the customer can view the content.

If a memo input command is given from the operating part 942 sequentially via the sub CPU 941 and the I²C bus B2, the main CPU 940 picks up an object by the camera 925 for a predetermined time and takes in thus obtained video data. At this time, the main CPU 940 picks up surrounding sound via the microphone 920 for a predetermined time, and takes this in by converting thus obtained audio signal into digital audio data sequentially via a microphone amplifier 949 and an analog-to-digital converter 950. The main CPU 940 compressively codes these video data and audio data as memo data, and transmits this to the data memory 945 via the memory bus B1 for storing.

In this connection, at this time, if a character string such as a comment on the memo is entered by the customer's operation of the character input key group 914, the character type change key 915 and the cancel key 916, and it is sent to the main CPU 940 from the operating part 942 sequentially via the sub CPU 941 and the I²C bus B2 as text data, the main CPU 940 adds the text data to the memo data and compressively codes this, and stores thus obtained data in the data memory 945.

If a reproducing start command for the memo data is sent from the operating part 942 sequentially via the sub CPU 941 and the I²C bus B2, the main CPU 940 performs processing similarly to the reproducing of the content data described above. Thereby, the customer can confirm the content of the memo by the display part 913 and the headphones.

By the way, the main CPU 940 is electrically connected to a connecter 953 provided on the bottom of the case sequentially via a peripheral component interconnect (PCI) bus B3, a bus switch 951, a specified bus based on the PCI standard (hereinafter, this is referred to as PCI-based bus) B4, and a protection circuit 952.

The protection circuit 952 has a function to protect each circuit in the main body of the terminal 911 from the external static electricity and a function to prevent leakage of unnecessary radiation occurred by data (signal) processing in the main body of the terminal 911 to the outside.

Furthermore, the protection circuit 952 detects whether or not the connecter 929 of the regular cradle 912 is connected to the connecter 953, and notifies the main CPU 940 of the detected result.

The main CPU 940 controls the bus switch 951 according to the detected result notified from the protection circuit 952, so that until the connector 929 of the regular cradle 912 is connected to the connecter 953, the main CPU 940 interrupts electrical connection to the protection circuit 952, and only when the connector 929 of the regular cradle 912 is connected to the connecter 953, the main CPU 940 electrically connects the main body of the terminal 911 to the protection circuit 952 via the bus switch 951.

Thereby, even if an electronic device other than the cradle 912 is erroneously connected to the connecter 953 and the above connecter 953 short-circuited, the main CPU 940 can protect itself from crash or the like.

Here, the cradle 912 takes power supply voltage supplied from the AC adapter 927 connected to the main power in an internal power monitoring circuit 955 to convert the power supply voltage into internal voltage at plural kinds of predetermined levels, and supplies them to each corresponding circuit in the above cradle 912 respectively to start up each of these circuits.

If the main body of the terminal 911 is mounted on the cradle 912, power supply voltage is converted into charge voltage at a predetermined level by the power monitoring circuit 955, and the charge voltage is supplied to the battery pack 926 from the connector 929 via the connecter 953 of the main body of the terminal 911 for charge.

If an operating request for communication is given to the main CPU 940, from the operating part 942 sequentially via the sub CPU 941 and the I²C bus B2 in the state where the main body of the terminal 911 is mounted on the cradle 912, the main CPU 940 reads communication operating screen data from the system memory 943 via the memory bus B1, transmits this to the timing generator 946, and displays a communication operating screen based on the communication operating screen data on the display part 913.

In this state, if the customer arbitrary selects either the public network or the Ethernet (trademark) on the communication operating screen by operating the operating part 942 and specifies a uniform resource locator (URL) of the other party of communication, according to this, a command to selectively specify either of the communication lines, that URL and a sending command are given to the main CPU 940 from the operating part 942 sequentially via the sub CPU 941 and the I²C bus B2. Thereby, the main CPU 940 generates access request data for the other party of communication specified by the above URL.

If the Ethernet (trademark) is selected as the communication line to be used in communication, the main CPU 940 compressively codes access request data, and sends the compressed access request data from the connecter 953 to the cradle 912 sequentially via the PCI bus B3, the bus switch 951, the PCI-based bus B4 and the protection circuit 952. In the above cradle 912, the compressed access request data is sent from the Ethernet jack 931 to the other party of communication via the Ethernet (trademark), sequentially via the connector 929, an Ethernet controller 956 and an Ethernet interface 957.

Responding to the access request, if compressively-coded access confirmation data (hereinafter, this is referred to as compressed access confirmation data) is sent, from the other party of communication via the Ethernet (trademark), the main CPU 940 receives this by the connecter 953 from the Ethernet jack 931 of the cradle 912 sequentially via the Ethernet interface 957, the Ethernet controller 956 and the connector 929, and takes in from the connecter 953 sequentially via the protection circuit 952, the PCI-based bus B4, the bus switch 951 and the PCI bus B3 for decoding.

Here, in the compressed access confirmation data sent from the system management server 701 to which the portable dedicated terminal 910 can communicate (that is, communication has been permitted) or the data providing server 703 installed in the agency, an identification code peculiar to the above system management server 701 or data providing server 703 (or agency) has been stored.

On the other hand, in the data memory 945 in the main body of the terminal 911, when the portable dedicated terminal 910 was sold or rented, the identification code peculiar to the communicable system management server 701 (that is, communication has been permitted) or the data providing server 703 (or the agency) was stored.

Therefore, if the main CPU 940 decodes the access confirmation data and generates access confirmation data, it compares the identification code stored in the above access confirmation data with the identification code previously stored in the data memory 945.

As a result, if the compared identification codes coincide, the main CPU 940 determines that the specified other party of communication is a regular permitted party, and continues the communication. Thereby, the customer can request obtaining of content data, introducing of an advertiser and/or a company, etc.

On the contrary, if the compared identification codes are different from each other or the identification code has not been stored in the access confirmation data, the main CPU 940 judges the specified other party of communication not to be a permitted party, and forcedly stops the communication. Thus, it can be prevented that content data is illegally used by that the portable dedicated terminal 910 communicates with a party not permitted.

The main CPU 940 can communicate only with a party previously permitted via the Ethernet (trademark) as the above. As a result, if screen data such as compressively-coded advertiser and/or company introducing data and content selecting screen data (hereinafter, these are referred to as compressed screen data), and compressed content data for advertisement and for obtaining is sent from the system management server 701 or the data providing server 703 being a permitted party via the Ethernet (trademark), the main CPU 940 receives this via the same path as the case of the aforementioned compressed access confirmation data, and decodes this as occasion demands.

In this connection, if the main CPU 940 receives such compressed screen data, the main CPU 940 decodes this, transmits the decoded data to the timing generator 946, and displays a screen based on the screen data on the display part 913.

When the main CPU 940 is connected to the other party of communication previously permitted via the Ethernet (trademark), if the customer enters a content obtaining request or the like by the operating part 942 and the request is transmitted to the main CPU 940 sequentially via the sub CPU 941 and the I2C bus B2, the main CPU 940 generates request data based on the request, compressively codes the request data, and sends thus obtained compressed request data to the other party via the Ethernet (trademark) by the same path as the case of the aforementioned compressed access confirmation data.

In this connection, to selectively specify a content that the customer wants to obtain, the customer enters the title of the content, or the numerals of a bar code corresponding to the content by the operating part 942.

At this time, the main CPU 940 can pick up the picture of the bar code by the camera 925. In this case, the main CPU 940 can analyze the picked-up image obtained from the camera 925 by a predetermined image recognition program, and the content can be specified.

If the customer selects a public network as a communication line to be used for communication, the main CPU 940 compressively codes the access request data, and transmits the compressed access request data to the sub CPU 941 via the I2C bus B2, as serial data.

The sub CPU 941 has a function as a universal asynchronous receiver transmitter (UART) device. The sub CPU 941 converts the compressed access request data into parallel data, and transmits this from the connecter 953 to the cradle 912 via the protection circuit 952. In the cradle 912, the compressed access request data is sent from the modular jack 930 to the other party of communication via the public network sequentially via the connector 929 and a modem interface 958.

As a result, if the compressed access confirmation data is sent from the other party of communication via the public network, the main CPU 940 takes this by in the connecter 953, from the modular jack 930 of the cradle 912 sequentially via the modem interface 958 and the connector 929, transmits this to the sub CPU 941 via the protection circuit 952, converts this into serial data, and receives this via the I2C bus B2 for decoding.

Thereby, also when in using the public network, the main CPU 940 compares the identification code stored in the access confirmation data obtained by decoding the compressed access confirmation data with the identification code stored in the data memory 945.

Only in the case where thus compared identification codes are coincide, the main CPU 940 judges the accessing other party of communication is the regular party previously permitted, and continues the communication via the public network.

Then, in the state where the main CPU 940 is connected to the other party of communication previously permitted via the public network, if the aforementioned compressed screen data is sent from the system management server 701 or the data providing server 703 being the other party of communication, the main CPU 940 takes this in the sub CPU 941 from the modular jack 930, and performs processing similar to the aforementioned case of using the Ethernet (trademark).

In the state where the main CPU 940 is connected to the other party of communication previously permitted via the public network, if the customer enters the content obtaining request or the like by the operating part 942 and the request is transmitted to the main CPU 940 sequentially via the sub CPU 941 and the I$^2$C bus B2, the main CPU 940 generates request data based on the request, compressively codes the request data, and transmits thus obtained compressed request data to the other party of communication via the public network by passing over the sub CPU 941 and the modular jack 930.

By the way, in either of the Ethernet (trademark) and the public network, for instance, if the main CPU 940 displays the content selecting screen being a three-dimensional virtual reality space picture described above with reference to FIGS. 29 to 31 on the display part 913, it performs processing similar to the aforementioned portable dedicated terminal 303 according to the sixth embodiment (FIGS. 28 to 37).

If the main CPU 940 moves the picture of customer to the specified coordinate position on the content selecting screen (the picture of first floor in shop or the picture of second floor in shop), it compressively codes specified coordinate position data representing that the above picture of customer moved to the specified coordinate position, and sends the compressively-coded data to the data providing server 703 via the Ethernet (trademark) or the public network that has been selected.

At this time, if the data providing server 703 receives the specified coordinate position data from the portable dedicated terminal 910, it compressively codes content data for advertisement (that is, commercial data) specified by the above specified coordinate position data, and sends thus obtained compressed content data to the portable dedicated terminal 910 via the Ethernet (trademark) or the public network that is the same path as the sending path of the compressively-coded specified coordinate position data in streaming, according to the user datagram protocol/Internet protocol (UDP/IP).

As a result, if the main CPU 940 takes in the compressed content data for advertisement sent from the data providing server 703, it temporarily stores this in the SDRAM 944.

The main CPU 940 reads the compressed content data for advertisement from the SDRAM 944 and decodes this. In video data and audio data forming the obtained content data, the main CPU 940 transmits the video data to the timing generator 946, and converts the audio data into an analog audio signal by the digital-to-analog converter 947, and transmits the audio signal to the headphone jack 919 via the headphone amplifier 948.

Thereby, the main CPU 940 displays the pictures of a content for advertisement based on the video data on the display part 913 by the timing generator 946, and outputs the sound of the content for advertisement based on the audio signal from the headphones connected to the headphone jack 919. Thus, the customer can view a part of the content, as advertisement.

In this manner, the main CPU 940 reproduces in streaming the compressed content data for advertisement that was sent in streaming from the system management server 701 and the data providing server 703 being the regular other party of communication, by using the SDRAM 944 as buffer.

If desired content data is selectively specified on the content selecting screen being a three-dimensional virtual reality space picture displayed on the display part 913, the main CPU 940 compressively codes content specifying data representing the above specified content data, and sends the compressively-coded data to the data providing server 703 via the Ethernet (trademark) or the public network that has been selected at this time.

At this time, if the data providing server 703 receives the content specifying data from the portable dedicated terminal 910, it compressively codes the content data for obtaining specified by the above content specifying data, and sends thus obtained compressed content data to the portable dedicated terminal 910 via the Ethernet (trademark) or the public network that is the same path as the sending path of the compressively-coded content specifying data, according to the transmission control protocol/Internet protocol (TCP/IP).

If the main CPU 940 receives the compressed content data for obtaining sent from the data providing server 703, the main CPU 940 temporarily stores this in the SDRAM 944 as it is compressed, and transmits this in the data memory 945 for recording via the memory bus B1 while using the above SDRAM 944 as buffer.

In this manner, when the main CPU 940 obtains compressed content data or the like from the system management server 701 or the data providing server 703, the main CPU 940 uses the SDRAM 944 as buffer. Thereby, the data can be downloaded while preventing occurrence of an error in the data processing.

In addition to this, when the main body of the terminal 911 is mounted on the cradle 912, the customer can arbitrary select either the display part 913 and the headphone jack 919 of the main body of the terminal 911 or an external device such as a television receiving set and a reproducing operation screen displayed on the display part 913, as means for viewing reproduced content data.

If the customer selects the display part 913 and the headphone jack 919 of the main body of the terminal 911 on the reproducing operation screen and a command to selectively specify the display part 913 and the headphone jack by the operating part 942, the main CPU 940 receives information of that (with a command to specify content data and a reproducing start command) sequentially via the sub CPU 941 and the I$^2$C bus B2 reproduces the compressed content data from the data memory 945, and decodes the reproduced data similarly to the aforementioned case where the main body of the terminal 911 is not mounted on the cradle 912. Thus, the customer can view the content by the display part 913 and the headphones.

On the contrary, if the customer selects the external device as means for viewing reproduced content data on the reproducing operation screen and a command to selectively specify the external device by the operating part 942, the main CPU 940 receives information of that (with the command to selectively specify the content data and the reproducing start command) sequentially via the sub CPU 941 and the I$^2$C bus B2, and reads the specified compressed content data from the data memory 945 via the memory bus B1.

The main CPU 940 decodes the compressed content data. In the video data and audio data forming thus obtained content data, the main CPU 940 converts the video data into an analog video signal by a digital-to-analog converter 959 for video, and transmits the video signal from the connecter 953 to the cradle 912 via the protection circuit 952, and sends that video signal from the video output terminal 932 to the external device via the connector 929 in the above cradle 912.

At that time, the main CPU 940 converts the audio data forming the content data into an analog audio signal by the digital-to-analog converter 947, and transmits the audio signal from the connecter 953 to the cradle 912 via the protection circuit 952, converts that audio signal into an analog audio signal of the left and the right two channels via a power amplifier 960 in the above cradle 912, and then sends the audio signal from the audio output terminal 933 to the external device.

Thereby, the customer can enjoy the content for example by a large screen display and a speaker with high quality sound, by using not only the main body of the terminal 911 but also the external device.

Furthermore, when the main body of the terminal 911 is mounted on the cradle 912, the main CPU 940 performs processing not only the content data but also memo data similarly, so that the customer can confirm the contents of the memo by either of the display part 913 and the headphones of the main body of the terminal 911 and the external device.

Note that, in this tenth embodiment, the main CPU 940 controls the system memory 943 and the data memory 945 via a control bus B5, and controls the digital-to-analog converter 947 and the analog-to-digital converter 950 for video and audio, via the I²C bus B2.

Furthermore, when in generating obtaining request data for content data, the main CPU 940 stores content specifying information that specifies a desired content by its title, bar code or the like, whether the content data was purchased or rented, payment information on the purchase price and the rental charges for the content data (as paying method, for example, payment by credit), the customer ID, etc., in the above obtaining request data.

Whenever the data providing server 703 receives the obtaining request data from the portable dedicated terminal 910, the data providing server 703 performs accounting based on the customer information on the customer who requested to obtain the content (the account number of the customer), the selling price and the rental charges for the content data, and the account number of the agency at the dealing bank.

As a result, the data providing server 703 generates accounting information on the sale or the rental of the content data, and sends the above generated accounting information to a settlement processing server via the Internet 707. In the settlement-processing server, electronical settlement processing based on that accounting information is executed.

Accordingly, the portable dedicated terminal 910 enables the user to obtain content data and pay for the content data or the rental charges for the content data while being at home without going to the agency.

According to the above configuration, in this data providing system 900, the character input key group 914 being ten keys is provided in the portable dedicated terminal 910. Thereby, the customer can selectively specify a content for obtaining by entering the numerals of a bar code corresponding to the content by the above character input key group 914.

Furthermore, in this data providing system 900, the camera 925 is provided in the portable dedicated terminal 910. Thereby, the picture of the bar code corresponding to a content can be picked up by the camera 925, and the customer can selectively specify the content for obtaining by taking the picture of the bar code.

Accordingly, in this data providing system 900, when the customer selectively specifies a content for obtaining by the portable dedicated terminal 910, the customer can easily selectively specify a desired content only by simply entering the numerals or taking the picture of the bar code with the camera 925, without entering plural characters such as the title of the content.

According to the above configuration, the portable dedicated terminal 910 having the character input key group 914 being ten keys and the camera 925 for pattern recognition is used. Thereby, in the portable dedicated terminal 910, in addition to the effects obtained in the aforementioned ninth embodiment, the customer can easily selectively specify a desired content by simply entering the numerals with the character input key group 914 or only by taking the picture of the bar code with the camera 925. Thereby, a data providing system in that the usability of a portable dedicated terminal is improved and the customer can remarkably easily use can be realized.

Note that, in the aforementioned tenth embodiment, in the portable dedicated terminal 910, it has dealt with the case where the main CPU 940 of the main body of the terminal 911 executes the similar processing to the recording control part 81, the reproducing control part 84 and the request data generating part 86 described above with reference to FIG. 4, the request data generating part 241, the recording control part 245 and the reproducing control part 248 described above with reference to FIG. 11, the request data generating part 270 described above with reference to FIG. 25, the reproducing control part 342, the request data generating part 344 and the recording control part 347 described above with reference to FIG. 28, the operational information judging part 541, the request data generating part 542, the judging part 545, the recording control part 546 and the reproducing control part 548 described above with reference to FIG. 38, and the request data generating part 630 described above with reference to FIG. 45, according to the various programs previously stored in the system memory 943. However, this invention is not only limited to this but also these various processing may be executed by providing a program storing medium storing these various programs in the main body of the terminal 911.

In this connection, such program storing medium is not only limited to packaged media such as a flexible disk, a CD-ROM, and a DVD but also it may be a semiconductor memory, a magnetic disk, etc., that can temporarily or permanently store the various programs. Furthermore, as means for storing the various programs in the program storing medium, also a cable or radio communication medium such as a local area network, the Internet, and digital satellite broadcasting may be used, and they may be stored via various communication interfaces such as a rooter and a modem.

In the aforementioned tenth embodiment, it has dealt with the case where the portable dedicated terminal 910 only can communicate with the specified other party of communication previously permitted based on the identification code. However, this invention is not only limited to this but also, after the user started to use the portable dedicated terminal 910, the customer may newly contract with an agency or the like and obtain an identification code peculiar to the agency so that the user can communicate with plural agencies or the like by one portable dedicated terminal 910. Thereby, for instance, it becomes unnecessary to prepare a portable dedicated terminal 910 in each agency, and one portable dedicated terminal 910 can be used as a common dedicated terminal for the plural agencies or the like. Thus, the usability of the portable dedicated terminal 910 can be further improved.

In the aforementioned tenth embodiment, it has dealt with the case where the main body of the terminal 911 of the portable dedicated terminal 910 works by battery voltage supplied from the detachable battery pack 926. However, this invention is not only limited to this but also the main body of the terminal 911 of the portable dedicated terminal 910 may work by mounting an exchangeable primary battery therein, or the main body of the terminal 911 may work either of the battery pack and the primary battery. Thereby, the customer can easily exchange the primary battery when the customer is going out, and can use the portable dedicated terminal 910 for a long time.

Furthermore, in the aforementioned tenth embodiment, it has dealt with the case where the data providing server 703 generates accounting information every time when the data providing server 703 received content obtaining request data, and electronical settlement processing based on that accounting information is executed in the settlement processing server. However, this invention is not only limited to this but also the data providing server 703 or the system management server 701 may constantly and collectively generate accounting information for example once a month or once two weeks, or it may integrate generated accounting information every time when the data providing server 703 received obtaining request data, and settlement processing may be executed in the settlement processing server at that constant timing.

(12) Eleventh Embodiment

Figure 63:
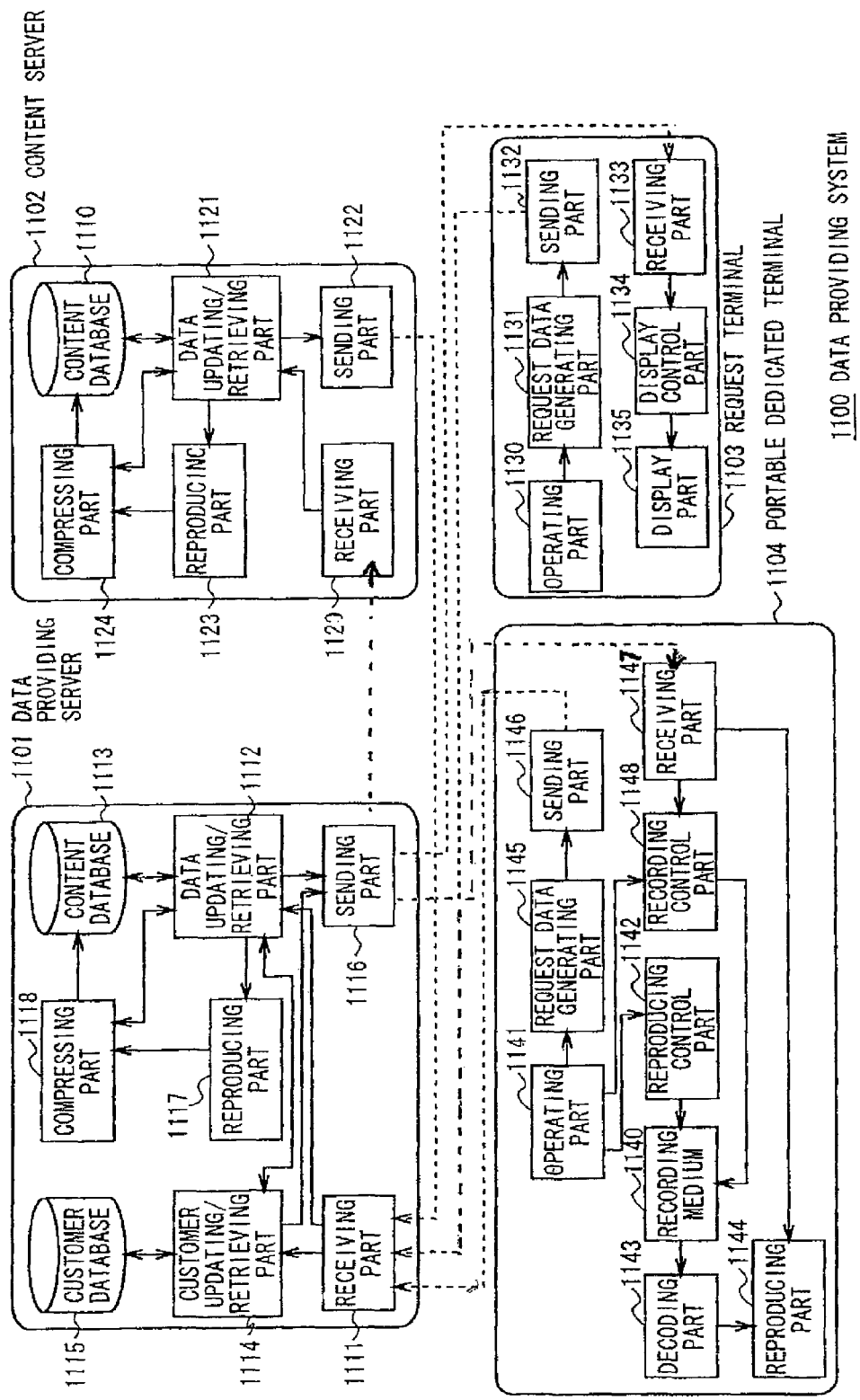
FIG. 63 is a schematic diagram showing the configuration of a data providing system according to an eleventh embodiment.

FIG. 63 shows a data providing system 1100 according to an eleventh embodiment. A content server 1102 corresponding to the system management site 2 and the sales company 5 described above with reference to FIGS. 1 to 3, a request terminal 1103 corresponding to the customer 3 described above with reference to FIGS. 1 to 3 (that is, the request terminal used by the customer 3), and a portable dedicated terminal 1104 that corresponds to the portable dedicated terminals 7A to 7N described above with reference to FIGS. 1 to 3, is dedicated to the agencies 4A to 4N, and is accessible only the data providing server 1101, are connected to the data providing server 1101 corresponding to the agencies 4A to 4N described above with reference to FIGS. 1 to 3 via the Internet (not shown), respectively.

In this case, the content server 1102 is installed in a sales company that deals in many packaged media respectively storing one or plural content data. In a content database 1110, a package data table generated by listing package additional information such as the title of each packaged media that the above sales company deals in (title of motion picture, album CD, single CD, etc.), the detailed contents of the packaged media (titles of plural tunes (content data) stored in album CD or single CD, artist name, manufacturing company of packaged media, content identification information peculiar to each content data stored in packaged media, etc.), and package identification information peculiar to the packaged media, has been stored.

In the content database 1110, many content data previously compressively coded by one or more kinds of compression coding methods, and content identification information peculiar to the above compressively-coded content data (hereinafter, this is referred to as compressed content data) (same as the aforementioned content identification information peculiar to the content data), have been previously stored by making a correspondence.

In the content database 1110, a content data table generated by listing content additional information such as the content identification information corresponding to the compressed content data in the content database 1110, the title of the content data (title of tunes, title of work, etc.), artist name, the manufacturing company of the content data, and a compression coding method that was used for the compression coding of the compressed content data, has been stored.

In this connection, for the compression coding of content data, according to the manufacturing company of the content data or the like, plural kinds of compression coding methods such as the adaptive transform acoustic coding 3 (ATRAC3) (trademark), moving picture experts group (MPEG)-1 audio layer 3 (MP3) (trademark), moving picture experts group-2 advanced audio coding (MPEG-2 AAC) (trademark), QDesign Music Codec (trademark), transform-domain weighted interleave vector quantization (TwinVQ) (trademark), Microsoft audio (MS Audio) (trademark) (another name is Windows media audio (WMA) (trademark), and Ogg Vorbis (trademark), have been used.

On the other hand, the data providing server 1101 is installed in an agency. If the above agency buys a part of many packaged media that the sales company deals in, sale/rental, package additional data representing package additional information corresponding to the above bought packaged media is supplied from the content server 1102. The above supplied package additional data is received by a receiving part 1111, and taken in a data updating/retrieving part 1112.

In addition to this, at this time, in many compressed content data stored in the content database 1110, a part of compressed content data is supplied from the content server 1102 to the data providing server 1101 with content additional data that represents content additional information corresponding to the compressed content data. They are received by the receiving part 1111, and taken in the data updating/retrieving part 1112.

By the data updating/retrieving part 1112, the data providing server 1101 lists the package additional information based on the package additional data, and generates a package data table, and also lists the content additional information based on the content additional data, and generates a content data table. The above generated package data table and content data table are stored in a content database 1113.

Furthermore, the data providing server 1101 stores the compressed content data and the content identification information in the content database 1113 by making a correspondence, by the data updating/retrieving part 1112.

In this manner, the data providing server 1101 can sell/rent compressed content data obtained from the content server 1102 to the customer.

In order to answer every obtaining request of content data from the customer, as described later, the data providing server 1101 also can sell/rent not only the compressed content data stored in the content server 1102 but also content data stored in packaged media that the agency and the sales company deal in to the customer as compressed content data.

Practically, if registration request data for requesting a customer registration is sent from the request terminal 1103 operated by the customer, the data providing server 1101 receives this by the receiving part 1111, and takes this in a customer updating/retrieving part 1114.

The data providing server 1101 reads customer registration screen data previously stored in a customer database 1115 based on the registration request data by the customer updating/retrieving part 1114, and sends this from a sending part 1116 to the request terminal 1103.

As a result, if customer information such as the name, the address, and the telephone number of the customer, that was entered on the customer registration screen based on the customer registration screen data is sent from the request terminal 1103 to the data providing server 1101 as customer data, the data providing server 1101 receives this by the receiving part 1111, and takes this in the customer updating/retrieving part 1114.

Thereby, the data providing server 1101 issues a customer ID to the customer who requests a registration and adds this to customer information based on the customer data, and stores the above customer information with the customer ID in the customer database 1115 as customer registration information, and registers the customer, by the customer updating/retrieving part 1114.

In this connection, if the customer is registered by the customer updating/retrieving part 1114, the data providing server 1101 generates registration completion data that includes the customer ID, and sends this from the sending part 1116 to the request terminal 1103 to notify the customer of the completion of customer registration and the customer ID.

If obtaining request data for requesting the obtaining of content data (including the customer ID) is sent from the request terminal 1103, the data providing server 1101 receives this by the receiving part 1111, and takes this in the customer updating/retrieving part 1114.

At this time, the data providing server 1101 retrieves customer registration information in the customer database 1115 based on the obtaining request data (i.e., the customer ID), and detects whether or not the customer who requested the obtaining of content data is a regular customer registered as a customer, by the customer updating/retrieving part 1114.

If that the customer requesting the obtaining of content data is not a regular customer is detected by the customer updating/retrieving part 1114, the data providing server 1101 stops the acceptance of the content data obtaining request from the customer, and notifies the customer of the stop of the acceptance of the obtaining request from the sending part 1116 via the request terminal 1103, and urges the customer to a customer registration.

On the contrary, if that the customer requesting the obtaining of content data is a regular customer is detected by the customer updating/retrieving part 1114, the data providing server 1101 transmits the obtaining request data to the data updating/retrieving part 1112.

In this case, the data providing server 1101 reads content selecting screen data previously stored in the content database 1113 based on the obtaining request data by the data updating/retrieving part 1112, and sends thus read data from the sending part 1116 to the request terminal 1103.

In this connection, the data providing server 1101 can make the customer select every compressed content data stored in the content server 1102 and every content data stored in packaged media that the sales company deals in as content data to be obtained, by a content selecting screen based on the content selecting screen data.

As a result, if content specifying information representing the purchase of desired content data (hereinafter, this is referred to as specified content data), whether or not the data is rented, and the title of the above specified content data or the like, and terminal specifying information representing a purchase for the portable dedicated terminal 1104 to record the specified content data as compressed content data, whether or not the data is rented or not, a specified compression coding method wanted by the customer to be used in the compression coding of the above specified content data (hereinafter, this is referred to as specified compression coding method) or the like, are entered on the content selecting screen based on the content selecting screen data as reservation information with the customer ID, and reservation data representing the above reservation information is sent from the request terminal 1103, the data providing server 1101 receives this by the receiving part 1111, and takes this in the customer updating/retrieving part 1114.

In this case, in the agency, plural kinds of portable dedicated terminals (not shown) applying a decoding method corresponding to the aforementioned plural kinds of compression coding methods are prepared for sale and rental.

The data providing server 1101 selects a portable dedicated terminal to be sold/rented to the customer, applying a specified decoding method corresponding to the specified compression coding method included in the reservation data (heretofore, this is referred to as specified decoding method), and updates the above customer registration information by adding terminal identification information peculiar to the above portable dedicated terminal previously recorded in the above selected portable dedicated terminal and the specified compression coding method to the customer registration information in the customer database 1115, by the customer updating/retrieving part 1114.

In this manner, the data providing server 1101 can prepare a portable dedicated terminal to sell/rent this to the customer, and also can identify customer's portable dedicated terminal by the customer registration information (terminal identification information).

Then, the data providing server 1101 transmits the reservation data and the customer ID of the customer requesting the obtaining of the specified content data and the portable dedicated terminal 1104, from the customer updating/retrieving part 1114 to the data updating/retrieving part 1112.

The data providing server 1101 retrieves content additional information in the content data table in the content database 1113 based on the reservation data, and detects whether or not compressed content data generated by compressively coding the specified content data by the specified compression coding method (hereinafter, this is referred to as specified compressed content data) has been stored in the content database 1113, by the data updating/retrieving part 1112.

If that the specified compressed content data has been stored in the content database 1113 is detected by the data updating/retrieving part 1112, the data providing server 1101 reads that specified compressed content data from the above content database 1113.

In this case, the portable dedicated terminal prepared for the sale/rental to the customer (that is, before it is delivered to the customer) is directly connected to the dedicated terminal of the data providing server 1101 (not shown) via a cable or the like.

The data providing server 1101 transmits the specified compressed content data read from the content database 1113 from the dedicated terminal to the portable dedicated terminal with the customer ID via the cable or the like. They are recorded in the portable dedicated terminal.

On the contrary, in the case where the previous reservation has been accepted, if that the specified compressed content data has not been stored in the content database 1113 is detected by the data updating/retrieving part 1112, the data providing server 1101 successively retrieves package additional information in the package data table in the content database 1113 based on the reservation data by the data updating/retrieving part 1112.

As a result, if that the agency deals in packaged media storing the specified content data being the original data of the specified compressed content data is detected by the data updating/retrieving part 1112, the data providing server 1101 notifies a reproducing part 1117 being a changer of the packaged media storing the above specified content data (that is, package identification information) and that specified content data (that is, content identification information), and also notifies a compressing part 1118 that cope with various compression coding methods of the content identification information and the specified compression coding method of the specified content data.

In this case, the data providing server 1101 selects the packaged media storing the specified content data from among many packaged media that the agency deals in for sale and rental, and reproduces that specified content data from the above selected packaged media by the reproducing part 1117, and transmits the above reproduced specified content data to the compressing part 1118.

The data providing server 1101 compressively codes the specified content data supplied from the reproducing part 1117 by the specified compression coding method by the compressing part 1118. Thus obtained specified compressed content data is stored in the content database 1113 by making a correspondence to the content identification information.

The data providing server 1101 generates new content additional information based on the package additional information corresponding to the specified compressed content data stored in the content database 1113, and updates the content data table by adding the above generated content additional information to the content data table in the content database 1113, by the data updating/retrieving part 1112.

The data providing server 1101 reads the specified compressed content data newly stored from the content database 1113 by the data updating/retrieving part 1112, and records this in the portable dedicated terminal before it is delivered to the customer with the customer ID.

Figure 64:
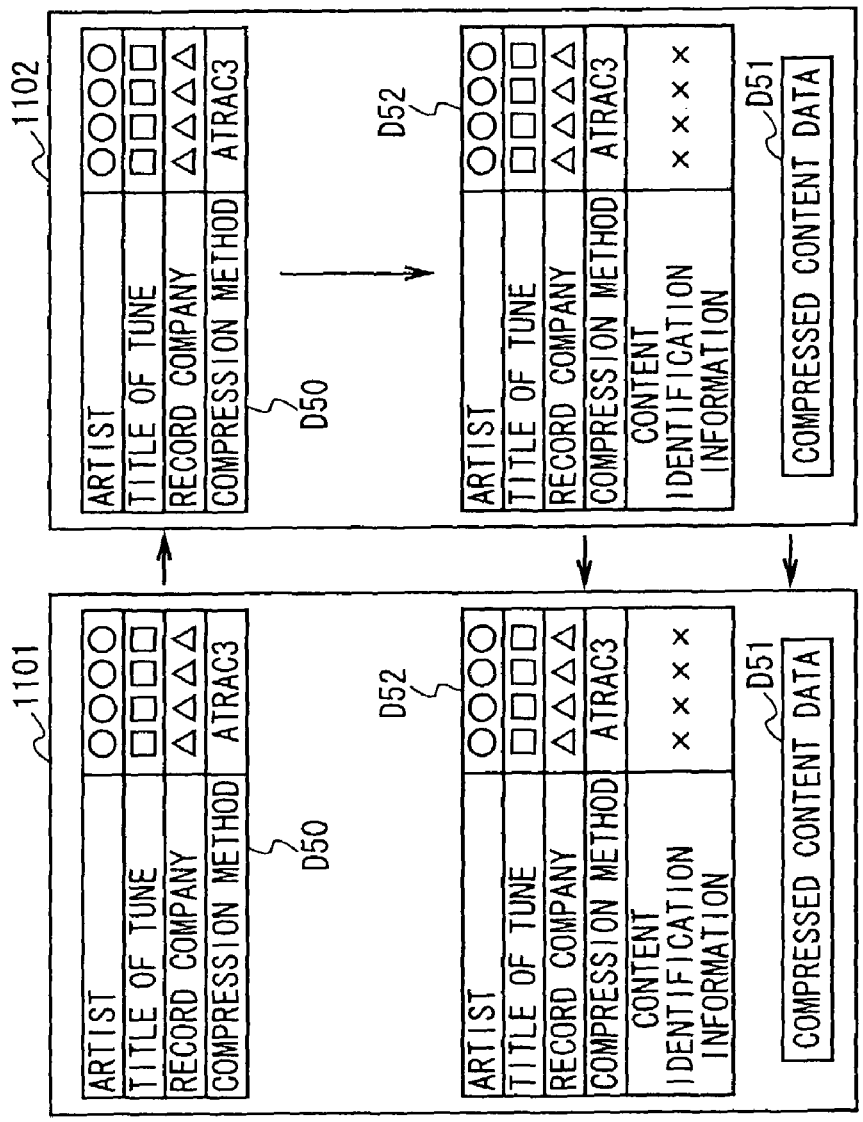
FIG. 64 is a schematic diagram for explaining the obtaining of specified compressed content data in the data providing server.

Furthermore, in the case where the previous registration has been accepted, if the specified compressed content data has not been stored in the content database 1113 and the package additional information in the package data table in the content database 1113 is retrieved based on the reservation data by the data updating/retrieving part 1112, and that the agency does not deal in the packaged media storing the specified content data is detected, the data providing server 1101 generates content request data D50 shown in FIG. 64, and sends this from the sending part 1116 to the content server 1102.

Here, in the content request data D50, content specifying information representing an artist name, a title (title of tune), a manufacturing company (record company), and specified compression coding method (e.g., ATRAC3 (trademark)) or the like, that correspond to the specified compressed content data, is stored.

As a result that the data providing server 1101 sent the content request data D50 to the content server 1102, if specified compressed content data D51 and corresponding content additional data D52 are sent from the above content server 1102 as shown in FIG. 64, the data providing server 1101 receives them by the receiving part 1111, and takes them in the data updating/retrieving part 1112.

The data providing server 1101 adds content additional information based on the content additional data D52 to the content data table in the content database 1113 and updates the above content data table by the data updating/retrieving part 1112, and stores the specified compressed content data D51 in the content database 1113 by making a correspondence to content identification information.

Then, the data providing server 1101 records the specified compressed content data D51 obtained from the content server 1102 and the customer ID in the portable dedicated terminal before it is delivered to the customer, by the data updating/retrieving part 1112.

In this manner, the data providing server 1101 accepts the previous reservation of the purchase/rental of the specified content data and the portable dedicated terminal 1104 requested by the customer by means of the request terminal 1103, and prepares the portable dedicated terminal 1104 in which the above specified content data has been recorded as specified compressed content data. Thereby, for instance, when the customer comes to the shop, that portable dedicated terminal 1104 can be delivered and sold/rented to the customer.

Then, if obtaining request data for requesting the obtaining (purchase/rental) of desired content data (including the customer ID of the customer previously recorded and terminal identification information) is sent from the portable dedicated terminal 1104 sold/rented to the customer, the data providing server 1101 receives this by the receiving part 1111, and takes this in the customer updating/retrieving part 1114.

At this time, the data providing server 1101 retrieves the customer registration information in the customer database 1115 based on the obtaining request data (i.e., customer ID), and detects whether or not the customer who requested to obtain (purchase/rental) the specified content data is a regular customer registered as a customer, by the customer updating/retrieving part 1114.

If that the customer requesting to obtain the specified content data is a regular customer is detected by the customer updating/retrieving part 1114, the data providing server 1101 compares terminal identification information included in the customer registration information on that customer in the content database 1113 with the terminal identification information included in the obtaining request data, to detect whether or not the above customer is using the authorized portable dedicated terminal 1104 bought/rented from the agency, successively, by the customer updating/retrieving part 1114.

If that the regular customer requesting to obtain the specified content data is using the authorized portable dedicated terminal 1104 is detected, the data providing server 1101 transmits the obtaining request data to the data updating/retrieving part 1112.

At this time, the data providing server 1101 reads content selecting screen data from the content database 1113 based on the obtaining request data by the data updating/retrieving part 1112, and sends the above read content selecting screen data from the sending part 1116 to the portable dedicated terminal 1104 of the customer.

Figure 65:
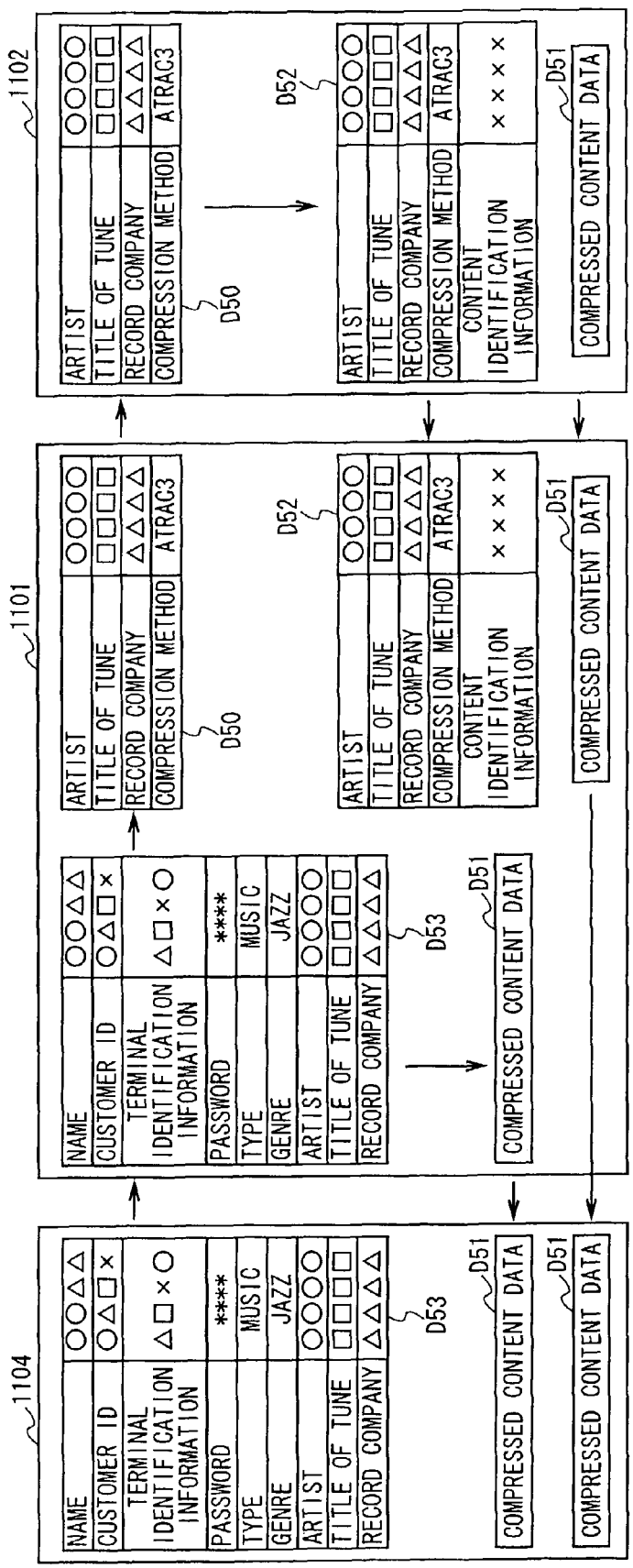
FIG. 65 is a schematic diagram for explaining the providing of specified compressed content data in the data providing server.

As a result, if specifying information for the specified content data is entered on a content selecting screen based on the content selecting screen data and content specifying data D53 shown in FIG. 65 representing the above specifying information is sent from the portable dedicated terminal 1104, the data providing server 1101 receives this by the receiving part 1111, and takes this in the customer updating/retrieving part 1114.

In this connection, in the content specifying data D53, as specifying information, information such as the customer's name, customer ID, terminal identification information on the portable dedicated terminal 1104 used by the customer, password, type of specified content data, genre, artist, title (title of tune), and manufacturing company (record company) will be stored.

The data providing server 1101 specifies the customer registration information on the customer in the customer database 1115 based on the customer ID included in the content specifying data D53 (that is, the customer who requested to purchase/rent the specified content data), by the customer updating/retrieving part 1114.

Then, the data providing server 1101 reads information on a specified compression coding method corresponding to the terminal identification information stored in the content specifying data D53 in the specified customer registration information (that is, information on a compression coding method corresponding to a specified decoding method applied to the portable dedicated terminal 1104 used by the customer) from the customer database 1115 by the customer updating/retrieving part 1114, adds the above read information on the specified compression coding method to the content specifying data D53, and transmits them to the data updating/retrieving part 1112.

The data providing server 1101 retrieves content additional information in the content data table in the content database 1113 based on the information on the specified compression coding method and the content specifying data D53, and detects whether or not the specified compressed content data has been stored in the content database 1113, by the data updating/retrieving part 1112.

As a result, if that the specified compressed content data has been stored in the content database 1113 is detected by the data updating/retrieving part 1112, the data providing server 1101 reads that specified compressed content data D51 from the above content database 1113, and sends this from the sending part 1116 to the portable dedicated terminal 1104. This data is recorded in the portable dedicated terminal 1104.

On the contrary, if that the specified compressed content data D51 has not been stored in the content database 1113 is detected by the data updating/retrieving part 1112, the data providing server 1101 retrieves the package additional information in the package data table in the content database 1113 based on the information on the specified compression coding method and the content specifying data D53, successively, by the data updating/retrieving part 1112.

As a result, if that the agency deals in packaged media storing the specified content data being the original data of the specified compressed content data D51 is detected by the data updating/retrieving part 1112, the data providing server 1101 notifies the reproducing part 1117 of the packaged media storing the above specified content data (that is, package identification information) and the specified content data (that is, content identification information), and notifies the compressing part 1118 of the content identification information and the specified compression coding method of the above specified content data.

Then, the data providing server 1101 selects the packaged media storing the specified content data from among many packaged media that the agency deals in for sale and rental, and reproduces that specified content data by the reproducing part 1117. In the compressing part 1118, the data providing server 1101 compressively codes the specified content data by the specified compression coding method, and stores thus obtained specified compressed content data in the content database 1113 by making a correspondence to the content identification information.

The data providing server 1101 generates new content additional information based on package additional information corresponding to the specified compressed content data stored in the content database 1113, adds the above generated content additional information to the content data table in the content database 1113, and updates the above content data table, by the data updating/retrieving part 1112.

The data providing server 1101 reads the specified compressed content data newly stored from the content database 1113, and sends the above read specified compressed content data from the sending part 1116 to the portable dedicated terminal 1104 by the data updating/retrieving part 1112. This data is recorded in the portable dedicated terminal 1104.

Furthermore, as a result that the specified compressed content data has not been stored in the content database 1113 and package additional information in the package data table in the content database 1113 is retrieved based on the reservation data by the data updating/retrieving part 1112, if that the agency does not deal in packaged media storing the specified content data is detected, as shown in FIG. 65, the data providing server 1101 generates content request data D50, and sends this from the sending part 1116 to the content server 1102.

As a result, if the specified compressed content data D51 and corresponding content additional data D52 are sent from the content server 1102, the data providing server 1101 receives them by the receiving part 1111, and takes them in the data updating/retrieving part 1112.

The data providing server 1101 adds content additional information based on the content additional data D52 to the content data table in the content database 1113, updates the above content data table, and stores the specified compressed content data D51 in the content database 1113 by making a correspondence to the content identification information, by the data updating/retrieving part 1112.

Then, the data providing server 1101 sends the specified compressed content data D51 obtained from that content server 1102, from the sending part 1116 to the portable dedicated terminal 1104 by the data updating/retrieving part 1112. This data is recorded in the portable dedicated terminal 1104.

In this manner, the data providing server 1101 sends the specified compressed content data to the portable dedicated terminal 1104 sold/rented to the customer via the Internet. Thus, the customer can buy/rent specified compressed content data by means of the portable dedicated terminal 1104.

In this connection, by the detection of whether or not the customer requesting the obtaining of specified content data is a regular customer, if that the above customer is not a regular customer is detected by the customer updating/retrieving part 1114, the data providing server 1101 stops the acceptance of the obtaining request of the specified content data, and notifies a communication device such as the portable dedicated terminal that the customer used to send the obtaining request data (for instance, a portable dedicated terminal that was illegally obtained), and a personal computer, of the stop of the acceptance of the obtaining request from the sending part 1116.

Furthermore, if that the customer requesting the obtaining of the specified content data is a regular customer registered as a customer but the customer uses a communication device such as another personal computer different from the authorized portable dedicated terminal 1104 is detected based on the terminal identification information by the customer updating/retrieving part 1114, the data providing server 1101 stops accepting the obtaining request of the specified content data from the customer, and notifies that communication terminal of the stop of the acceptance of the obtaining request from the sending part 1116.

By the way, the data providing server 1101 constantly retrieves a content database in the content database 1113 by the data updating/retrieving part 1112. Thereby, a compression coding method that is most frequently used for the specified compressed content data D51 newly stored in the above content database 1113 according to the obtaining request by the customer (hereinafter, this is referred to as most-frequently-used compression coding method) is detected.

The data providing server 1101 compares the number of times of using the most-frequently-used compression coding method to a predetermined threshold value previously set, by the data updating/retrieving part 1112.

If the number of times of using the most-frequently-used compression coding method is larger than the threshold value, the data providing server 1101 judges that at that point in time, the use of the most-frequently-used compression coding method is mainstream among the customers who use the data providing server 1101 to obtain specified content data and a possibility that the most-frequently-used compression coding method is specified when the customer obtains specified content data is remarkably high, by the data updating/retrieving part 1112.

Therefore, if the number of times of using the most-frequently-used compression coding method is larger than the threshold value, the data providing server 1101 detects compressed content data that has not been compressively coded by the most-frequently-used compression coding method from among every compressed content data stored in the content database 1113 by the data updating/retrieving part 1112.

Then, the data providing server 1101 compressively codes content data being the original data of that detected compressed content data by the most-frequently-used compression coding method by means of packaged media and the content server 1102 that the agency deals in, and additionally stores thus obtained compressed content data in the content database 1113, by the data updating/retrieving part 1112.

Since the data providing server 1101 prepares the specified compressed content data D51 compressively coded by the above most-frequently-used compression coding method in advance, when obtaining specified content data is requested by the customer, even if the most-frequently-used compression coding method is specified as a specified compression coding method for the above specified content data, the specified compressed content data D51 can be rapidly provided to the customer.

On the other hand, the content server 1102 receives the content request data D50 sent from the data providing server 1101 (FIGS. 64 and 65) by a receiving part 1120, and takes this in a data updating/retrieving part 1121.

In this case, the content server 1102 retrieves content additional information in the content data table in the content database 1110 based on the content request data D50, and detects whether or not the specified compressed content data D51 has been stored in the content database 1110, by the data updating/retrieving part 1121.

As a result, if the specified compressed content data D51 has been stored in the content database 1110 is detected by the data updating/retrieving part 1121, the data providing server 1101 reads that specified compressed content data D51 and content additional data D52 corresponding to this from the above content database 1110, and sends them from a sending part 1122 to the data providing server 1101.

On the contrary, if that the specified compressed content data D51 has not been stored in the content database 1110 is detected by the data updating/retrieving part 1121 (that is, in the case where the specified compressed content data D51 has not been stored completely or the specified content data has been stored by compressively coding by a different compression coding method from the specified compression coding method), the content server 1102 successively retrieves package additional information in the package data table in the content database 1110 based on the content request data D50 by the data updating/retrieving part 1121.

As a result, the content server 1102 detects packaged media storing the specified content data being the original data of the specified compressed content data by the data updating/retrieving part 1121, notifies a reproducing part 1123 being a changer of the above detected packaged media (that is, package identification information) and the specified content data (that is, content identification information), and notifies a compressing part 1124 cope with various compression coding methods of the content identification information and the specified compression coding method of the above specified content data.

The content server 1102 selects packaged media storing the specified content data from among many packaged media that the sales company deals in, reproduces that specified content data from the above selected packaged media by the reproducing part 1123, and transmits this to the compressing part 1124.

The content server 1102 compressively codes the specified content data supplied from the reproducing part 1123 by the specified compression coding method by the compressing part 1124, and stores thus obtained specified compressed content data D51 in the content database 1110 by making a correspondence to the content identification information.

Thereby, the content server 1102 reads the newly-stored specified compressed content data D51 from the content database 1110 by the data updating/retrieving part 1121, generates new content additional information based on the package additional information corresponding to the above read specified compressed content data D51, and sends content additional data D52 representing the above generated content additional information and the read specified compressed content data D51 from the sending part 1122 to the data providing server 1101.

In this connection, at this time, the content server 1102 adds the content additional information newly generated to the content data table in the content database 1110, and updates the above content data table by the data updating/retrieving part 1121.

By the way, the content server 1102 constantly retrieves a data table in the content database 1110 by the data updating/retrieving part 1121 similarly to the data providing server 1101, and detects the most-frequently-used compression coding method for the specified compressed content data D51 newly stored in the above content database 1110 according to the request from the data providing server 1101.

The content server 1102 compares the number of times of using the most-frequently-used compression coding method to a predetermined threshold value previously set, by the data updating/retrieving part 1112. If the number of times of using the most-frequently-used compression coding method is larger than the threshold value, the content server 1102 judges that at that point in time, the use of the most-frequently-used compression coding method is mainstream among the customers who use the data providing server 1101 to obtain specified content data and a possibility that the most-frequently-used compression coding method is specified when the customer obtains specified content data is remarkably high.

Therefore, if the number of times of using the most-frequently-used compression coding method is larger than the threshold value, the content server 1102 detects compressed content data that is not compressively coded by the most-frequently-used compression coding method from among every compressed content data stored in the content database 1110 by the data updating/retrieving part 1121.

Then, the data providing server 1102 reproduces content data being the original data of that detected compressed content data from packaged media that the sales company deals in, compressively codes this by the most-frequently-used compression coding method, and additionally stores thus obtained compressed content data in the content database 1110.

Since the content server 1102 prepares the specified compressed content data D51 compressively coded by the above most-frequently-used compression coding method in advance, when obtaining the specified content data is requested from the data providing server 1101, even if the most-frequently-used compression coding method is specified as a specified compression coding method for the above specified content data, the specified compressed content data D51 can be rapidly provided to the data providing server 1101.

On the other hand, if a customer registration request is entered by the customer via an operating part 1130, the request terminal 1103 generates registration request data representing the registration request by a request data generating part 1131, and sends this from a sending part 1132 to the data providing server 1101.

As a result, if the request terminal 1103 receives customer registration screen data from the data providing server 1101 by a receiving part 1133, the request terminal 1103 transmits the above received customer registration screen data from a display control part 1134 to a display part 1135, so that a customer registration screen based on the customer registration screen data is displayed on the above display part 1135.

If customer information is entered on the customer registration screen by that the customer operates the operating part 1130, the request terminal 1103 generates customer information data by the request data generating part 1131, and sends this from the sending part 1132 to the data providing server 1101. Thus, the customer is registered in the data providing server 1101.

In this connection, as a result of the customer registration, if registration completion data is sent from the data providing server 1101, the request terminal 1103 receives this by the receiving part 1133, and transmits this to the display part 1135 via the display control part 1134, to notify the customer of the completion of the customer registration and the customer ID via the above display part 1135.

If content data obtaining request is entered by the customer via the operating part 1130, the request terminal 1103 generates obtaining request data representing that obtaining request (including the customer ID) by the request data generating part 1131, and sends the above generated obtaining request data from the sending part 1132 to the data providing server 1101.

As a result, if the request terminal 1103 receives content selecting screen data from the data providing server 1101 by the receiving part 1133, the request terminal 1103 transmits this from the display control part 1134 to the display part 1135, so that a content selecting screen based on the content selecting screen data is displayed on the above display part 1135.

Then, if reservation information is entered on the content selecting screen by that the customer operates the operating part 1130, the request terminal 1103 generates reservation data by the request data generating part 1131, and sends this from the sending part 1132 to the data providing server 1101. Thus, the reservation of purchase/rental of the specified content data and the portable dedicated terminal 1104 by the customer is finished.

In this connection, as a result of that the obtaining request data is sent to the data providing server 1101, if that the customer is not a regular customer is detected and stopping the acceptance of the obtaining request is notified, the request terminal 1103 receives that notification by the receiving part 1133, and transmits this to the display part 1135 via the display control part 1134, to notify the customer of that accepting the obtaining request is stopped via the above display part 1135, and to urge the customer to a customer registration.

Furthermore, if a reproducing command is entered via an operating part 1141, the portable dedicated terminal 1104 which has been sold/rented to the customer in the state where the specified compressed content data has been recorded in the internal recording medium 1140, reproduces the specified compressed content data previously bought/rented by the customer from the recording medium 1140 by a reproducing control part 1142, and transmits the above reproduced specified compressed content data to a decoding part 1143.

The portable dedicated terminal 1104 decodes the specified compressed content data by the decoding part 1143, and transmits thus obtained specified content data to a reproducing part 1144 composed of a display control part, a display part, a speaker, etc. Thus, the customer can enjoy a content based on the specified content data.

Furthermore, if a content data obtaining request is entered by the customer via the operating part 1141, the portable dedicated terminal 1104 generates obtaining request data that represents the obtaining request and includes the customer ID and the terminal identification information, for instance, previously recorded in the recording medium 1140, by the request data generating part 1145, and sends the above generated obtaining request data from the sending part 1146 to the data providing server 1101.

As a result, if the portable dedicated terminal 1104 receives content selecting screen data from the data providing server 1101 by a receiving part 1147, the portable dedicated terminal 1104 transmits this to the reproducing part 1144, so that a content selecting screen based on the content selecting screen data is displayed.

Then, if specifying information on specified content data is entered on the content selecting screen according to the operation of the operating part 1141, the portable dedicated terminal 1104 generates content specifying data D53 that represents the specifying information and includes the customer ID and the terminal identification information, for instance, previously recorded in the recording medium 1140 by the request data generating part 1145, and sends the above generated content specifying data D53 from the sending part 1146 to the data providing server 1101.

As a result, if the portable dedicated terminal 1104 receives the specified compressed content data D51 from the data providing server 1101 by a receiving part 346, the portable dedicated terminal 1104 records the above received specified compressed content data D51 in the recording medium 1140 by a recording control part 1148.

Thereby, after that, the portable dedicated terminal 1104 can reproduce the specified compressed content data newly obtained (that is, bought/rented), from the recording medium 1140 by the reproducing control part 1142, according to the operation of the operating part 1141, similarly to the aforementioned case.

Here, content providing and obtaining processing procedures by the data providing server 1101, the content server 1102 and the portable dedicated terminal 1104 in the data providing system 1100 will be collectively described. As shown in FIGS. 66A and 67A, the portable dedicated terminal 1104 first enters routine RT50 from the start step, and proceeds to step SP601.

In step SP601, the portable dedicated terminal 1104 awaits that an obtaining request is entered via the operating part 1141. If the above obtaining request is entered, the portable dedicated terminal 1104 proceeds to step SP602.

In step SP602, the portable dedicated terminal 1104 generates obtaining request data by the request data generating part 1145, and sends this from the sending part 1146 to the data providing server 1101. Then, the portable dedicated terminal 1104 proceeds to step SP603.

At this time, as shown in FIGS. 66B and 67B, the data providing server 1101 enters routine RT51 from the start step, and proceeds to step SP621. In the above step SP621, the data providing server 1101 awaits that obtaining request data is sent from the portable dedicated terminal 1104.

Then, in step SP621, if the data providing server 1101 receives the obtaining request data from the portable dedicated terminal 1104 by the receiving part 1111, the data providing server 1101 proceeds to step SP622.

In step-SP622, the data providing server 1101 judges whether or not terminal identification information included in the obtaining request data is terminal identification information peculiar to a authorized portable dedicated terminal 1104 sold/rented to the customer from the agency, by the customer updating/retrieving part 1114.

Obtaining an affirmative result in this step SP622 means that the customer requested to obtain specified content data by means of a authorized portable dedicated terminal 1104 that the customer bought/rented from the agency (that is, the customer sent obtaining request data). At this time, the data providing server 1101 proceeds to step SP623.

In step SP623, the data providing server 1101 reads content selecting screen data from the content database 1113 according to the obtaining request data by the data updating/retrieving part 1112, and sends the above read content selecting screen data from the sending part 1116 to the portable dedicated terminal 1104. Then, the data providing server 1101 proceeds to step SP624.

At this time, in step SP603, the portable dedicated terminal 1104 awaits that the content selecting screen data is sent from the data providing server 1101. If the portable dedicated terminal 1104 receives the above content selecting screen data by the receiving part 1147, the portable dedicated terminal 1104 transmits this to the reproducing part 1144 and displays a content selecting screen, and proceeds to step SP604.

In step SP604, the portable dedicated terminal 1104 awaits that specifying information for specifying the specifying content data is entered on the content selecting screen according to the operation of the operating part 1141. If the above specifying information is entered, the portable dedicated terminal 1104 proceeds to step SP605.

In step SP605, the portable dedicated terminal 1104 generates content specifying data D53 by the request data generating part 1145, sends the above generated content specifying data D53 from the sending part 1146 to the data providing server 1101, and proceeds to step SP606.

At this time, in step SP624, the data providing server 1101 awaits that the content specifying data D53 is sent from the portable dedicated terminal 1104. If the data providing server 1101 receives the content specifying data D53 from the above portable dedicated terminal 1104, the data providing server 1101 proceeds to step SP625.

In step SP625, the data providing server 1101 detects a specified compression coding method corresponding to the terminal identification information on the portable dedicated terminal 1104 used by the customer, based on the content specifying data D53 by the customer updating/retrieving part 1114, retrieves data in the content database 1113 based on the information on that specified compression coding method and the content specifying data D53 by the data updating/retrieving part 1112, and proceeds to step SP626.

In step SP626, the data providing server 1101 judges whether or not specified compressed content data D51 should be obtained according to the obtaining request of the specified content data by the customer.

Obtaining a negative result in this step SP626 means that the specified compressed content data D51 has been stored in the content database 1113 of the data providing server 1101, or it means that the specified compressed content data D51 has not been stored in the above content database 1113, however, there is packaged media storing the specified content data being the original data of the specified compressed content data D51 in many packaged media that the agency deals in.

At this time, the data providing server 1101 reads the specified compressed content data D51 from the content database 1113 by the data updating/retrieving part 1112, or reproduces the specified content data from the packaged media, compressively codes this by the specified compression coding method, and generates the specified compressed content data D51 by the data updating/retrieving part 1112, the reproducing part 1117 and the compressing part 1118. Then, the data providing server 1101 proceeds to step SP627.

On the contrary, obtaining an affirmative result in step SP626 means that the specified compressed content data D51 has not been stored in the content database 1113 of the data providing server 1101 and there is no packaged media storing the specified content data being the original data of the specified compressed content data D51 also in the packaged media that the agency deals in. At this time, the data providing server 1101 proceeds to step SP628.

In step SP628, the data providing server 1101 generates content request data D50 based on the content specifying data D53 by the data updating/retrieving part 1112, sends the above generated content request data D50 from the sending part 1116 to the content server 1102, and proceeds to step SP629.

At this time, as shown in FIGS. 66C and 67C, the content server 1102 enters routine RT52 from the start step, and proceeds to step SP641. In the above step SP641, the content server 1102 awaits that the content request data D50 is sent from the data providing server 1101.

Then, in step SP641, if the content server 1102 receives the content request data D50 from the data providing server 1101 by the receiving part 1120, the content server 1102 proceeds to step SP642.

In step SP642, the content server 1102 retrieves data in the content database 1110 based on the content request data D50 by the data updating/retrieving part 1121, and proceeds to step SP643.

In step SP643, the content server 1102 judges whether or not it is necessary to generate the above specified compressed content data D51 according to the obtaining request of the specified compressed content data D51 from the data providing server 1101.

Obtaining a negative result in this step SP643 means that the specified compressed content data D51 has been stored in the content database 1110 of the content server 1102. At this time, the content server 1102 reads the specified compressed content data D51 and corresponding content additional data D52 from the content database 1110 based on the content request data D50 by the data updating/retrieving part 1121, and proceeds to step SP644.

On the contrary, obtaining an affirmative result in step SP643 means that the specified compressed content data D51 has not been stored in the content database 1110 of the content server 1102 and it is necessary to generate the specified compressed content data D51 by means of packaged media that the sales company deals in. At this time, the content server 1102 proceeds to step SP645.

In step SP645, the content server 1102 reproduces the specified content data from the packaged media, compressively codes the above reproduced specified content data by the specified compression coding method, and generates specified compressed content data D51 by the data updating/retrieving part 1121, the reproducing part 1123 and the compressing part 1124, and proceeds to step SP646.

In step SP646, the content server 1102 generates content additional information corresponding to the above specified compressed content data D51 based on package additional information on the packaged media that was used to generate the specified compressed content data D51, adds the above generated content additional information to a content data table in the content database 1110, and updates the above content data table. Then, the content server 1102 proceeds to step SP644.

In step SP644, the content server 1102 sends the specified compressed content data D51 and the content additional data D52 read from the content database 1110 in step SP643, or the specified compressed content data D51 generated in step SP645, from the sending part 1122 to the data providing server 1101 with the content additional data D52 representing the content additional information generated in step SP646. Then, the content server 1102 proceeds to step SP647, and finishes the processing of the above content server 1102.

At this time, in step SP629, the data providing server 1101 awaits that the specified compressed content data D51 and the content additional data D52 are sent from the content server 1102. If the data providing server 1101 receives the above specified compressed content data D51 and content additional data D52 by the receiving part 1111, the data providing server 1101 proceeds to step SP630.

In step SP630, the data providing server 1101 stores the specified compressed content data D51 obtained from the content server 1102 in the content database 1113, adds the content additional information based on the content additional data D52 obtained from the above content server 1102 to a content data table in the content database 1113, and updates the above content data table, by the data updating/retrieving part 1112. Then, the data providing server 1101 proceeds to step SP627.

In step SP627, the data providing server 1101 sends the specified compressed content data D51 corresponding to the content specifying data D53 from the sending part 1116 to the portable dedicated terminal 1104. Then, the data providing server 1101 proceeds to step SP228, and finishes the processing by the above data providing server 1101.

In this connection, obtaining a negative result in the aforementioned step SP622 means that the customer requested to obtain specified content data (that is, the customer sent the obtaining request data) by means of another communication device different from a authorized portable dedicated terminal 1104 that the customer bought/rented from the agency. At this time, the data providing server 1101 proceeds to step SP631.

In step SP606, the portable dedicated terminal 1104 awaits that the specified compressed content data D51 is sent from the data providing server 1101. If the portable dedicated terminal 1104 receives the above specified compressed content data D51 by the receiving part 1147, the portable dedicated terminal 1104 proceeds to step SP607.

In step SP607, the portable dedicated terminal 1104 records the specified compressed content data D51 obtained from the data providing server 1101 in the recording medium 1140 by the recording control part 1148, and proceeds to step SP608 to finish the processing by the above portable dedicated terminal 1104. Thus, the data providing system 1100 completely finishes the content providing and obtaining processing.

In this manner, the above data providing system 1100 can provide specified compressed content data D51 that has been always compressively coded by a specified compression coding method specified by the customer to the portable dedicated terminal 1104.

In the above configuration, in this data providing system 1100, the portable dedicated terminal 1104 applying a specified decoding method corresponding to a desired specified compression coding method is sold/rented to the customer registered as a customer in the data providing server 1101.

Furthermore, in this data providing system 1100, many compressed content data, content additional information composed of information on a compression coding method that was used when these compressed content data were generated respectively and content identification, and package additional information representing content data stored in each packaged media that the agency deals in, have been stored in the content database 1113 of the data providing server 1101.

Furthermore, in this data providing system 1100, as customer registration information on the customer registered as a customer in the customer database 1115 of the data providing server 1101, terminal identification information peculiar to the portable dedicated terminal 1104 sold/rented to the customer and information on the specified compression coding method desired by the customer corresponding to the above terminal identification information have been stored.

Then, in this data providing system 1100, if content specifying data D53 representing desired specified content data and terminal identification peculiar to the portable dedicated terminal 1104 are sent from the portable dedicated terminal 1104 used by the customer to the data providing server 1101, the data providing server 1101 retrieves customer registration information in the customer database 1115 based on the content specifying data D53 and detects a specified compression coding method corresponding to the terminal identification information, and retrieves content additional information in the content database 1113 based on the above detected information on the specified compression coding method and content data specifying information stored in the content specifying data D53.

As a result, in this data providing system 1100, if that the specified content data specified by the customer has been stored in the content database 1113 as specified compressed content data D51 is detected, the data providing server 1101 reads that specified compressed content data D51 from the above content database 1113, and sends the above read specified compressed content data D51 to the portable dedicated terminal 1104.

Furthermore, in this data providing system 1100, if that the specified content data specified by the customer has not been stored in the content database 1113 as the specified compressed content data D51 is detected, the data providing server 1101 retrieves package additional information in the content database 1113 based on the content data specifying information stored in the content specifying data D53.

As a result, in the data providing system 1100, if that the agency deals in packaged media storing the specified content data being the original data of the specified compressed content data D51 is detected, the data providing server 1101 reproduces that specified content data from the packaged media storing the above specified content data, compressively codes the reproduced data by the specified compression coding method corresponding to the terminal identification information, and sends thus obtained specified compressed content data D51 to the portable dedicated terminal 1104.

Accordingly, in this data providing system 1100, the above specified content data can be provided to the customer as the specified compressed content data D51 compressively coded by the specified compression coding method corresponding to a specified decoding method applied to the portable dedicated terminal 1104, every time when the portable dedicated terminal 1104 requests the data providing server 1101 to obtain the specified content data.

Therefore, in the data providing system 1100, the above specified compressed content data D51 can be accurately decoded by the decoding part 1143 previously provided in the portable dedicated terminal 1104, every time when the portable dedicated terminal 1104 obtains the specified compressed content data D51, without newly obtaining a decoding software or newly providing a decoding circuit applying another decoding method different from a specified decoding method previously applied.

In this data providing system 1100, in the data providing server 1101, if specified compressed content data D51 is newly generated according to the obtaining request of specified content data by means of packaged media, the above generated specified compressed content data D51 is additionally stored in the content database 1113.

Accordingly, in this data providing system 1100, compressed content data for providing can be properly increased according to the obtaining request of specified content data. Thereby, when compressed content data is provided, a possibility that the data providing server 1101 generates new compressed content data can be reduced. Therefore, also load on processing at the time of providing compressed content data can be reduced.

In this data providing system 1100, in the case where the specified compressed content data D51 has not been stored in the content database 1113 of the data providing server 1101 and the agency does not deal in the packaged media storing the specified content data, the specified compressed content data D51 is sent from the content server 1102 to the portable dedicated terminal 1104 via the data providing server 1101.

Therefore, in this data providing system 1100, even if the circuit scale of the data providing server 1101 is comparatively reduced and also the shop scale of the agency is comparatively reduced, various specified compressed content data D51 can be provided to the customer via the portable dedicated terminal 1104.

According to the above configuration, in the data providing server 1101, whether or not specified compressed content data D51 generated by compressively coding specified content data by a specified compression coding method corresponding to terminal identification information has been stored in the content database 1113 is detected according to content specifying data D53 including the terminal identification information sent from the portable dedicated terminal 1104. As the detection result, if the specified compressed content data D51 has been stored in the content database 1113, the specified compressed content data D51 is read from the above content database 1113, and sent to the portable dedicated terminal 1104. If the specified compressed content data D51 has not been stored in the content database 1113, the specified content being the original data of the above specified compressed content data D51 is compressively coded by the specified compression coding method by means of packaged media to generate the specified compressed content data D51, and the above generated specified compressed content data D51 is sent to the portable dedicated terminal 1104. Thereby, specified compressed content data D51 generated by compressively coding specified content data by a specified compression coding method corresponding to a specified decoding method can be accurately provided, every time when the obtaining of specified content data is requested from a portable dedicated terminal 1104, without newly applying another decoding method different from a specified decoding method previously applied to the portable dedicated terminal 1104. Thus, a data providing system that the customer can easily view a content based on content data can be accomplished.

Note that, in the aforementioned eleventh embodiment, it has dealt with the case where the data providing server 1101 is installed in the agency and the content server 1102 is installed in the sales company. However, this invention is not only limited to this but also provided that specified compressed content data D51 can be provided/supplied, the data providing server 1101 and the content server 1102 may be installed in various places.

In the aforementioned eleventh embodiment, it has dealt with the case where the portable dedicated terminal 1104 applying a specified decoding method corresponding to a specified compression coding method is delivered to the customer by specifying the desired specified compression coding method to the data providing server 1101 at the time of a customer registration. However, this invention is not only limited to this but also a specified compression coding method may be arbitrary selected on the data providing server 1101 side so that the portable dedicated terminal 1104 applying a decoding method corresponding to the compression coding method of the specified compressed content data D51 stored in the content database 1113 of the data providing server 1101 and the content database 1110 of the content server 1102 as the specified content data specified by the customer at the time of previous reservation is delivered to the customer, without specially specifying desired compression coding method in a customer registration.

In the aforementioned eleventh embodiment, it has dealt with the case where the data providing server 1101 and the content server 1102 respectively constantly detect the most-frequently-used compression coding method, and compressively code all of the content data using a compression coding method different from the above detected most-frequently-used compression coding method by that most-frequently-used compression coding method. However, this invention is not only limited to this but also the most-frequently-used compression coding method may be constantly detected for each various categories such as the genre, type, and artist of content, and all of content data using the compression coding method different from the most-frequently-used compression coding method may be compressively coded by that most-frequently-used compression coding method by categories.

In the aforementioned eleventh embodiment, it has dealt with the case where compressed content data compressively coded by various compression coding methods will be provided by the data providing server 1101 and the content server 1102. However, this invention is not only limited to this but also only compressed content data compressively coded by an arbitrary one type of compression coding method may be provided by the data providing server 1101 and the content server 1102.

Thereby, the agency can prepare only the portable dedicated terminal 1104 applying one type of decoding method and provide this. Thus, the cost of arranging portable dedicated terminals 1104 for sale and rental can be reduced.

Furthermore, if obtaining specified content data is requested from the customer using the portable dedicated terminal 1104, it is unnecessary to confirm a specified compression coding method desired by the customer. Therefore, it is necessary to confirm only whether or not the portable dedicated terminal 1104 that was used in the obtaining request of the specified content data is an authorized portable dedicated terminal 1104 based on terminal identification information. Thus, the processing of the acceptance of the obtaining request can be simplified.

In the aforementioned eleventh embodiment, it has dealt with the case where if the specified compressed content data D51 has not been stored in the content database 1113 of the content database 1113 and the content database 1110 of the content server 1102, the specified compressed content data D51 is generated by means of packaged media. However, this invention is not only limited to this but also a new database may be provided in the data providing server 1101 and/or the content server 1102 to previously store content data being the original data of compressed content data, and if the specified compressed content data D51 has not been stored in the content databases 1113 and 1110, the specified compressed content data D51 may be generated by means of content data in the database.

Furthermore, in the aforementioned eleventh embodiment, it has dealt with the case where the data providing server 1101, the content server 1102 and the portable dedicated terminal 1104 execute the content providing and obtaining processing procedure described above with reference to FIGS. 66A to 66C, and 67A to 67C. However, this invention is not only limited to this but also a program to execute the content providing and obtaining processing procedure may be respectively previously stored in the data providing server 1101, the content server 1102 and the portable dedicated terminal 1104, and the content providing and obtaining processing may be executed according to these programs, and a program storing medium storing the program may be installed in the data providing server 1101, the content server 1102 and the portable dedicated terminal 1104 to execute the above content providing and obtaining processing.

In this connection, as a program storing medium for installing various programs to execute the above content providing and obtaining processing in the data providing server 1101, the content server 1102 and the portable dedicated terminal 1104 and for making them executable, for instance, it may be realized by a semiconductor memory and a magnetic disk, that temporary or permanently store various programs, only by packaged media such as a flexible disk, a CD-ROM and a DVD. Furthermore, as means for storing various programs in the program storing medium, a cable/wireless communication medium such as a local area network, the Internet, and a digital satellite broadcasting may be used, and the programs may be stored via various communication interface such as a router and a modem.

(13) Other Embodiments

In the aforementioned first to eleventh embodiments, it has dealt with the case where in order to obtain compressed content data, identification information peculiar to a content obtaining apparatus is transmitted from the content obtaining apparatus. However, this invention is not only limited to this but also identification data representing a specified compression coding method applied to the content obtaining apparatus may be transmitted.

Note that, in the aforementioned first to eleventh embodiments, it has dealt with the case where as a content providing apparatus for providing compressed content data generated by compressively coding content data by a specified compression coding method according to this invention, the data providing server 1101 described above with reference to FIGS. 63 to 67C is applied. However, this invention is not only limited to this but also, provided that compressed content data generated by compressively coding content data by a specified compression coding method is provided, content providing apparatuses having various configurations other than that, such as a content providing apparatus in which the data providing server 1101 and the content server 1102 are unified and a content providing apparatus being a personal computer can be widely applied.

In the aforementioned first to eleventh embodiments, it has dealt with the case where as a content obtaining apparatus applying a specified decoding method corresponding to a specified compression coding method, for obtaining compressed content data provided from a content providing apparatus according to this invention, the portable dedicated terminal 1104 described above with reference to FIGS. 63 to 67C is applied. However, this invention is not only limited to this but also, provided that it applies a specified decoding method corresponding to a specified compression coding method and it can obtain compressed content data provided from a content providing apparatus, content obtaining apparatuses having various configurations other than that such as a personal computer, a portable telephone, and a personal digital assistance (PDA) can be widely applied.

Furthermore, in the aforementioned first to eleventh embodiments, it has dealt with the case where as a content providing and obtaining system constructed by a content providing apparatus for providing compressed content data generated by compressively coding content data by a specified compression coding method, and a content obtaining apparatus applying a specified decoding method corresponding to the specified compression coding method, for obtaining compressed content data provided from the content providing apparatus, the data providing system 1100 described above with reference to FIGS. 63 to 67C is applied. However, this invention is not only limited to this but also, provided that it is a system capable of obtaining compressed content data provided from a content providing apparatus by means of a content obtaining apparatus applying a specified decoding method corresponding to a specified compression coding method, content providing and obtaining systems having other various configurations other than that can be widely applied.

In the aforementioned first to eleventh embodiments, it has dealt with the case where as a content supplying apparatus for supplying compressed content data to a content providing apparatus, the content server 1102 described above with reference to FIGS. 63 to 67C is applied. However, this invention is not only limited to this but also, provided that it can supply compressed content data to a content providing apparatus, a content supplying apparatuses having various configurations other than that such as a content supplying apparatus being a personal computer can be widely applied.

In the aforementioned first to eleventh embodiments, it has dealt with the case where as data storing means for storing plural kinds of compressed content data, the content database 1113 described above with reference to FIGS. 63 to 67C is applied. However, this invention is not only limited to this but also, provided that it can store plural kinds of compressed content data, various data storing means other than that corresponding to a recording medium to be used can be widely applied.

In the aforementioned first to eleventh embodiments, it has dealt with the case where as information receiving means for receiving identification information peculiar to a content obtaining apparatus sent therefrom and specifying information representing specified content data that the customer wanted to obtain, the receiving part 1111 connected to the Internet described above with reference to FIGS. 63 to 67C is applied. However, this invention is not only limited to this but also, provided that it can receive identification information peculiar to a content obtaining apparatus sent therefrom and specifying information representing specified content data that the customer wanted to obtain, various information receiving means other than that corresponding to a radio/cable communication system to be used can be widely applied.

In the aforementioned first to eleventh embodiments, it has dealt with the case where as data detecting means for detecting whether or not specified compressed content data generated by compressively coding specified content data by a specified compression coding method corresponding to identification information has been stored in data storing means according to the identification information and specifying information, the data updating/retrieving part 1112 described above with reference to FIGS. 63 to 67C is applied. However, this invention is not only limited to this but also, provided that it can detect whether or not specified compressed content data generated by compressively coding specified content data by a specified compression coding method identification information has been stored in data storing means according to the identification information and specifying information, various data detecting means other than that such as a CPU and a microprocessor can be widely applied.

In the aforementioned first to eleventh embodiments, it has dealt with the case where as reading means in the case where specified compressed content data has been stored in the data storing means for reading the specified compressed content data from the data storing means according to the detection result by the data detecting means according to the detection result by the data detecting means, the data updating/retrieving part 1112 described above with reference to FIGS. 63 to 67C is applied. However, this invention is not only limited to this but also, provided that in the case where the specified compressed content data has been stored in the data storing means, it can read the specified compressed content data from the data storing means, according to the detection result by the data detecting means, various reading means other than that such as a CPU and a microprocessor can be widely applied.

In the aforementioned first to eleventh embodiments, it has dealt with the case where as compressively-coding means, in the case where specified compressed content data has not been stored in the data storing means, for compressively coding specified content data being the original data of the above specified compressed content data by a specified compression coding method and generating the specified compressed content data, according to the detection result by the data detecting means, the compressing part 1118 described above with reference to FIGS. 63 to 67C is applied. However, this invention is not only limited to this but also, provided that in the case where the specified compressed content data has not been stored in the data storing means, it can compressively code the specified content data being the original data of the above specified compressed content data by a specified compression coding method and can generate the specified compressed content data, according to the detection result by the data detecting means, various compressively-coding means other than that such as a CPU and a microprocessor that compressively codes data by means of a software for compression coding can be widely applied.

In the aforementioned first to eleventh embodiments, it has dealt with the case where as data transmitting means for transmitting specified compressed content data read from the data storing means by the reading means and specified compressed content data generated by the compressively-coding means to a content obtaining apparatus, the sending part 1116 connected to the Internet described above with reference to FIGS. 63 to 67C is applied. However, this invention is not only limited to this but also, provided that it can transmit specified compressed content data read from the data storing means by the reading means and specified compressed content data generated by the compressively-coding means to a content obtaining apparatus, various data transmitting means other than that corresponding to a radio/cable communication system to be used can be widely applied.

In the aforementioned first to eleventh embodiments, it has dealt with the case where as information transmitting means for transmitting identification information and specifying information to a content providing apparatus, the sending part 1146 connected to the Internet described above with reference to FIGS. 63 to 67C is applied. However, this invention is not only limited to this but also, provided that it can transmit identification information and specifying information to a content providing apparatus, various information transmitting means other than that corresponding to a radio/cable communication system to be used can be widely applied.

In the aforementioned first to eleventh embodiments, it has dealt with the case where as data receiving means for receiving specified compressed content data from a content providing apparatus, the receiving part 1147 connected to the Internet described above with reference to FIGS. 63 to 67C is applied. However, this invention is not only limited to this but also, provided that it can receive specified compressed content data from a content providing apparatus, various data receiving means other than that corresponding to a radio/cable communication system to be used can be widely applied.

In the aforementioned first to eleventh embodiments, it has dealt with the case where as decoding means for decoding specified compressed content data by a specified decoding method and generating specified content data, the decoding part 1143 described above with reference to FIGS. 63 to 67C is applied. However, this invention is not only limited to this but also, provided that it can decode specified compressed content data by a specified decoding method and generate specified content data, various decoding means other than that such as a CPU and a microprocessor that perform decoding by means of a decoding software can be widely applied.

In the aforementioned first to eleventh embodiments, it has dealt with the case where as judging means for judging whether or not a content obtaining apparatus which transmitted identification information is an authorized apparatus usable the providing service of specified content data based on the identification information, the customer updating/retrieving part 1114 described above with reference to FIGS. 63 to 67C is applied. However, this invention is not only limited to this but also, provided that it can judge whether or not a content obtaining apparatus which transmitted identification information is an authorized apparatus usable the providing service of specified content data based on the identification information, various judging means other than that such as a CPU and a microprocessor can be widely applied.

In the aforementioned first to eleventh embodiments, it has dealt with the case where as information storing means for storing identification information and information on a specified compression coding method corresponding to a specified decoding method applied to a content obtaining apparatus allocated to which the above identification information has been allocated by making a correspondence, the customer database 1115 described above with reference to FIGS. 63 to 67C is applied. However, this invention is not only limited to this but also, provided that it can store identification information and information on a specified compression coding method corresponding to a specified decoding method applied to a content obtaining apparatus to which the above identification information has been allocated by making a correspondence, various information storing medium other than that can be widely applied corresponding to a recording medium to be used.

In the aforementioned first to eleventh embodiments, it has dealt with the case where as information detecting means for detecting a specified compression coding method corresponding to identification information in information storing means based on identification information sent from a content obtaining apparatus, the customer updating/retrieving part 1114 described above with FIGS. 63 to 67C is applied. However, this invention is not only limited to this but also, provided that it can detect a specified compression coding method corresponding to identification information in data storing means based on the identification information sent from a content obtaining apparatus, various information detecting means other than that such as a CPU and a microprocessor can be widely applied.

In the aforementioned first to eleventh embodiments, it has dealt with the case where as recording means, when specified compressed content data is generated by the compressively-coding means, for recording and storing the above generated specified compressed content data in the data storing means, the data updating/retrieving part 1112 described above with reference to FIGS. 63 to 67C is applied. However, this invention is not only limited to this but also, provided that when specified compressed content data is generated by the compressively-coding means, it can record and store the above generated specified compressed content data in data storing means, various recording means other than that such as a CPU and a microprocessor can be widely applied.

In the aforementioned first to eleventh embodiments, it has dealt with the case where as supply-side data storing means for storing plural kinds of compressed content data for supply at least different from plural kinds of compressed content data stored in the data storing means of a content providing apparatus, the content database 1110 described above with reference to FIGS. 63 to 67C is applied. However, this invention is not only limited to this but also, provided that it can store plural kinds of compressed content data for supply at least different from plural kinds of compressed content data stored in the data storing means of a content providing apparatus, various supply-side data storing means other than that corresponding to a recording medium to be used can be widely applied.

In the aforementioned first to eleventh embodiments, it has dealt with the case where as supply-side information receiving means for receiving request information representing a specified compression coding method and specified content data from a content providing apparatus, the receiving part 1120 connected to the Internet described above with reference to FIGS. 63 to 67C is applied. However, this invention is not only limited to this but also, provided that it can receive request information representing a specified compression coding method and specified content data from a content providing apparatus, various supply-side information receiving means other than that corresponding to a radio/cable communication system to be used can be widely applied.

In the aforementioned first to eleventh embodiments, it has dealt with the case where as supply-side data detecting means for detecting whether or not specified compressed content data generated by compressively coding specified content data by a specified compression coding method has been stored in the supply-side data storing means based on request information, the data updating/retrieving part 1121 described above with reference to FIGS. 63 to 67C is applied. However, this invention is not only limited to this but also, provided that it can detect whether or not specified compressed content data generated by compressively coding specified content data by a specified compression coding method has been stored in supply-side data storing means based on request information, various supply-side data detecting means other than that such as a CPU and a microprocessor can be widely applied.

In the aforementioned first to eleventh embodiments, it has dealt with the case where as supply-side reading means, in the case where the specified compressed content data has been stored in the supply-side data storing means, for reading the specified compressed content data from the supply-side data storing means according to the detection result by the supply-side data detecting means, the data updating/retrieving part 1121 described above with reference to FIGS. 63 to 67C is applied. However, this invention is not only limited to this but also, in the case where the specified compressed content data has been stored in the supply-side data storing means, if it can read the specified compressed content data from the supply-side data storing means according to the detection result by the supply-side data detecting means, various supply-side reading means other than that such as a CPU and a microprocessor can be widely applied.

In the aforementioned first to eleventh embodiments, it has dealt with the case where as supply-side compressively-coding means, in the state where specified compressed content data has not been stored in the supply-side data storing means, for compressively coding specified content data being the original data of the above specified compressed content data by a specified compression coding method according to the detection result by the supply-side data detecting means, the compressing part 1124 described above with reference to FIGS. 63 to 67C is applied. However, this invention is not only limited to this but also, in the state where specified compressed content data has not been stored in the supply-side data storing means, if it can compressively code specified content data being the original data of the above specified compressed content data by a specified compression coding method and generate specified compressed content data according to the detection result by the supply-side data detecting means, various supply-side compression coding means other than that such as a CPU and a microprocessor that perform compression coding by means of a software for compressing can be widely applied.

In the aforementioned first to eleventh embodiments, it has dealt with the case where as supply-side data transmitting means for transmitting specified compressed content data read from the supply-side data storing means by the supply-side reading means and specified compressed content data generated by the supply-side compressively-coding means to a content providing apparatus, the sending part 1122 connected to the Internet described above with reference to FIGS. 63 to 67C is applied. However, this invention is not only limited to this but also, provided that it can transmit specified compressed content data read from supply-side data storing means by the supply-side reading means and specified compressed content data generated by supply-side compressively-coding means to a content providing apparatus, various supply-side data transmitting means other than that corresponding to a radio/cable communication system to be used can be widely applied.

In the aforementioned first to eleventh embodiments, it has dealt with the case where as data presence detecting means, in the state where specified compressed content data has not been stored in the data storing means, for detecting the presence of specified content data being the original data of the above specified compressed content data according to the detection result by the data detecting means, the data updating/retrieving part 1112 described above with reference to FIGS. 63 to 67C is applied. However, this invention is not only limited to this but also, provided that in the state where specified compressed content data has not been stored in data storing means, it can detect the presence of specified content data being the original data of the above specified compressed content data according to the detection result by the data detecting means, various data presence detecting means other than that such as a CPU and a microprocessor, can be widely applied.

In the aforementioned first to eleventh embodiments, it has dealt with the case where as request sending means, in the state where the absence of specified content data being the original data of specified compressed content data is detected by the data presence detecting means, for sending request information to a content supplying apparatus, the sending part 1116 connected to the Internet described above with reference to FIGS. 63 to 67C is applied. However, this invention is not only limited to this but also, provided that in the state where the absence of specified content data being the original data of specified compressed content data is detected by the data presence detecting means, it can send request information to a content supplying apparatus, various request sending means other than that corresponding to a radio/cable communication system can be widely applied.

Furthermore, in the aforementioned first to eleventh embodiments, it has dealt with the case where as receiving means for receiving specified compressed content data from a content supplying apparatus, the receiving part 1111 connected to the Internet described above with reference to FIGS. 63 to 67C is applied. However, this invention is not only limited to this but also, provided that it can receive specified compressed content data from a content supplying apparatus, various receiving means other than that corresponding to a radio/cable communication system to be used can be widely applied.

While there has been described in connection with the preferred embodiments of this invention, it will be obvious to those skilled in the art that various changes and modifications may be aimed, therefore, to cover in the appended claims all such changes and modifications as fall within the true spirit and scope of this invention.

What is claimed is:

1. A content providing and obtaining system composed of a content providing apparatus for providing compressed content data generated by compressively coding content data by a specified compression coding method, and a content obtaining apparatus applying a specified decoding method corresponding to the specified compression coding method, for obtaining said compressed content data provided from said content providing apparatus, wherein:
said content providing-apparatus:
stores on the content providing apparatus said compressed content data compressively coded by at least one kind of compression coding method,
receives identification information for identifying said specified decoding method applied to the content obtaining apparatus, and specifying information representing specified content data, transmitted from said content obtaining apparatus,
in response to receiving the identification information, detects whether or not specified compressed content data generated by compressively coding said specified content data by said specified compression coding method corresponding to said identification information has been stored thereon according to said identification information and said specifying information, to generate a detection result,
in response to determining that the detection result indicates that said specified compressed content has been stored, reads said specified compressed content data or in response to determining that the detection result indicates that said specified compressed content data has not been stored, compressively codes said specified content data to generate said specified compressed content data, said specified content data being original data of the specified compressed content data before being compressively codes by said specified compression coding method, and
transmits said specified compressed content data to said content obtaining apparatus; and said content obtaining apparatus:
transmits said identification information and said specifying information to said content providing apparatus,
receives said specified compressed content data transmitted from said content providing apparatus, and
decodes said specified compressed content data by said specified decoding method, and generating said specified content data.

2. The content providing and obtaining system according to claim 1, wherein:
said content obtaining apparatus transmits apparatus identification data for identifying the above content obtaining apparatus to said content providing apparatus as said identification information; and
said content providing apparatus specifies said specified decoding method by said apparatus identification data.

3. The content providing and obtaining system according to claim 1, wherein:
said content providing apparatus:
evaluates whether or not said content obtaining apparatus which transmitted said identification information is an authorized apparatus to use a providing service of said specified content data, based at least in part on said identification information; and
only when said content obtaining apparatus is determined to be an authorized apparatus to use said providing service of said specified content data, detects whether or not specified compressed content data generated by compressively coding said specified content data by said specified compression coding method corresponding to said identification information has been stored thereon, based at least in part on said specifying information.

4. The content providing and obtaining system according to claim 1, wherein:
said content providing apparatus:
stores, on the content providing apparatus, said identification information, and information produced by said specified compression coding method corresponding to said specified decoding method applied to said content obtaining apparatus to which the identification information has been allocated, by making a correspondence, and
detects said specified compression coding method corresponding to the stored identification information, based at least in part on said identification information transmitted from said content obtaining apparatus; and
detects whether or not specified compressed content data generated by compressively coding said specified content data by said specified compression coding method corresponding to said identification information has been stored on the content providing apparatus, based at least in part on said specifying information and said detected specified compression coding method.

5. The content providing and obtaining system according to claim 1, wherein;
said content providing apparatus records and stores, if said specified compressed content data is generated, the generated specified compressed content data thereon.

6. The content providing and obtaining system according to claim 1, further comprising a content supplying apparatus, wherein the content supplying apparatus:
stores, on the content supplying apparatus, supply-side compressed content data for supply that has been compressively coded by a compression coding method and different from said compressed content data stored on said content providing apparatus, receives request information representing said specified compression coding method and said specified content data, from said content providing apparatus, detects whether or not said supply-side specified compressed content data generated by compressively coding said specified content data by said specified compression coding method has been stored on the content supplying apparatus, based at least in part on said request information, to generate a supply-side detection result, if the supply-side detection result indicates that said supply-side specified compressed content data has been stores on the content supplying apparatus, reads said specified compressed content data, compressively codes according to the supply-side detection result, if said supply-side specified compressed content data has not been stored on the content supplying apparatus, said specified content data being the original data of the supply-side specified compressed content data by said specified compression coding method, and generating said supply-side specified compressed content data, and transmits said supply-side specified compressed content data to said content providing apparatus; and wherein said content providing apparatus:

detects, if said specified compressed content data has not been stored on the content providing apparatus a presence/absence of said specified content data being original data of the specified compressed content data, transmits, if the absence of the specified content data being the original data of said specified compressed content data is detected, said request information to said content supplying apparatus, and receives said supply-side specified compressed content data transmitted from said content supplying apparatus;

wherein a data transmitter of said content providing apparatus transmits said received supply-side specified compressed content data to said content obtaining apparatus.

7. A method of providing and obtaining a content by providing compressed content data generated by compressively coding content data by a specified compression coding method from a content providing apparatus, and obtaining the provided compressed content data by a content obtaining apparatus applying a specified decoding method corresponding to the specified compression coding method, wherein said content providing method comprises acts of:

receiving identification information for identifying said specified decoding method applied to the content obtaining apparatus, and specifying information representing specified content data, from said content obtaining apparatus, in response to receiving the identification information, detecting whether or not specified compressed content data generated by compressively coding said specified content data by said specified compression coding method corresponding to said identification information has been stored in a data store for storing plural kinds of said compressed content data, according to said identification information and said specifying information, to generate a detection result, in response to determining that the detection result indicates that said specified compressed content data has been stored in said data store, reading said specified compressed content data from said data store, or in response to determining that said specified compressed content data has not been stored in said data store, compressively coding said specified content data being original data of the above specified compressed content data by said specified compression coding method, and generating said specified compressed content data, and transmitting said specified compressed content data read from said data store, or said generated specified compressed content data, to said content obtaining apparatus; and wherein said content obtaining method comprises acts of:

transmitting said identification information and said specifying information to said content providing apparatus, receiving said specified compressed content data from said content providing apparatus, and decoding said specified compressed content data by said specified decoding method, and generating said specified content data.

8. The method of providing and obtaining a content according to claim 7, wherein:

said content obtaining apparatus transmits apparatus identification data for identifying the above content obtaining apparatus to said content providing apparatus as said identification information; and said content providing apparatus specifies said specified decoding method by said apparatus identification data.

9. The method of providing and obtaining a content according to claim 7, wherein:

said content providing method further includes acts of:

evaluating whether or not said content obtaining apparatus which transmitted said identification information is an authorized apparatus to use a providing service of said specified content data, based at least in part on said identification information; and when said content obtaining apparatus is determined to be an authorized apparatus to use said providing service of said specified content data in said act of evaluating, said act of detecting further comprises an act of determining whether or not specified compression content data generated by compressively coding said specified content data by said specified compression coding method corresponding to said identification information has been stored in said data store, based at least in part on said specifying information.

10. The method of providing and obtaining a content according to claim 7, wherein:

said content providing method further includes acts of:

storing said identification information, and information on said specified compression coding method corresponding to said specified decoding method applied to said content obtaining apparatus to which the identification information has been allocated, in an information store by making a correspondence, and detecting said specified compression coding method corresponding to the stored identification information, based at least in part on said identification information transmitted from said content obtaining apparatus; and wherein the act of detecting whether or not specified compressed content data generated by compressively coding said specified content data has been stored in the data store further comprises determining whether or not specified compressed content data generated by compressively coding said specified content data by said specified compression coding method corresponding to said identification information has been stored in said data store, based at least in part on said specifying information and said specified compression coding method detected in the act of detecting the specified compression coding method corresponding to the identification information.

11. The method of providing and obtaining a content according to claim 7, wherein;
said content providing method further comprises an act of recording and storing said generated specified compressed content data in said data store.

12. The method of providing and obtaining a content according to claim 7, further comprising:
a content supplying method for supplying said compressed content data to said content providing apparatus comprises acts of:
receiving request information representing said specified compression coding method and said specified content data, from said content providing apparatus,
detecting whether or not said specified compressed content data generated by compressively coding said specified content data by said specified compression coding method has been stored on a content supplying apparatus, based at least in part on said request information to generate a detection result,
reading, if, according to the detection result, said specified compressed content data has been stored on the content supplying apparatus, said specified compressed content data from said content supplying apparatus, and if said specified compressed content data has not been stored in said content supplying apparatus, compressively coding said specified content data being original data of the above specified compressed content data by said specified compression coding method, and generating said specified compressed content data, and
transmitting said specified compressed content data read from said content supplying apparatus, or said generated specified compressed content data, to said content providing apparatus;

and wherein said content providing method further includes acts of:
detecting, if, according to the detection result, said specified compressed content data has not been stored on the content supplying apparatus, a presence/absence of said specified content data being original data of the above specified compressed content data,
transmitting, if the absence of the specified content data being the original data of said specified compressed content data is detected in the act of detecting, of transmitting said request information to said content supplying apparatus, and
receiving said specified compressed content data from said content supplying apparatus; and
transmitting said specified compressed content data received in the act of receiving to said content obtaining apparatus.

13. A content providing apparatus for providing compressed content data generated by compressively coding content data by a specified compression coding method, to a content obtaining apparatus applying a specified decoding method corresponding to the specified compression coding method, wherein the content providing apparatus:
stores thereon said compressed content data compressively coded by at least one kind of compression coding method;
receives identification information for identifying said specified decoding method applied to the content obtaining apparatus, and specifying information representing specified content data, from said content obtaining apparatus;
in response to receiving the identification information, detects whether or not specified compressed content data generated by compressively coding said specified content data by said specified compression coding method corresponding to said identification information has been stored on the content providing apparatus, according to said identification information and said specifying information to generate a detection result;
in response to determining that the detection result indicates that said specified compressed content has been stored on the content obtaining apparatus, reads said stored specified compressed content data or in response to determining that the detection result indicates that said specified compressed content data has not been stored on the content providing apparatus, compressively coding said specified content data being original data of the above specified compressed content data by said specified compression coding method, and generating said specified compressed content data; and
transmits said specified compressed content data, or said specified compressed content data, to said content obtaining apparatus.

14. The content providing apparatus according to claim 13, wherein:
said identification information transmitted from said content obtaining apparatus is identification data for identifying the content obtaining apparatus; and
the content providing apparatus specifies said specified decoding method by said identification data.

15. The content providing apparatus according to claim 13, wherein the content providing apparatus:
determines whether or not said content obtaining apparatus which transmitted said identification information is an authorized apparatus to use a providing service of said specified content data, based at least in part on said identification information; and
when said content obtaining apparatus is determined to be an authorized apparatus to use said providing service of said specified content data, detects whether or not specified compressed content data generated by compressively coding said specified content data by said specified compression coding method corresponding to said identification information has been stored on the content providing apparatus, based at least in part on said specifying information.

16. The content providing apparatus according to claim 13, wherein the content providing apparatus:
stores thereon said identification information, and information produced by said specified compression coding method corresponding to said specified decoding method applied to said content obtaining apparatus to which the identification information has been allocated, by making a correspondence, detects said specified compression coding method corresponding to the above identification information in said identification information store, based at least in part on said identification information transmitted from said content obtaining apparatus; and
detects whether or not specified compressed content data generated by compressively coding said specified content data by said specified compression coding method corresponding to said identification information has been stored on the content providing apparatus, based at least in part on said specifying information and said detected specified compression coding method.

17. The content providing apparatus according to claim 13, wherein the content providing apparatus;

records and stores thereon, if said specified compressed content data is generated by said compressively-coding encoder, the generated specified compressed content data.

18. The content providing apparatus according to claim 13, wherein the content providing apparatus:
  detects, according to the detection result, if said specified compressed content data has not been stored on the content providing apparatus, a presence/absence of said specified content data being original data of the specified compressed content data, to generate a data presence detection result,
  transmits, if the absence of the specified content data being the original data of said specified compressed content data is detected according to said data presence detection result, request information representing said specified compression coding method and said specified content data, to a content supplying apparatus that stores compressed content data for supply that has been compressively coded by a compression coding method different from said compressed content data stored on the content providing apparatus, and
  receives, as a result that said request information was transmitted to said content supplying apparatus, if said specified compressed content data has been stored on the content supplying apparatus, said specified compressed content data read and transmitted from the content supplying apparatus, and if said specified compressed content data has not been stored on the content supplying apparatus receives said specified compressed content data generated by compressively coding said specified content data being the original data of the specified compressed content data by said specified compression coding method and then transmitted;
  wherein said content providing apparatus transmits said received specified compressed content data received to said content obtaining apparatus.

19. A method of providing a content by providing compressed content data generated by compressively coding content data by a specified compression coding method to a content obtaining apparatus applying a specified decoding method corresponding to the specified compression coding method, comprising acts of:
  receiving, at a content providing apparatus, identification information, transmitted from the content obtaining apparatus, for identifying said specified decoding method applied to the content obtaining apparatus, and specifying information representing specified content data, from said content obtaining apparatus;
  in response to receiving the identification information, detecting whether or not specified compressed content data generated by compressively coding said specified content data by said specified compression coding method corresponding to said identification information has been stored on the content providing apparatus, according to said identification information and said specifying information to generate a detection result;
  in response to determining that the detection result indicates that specified compressed content data has been stored on the content providing apparatus, reading said specified compressed content data from said content providing apparatus, or in response to determining that the detection result indicates that said specified compressed content data has not been stored on the content providing apparatus, compressively coding said specified content data being original data of the specified compressed content data by said specified compression coding method, and generating said specified compressed content data; and
  transmitting said specified compressed content data, or said generated specified compressed content data, to said content obtaining apparatus.

20. The method of providing a content according to claim 19, wherein:
  said identification information transmitted from said content obtaining apparatus is identification data for identifying the content obtaining apparatus; and
  said act of detecting further comprises an act of specifying said specified decoding method by said identification data.

21. The method of providing a content according to claim 19, further comprising acts of:
  determining whether or not said content obtaining apparatus which transmitted said identification information is an authorized apparatus to use a providing service of said specified content data, based at least in part on said identification information; and wherein
  when said content obtaining apparatus is determined to be an authorized apparatus to use said providing service of said specified content data, said act of detecting further comprises an act of determining whether or not specified compressed content data generated by compressively coding said specified content data by said specified compression coding method corresponding to said identification information has been stored on the content providing apparatus, based at least in part on said specifying information.

22. The method of providing a content according to claim 19, further comprising acts of:
  storing said identification information, and information on said specified compression coding method corresponding to said specified decoding method applied to said content obtaining apparatus to which the above identification information has been allocated by making a correspondence, and
  detecting said specified compression coding method corresponding to the stored identification information, based at least in part on said identification information transmitted from said content obtaining apparatus; wherein
  said act of detecting whether or not said specified compressed content data has been stored further comprises determining whether or not specified compressed content data generated by compressively coding said specified content data by said specified compression coding method corresponding to said identification information has been stored, based at least in part on said specifying information and said specified compression coding method detected in the act of detecting the specified coding method corresponding to the identification information.

23. The method of providing a content according to claim 19, further comprising an act of:
  recording and storing said generated specified compressed content data on the content providing apparatus.

24. The method of providing a content according to claim 19, further comprising acts of:
- detecting, if, according to the detection result, if said specified compressed content data has not been stored, a presence/absence of said specified content data being the data of the specified compressed content data,
- transmitting, if the absence of the specified content data being the original data of said specified compressed content data is detected, request information representing said specified compression coding method and said specified content data, to a content supplying apparatus that stores compressed content data for supply that has been compressively coded by a compression coding method different from said compressed content data stored on the content providing apparatus, and
- receiving, if, as a result that said request information was transmitted to said content supplying apparatus, said specified compressed content data has been stored on said content supplying apparatus, said specified compressed content data read and transmitted from said content supplying apparatus, and if said specified compressed content data has not been stored on said content supplying apparatus, receiving said specified compressed content data generated by compressively coding said specified content data being the original data of the above specified compressed content data by said specified compression coding method and then transmitted; and
- transmitting said received specified compressed content data to said content obtaining apparatus.

25. A non-transitory content providing program storing medium encoded with instructions that, when executed by a content providing apparatus, perform a method comprising:
- receiving identification information for identifying a specified decoding method, and specifying information representing specified content data, from a content obtaining apparatus applying the specified decoding method corresponding to a specified compression coding method, for obtaining compressed content data generated by compressively coding content data by the specified compression coding method;
- in response to receiving the identification information, detecting whether or not specified compressed content data generated by compressively coding said specified content data by said specified compression coding method corresponding to said identification information has been stored on the content providing apparatus to generate a detection result;
- in response to determining that the detection result indicates that said specified compressed content data has been stored on the content providing apparatus, reading said specified compressed content data, or in response to determining that the detection result indicates that said specified compressed content data has not been stored on the content providing apparatus, compressively coding said specified content data being original data of the above specified compressed content data by said specified compression coding method, and generating said specified compressed content data; and
- transmitting said read specified compressed content data, or said generated specified compressed content data, to said content obtaining apparatus.

26. The non-transitory content providing program storing medium according to claim 25, wherein:
- said identification information transmitted from said content obtaining apparatus is identification data for identifying the above content obtaining apparatus; and wherein the act of
- detecting further comprises specifying said specified decoding method by said identification data.

27. The non-transitory content providing program storing medium according to claim 25, wherein said method further comprises:
- determining whether or not said content obtaining apparatus which transmitted said identification information is an authorized apparatus to use a providing service of said specified content data, based at least in part on said identification information; and
- when said content obtaining apparatus is determined to be an authorized apparatus to use said providing service of said specified content data, determining whether or not specified compressed content data generated by compressively coding said specified content data by said specified compression coding method corresponding to said identification information has been stored on the content providing apparatus, based at least in part on said specifying information.

28. The non-transitory content providing program storing medium according to claim 25, wherein said method further comprises:
- storing said identification information, and information on said specified compression coding method corresponding to said specified decoding method applied to said content obtaining apparatus to which the identification information has been allocated by making a correspondence, and
- identifying said specified compression coding method corresponding to the stored identification information, based at least in part on said identification information transmitted from
- said content obtaining apparatus; wherein said act of detecting further comprises an act of determining whether or not specified compressed content data generated by compressively coding said specified content data by said specified compression coding method corresponding to said identification information has been stored on the content providing apparatus, based at least in part on said specifying information and said specified compression coding method detected in said act of identifying.

29. The non-transitory content providing program storing medium according to claim 25, wherein said method further comprises:
- recording and storing said generated specified compressed content data on the content providing apparatus.

30. The non-transitory content providing program storing medium according to claim 25, wherein said method further comprises:
- detecting, if, according to the detection result, if said specified compressed content data has not been stored, a presence/absence of said specified content data being the data of the specified compressed content data,
- transmitting, if the absence of the specified content data being the original data of said specified compressed content data is detected, request information representing said specified compression coding method and said specified content data, to a content supplying apparatus that stores compressed content data for supply that has been compressively coded by a compression coding method different from said compressed content data stored on the content providing apparatus, and receiving, if, as a result that said request information was transmitted to said content supplying apparatus, said specified compressed content data has been stored on said content supplying apparatus, said specified compressed content data read and transmitted from said content supplying apparatus, and if said specified compressed content data has not been stored on said content supplying apparatus, receiving said specified compressed content data generated by compressively coding said specified content data being the original data of the above specified compressed content data by said specified compression coding method and then transmitted; and transmitting said received specified compressed content data to said content obtaining apparatus.

* * * * *